(12) United States Patent
Chien et al.

(10) Patent No.: US 11,746,047 B2
(45) Date of Patent: Sep. 5, 2023

(54) WIRED AND DETACHABLE CHARGING-UNIT OF ELECTRIC PRODUCT

(71) Applicants: Tseng-Lu Chien, Walnut, CA (US); De-Yi Chien, Walnut, CA (US); De-Ying Cian, Walnut, CA (US)

(72) Inventors: Tseng-Lu Chien, Walnut, CA (US); De-Yi Chien, Walnut, CA (US); De-Ying Cian, Walnut, CA (US)

(73) Assignees: Aaron Chien, Walnut, CA (US); Hsin-Yi Wang, Walnut, CA (US); Te-Ju Chien, Walnut, CA (US)

( * ) Notice: Subject to any disclaimer, the term of this patent is extended or adjusted under 35 U.S.C. 154(b) by 288 days.

(21) Appl. No.: 16/935,739

(22) Filed: Jul. 22, 2020

(65) Prior Publication Data

US 2021/0002170 A1 Jan. 7, 2021

Related U.S. Application Data

(60) Continuation-in-part of application No. 14/951,872, filed on Nov. 25, 2015, now Pat. No. 10,948,175, (Continued)

(51) Int. Cl.
| | |
|---|---|
| *C03C 27/02* | (2006.01) |
| *C03C 10/00* | (2006.01) |
| *C03B 27/012* | (2006.01) |
| *C03C 3/097* | (2006.01) |
| *C03B 32/02* | (2006.01) |
| *F16J 15/10* | (2006.01) |

(52) U.S. Cl.
CPC ............ *C03C 27/02* (2013.01); *C03B 27/012* (2013.01); *C03B 32/02* (2013.01); *C03C 3/097* (2013.01); *C03C 10/0027* (2013.01); *F16J 15/102* (2013.01)

(58) Field of Classification Search
CPC ..... C03C 27/02; C03C 3/097; C03C 10/0027; C03B 27/012; C03B 32/02; F16J 15/102; H05B 45/30; H02J 7/0042; H02J 50/005; H02J 50/10; F21V 33/0004; F21S 6/003; F21S 6/004; F21Y 2103/33; F21Y 2115/10
See application file for complete search history.

(56) References Cited

U.S. PATENT DOCUMENTS 5,347,211 A 9/1994 Jakubowski
6,474,823 B1 11/2002 Agata et al.
(Continued)

FOREIGN PATENT DOCUMENTS

CN 201078619 Y 6/2008

*Primary Examiner* — Bao Q Truong
(74) *Attorney, Agent, or Firm* — BACON&THOMAS, PLLC

(57) ABSTRACT

A wired and detachable, moveable, dis-assemble, re-assemble USB or Wireless charging-unit(s) which has minimum feet DC power delivery wire that is manual to coil, wrap within unit's own space for wire-arrangement, said each wired and detachable unit(s) cover broad area and people can chare external product(s) at any location within said area; wherein said unit(s) assembly with electric product which is at least one (1) desk, floor, wall-mounted item, light, (2) power strip, (3) selfie LED light has built-in or added-on image capture device(s).

18 Claims, 47 Drawing Sheets

Related U.S. Application Data which is a continuation of application No. 14/834,616, filed on Aug. 25, 2015, now Pat. No. 9,878,944, which is a continuation-in-part of application No. 14/827,810, filed on Aug. 17, 2015, now Pat. No. 10,476,286, application No. 16/935,739 is a continuation-in-part of application No. 14/643,026, filed on Mar. 10, 2015, which is a continuation of application No. 14/144,703, filed on Dec. 31, 2013, which is a continuation of application No. 13/161,643, filed on Jun. 16, 2011, now Pat. No. 8,783,936, said application No. 14/951,872 is a continuation of application No. 14/793,262, filed on Jul. 7, 2015, now abandoned, which is a continuation of application No. 14/642,169, filed on Mar. 9, 2015, now abandoned, which is a continuation of application No. 12/950,017, filed on Nov. 19, 2010, now Pat. No. 8,998,462, application No. 16/935,739 is a continuation-in-part of application No. 16/781,155, filed on Feb. 4, 2020, which is a division of application No. 14/870,601, filed on Sep. 30, 2015, now Pat. No. 10,753,598.

(56) References Cited

U.S. PATENT DOCUMENTS

| | | | |
|---|---|---|---|
| 6,666,563 B2 | 12/2003 | Brown | |
| 6,780,048 B2 * | 8/2004 | Chen | H01R 13/7034 439/502 |
| 7,679,317 B2 | 3/2010 | Meselic | |
| 7,736,033 B2 | 6/2010 | Patel | |
| 7,742,293 B2 | 6/2010 | Strauser | |
| 7,897,277 B2 | 3/2011 | Meyer et al. | |
| 8,116,007 B2 | 2/2012 | Tsai | |
| 8,432,667 B2 | 4/2013 | Strauser | |
| 8,545,039 B2 | 10/2013 | Patel | |
| 8,562,187 B2 | 10/2013 | Smed | |
| 8,687,392 B2 | 4/2014 | Sims | |
| 8,758,031 B2 | 6/2014 | Cheng et al. | |
| 8,783,936 B2 | 7/2014 | Chien | |
| 8,853,884 B2 | 10/2014 | Genannt Berghegger | |
| 8,899,797 B2 | 12/2014 | Schaak | |
| 8,911,137 B2 | 12/2014 | Chien | |
| 8,915,608 B2 | 12/2014 | Chien | |
| 9,057,490 B2 | 6/2015 | Sharrah et al. | |
| 9,103,543 B2 | 8/2015 | Marquardt | |
| 9,125,462 B2 | 9/2015 | Akin | |
| 9,805,772 B1 | 10/2017 | Tang | |
| 2004/0145890 A1 | 7/2004 | Liao | |
| 2006/0209530 A1 | 9/2006 | Schaak | |
| 2006/0221017 A1 | 10/2006 | Fang | |
| 2008/0012423 A1 | 1/2008 | Mimran | |
| 2008/0258642 A1 | 10/2008 | Patel | |
| 2009/0057161 A1 | 3/2009 | Nagata | |
| 2009/0067161 A1 | 3/2009 | Nagata | |
| 2009/0154148 A1 | 6/2009 | Meyer et al. | |
| 2010/0039792 A1 | 2/2010 | Meyers | |
| 2011/0084660 A1 | 4/2011 | McSweyn | |
| 2011/0175544 A1 * | 7/2011 | Jong | H02J 50/20 315/294 |
| 2011/0177703 A1 | 7/2011 | Lin | |
| 2011/0215759 A1 * | 9/2011 | Lee | H01R 13/72 320/115 |
| 2011/0287665 A1 | 11/2011 | Chien | |
| 2012/0113645 A1 * | 5/2012 | Liao | F21V 33/0052 362/253 |
| 2012/0292991 A1 | 11/2012 | Dodal | |
| 2014/0307439 A1 * | 10/2014 | Chien | H02J 7/0042 362/253 |
| 2015/0070896 A1 | 3/2015 | Chien | |
| 2015/0091522 A1 * | 4/2015 | Byrne | H02J 7/025 320/108 |

* cited by examiner

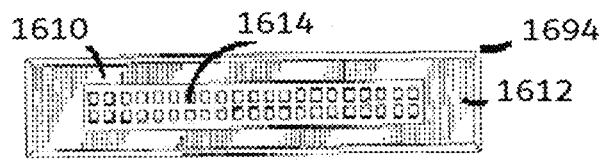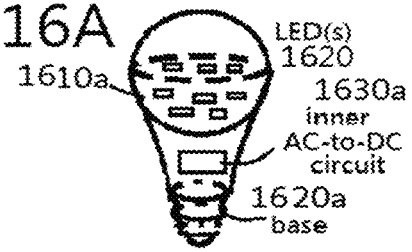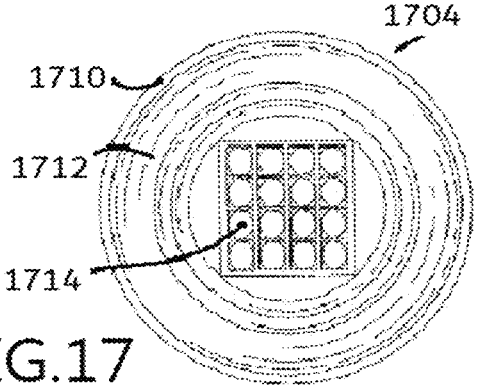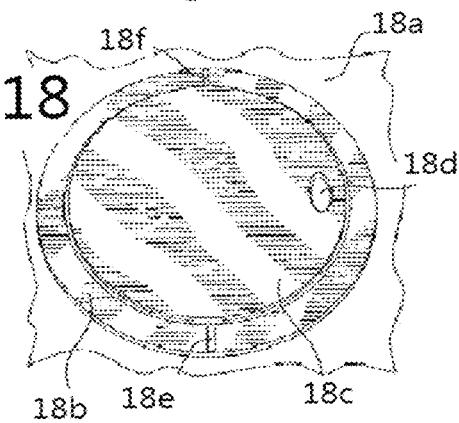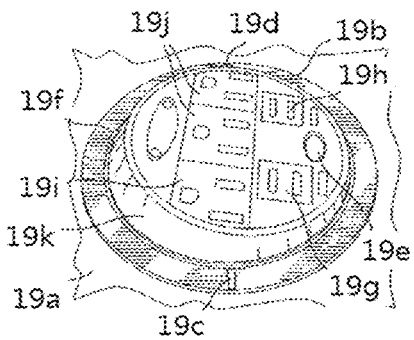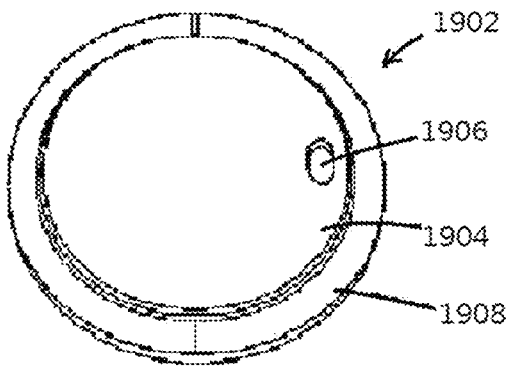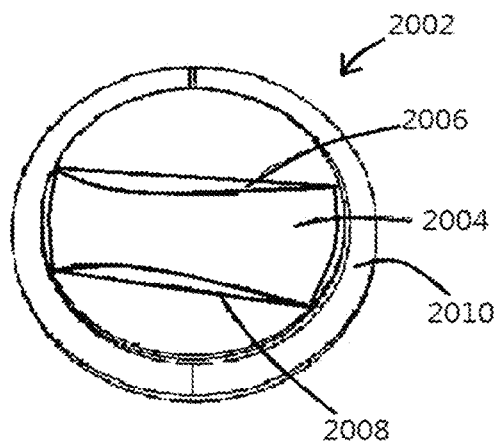

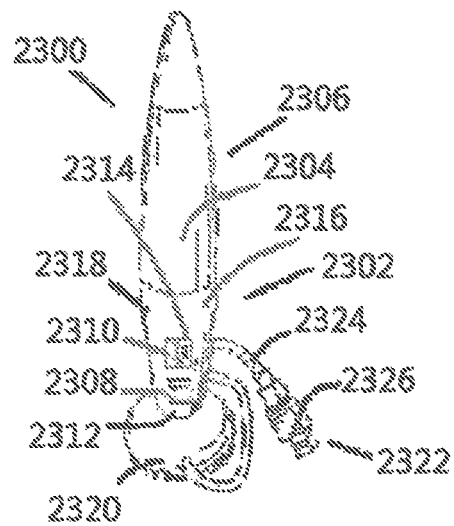
FIG. 23
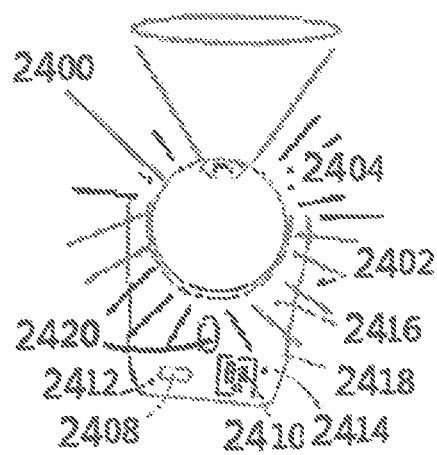
FIG. 24
FIG. 25
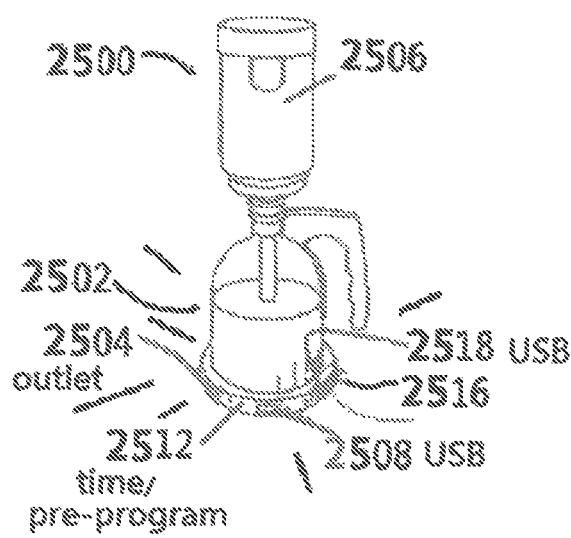
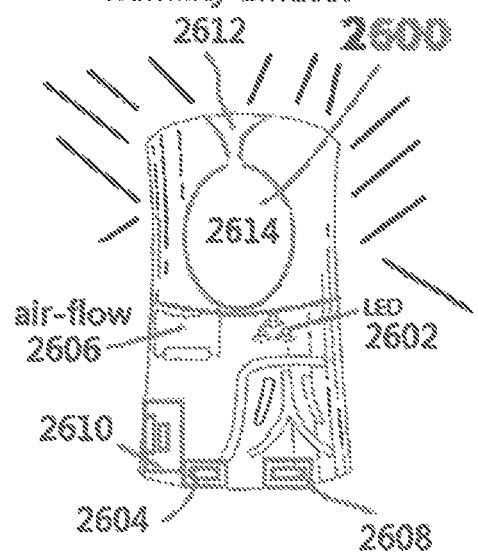
FIG. 26

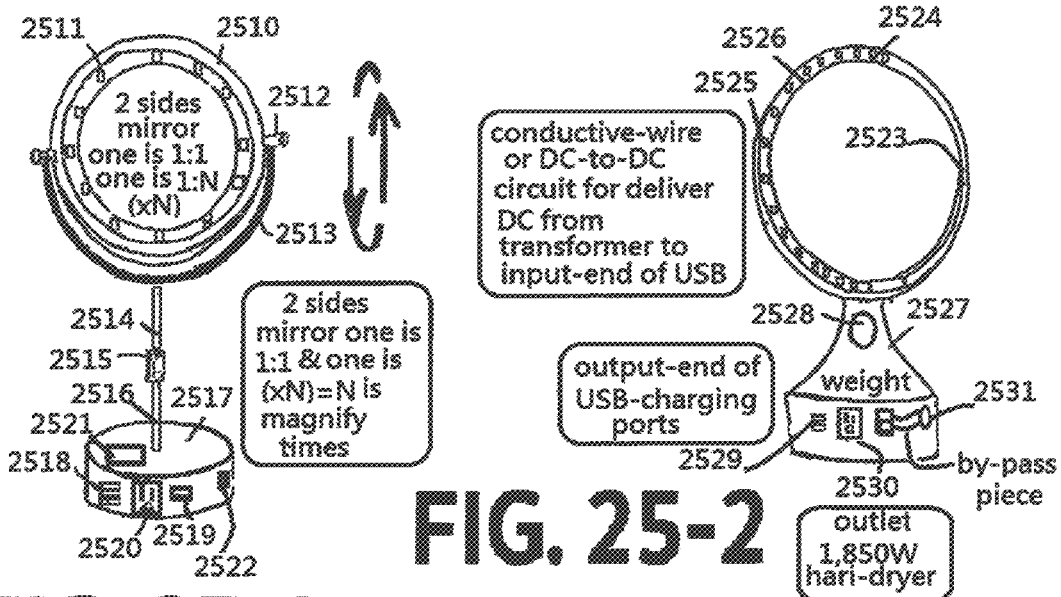
FIG. 25-1
FIG. 25-2
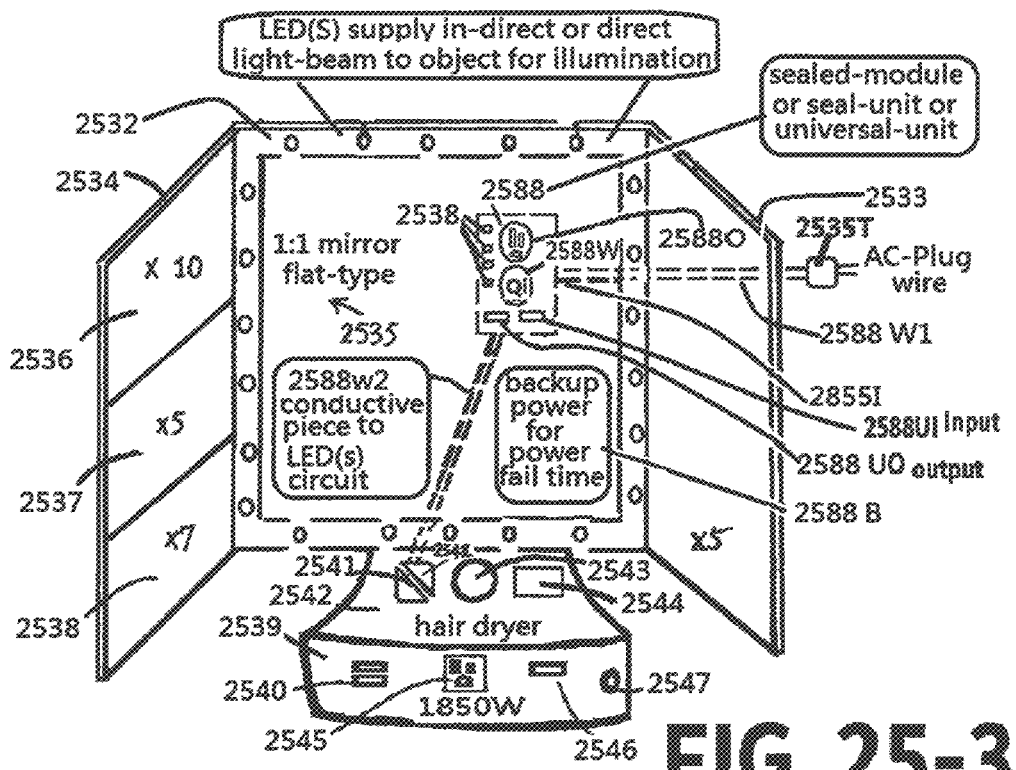
FIG. 25-3

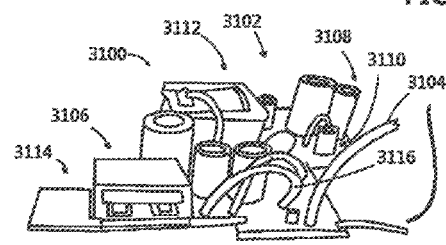
FIG. 30A1
(1) USB-unit: No housing, Not sealed and install within housing has one or more than one PCBs.
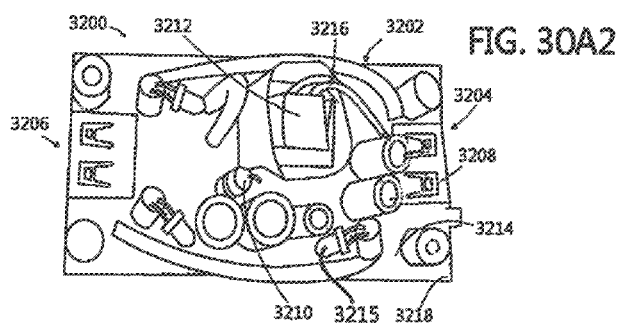
FIG. 30A2
(2) USB Module: more than one USB or optional outlet-unit(s) into 1 PCB to fit within the said desk top items (lamp).

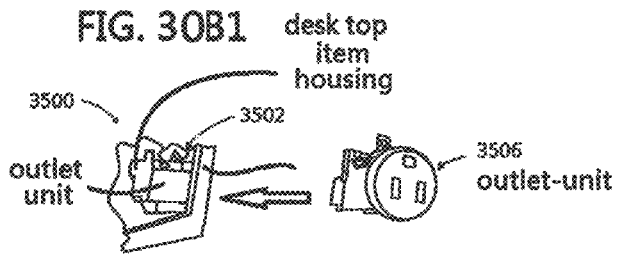
FIG. 30B1
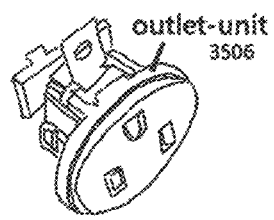
FIG.30B2
Outlet-unit: Outlet-unit is one unit has 2 or 3 prong receiving-ports to supply AC current to others device
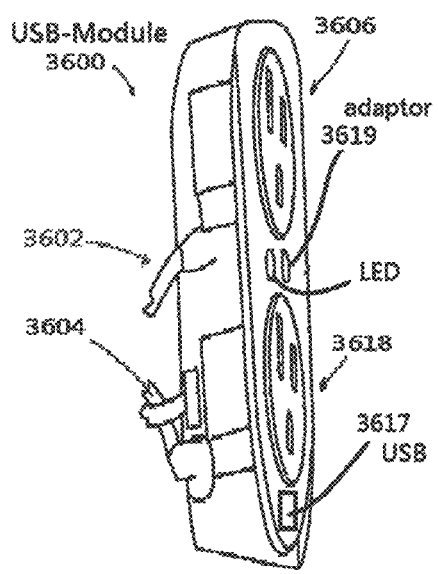
FIG.30B4
outlets-Module; hsae more than one of outlets or-and preferred USB-unit(s) or LED(s) inside its own housing or PCB(s) to fit into desk top item housing
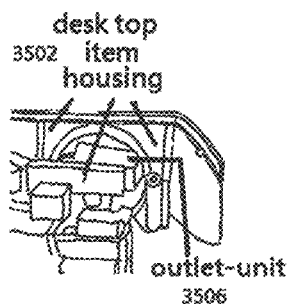
FIG. 30B3

FIG. 30C1

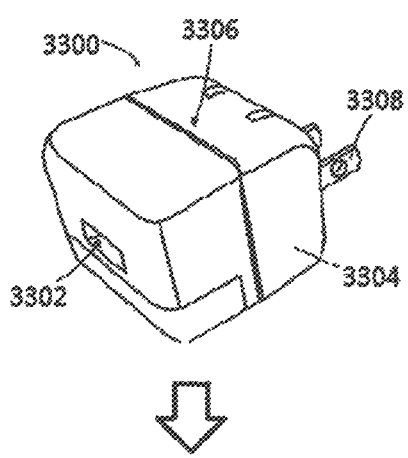

FIG. 30C3

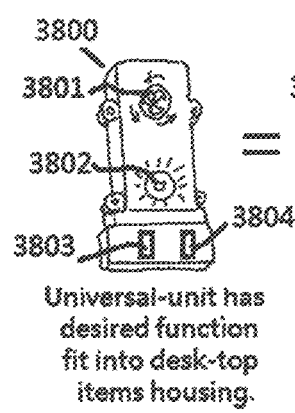

Universal-unit has desired function fit into desk-top items housing.

FIG. 30C4

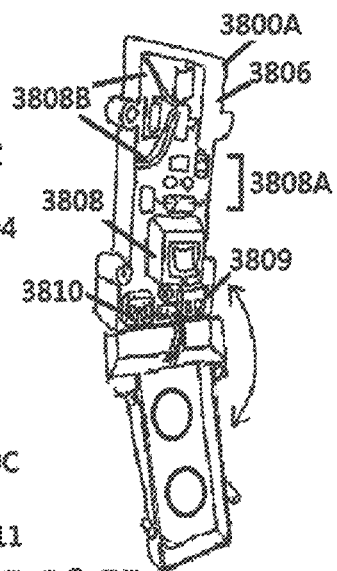

Universal-unit or module: is a sealed-unit has its functions such as fan or light and fit into any main housing. No safety certification.

FIG.30C5

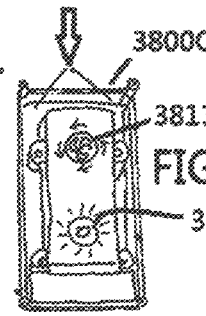

Sealed-Unit: Unit has safety certification can sell individual assemble with desk-top item by conductive-piece, and movable to use for itself while plug-into other outlets while detached from desk-top item outlets.

FIG. 30C2

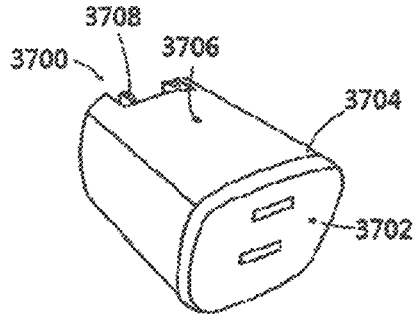

housing of desk top item or lamp housing

FIG.30C6

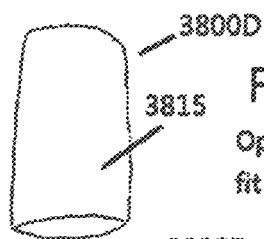

Optional optics-parts fit on desk top items

FIG.30C7

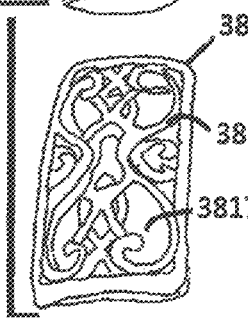

decorative parts fit on desk top item

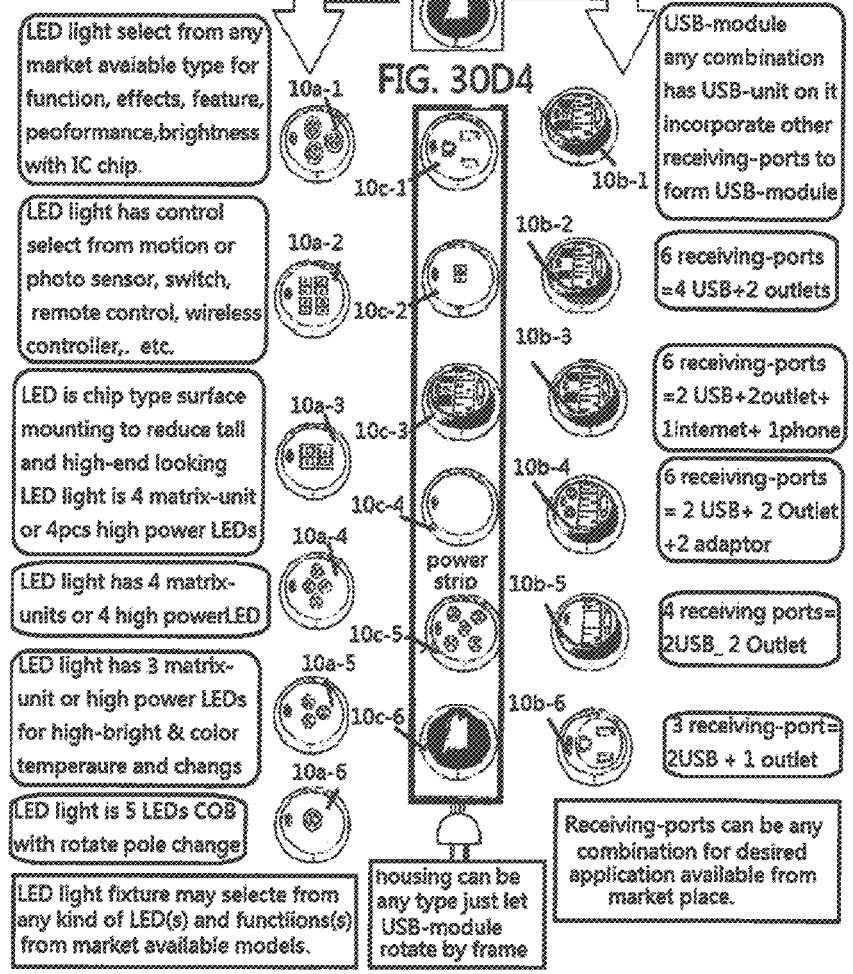

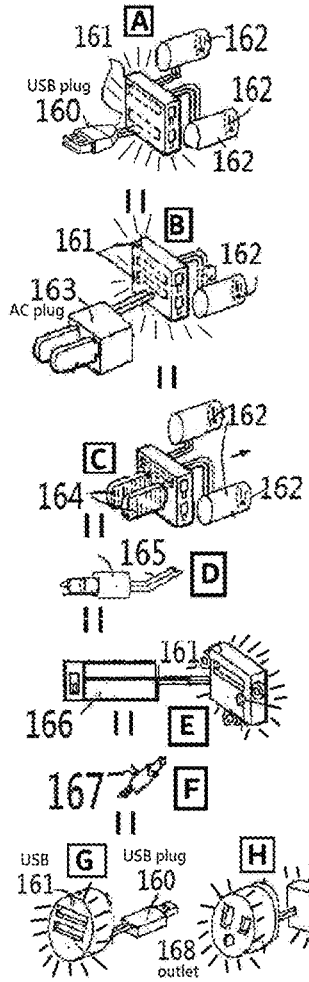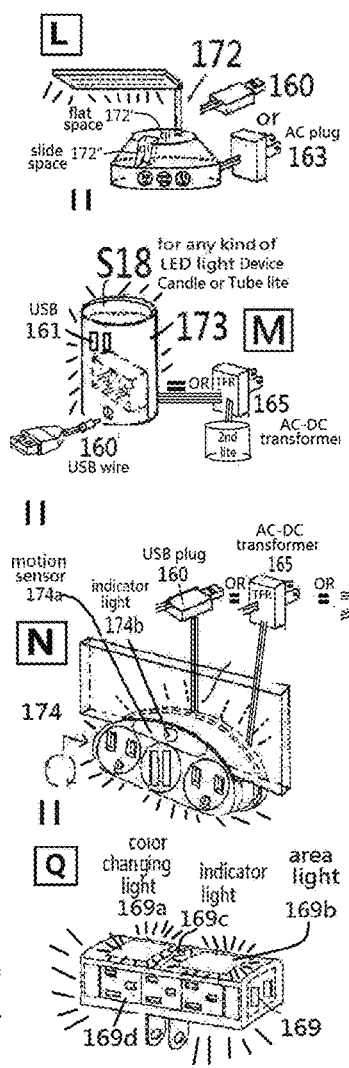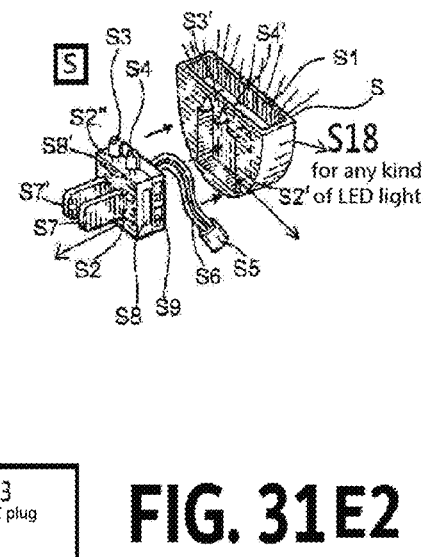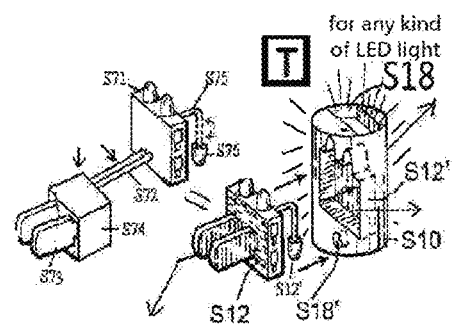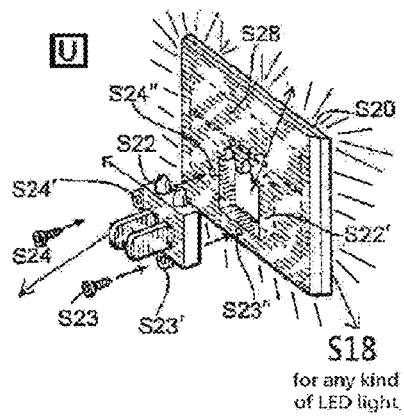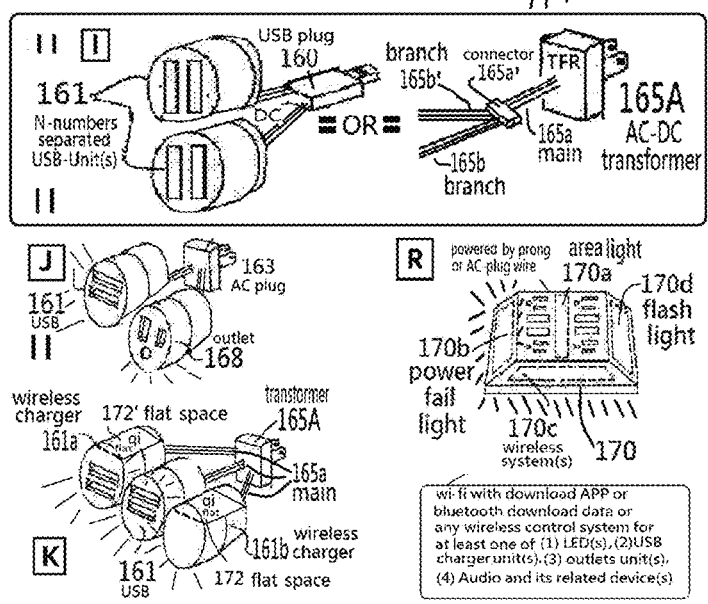
FIG. 30E1
FIG. 31E2

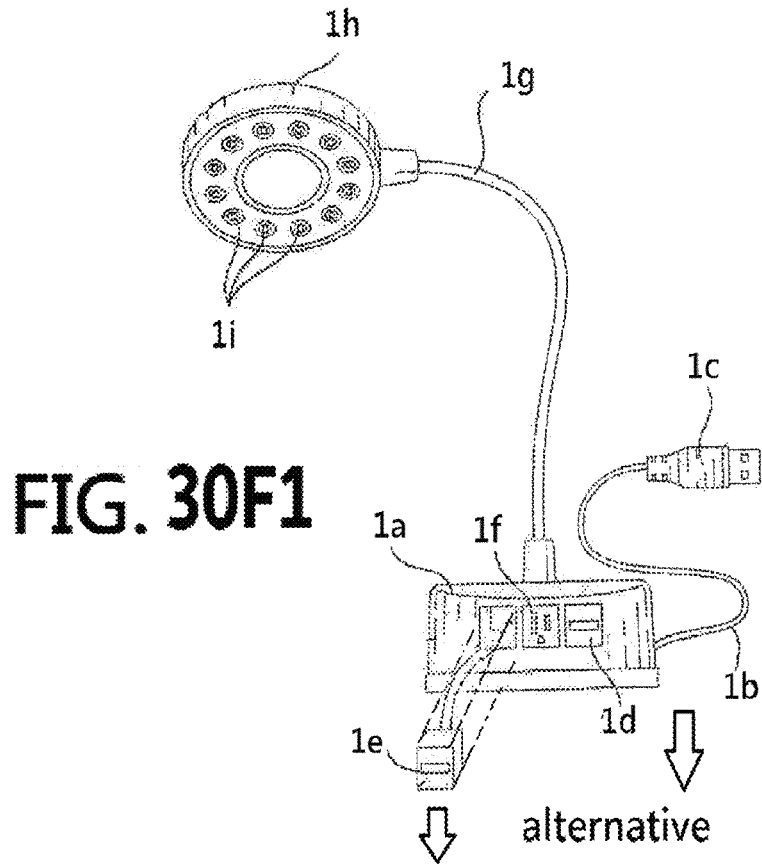
FIG. 30F1
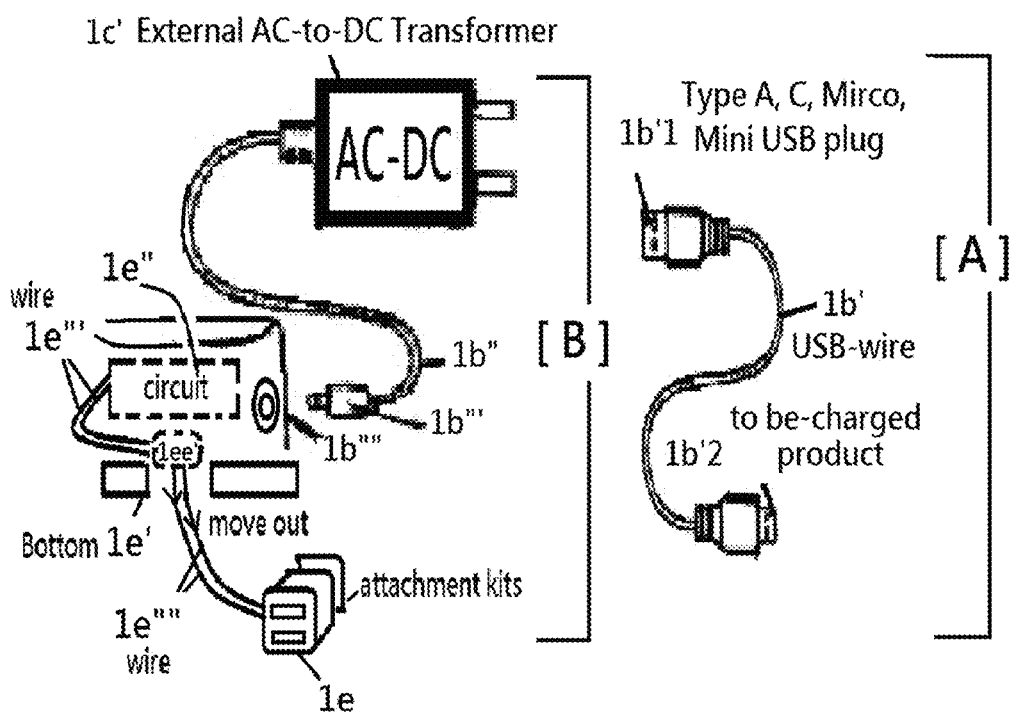

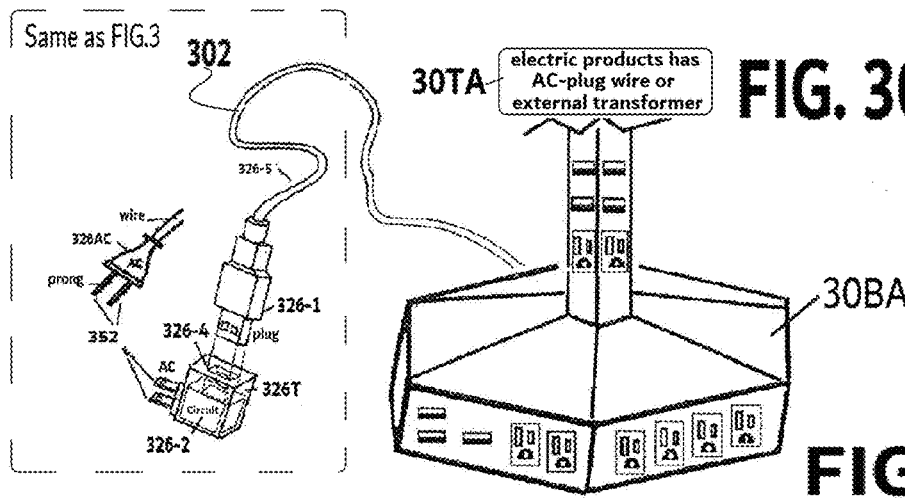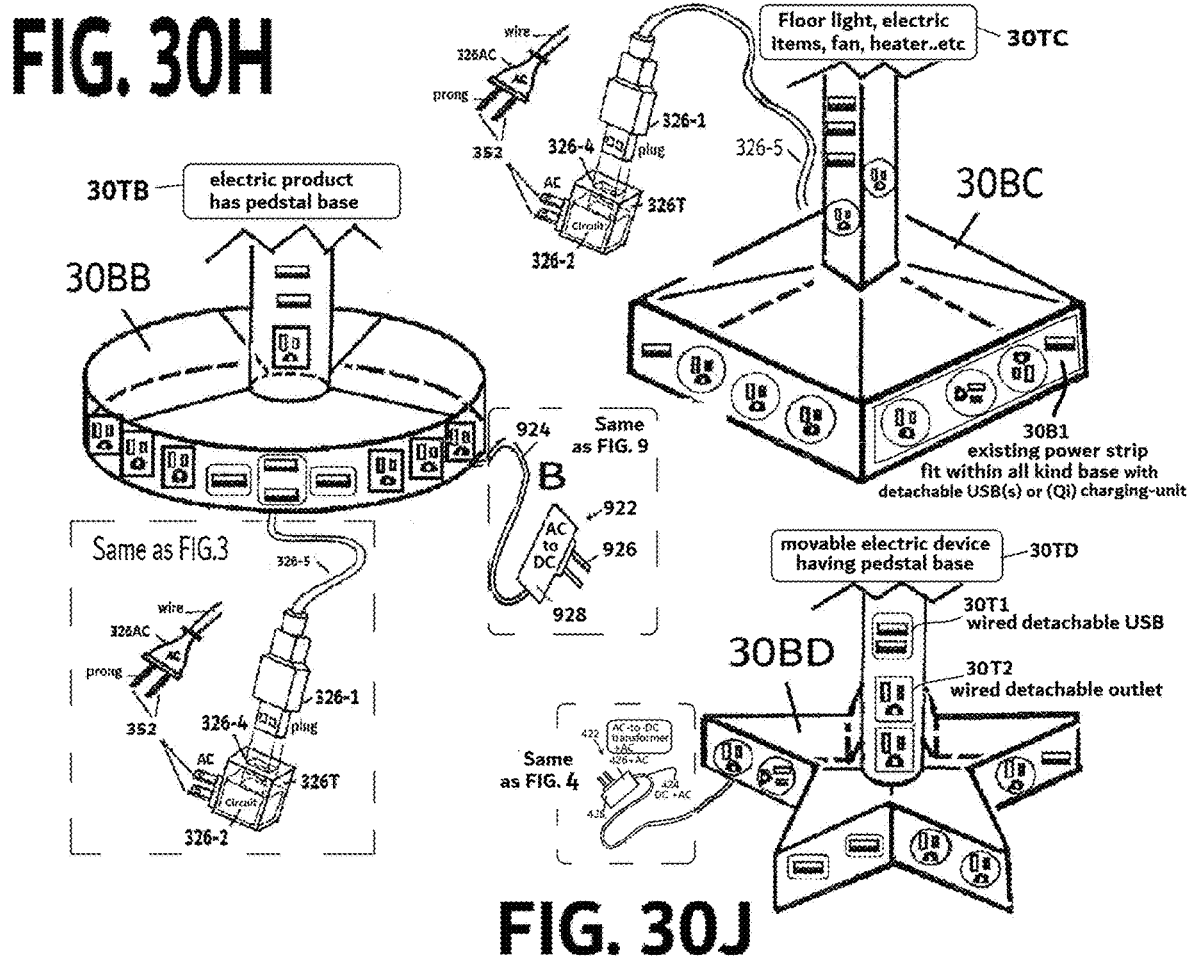

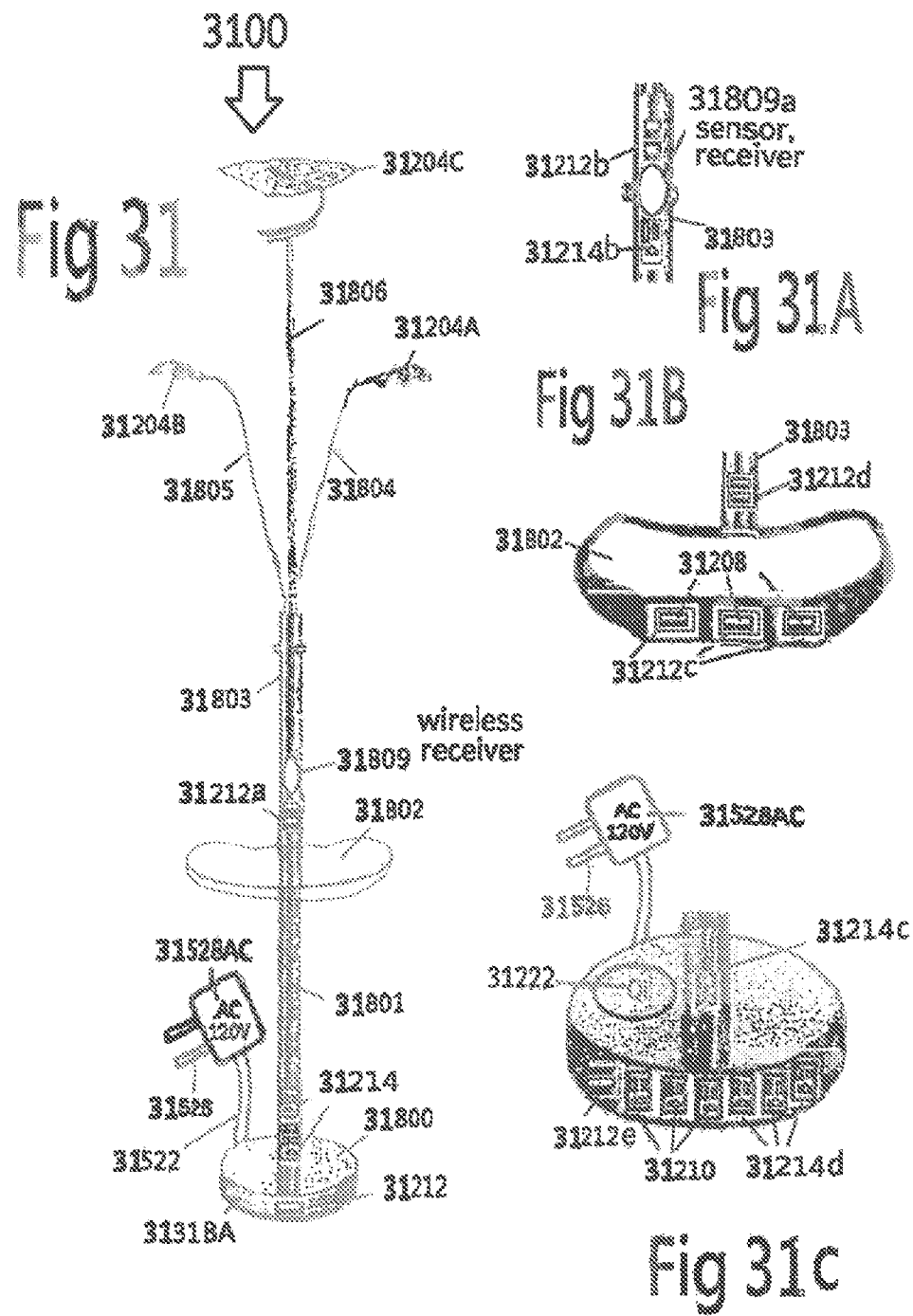

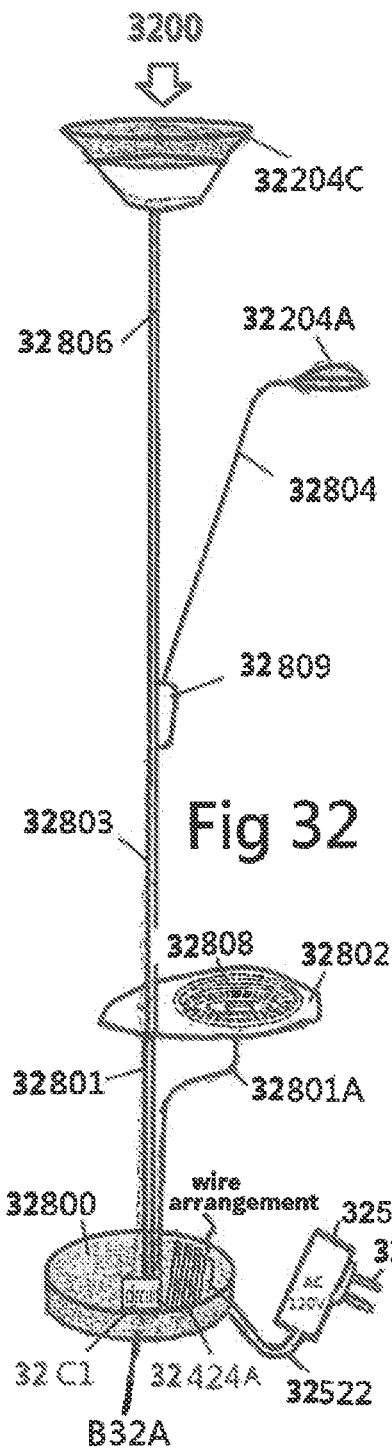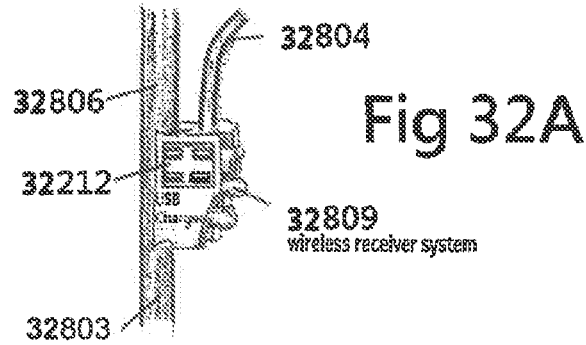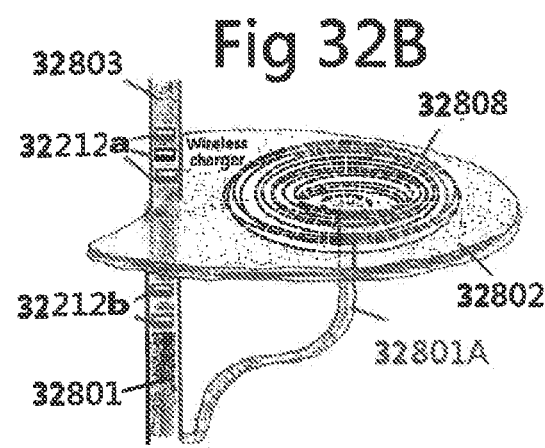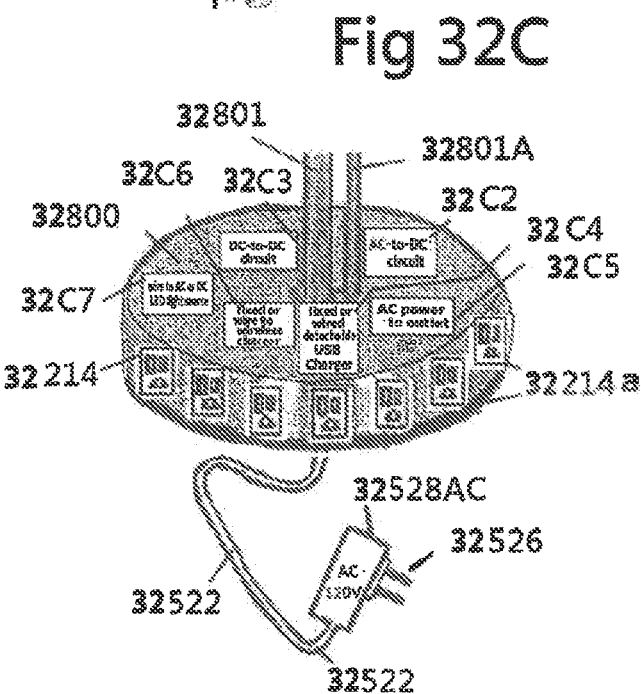

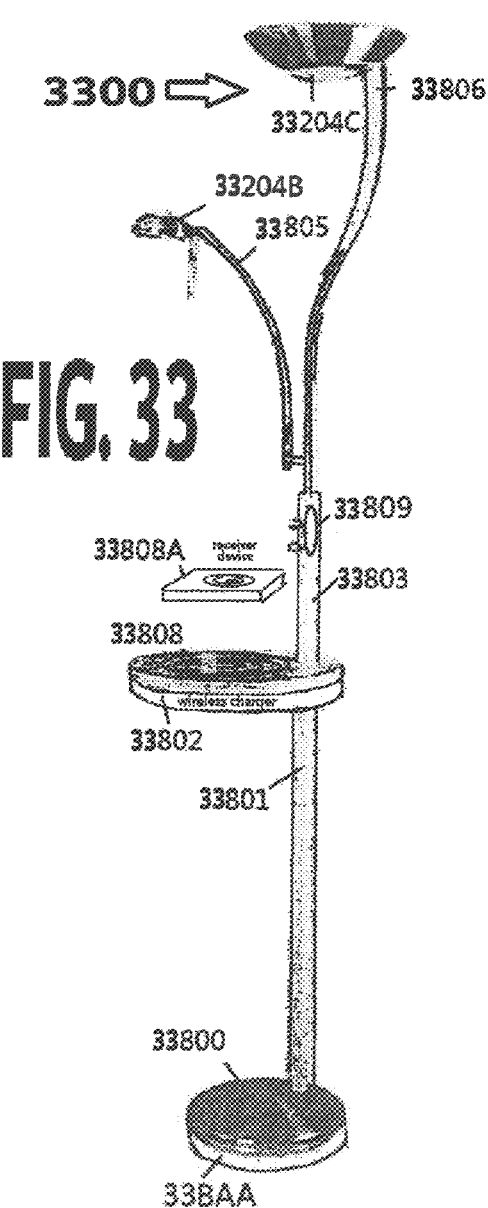
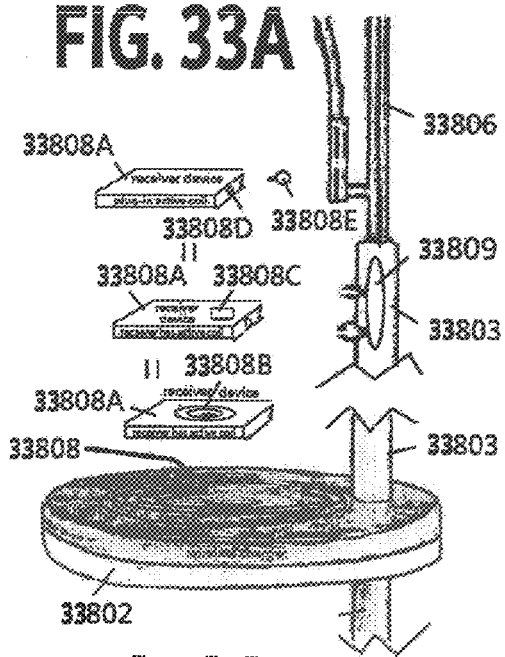
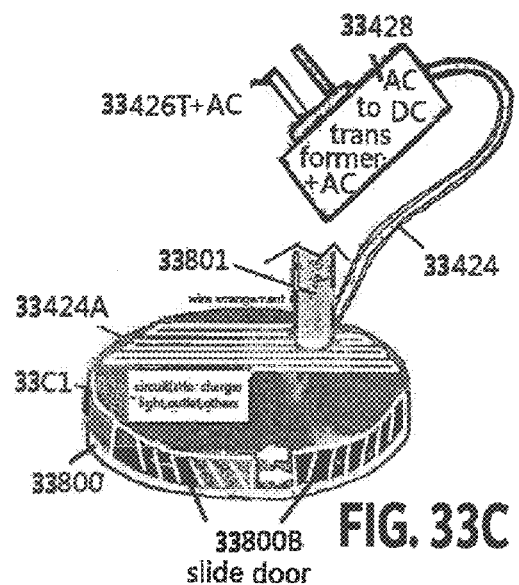

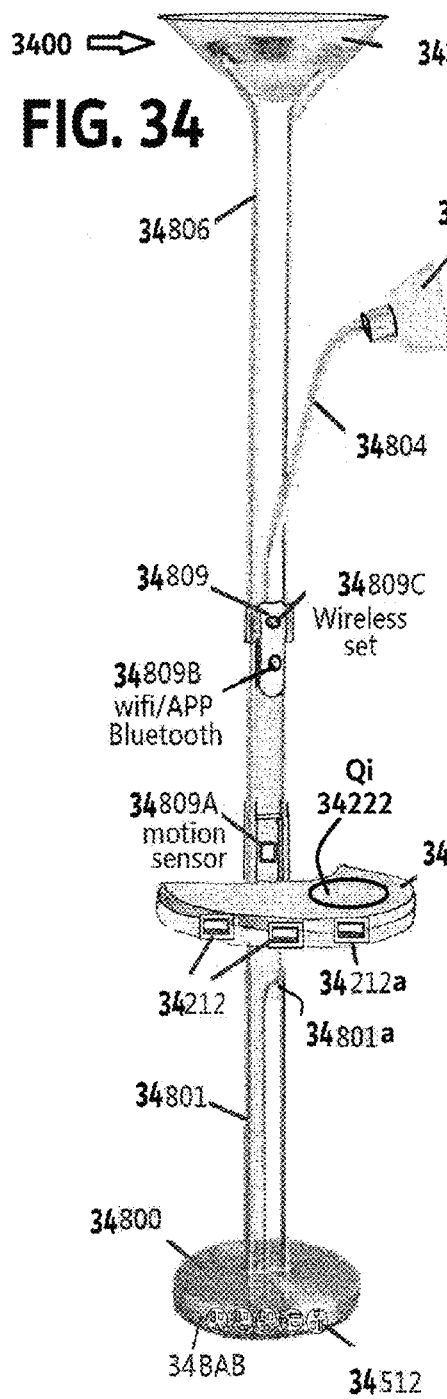
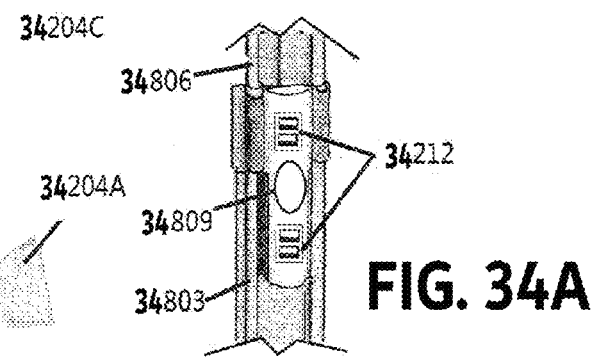
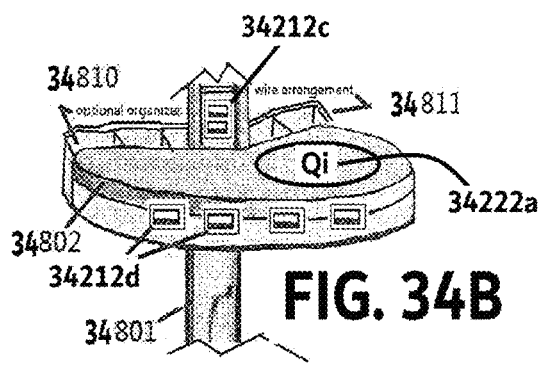
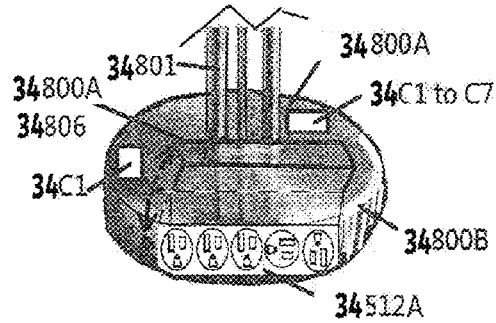

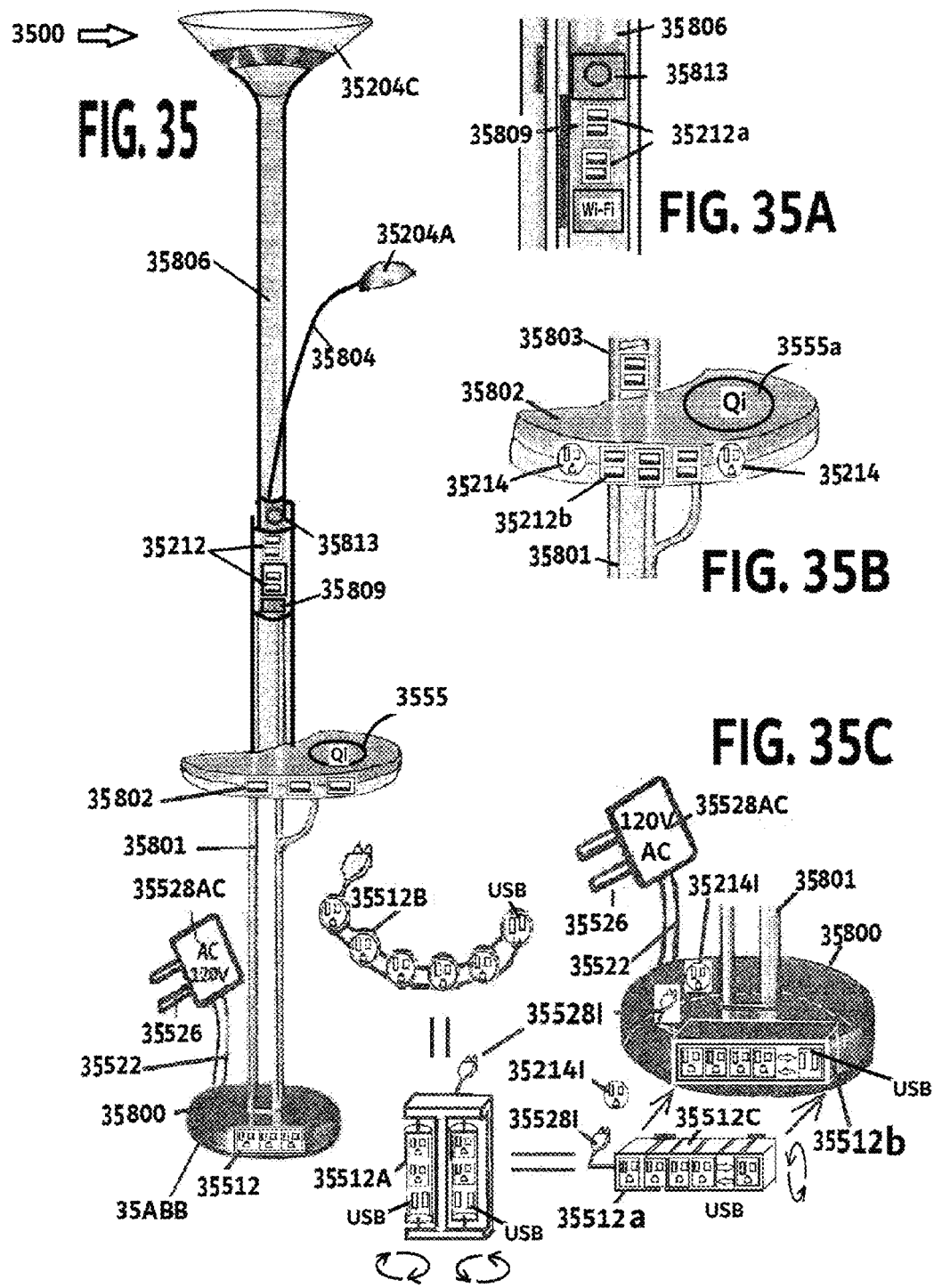

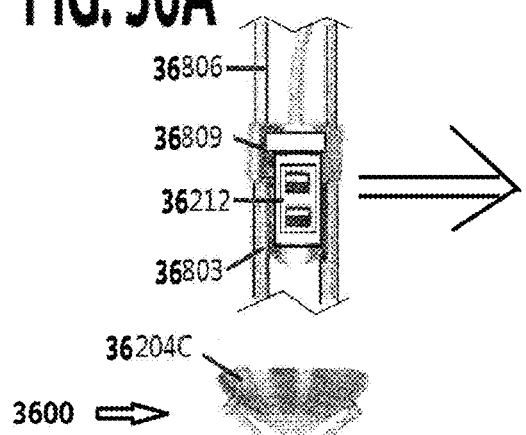
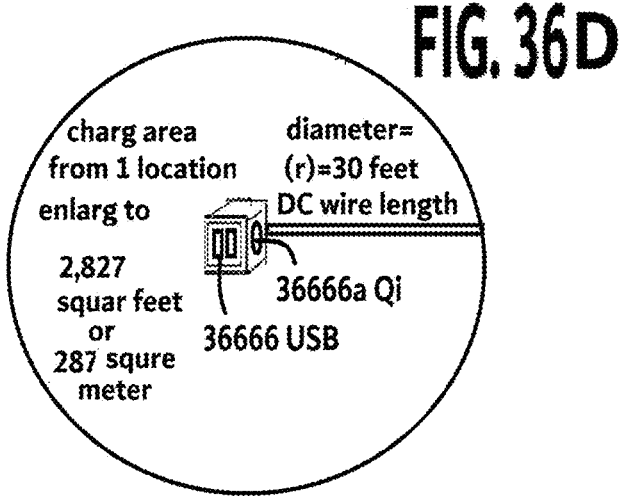
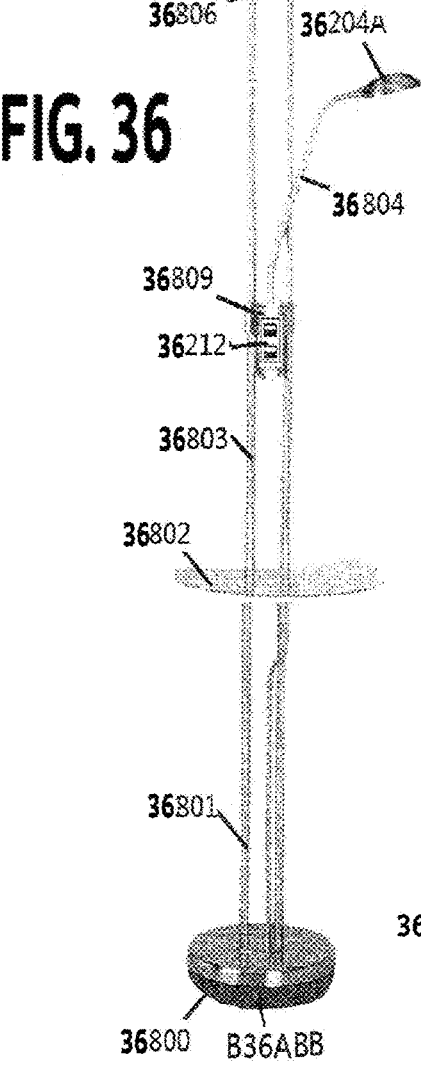
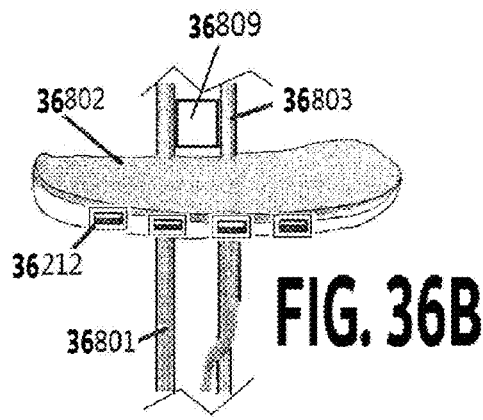
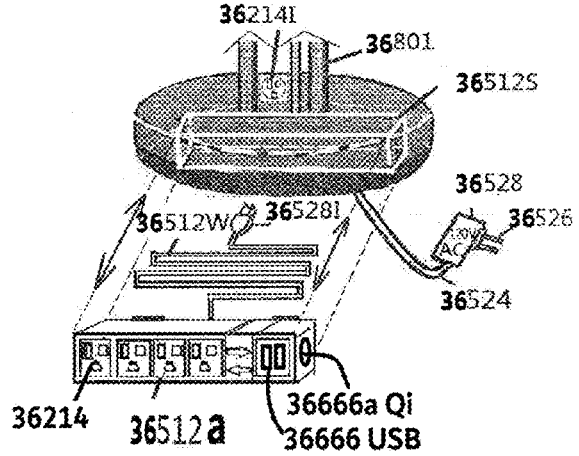

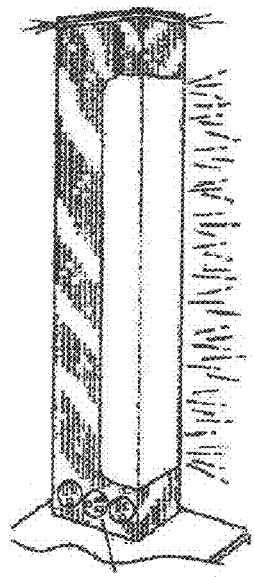
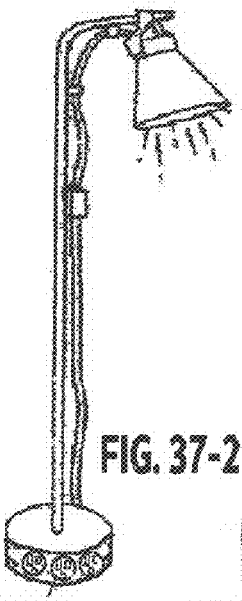
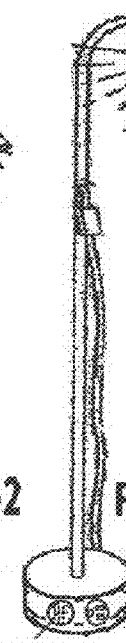
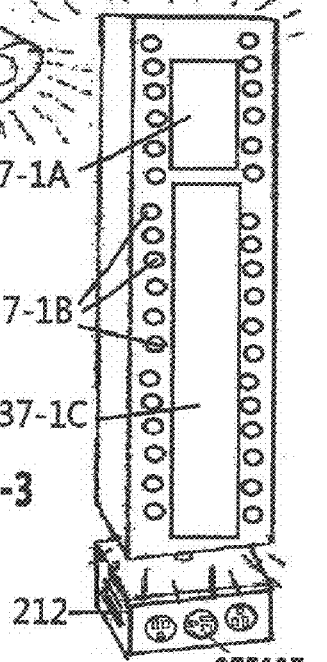
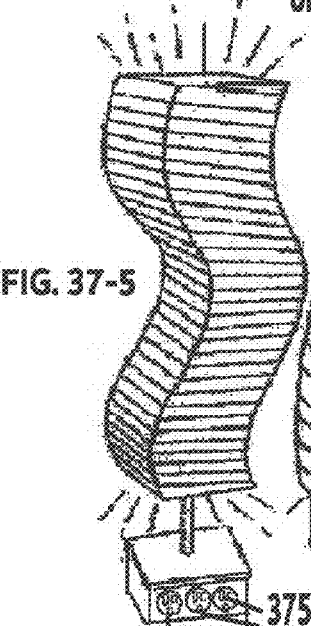
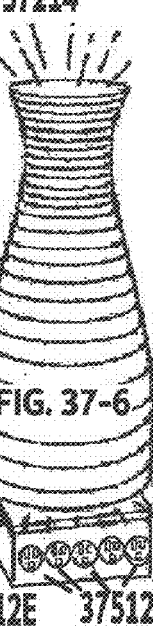
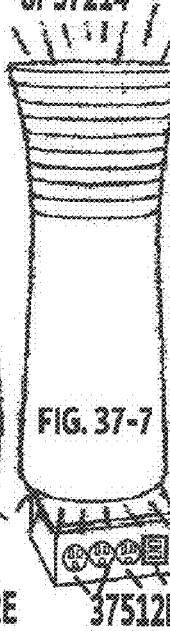
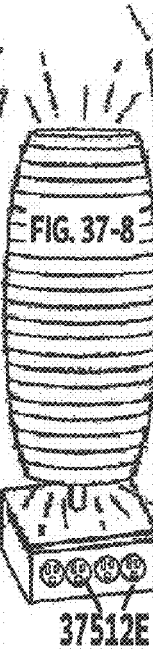

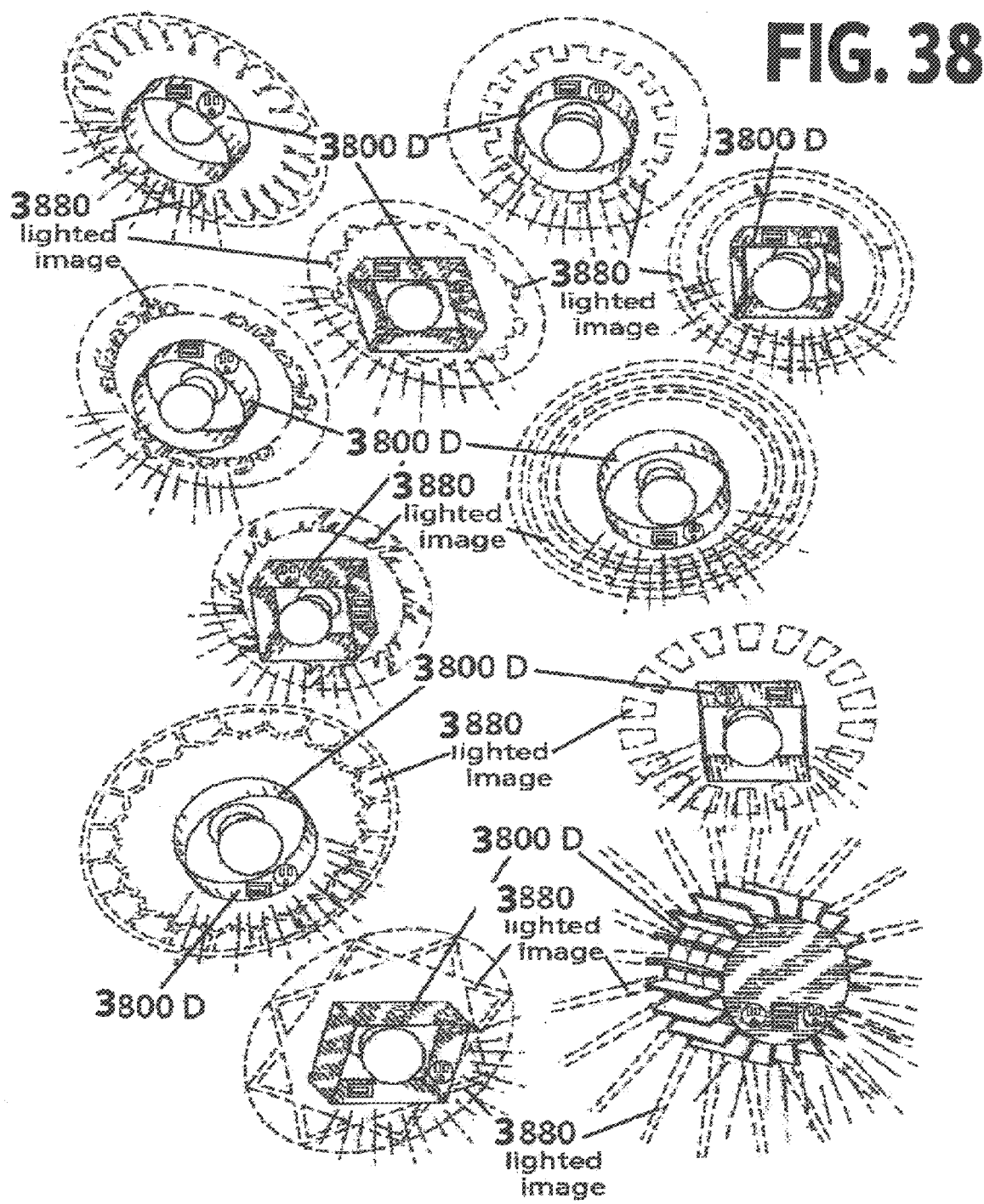

Co-inventor prior-art = Wall mounted light device

Co-inventor's prior-art=Wall mounted lighting
FIG. 40   FIG. 40a    FIG. 40b   FIG. 40c
FIG. 40d  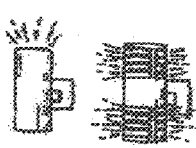 FIG. 40e    FIG. 40f   FIG. 40g
FIG. 40h   FIG. 40i    FIG. 40J   FIG. 40k
FIG. 40m   FIG. 40n    FIG. 40p   FIG. 40q
FIG. 40r   FIG. 40s    FIG. 40t FIG. 40u
FIG. 40v  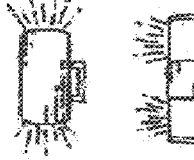 FIG. 40w    FIG. 40x FIG. 40y
FIG. 40z   FIG. 40z1    FIG. 40z2 FIG. 40z3
FIG. 40Z4   FIG. 40Z5    FIG. 40Z6 FIG. 40Z7

Co-inventor's prior-art= Wall mounted lighting

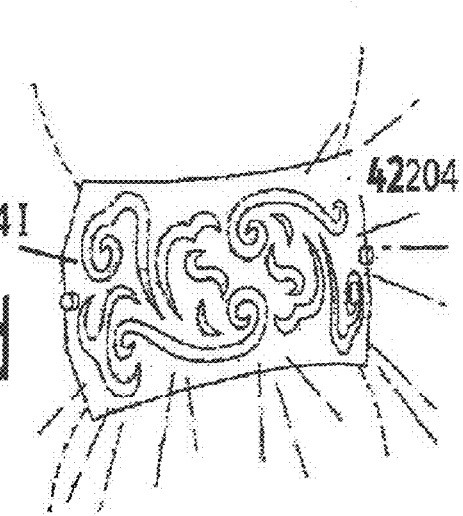
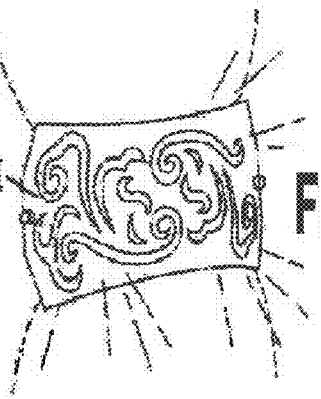

Existing Power strip has optional features (Extendable, tilt, rotating)

Existing Power strip has optional features (transforming shape, angle, configuration)

All kind of outlet tap has prongs on back to connect current

Quick Charger USB above 2.0A

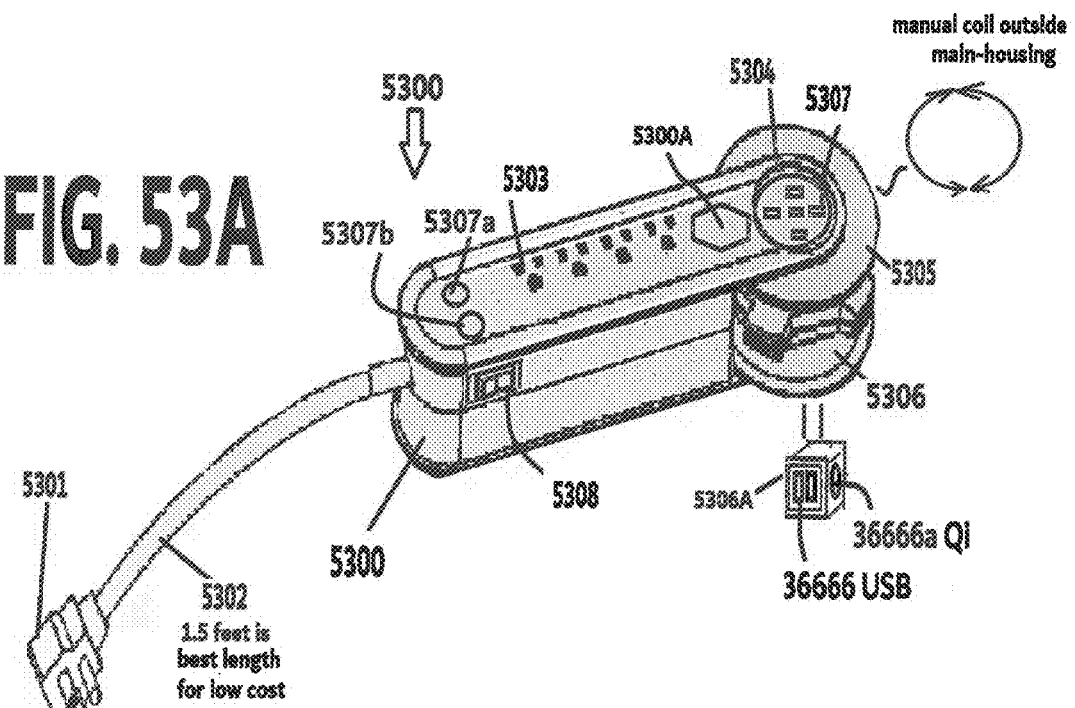
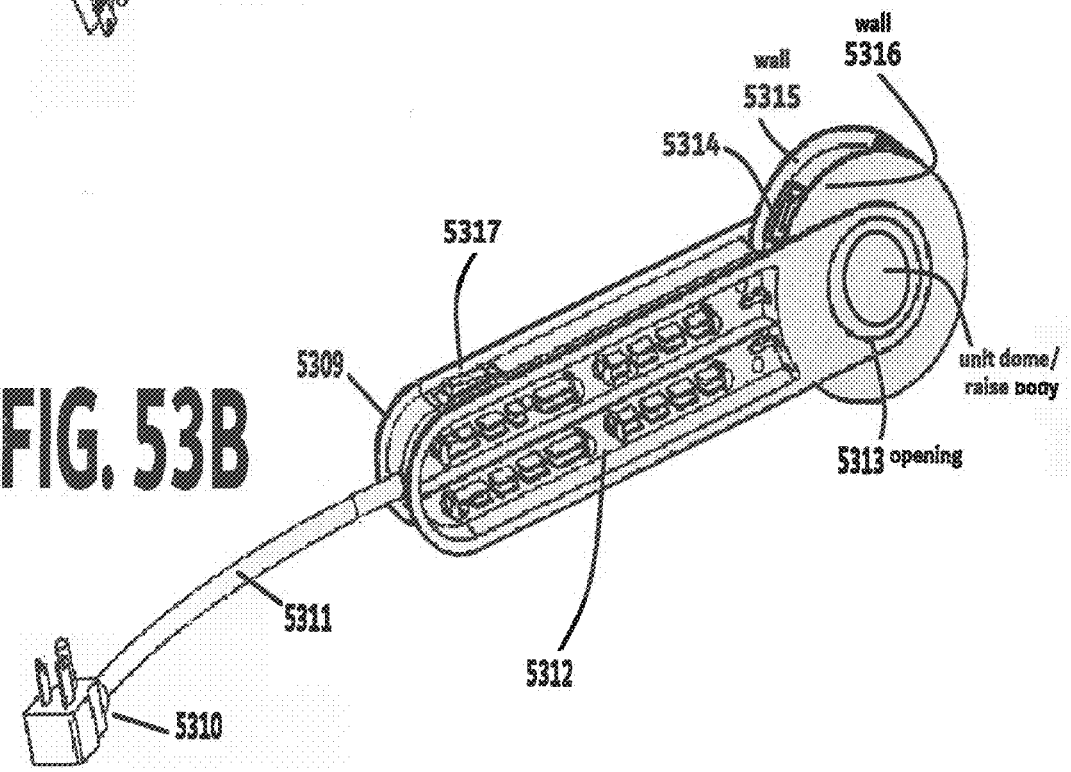

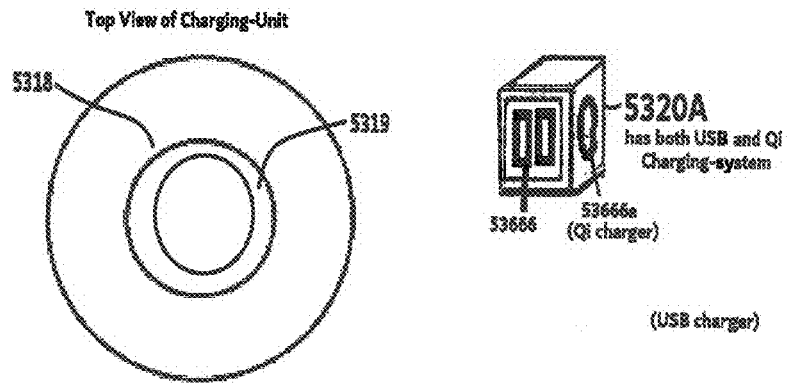
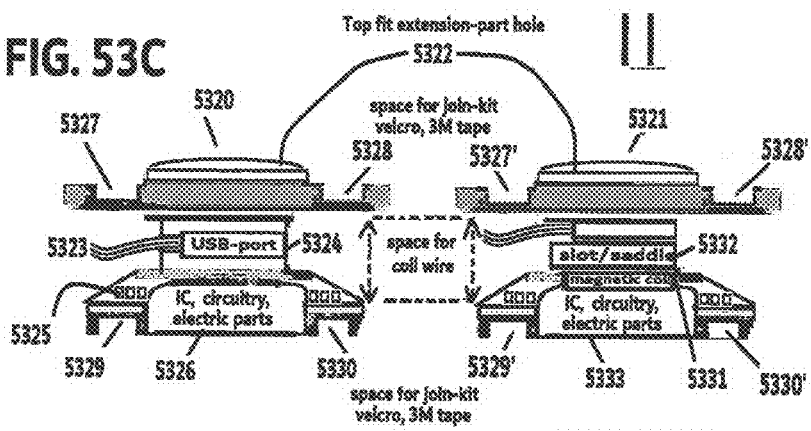
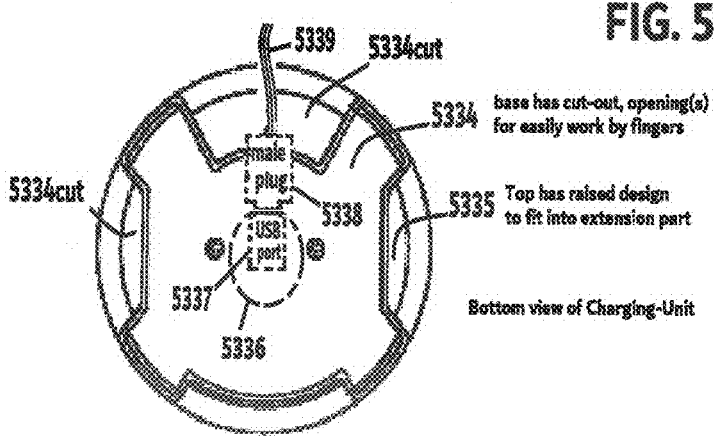

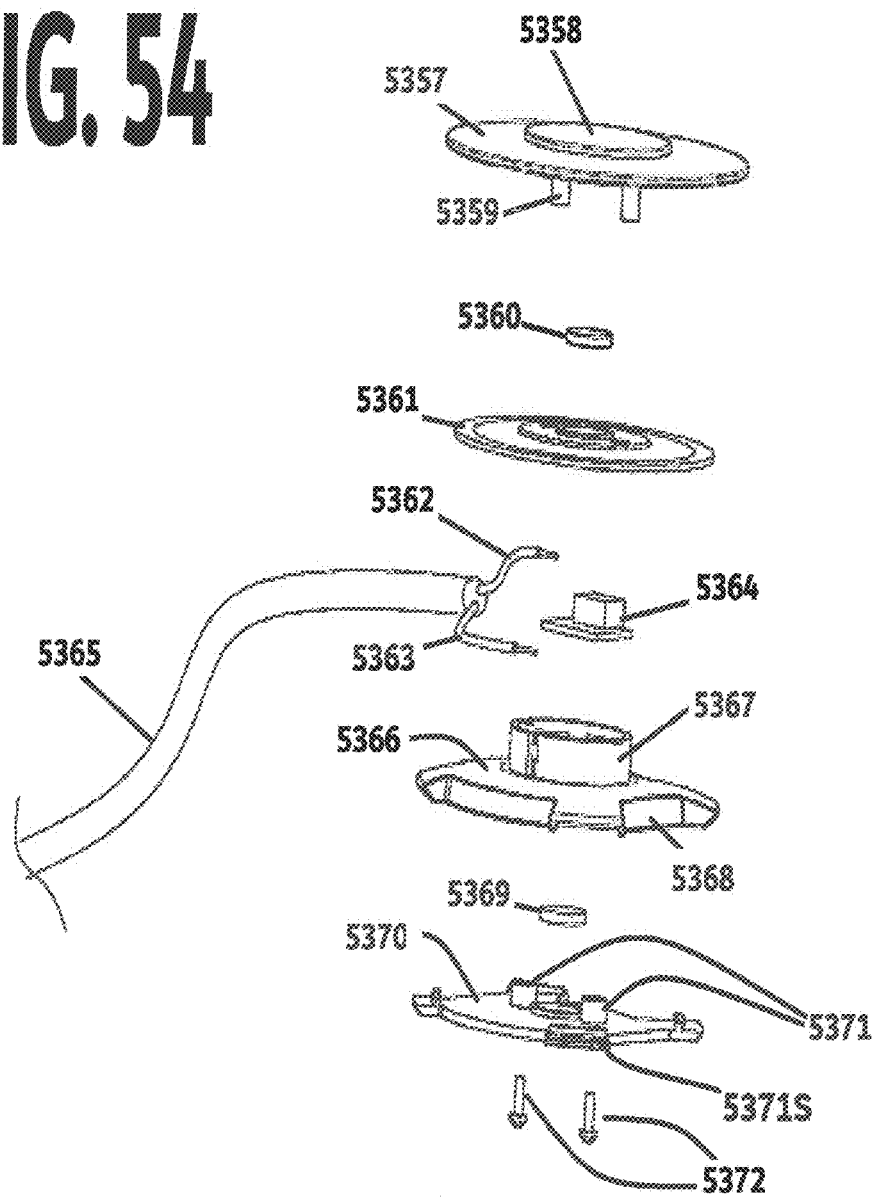

WIRED AND DETACHABLE CHARGING-UNIT OF ELECTRIC PRODUCT

FILING HISTORY

This application is a continuation of
This filing case is Continue of following parent filing case:
This application is a continuation of
(#GGG-8-Div2) U.S. Ser. No. 16/781,155 filed on Feb. 7, 2020 which is CIP
(#GGG-8=Div1) U.S. Ser. No. 16/715,625 filed on Jan. 14, 2020 which is CIP of
(#GGG-9D) U.S. Ser. No. 16/413,135 filed on Oct. 10, 2019 which is CIP of
(#GGG-5-1D) U.S. Ser. No. 16/413,234 filed on Jul. 29, 2019 which is CIP of
(#GGG-6-2) U.S. Ser. No. 16/365,972 filed on Mar. 27, 2019 which is CIP of
(#SSS-1) U.S. Ser. No. 16/287,844 filed on Feb. 8, 2019 which is CIP of
(#GGG-6-1) U.S. Ser. No. 16/197,800 filed on Nov. 21, 2018 which is CIP of
(#GGG-5-1C) U.S. Ser. No. 16/182,991 filed on Nov. 7, 2018 which is CIP of
(#GGG-11) U.S. Ser. No. 14/951,872 filed on Nov. 25, 2015, now allowed on Jan. 29, 2020, which is CIP of
(#GGG-10) U.S. Ser. No. 14/875,675 filed on Oct. 5, 2015 which is CIP of
(#GGG-9) U.S. Ser. No. 14/870,601 filed on Sep. 30, 2015 which is CIP of
(#GGG-8) U.S. Ser. No. 14/834,613 filed on Nov. 10, 2015, now allowed, which is CIP of
(#GGG-7) U.S. Ser. No. 14/834,823 filed on Aug. 25, 2015, now is U.S. Pat. No. 10,260,735 issued on Apr. 16, 2019, which is CIP of
(#GGG-6) U.S. Ser. No. 14/834,557 filed on Aug. 25, 2015 which is CIP of
(#GGG-5-1) U.S. Ser. No. 14/858,838 filed on Sep. 18, 2015 now is U.S. Pat. No. 10,184,649 issued on Jan. 22, 2019, wait for issued, which is CIP of
(#GGG-5) U.S. Ser. No. 14/833,935 filed on Aug. 24, 2015 now is U.S. Pat. No. 10,454,289 issued on Oct. 22, 2019, which is CIP of
(#GGG-4C) U.S. patent application Ser. No. 14/827,810 filed on Apr. 17, 2015 now is U.S. Pat. No. 10,476,286, which is continuation of
(#GGG-4) U.S. Ser. No. 14/827,810 filed on Aug. 17, 2015 now is U.S. Pat. No. 8,931,947 issued on Jan. 13, 2015 which is CIP of
(#GGG-3C) U.S. Ser. No. 14/643,026 filed on Mar. 10, 2015 which is CIP of
(#GGG-3) U.S. Ser. No. 14/144,703 filed on Dec. 31, 2013 which is CIP of
(#GGG-2C) U.S. Ser. No. 14/548,626 filed on Nov. 20, 2014 now U.S. Pat. No. 9,182,111 issued on Nov. 10, 2015 which is CIP of
(#GGG-2) U.S. Ser. No. 14/105,717 filed on Dec. 13, 2013 now U.S. Pat. No. 8,911,137 issued on Dec. 16, 2014 which is CIP of
(#GGG-1C) U.S. Ser. No. 14/548,861 filed on Nov. 20, 2014 which is CIP of
(#GGG-1) U.S. Ser. No. 14/105,607 filed on Dec. 13, 2013 now U.S. Pat. No. 8,915,608 issued on Dec. 23, 2014 which is CIP of
(#GGG-2011) U.S. Ser. No. 13/161,643 filed on Jun. 16, 2011 now is U.S. Pat. No. 8,783,936 issued on Jul. 22, 2014,
The current invention is continuously filed case of
(#CCC-2) Ser. No. 14/793,262 filed on Jul. 7, 2015 which is Continuation filed case of
(#CCC-1) U.S. Ser. No. 14/642,169 Filed on Mar. 9, 2015 which is continuation filed case of
(#CCC-2010) U.S. Ser. No. 12/950,017 filed on Nov. 19, 2010, Public on May 24, 2012 Publication Number US 2012/0127708 A1 and now is U.S. Pat. No. 8,998,462 issued on Apr. 7, 2015.
The current invention is continuously filed case of
(#CCC-2) U.S. Ser. No. 14/793,262 filed on Jul. 7, 2015 which is Continuation filed case of
(#CCC-1) U.S. Ser. No. 14/642,169 Filed on Mar. 9, 2015 which is continuation filed case of
(#CCC-2010) U. S. Ser. No. 12/950,017 filed on Nov. 19, 2010, Public on May 24, 2012 Publication Number US 2012/0127708 A1 and now is U.S. Pat. No. 8,998,462 issued on Apr. 7, 2015.

BACKGROUND

The current invention is CIP of (#CCC) U.S. Ser. No. 12/950,017 Filed Nov. 19, 2010 (Now is U.S. Pat. No. 8,998,462) and above list parent filed case.

One preferred parent filed case disclose a sealed-unit with uniform dimensions and shape to fit into the same uniformly dimensioned compartment so that the universal sealed-unit can fit into a variety of LED light devices. The sealed unit(s) disclosed in these applications share the following features:
  a. The sealed unit(s) has uniform dimensions to fit into the uniform compartment of any kind of LED light device.
  b. The sealed-unit(s) has passed all related safety standards and received a laboratory's safety certification so that it can be used with other LED light device's parts and accessories which may or may not meet the safety standard passed by the said sealed-unit(s).
  c. The sealed unit(s) can be any individually salable unit because it has passed all related safety requirements and standards. The other parts or accessories may or may not be just decorative or have other functions to make the LED light device more valuable.

The current invention utilizes the sealed-unit concept in the following manner:
(A) The current invention utilizes the concept disclosed in the above-cited applications of providing a sealed-unit that has passed all the relevant safety standard. And, it applies the concept to other electric device(s) which are not limited to an LED light device. It The concept may be applied to an LED light device, power strip device, wall outlet device, surge protection device, wall adaptor device, charging device(s), smart phone related device(s), computer related device(s), and other consumer electric device(s).
(B) The USB-unit or outlet-unit may be in the form sealed-unit of a rather than the previously disclosed LED-Unit, battery-pack, or prong and the said Sealed unit may just (B-a) a charging circuit board assembly for USB-unit to charge (not supply) the energy storage unit which built-inside of the said other device only, (B-b) maybe is a conductive-piece assembly for Outlet-unit to deliver or supply the input AC current to the other device (B-c) USB-unit maybe just a USB-receiving device to get power from the outside transformer, adaptor, invertor which already change outlet's AC current to DC current so can just pass though DC to DC circuit from different voltage to change to the 5V DC current or directly get 5Volt DC current from transformer to offer right current to the said USB-Unit to charge (Not supply) the current to the said energy storage unit inside the said other electric or digital device.

(C) The USB-unit or outlet-unit are arranged to charge or supply power from these units to a variety of electric devices to keep the electric device(s) in good power condition for people to use but USB-Unit is to charge the energy-storage unit and preferred is rechargeable battery and not directly supply power to the said electric device such as said mobile phone. The Outlet-unit which simple just is conductive-piece assembly to deliver the AC current to the said other device power input-end such as prongs directly and optional to has surge protection or wireless controller.

(D) The USB-unit or outlet-unit may each include its own related circuit, conductive piece, contact-piece, custom-pins, receiving-ends, output-ends, input-ends, electric parts and accessories to get the electric power from (D-a) AC power by a prong-cable from outlets; or (D-b) DC power from USB-cable to get power from outside power bank/energy storage unit or assembly which has multiple Amperage current storage capacity not from the computer export-ends which only limited 500 ma too slow for charging; or (D-c) DC power from outside housing transformer, adaptor, invertor unit which already has circuit built-in and already change the AC current to DC current,
and though a receiving-wire or delivery-wire or USB-wire has at least 2 male USB-plugs to insert into above USB-Unit or USB-Module female receiving-port (USB Charging-ports) to deliver the DC power though the DC to DC circuit inside the device's housing to get right current and get into a variety of electric device's female receiving-port which has desire contact or connector or Custom-Pin ports for the other device USB receiving port which depend on the other device's design so it is variable.

The USB Charging-ports prefer to use Type A which is most common for the desktop items so can fit for all kind of the USB-wires at least one-plug of the said 2 plugs on each USB-Wire or jump wire or bridge wire at this time. It is appreciated that prefer to use Type-C because more compact and majority of the other electric device will has this Type-C USB-unit from new device so can make the other device has smaller new Type C USB-unit to make the overall size become more compact and thin. Anyway, the one end of the USB-wire can be any type such as Type C or any kind of Custom-Pin contact depend on market design and requirement.

The said USB port type may in Type A, Type B, Type C each of these has Female receiving end and male plug so can build the electric power delivery. It also has digital data delivery but at this invention do not use and do not need to use the electric data or digital data delivery functions and the current invention only for Charging purpose only, so it can prevent slow charging or overheat issue happened. The current invention for quickly charging ports is not allow data delivery too.

The desktop items USB port (USB Charging-pots) not allow to use special of custom-pin to fit the other electric device's USB receiving-pots because this will become only can charge one of other electric or digital device. The current invention's USB charging-port preferred to use Type A which is most popular same as all laptop computer USB receiving ports but has quickly USB charging-port function to charge minimum 1 to 5 Amp at output-end 5Volt (+/− 10%) voltage. The Type A USB charging-port can easily built-in on the Desktop items because the desktop items no need to have super compact size like the be charged items such as mobile phone, ipad which need as slim and thin as possible so these communication or consumer electric products need use special custom-pin such as mini USB, Micro USB, or even type C for the USB receiving port so can allow the mail-plug of mini USB or micro USB can insert into so can make the communication or hand-held I-pad™ as slim and thin as possible. For Desktop still use the Type A will be more popular and can fit almost every USB-wire, jump-wire, so can charge any kind of other electric or digital device. As for special USB Charging-pots allow to charge minimum 1.0 Amp to 5 Amp specification release on 2007 and update on 2010 which is for quickly charging capacity this is what the current invention specify for charging capacity minimum from 1.0 Amp to higher Amperage and has details discuss on hereafter.

(E) The current invention offers USB-unit or Outlet-unit is a universal module design with the most compact size to enable each of the USB-unit and outlet-unit or any combination of USB-units and/or outlet-units to form a desired module that fits into all kinds of electric device(s), including an LED light device, wall outlet, wall outlet adaptor, power strips, surge protector, communication device, computer device, consumer electric device, smart phone device, panel computer device, etc. The universal module design means can fit into more than one of the other device and no need to change its electric circuit, PCB, trace with current invention use quickly charging USB Charging-ports has 2007 & 2010 definition and has minimum 1.0 Amp up charging capacity.

(F) Once the USB-unit or outlet-unit in circuit board assembly, in sealed unit assembly, in a universal module assembly and has passed all related safety standards and has its own issued certification, the finished electric device in which it is used does not need to get an additional safety certification related to USB-units or outlet-units. This means can save a lot of time and resource to apply each finish product's USB-unit or Outlet-unit meet the local safety standard and no fire, no electric shock, no electric shortage hazard. Plus the current invention use the quickly charging USB Charging-ports which has 2007 & 2010 definition and has minimum 1.0 Amp up charging capacity.

(G) The modules of the current invention can utilize any combination of suitable USB-unit or outlet-unit parts, such as a conductive wire, conductive plate, conductive piece, contact-kit, prong-cable kits, USB-cable, prongs, resilient conductive kit, printed circuit, flexible circuit board, related electric parts and accessories, fixing, positioning kit, and/or installation device to enable the module, outlet-unit, or USB-unit to pass the safety standard and get the relevant safety certification and be added onto more than one or a lot of others electric device.

(H) The module of the current invention may have different specifications, such as:
1 module has 1 USB-unit+1 USB-port,
1 module has 2 USB-ports+1 outlet-unit,
1 module has 2 USB-ports+2 outlet-units,
1 module=only has 1 USB-unit, or 1 Outlet
or, any combination of USB-units and outlet-units that still permits a standard module to fit into many of different electric device(s) as needed with current invention has quick charging USB Charging-ports which has 2007 & 2010 definition and has minimum 1.0 Amp up charging capacity.

(I) The module can also have the following different specifications:
2 USB ports having different current outputs including, 1 Amp, 1.1 Amp, and/or 2.2 Amps to enable the 2

USB-ports to charge different electric devices such as an iPhone™, which needs to have 1 Amp, and an iPad™, which requires 2.1 Amps.

If people want to charge 1 iPhone™+1 iPad™ at the same time, at least 3.1 Amps will be needed, which will be very expensive. Or more quickly speed charge for 4.2 Amp for 2 pcs of 2.1 Amp, or more quickly speed charge for 4.8 Amp for 2 pcs of 2.4 Amp. from data the current invention preferred for USB Charging-port basing on 2007 released for USB2.0 standard and 2010 upgrade for charging-port. However, as the current invention all desktop has no any digital data delivery and only charging function, so the current invention can have bigger current charging than out of date USB-ports from computer or other charger Before 2007 for limited 500 ma or less charging with overheat issues as the wiki reported on below text for cross reference!

If people want to charge the 1 iPhone™ or 1 iPad™ at different times, the standard module can be 1 port 1 Amp+1 port 1.1 Amp=2.1 Amps total, and the cost will be cheaper.

If people want to charge only 1 iPhone™, only need 1 USB-unit with 1 port which has only 1 Amp is needed for the most economical product. Hence, the module of the invention should not be limited to only one specification. But the current invention has quickly charging USB Charging-ports application which meet 2007 & 2010 released definition and has minimum 1.0 Amp up charging capacity.

The current invention specify the Charging capability start from 1.0 Amp up to hundreds of Amp and the old date before 2007 has limited for 500 ma charging capacity for out of date USB construction and also has overheat or burn problem for bigger than 500 ma so from 2007 has update USB charging-port so market can has a lot of USB-charging device coming from 2010 for Big charging current such as the current invention. The below is copy from WikiPedia, The Free Encyclopedia has the details (Charging port and Charging speed and Charging port) to support the current invention for update charging capability.

USB

From Wikipedia, the free encyclopedia

USB 2.0

Battery Charging Specification 1.1: Released in March 2007 and updated on 15 Apr. 2009.

Adds support for dedicated chargers (power supplies with USB connectors), host chargers (USB hosts that can act as chargers) and the No Dead Battery provision, which allows devices to temporarily draw 100 mA current after they have been attached. If a USB device is connected to dedicated charger, maximum current drawn by the device may be as high as 1.8 A. (Note that this document is not distributed with USB 2.0 specification package, only USB 3.0 and USB On-The-Go.)

Battery Charging Specification 1.2:[25] Released in December 2010. Several changes and increasing limits including allowing 1.5 A on charging ports for unconfigured devices, allowing High Speed communication while having a current up to 1.5 A and allowing a maximum current of 5 A.

USB 3.0[Edit]

Main Article: USB 3.0

As with previous USB versions, USB 3.0 ports come in low-power and high-power variants, providing 150 mA and 900 mA respectively, while simultaneously transmitting data at Super Speed rates.[28] Additionally, there is a Battery Charging Specification (Version 1.2—Dec. 2010), which increases the power handling capability to 1.5 A but does not allow concurrent data transmission.[25] The Battery Charging Specification requires that the physical ports themselves be capable of handling 5 A of current[citation needed] but limits the maximum current drawn to 1.5 A.

Charging Ports[Edit]

A small gadget that provides voltage and current readouts for devices charged over USB This USB power meter additionally provides a charge readout (in mAh) and data logging The USB Battery Charging Specification Revision 1.1 (released in 2007) defines a new type of USB port, called the charging port. Contrary to the standard downstream port, for which current draw by a connected portable device can exceed 100 mA only after digital negotiation with the host or hub, a charging port can supply currents between 500 mA and 1.5 A without the digital negotiation. A charging port supplies up to 500 mA at 5V, up to the rated current at 3.6V or more, and drops its output voltage if the portable device attempts to draw more than the rated current. The charger port may shut down if the load is too high.[92]

Two types of charging port exist: the charging downstream port (CDP), supporting data transfers as well, and the dedicated charging port (DCP), without data support. A portable device can recognize the type of USB port; on a dedicated charging port, the D+ and D− pins are shorted with a resistance not exceeding 200 ohms, while charging downstream ports provide additional detection logic so their presence can be determined by attached devices.[92]

With charging downstream ports, current passing through the thin ground wire may interfere with high-speed data signals; therefore, current draw may not exceed 900 mA during high-speed data transfer. A dedicated charge port may have a rated current between 500 and 1,500 mA. For all charging ports, there is maximum current of 5 A, as long as the connector can handle the current (standard USB 2.0 A-connectors are rated at 1.5 A).[92]

Before the battery charging specification was defined, there was no standardized way for the portable device to inquire how much current was available. For example, Apple's iPod and iPhone chargers indicate the available current by voltages on the D− and D+ lines. When D+=D−= 2.0 V, the device may pull up to 500 mA. When D+=2.0 V and D−=2.8 V, the device may pull up to 1 A of current.[93] When D+=2.8 V and D−=2.0 V, the device may pull up to 2 A of current.[94]

Dedicated charging ports can be found on USB power adapters that convert utility power or another power source (e.g. a car's electrical system) to run attached devices and battery packs. On a host (such as a laptop computer) with both standard and charging USB ports, the charging ports should be labeled as such.[92]

To support simultaneous charge and data communication, even if the communication port does not support charging a demanding device, so-called accessory charging adapters (ACA) are introduced. By using an accessory charging adapter, a device providing a single USB port can be attached to both a charger, and another USB device at the same time.[92]

The USB Battery Charging Specification Revision 1.2 (released in 2010) makes clear that there are safety limits to the rated current at 5 A coming from USB 2.0. On the other hand, several changes are made and limits are increasing including allowing 1.5 A on charging downstream ports for unconfigured devices, allowing high speed communication while having a current up to 1.5 A, and allowing a maximum current of 5 A. Also, revision 1.2 removes support for USB ports type detection via resistive detection mechanisms (J) If the (10-1) a Universal piece, or (10-2) a sealed-unit or (10-3) USB-Unit, or (10-4) USB-module in a circuit board, housing form, or (10-5) Outlet-unit, (10-6) Outlet-module is a conductive-piece assembly each has its own issued safety certification and that can fit into the any compartment of any other electric device, there is no need to file, for each different electric devices, a UL, ETL, or CSA safety certification, which saves a lot of time for tooling, development, and safety testing for each different electric device. This will reduce a lot of R&D, development, tooling, safety certification time and fees.

However, Some cases, it no need get pre-certification for the all (10-1) to (10-6) because factory may only make 1 model of the products or other reason for limited products productions, so no need get pre-certification is also fall within the current invention has built-in USB related parts & accessories to Charging the DC current into the built-in energy storage unit of other device or Deliver the AC power though conductive assembly to the other device. To get pre-certification good only for factory has a lot of desktop items so need to do pre-certification to save each time test the USB-Charger or Outlet-unit or the items listed on above (10-1) to (10-6).

The co-pending application entitled "Universal module of USB-unit or Outlet-unit for electric or digital data device," U.S. Ser. No. 13/117,227, (#FFF-11) discloses a simple arrangement for enabling "Desk Top items with LED means having USB-unit(s) or USB-module(s) to charge a variety of electric or digital data device(s)," which does not require a universal module because some of the desk top items have plenty of room/space to accommodate a larger size of USB-unit(s) or USB-module(s) or above discussed (10-1) to (10-6) and reduce the cost for related electric components, parts, or accessories to make the items more cost attractive to the consumer.

The USB-unit(s) and all above discussed (10-1) to (10-4) is an electric USB-charging unit which has a USB-female receiving means (hereafter as USB-Charging port as wiki release on 2007 has minimum 1.0 Amp charging capability) to receive a wire's USB-male plug (hereafter as USB-plug) to deliver electric power from the USB-female receiving means (USB-Charging port release on 2007 as wiki disclosure) to the other wire device's USB-male plug (USB-Plug).

The preferred USB-female receiving means (USB Charging-Ports) gets power from a power source and uses circuit to convert the in-put AC electric power to an out-put power has desired voltage, and current flow or amperage (A or ma) by circuit which may (AA-1) circuit install inside the desk top housing has at least one of transformer, adaptor, invertor, converter has circuit-inner to change AC current to DC current.

(AA-1) circuit install within outside housing's and has at least one of transformer or adaptor or invertor or converter has circuit-kits to change AC current to DC current to enable the wire device 1st USB-male plug (USB-Plug) to supply power from wire's $1^{st}$ input-end USB-plug to $2^{nd}$ wire-output end's USB-plug which has desire connector type selected from (T-1) Type A, (T-2) Type B, (T-3) Type C or (T-4) mini-USB, (T-5) micro-USB or (T-6) custom-pin USB while the $2^{nd}$ end's USB-Plug of USB-Wire to insert into the USB-receiving port of the other electric or digital device(s). The current invention all the related USB Charging-Port has min. 1.0 Amp up to 5 Amp and meet the USB 2.0 and USB 3.0 and has NO electric data or digital data delivery functions as co-inventor's plurality issued and co-pending filing case including parent filing case U.S. Pat. No. 8,783,936 filed on Jun. 16, 2011 and issued on Jul. 22, 2014 of inventor's reference series number (#GGG-2011), and child-Filed U.S. Pat. No. 8,911,137 (#GGG-2), U.S. Pat. No. 8,915,608 (#GGG-1), U.S. Pat. No. 8,931,947 (#GGG-4) and co-pending filing cases. Also, all the current invention only accept ONLY ONE input current not allow more than one input current such as normal time is AC power and change to DC power while power fail which will had a lot of controller or additional circuit need to do which may have more risk for fire case happened.

The USB-module(s) described in the co-pending application is an electric charging module which has at least one (aa) USB-female charging receiving means (USB Charging-Port as wiki release on 2007) but also has a number of receiving means selected from (bb) an outlet-female receiving means (hereafter as Outlet-ports), (cc) USB-female Charging receiving means (hereafter as be charged device's USB Ports), (dd) USB-female Hub receiving means for digital or electric data delivery (hereafter as USB-HUB Ports)

(ee) an adaptor's female receiving means (hereafter as Adaptor-ports), or (ff) any conventional female receiving means (hereafter as Any-Other-ports)

to form a single body which has more than one (aa) USB-female Charging receiving means (USB Charging-port) to offer the same or different electric power though the different female receiving means (hereafter as different ports) within the one body.

The USB-module connects with an input power source and circuit to offer a desired waveform, voltage, and current (Amperage or mini-amperage) as output power to charge energy-storage unit or assembly inside of the said other device(s) when the female receiving means (USB ports) is connected with other device's male plug (USB-Plug) of desire style of the connect, style, size, construction or custom-pin for connection for be charged device(s).

Hereof, also attached the USB history charter for different years for the USB generation;

Version History[Edit]

Version History Overview[Edit]

| Release name | Release date | Speed and max signaling rate | Note |
|---|---|---|---|
| USB 0.8 | December 1994 | | |
| USB 0.9 | April 1995 | | |
| USB 0.99 | August 1995 | | |
| USB 1.0 Release Candidate | November 1995 | | |
| USB 1.0 | January 1996 | Low Speed (1.5 Mbit/s), Full Speed (12 Mbit/s) | |
| USB 1.1 | August 1998 | | |
| USB 2.0 | April 2000 | High Speed (480 Mbit/s) | |
| USB 3.0 | November 2008 | SuperSpeed (5 Gbit/s) | Also called USB 3.1 Gen 1[19] |
| USB 3.1 | July 2013 | SuperSpeed+ (10 Gbit/s)[20] | Also called USB 3.1 Gen 2[21] |

So, the current invention offers a quick USB charging-port to offer the min. 1.0 Amp and the current invention only for Charring function from the charging circuit connected with power source from (4-a) AC power by a prong-cable from the AC outlets from wall or extension cord, power strips and has circuit-inner inside of Desktop item's housing has at least one of transformer, adaptor, invertor and use circuit-inside to change AC current to DC current at desired voltage and has other IC or circuit-insides or DC-to-DC circuit to change the different voltage DC current to USB-Charging port output-end DC 5 (+/−10%) volt or supply the desired voltage DC current to DC light source or DC other function's circuit to use. or (4-b) DC power from USB-cable to get power from outside housing's power bank or/energy storage unit directly do not have other circuit or controller which has multiple amperage current storage so can offer minimum charging capacity from 1.0 A up to 5 Amp range or higher, or (4-c) DC power from circuit inside of outside housing has at least one of transformer, adaptor, invertor has circuit-kits to change the AC current to DC current for variety or different voltage of DC current and though IC or circuit-inside or DC-to-DC circuit to change or adjust from different Voltage DC current and has the USB charging-port output end has DC 5 (+/−10%) Volt, And though a receiving-wire or delivery-wire has at least 2 male USB-plugs to insert into above USB-Unit or Outlet-unit female receiving USB charging-port for supplying power that power been though the desktop device's inside housing IC or other circuit-inside or DC-to-DC circuit to get desired current type to a variety of electric device's female receiving-port to charge the inside energy-storage unit or assembly DC current so can make other electric or digital device can work or operation.

To enable people to easily reach, touch, operate, or manage the desk top items, the USB-unit(s) or USB-module(s) are installed on or within the item/housing or a substrate(s). The items may be positioned at a location where people will stay for a period of time, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

In all such places where people will stay for period of time, the nearby desk top items has built-in USB-units easily offer electric power to all other electric or digital data device(s), so people do not need to bend the body to find a power source under the table, which normally is farther away from the desk top items having LED means. Hence, this arrangement offers good convenience for people while they work, rest, or even take a nap, so that they can easily use the USB-unit(s) or USB-module of the desk top items to charge their small phone, computer, iPad™, or any other electric or digital data device(s) while they work, rest, sleep or take a nap.

It is desirable for the universal module of the USB-unit(s) or outlet-unit(s) described in the co-pending application to be made as small as possible so that it can fit into as many applications' limited housing size as possible and therefore really meet the goal of universal applicability. On the other hand, the smallest, slimmest, or most compact size of the USB-unit(s), outlet-unit(s), or USB-module is too expensive. For example, the APPLE™ iPhone™'s or iPad™'s USB-unit, which is very small in size, needs to use a very high cost compact transformer or inverter with super big power output in order to achieve a very short time to fully charge the other electric or digital data device(s). This problem can be resolved if, in order to get the USB-2.0 or new standard 2.1 amp output from the USB-unit(s), the size of some electric components, parts, or accessories such as transformer or inverter, or other same-function electric parts, or accessories can be increased by placing it in a desk top item with sufficient space, thereby obtaining the same big power output at a substantially lower cost to let the consumer save pocket money. Suitable desk top items to which a universal module, USB-unit, or outlet-unit can be added include a desk lamp, desktop lighted mirror, desk top clock, desk top radio, desk top fan, desk top lighting, reading light, wall reading light, head lighting, book light, electric picture display, night light with AC to DC power source or adaptor with prong and wire, projection light with AC to DC power source or adaptors with prong and wire, electric candle set with AC to DC power source or adaptors with prong and wire, or any LED device that can serve as a desk top item as described herein and that can accommodate a USB-unit or USB-ports designed only for charging purposes rather than delivery of digital data. The desk top items can provide function(s), performance, and effects(s) including, by way of example, generation of light beams and projection of images such as time images, as well as serving as a source of illumination, music, power, electric signals, photos, and digital signals for sound, light, music, smell or any conventional market-available devices that people will STAY there for a period of time sufficient to also enable charging of other electric or digital data device(s).

Also, the current invention not only for charger but also has illumination as below;

For power strips related prior arts, the current invention had big improvement as below (4) discussion including;

1. US 2011-021-5759 LEE ET AL.

1-1: '759 the coil reel 14 is install on the power strips 10 as From FIG. 1 and

[0020] The coil reel 14 of the detachable electrical power receptacle 1 according to the present invention is used to wind the extension power cord 141.

1-2: '759 the coil reel 14 is install on center and end of main body 10 as FIG. 2 and

[0022] Please refer to FIG. 2 in conjunction with FIG. 1A, in which an exploded diagram of a second embodiment of the detachable electrical power receptacle according to the present invention is demonstrated. A detachable electrical power receptacle 1a has identical components and similar connecting relationship with respect to that of FIG. 1A and FIG. 1B. The only structural difference, however, is a location design regarding the accommodating section 107a. As shown in FIG. 2, the accommodating section 107a has a first accommodating space 1070 and a second accommodating space 1072. The first accommodating space 1070 is disposed on a periphery of the main body 1Oa and the second accommodating space 1072 is disposed on a middle section of the main body 10a.

1-3: '759 the coil reel 14 is install between the main body 10 and extension socket 16 as FIG. 3 and

[0024] In addition to the foregoing illustrations, please refer to FIG. 3, in which an exploded diagram of a third embodiment of the detachable electrical power receptacle according to the present invention is shown. A detachable electrical power receptacle 1b has identical components and similar connecting relationship with respect to that of FIG. 1A. The only structural difference, however, is a location design regarding the coil reel 14b. The coil reel 14b is dis-posed between the main body 10 and the extension socket 16b.

1-4: '759 the coil reel 14 is no needed as FIG. 4 and

[0024] . . . from line 15 to line 26 The only structural difference, however, is the coil reel 14b is removed and not included as per the present structural design as shown in FIG. 4. As such, the extension power cord 141c, connected to the main body 10c and the extension socket 16c, may be arranged in order out-side the main body 10c and the extension socket 16c without depending on any specific tools, i.e., coil reel. The extension power cord 141c may be winded up, collected, and received in any spaces; conversely, the extension power cord 141c may not be winded up and may be exposed out arbitrarily. The aforementioned embodiments are taken for illustration, but not limited thereto.

VS. current invention;

The detachable USB-unit(s) has its own wire-arrangement and the desktop item or charger or extension cord DO NOT HAVE any wire arrangement as '759 construction which is too difficult to repair for wire coil problem by manual or automatically.

1-6: '759 charge the other electric products no need wire and connector for its extension socket as [0025] Please refer to FIG. 5 in conjunction with FIG. 1A, in which a diagram of an embodiment in accordance with the detachable electrical power receptacle according to the present invention in use is demonstrated. The extension socket 16 of the detachable electrical power receptacle 1 may be pulled from the ground to the desktop according to the existence of the extension power cord 141, so that the users may apply the extension socket 16 directly to connect to an electronic device 3, e.g., a cell phone or a digital camera, for charging the operations conveniently. Furthermore, the users are not required to bring along other external charging connectors or cords for charging the electronic device 3, thereby increasing the convenience in use. By applying the detachable electrical power receptacle 1, the extension socket 16 may be managed to be engaged or disengaged from the main body so as to improve the convenience in use and expand the charging operation range.

VS. Current invention

The current invention every detachable, separate able, movable USB-unit(s) only have the female USB-port, so need external USB wire having at least 2 male plugs to make DC current delivery from USB-unit(s) to be-charged items. '957 Furthermore, the users are not required to bring along other external charging connectors or cords for charging the electronic device 3 is not happen for current invention USB-unit(s) at all.

1-7: '759 do not have any attachment kits or means to fix or install the said main body 10 or extension socket 16 to any surface.

VS. current invention

The current invention has strong attachment kits to install the desktop items or charger or power strip on desired locations to offer user to insert male plugs into detachable, separate able USB-unit or desktop items or charger or power strips without make position change of the said main housing. Also, the USB-unit(s) is not only for desktop, more than one of USB-unit(s) can fix or install on wall, side table, bed frame, bed base surface in order to one power strips have many locations can charge the said be-charged items.

[Conclusion]

Hence, the current invention for wire arrangement for detachable, separated USB-unit(s) having built-in wire-arrangement is different with said '957.

2. US 2004/020 33275 Jeansonne et al.

2-1: '275 mainly for wire arrangement for electronic device and peripheral component as FIG. 1, 2, 3, 4 and background

[0001] A variety of peripheral components are coupled to electronic devices, such as computers. For example, many computers now comprise at least one universal serial bus (US) port through which peripheral devices may be con-nected to the computer. For example, USB cables can be used to connect printers, scanners, mice, joysticks, web cams, modems, speakers, telephones and many other devices to an electronic device for interaction with the device.

VS. current invention

The current invention for (1) Extension cord, (2) Desktop lighting, (3) Desktop charger items is different applications.

2-2: '275 the USB cable delivery 0.5 Am current and also deliver data as

[0001] A variety of peripheral components are coupled to electronic devices, such as computers. For example, many computers now comprise at least one universal serial bus (US) port through which peripheral devices may be con-nected to the computer. For example, USB cables can be used to connect printers, scanners, mice, joysticks, web cams, modems, speakers, telephones and many other devices to an electronic device for interaction with the device. The USB port is an input/output port that may be coupled to a USB cable having two wires for power (+5 volts and ground) and a twisted pair of wires for carrying data. Based on the USB standard, 0.5 amps are available at five volts (2.5 watts) at the USB port. Thus, the USB standard enables the powering of a variety of low-power devices directly through device USB ports.

VS. current invention, the current invention specified the built-in USB port(s) of USB-unit(s) only deliver DC current without data delivery to save cost. Also, current invention applied 2010 announced USB 3.0 which can carry minimum 2.1 Amp current before 2010 announcement all market DO NOT have any USB Port(s) can deliver over 2.1 Amp because no standard so no any products can be made not following safety standard.

2-3: '275 the wire as FIG. 1, 2, 3, 4 show wire (16) (28) has one wire divider (50) to divide wire to USB connector (54) to deliver data and Barrel connector (56)

[0020] In the embodiment illustrated in FIG. 4, cable 16 comprises a USB cable, and cable sections 52 extend to a series B USE connector 54 and a separate power connector Thus, data may be transferred through the series B USE connector 54, and power may be transferred to peripheral component 14 via power connector 56. The series B USBconnector 54 and power connector 56 are received in corresponding ports 58 and 60, respectively. Ports 58 and 60 are formed in peripheral component 14 at an appropriate location, such as the rear location illustrated in FIG. 4

VS. current invention

Current invention for (1) Extension cord, (2) Desktop Charger, (3) Desktop lighting device AC-to-DC current output end is only USB port(s) and the be-charged product also only has USB port(s) for desired Type, A, B, C, D. Do not have any barrel-type male connector (56) to plug into female receiving barrel-plug port(s). Furthermore, the all USB ports or USB male plugs of current invention only delivery DC current without any data. Hence, Current invention is totally different with '275 for delivery data and has male barrel connect (56) to insert be-charged products female receiving barrel-port(s) (60).

2-4: '275 the wire as FIG. 2 show has 2 twisted wire (34) (36) to deliver the data from electric device to peripheral components.

[0016] With additional reference to FIG. 2, one example of cable 16 is illustrated as a USB cable. An embodiment of a USB cable may comprise two wires for power, e.g. a +5 volt wire 30 and a ground wire 32. Additionally, the USB cable may comprise a pair of data carrying wires 34, 36 arranged as a twisted pair. Furthermore, the USB cable may comprise a shielding layer 38 and an outer protective layer 40.

VS. current invention

The current invention only has female USB port(s) on electric device and be-charged products connecting by at least 2 USB male plug wires to delivery only DC current without any digital data to save cost.

2-5: '275 the electric device has 2 type of female USB port(s) one USB port(s) (46) is sufficient output power and one is not sufficient output USB port(s). And, the male USB plug (42) has abutment (44) to prevent from male plug (42) not insert into corresponding female USB port(s) (46).

[0017] In the embodiment illustrated in FIG. 3, first connector end 24 forms part of a USB cable 16 and is designed for engagement with input/output port 18, e.g. a USB port having increased power available relative to the power required by the USB standard specification. In this embodiment, connector end 24 comprises a series A USB connector 42 and an abutment 44. Abutment 44 is positioned to prevent insertion of the series A USB connector 42 into a USB port with insufficient power to meet the requirements of peripheral component 14. In other words, if the input/output port on electronic device 12 has not been designed with sufficient power to meet the requirements of peripheral component 14, a user will not be able to engage connector end 24 due to abutment 44.

[0018] In the illustrated embodiment, abutment 44 comprises a post disposed adjacent the series A USB connector 42. The abutment 44 is positioned for engagement with a corresponding feature 46 disposed, for example, on elec-tronic device 12 to enable insertion of the series A USB connector 42 into input/output port 18. If abutment 44 is formed as the illustrated post, corresponding feature 46 may be formed as a recess or other opening sized to receive abutment 44. Corresponding feature 46 effectively indicates that input/output port 18 has been designed to supply sufficient power for a given high power device, such as a mass storage drive. By way of example, both series A USB connector 42 and abutment 44 may be arranged to extend from a cable overmold 48 an approximately equal distance.

VS current invention

Current invention does not have sufficient or none-sufficient USB port(s) to supply different output power to other be-charged device. '957 shown on FIG. 1, 2, 3, 4 all male plugs has abutment (44) to insert female USB port(s) (46) which can supply sufficient output power for big current. However, '957 did not show or mentioned any male plug without the abutment (44) to insert into others female USB output port(s) which is only supply for 500 ma current output. So, the '957 drawing and applications is not practical VS the above discussion on column [0017] and [0018] at all.

Conclusion:

The '957 is nothing to do with current invention and is out-of-date application for its wires which act as one of USB male plugs for Hub wire applications. Not same as current invention apply 2010 announced USB 3.0 which allow carry more than 2.1 Amp current delivery with safety specification and only deliver the DC current without any digital data delivery. The current invention also do not have 2 types of female USB output port(s) one electric products.

3. US 2006-0261-712 Herriott et al.

3-1: '712 teach a wire arrangement for a office and home furniture as FIG. 1 to FIG. 13

VS current invention

The current invention has no any similar with current application for (1) Extension cord or power strip, (2) Desktop lighting or items, (3) USB Charging system only deliver the DC power to the detachable, separate able, movable USB-unit(s) own USB-port(s) incorporated jump-USB-wire to charge other digital or electric device.

Conclusion:

The '712 is nothing to do with current invention on any aspects, idea, application, concept, categories.

4. U.S. Pat. No. 7,706,136 Dotson et. Al 4-1: '136 main purpose is to apply the HMIS (human-machine interface) to all machine equipment related USB.

VS. Current invention

The current invention is apply USB female receiving port(s) built-in detachable, separate able, movable USB-unit(s), and male plug(s) of external USB wire to deliver DC power from at least one (1) extension cord (2) desktop lighting, and (3) Charger device to charge the be-charge products.

Conclusion:

The '136 to apply the HMIS system or panel to control machine to operate predetermined work. That is nothing to do with current invention for categories, application, concept, construction. Idea. Hence, This is not a proper prior arts VS current invention.

5. U.S. Pat. No. 7,918,685 Kruckenberg 4-1: '685 is one cable has plurality of wires for transmitting audio, video, data, and power signals, and the plurality of wires are in communication with respective pins of multip-pin female and male connector on either terminus of the flexible cable as FIG. 1, female receiving pin-sets (22) and male plug (12) on electric device, or FIG. 1 female receiving pin socket (24) corresponding to male plug with plurality of pins (14) all have plurality pins for male plug to connect with female receiving.

VS current invention

The current invention has at least two male plugs USB wire connected with at least one (1) Extension cord, (2) Desktop light, (3) USB charger device and be-charged product built-in female USB port(s). The current invention applied 2010 announced USB 3.0 enable to deliver 2.1 Amp DC current through USB-port and USB-plug. The current invention for USB-port(s) and USB-plug(s) same as Apple company i-phone 5 which is start from 2012 and the all world phone device start stop to use plurality of pins connector since 2012 i-phone 5.

Hence, '685 is out-of-date to apply the multiple or plurality of pins connectors and plurality pins female socket.

Conclusion:

The 685 not only delivery digital audio or media data but also use out-of-date plurality pins plug and receiving-socket. So, totally different with current invention.

6. US 2005-008-8834 MILAN (1-1a) '834 teach a desk workstation,

[0001] The present invention relates to a computer desk having a power core base hub including an integrated power source and computer accessories port for connection to peripheral devices located on or within the computer desk.

VS. Current invention the USB power station, do not connect with computer peripheral device.

Current invention only charge communication device such as mobile phone and ipad which has USB charging ports from i-phone 5 date on 2012. So, MILAN unit is not same as current invention.

[0002] More particularly, the present invention relates to a computer desk having a power core base hub including an integrated power source for providing power to peripheral devices located on or within the computer desk, and for providing a stepped down power source to a USB hub board located within the power core base hub, and a plurality of USB communication ports on the USB hub board for interconnecting peripheral devices located on or within the computer desk to a computer.

V.S. current invention, the USB ports is Type A or Type C male plug of JUMP USB wire which other end is micro-USB or lightning (Apple company) which is not available on '834 filed date on 2004. '834 on 2004 has no any idea for USB wires with 2 different male plug to charger other product(s).

[0003] Currently, computer technology has become more advanced with an ever increasing number of computer related peripheral devices to assist a computer user. Since peripheral devices interface with the operating system of the computer, it is advantageous for the computer and the peripheral devices to be in close to one another for accessibility purposes for the computer user. A universal serial bus (USB) is a universal communication standard for connecting and communicating various peripheral devices to a computer. The USB allows the transfer of data between the computer and the peripheral devices. The USB further allows peripheral devices to be added without requiring add-in cards, dip switch settings, IRQ's and the like. Peripheral devices using the USB may be plugged in and implemented immediately. The USB detects the peripheral devices set up on the system and configures the software to operate the peripheral device automatically without having to restart your computer. The USB connects multiple peripheral devices to the computer through using of USB ports on the back of the computer (usually two per PC) or a USE hub may be added to the system to connect (i.e. daisy chain) multiple peripheral devices together. Examples of devices that are used with the USB connection include a keyboard, a mouse, a scanner, a joystick and a digital camera. The USB is also capable of sensing the power that is required to operate the peripheral device and can supply the required power to the peripheral device.

VS. Current invention, (1) USB power station do not have any data transfer and Not related to any computer peripheral device(s).

(2) '834 workstation plurality of USB connects multiple peripheral device to the computer . . . . Not same as current invention the USB power station is connect with external transformer to get 5Volt DC current minimum 2.4 Amp to 20 Amp to share with at least one of built-in or separated USB power station which has at least one of USB-port(s). So, '834 is only connects with computer peripheral device for data transfer purpose.

(3) The '834 USB also capable to power the required power to the peripheral device from computer. VS current invention, the year 2004 '834 get power from computer output USB only can get Maximum 0.5 A to all computer peripheral device(s) that is enough for date transfer. The current invention is to charge the i-phone or i-pad or communication device need at least 2.4 Amp so can charge only one i-pad. If would like to charge more than one i-phone or i-pad need more than 3.4 Amp from at least one separated USB power station(s). The current invention has at least one of power station(s) and each had its own wire arrangement to connect or to assemble with the external transformer to get each of separated or built-in power station(s) inner at least USB port(s).

[0015] FIG. 2 shows the internal circuitry of the power core base hub 32. The power core base hub 32 includes a power board 38 and a USB hub board 40 encased within a single enclosure housing 36. The housing 36 is preferably made of plastic, but can be made of any type of material suitable to house the electrical components. A heat shield 42 separates the power board 38 from the USB hub board 40 so as to minimize the effects of the heat generated by the electrical power components of the power board 38. A power-in cord 44 is electrically attached to the power board 38 for receiving a power source (i.e. high voltage, alternat-ing current 120V) from a main power supply such as an electrical wall outlet. The power board 38 may include a transformer for stepping down the power from a high voltage source to a low voltage source and an AC to DC converter for converting the stepped down power source from an alternating current power source to a direct current power source. The main power board may also include one or more circuits prior to the AC to DC converter and transformer for providing the 120V AC source to any computer accessory devices requiring the 120V AC source (i.e. CPU unit, video screen, printer, fax, or copier). A surge protector may also be incorporated in the power board 38 to shut down the power provided to any devices electrically attached to the power core base hub 32 in the event of a power surge or an overload on the main circuit of the main power supply.

V.S. current invention:

(1) '834 has built-in AC to DC transformer, current invention has external transformer to supply DC power from outside for at least one or plurality of separated desk top USB power station(s) with desired numbers of USB charging port(s) only to deliver DC power without transfer the data(s).

(2) '834 had one or more circuit PRIOR to the AC-to-DC conver to transformer to supply other AC operated device . . . . The current invention do not have such concept.

(3) '834 all USB is belong to USB HUB has at least 2 electric poles and 2 data delivery conductive-piece(s) which is not same as current invention for CHARGING purpose USB which only has (+) and (−) electrical pole(s) basing on the definition. So, basically the HUB and Charging USB are totally different on electric construction, theory, application, concepts.

(4) '834 all HUB USB only can apply for the computer its peripheral device(s) for data transfer or supply max. 500 ma current to these peripheral device(s). Because too low output power so not able to use for current invention for quickly charger minimum for 5Volt 2.4 Amp or up to 20 Amp.

Conclusion:

The '834 is totally different with current invention for any aspects.

Furthermore, For desktop items has built-in wired or wireless (Qi) charger system, the current invention charger and lighting arrangement had big improvement and had difference for below listed (7) US prior arts:

1. U.S. Pat. Nos. 7,736,033 and 8,545,039 Patel. The Lamp Base with Electric device recharge receptacle & means. The both disclose the Outlet device and the Cigarette-lighter type construction build on the lamp base. The Lamp Base make the input AC current transfer to output current to automobile current (12 Volt), then the separated product is a Automobile-Cigarette or car-charger make the input current from (12 VDC) to USB end current (5 Volt) and be charged item's need use the $2^{nd}$ USB-Wires' male plugs to connect for 5Volt Output-end and be-charged items' USB-receiving port. This means the both device at least need 2 expensive circuit/Transformer to get the USB Charger's output current from (120 VAC wall outlets) to (USB Current 5 VDC) and need 2 wires products ($1^{st}$ is cigarette adaptor+$2^{nd}$ is USB wires has 2 male plugs) to build the DC charging current delivery. This is not economical and none of people need 12 Volt DC for house use at all.

The current invention has many different way and compare with Patel as above FIG. 3B can do 2 arrangement including (A) direct let the inside housing AC to DC transformer and its circuit-inside to get DC 5Volt Current directly so transfer the input-end 120 VAC to output-end 5 VDC so this is practically. Or (B) the AC to DC transformer and its circuit-inside to make the 120 VAC to any $1^{st}$ DC Voltage which may can operate the DC light source or other functions but it does not work for USB charging-ports output-end 5V DC current so need get help from the IC or more circuit-inside or DC-to-DC circuit to change the $1^{st}$ DC voltage to $2^{nd}$ DC voltage which has DC 5Volt which perfect for the USB Charging Port's output-end current. So, the FIG. 3B show the (A) and (B) 2way to get desired DC current not only for USB-Charger but also for DC light source or other DC powered functions such as controller, IC, motion sensor, wireless communication kits, IP cam, remote controller, infra-Red controller, communication device, computer device, consumer electric device. So this is different with the Patel basing on above discussion.

2. US Prior Public 2011-017-7703 (Now U.S. Pat. No. 8,007,295) Rotatable & concealable device which only has the outlets device with manual switch. This is directly for 120 VAC outlets power source directly though metal piece and delivery 120 VAC to the rotatable & concealable device's receptacles to offer 120 VAC current while the other device's plug means connect with the said receptacle.

'703 patent fail to disclosure the any USB charger concept, circuit, design and application so not have any related with the current invention for USB charger and the current invention device use Overlay to sit on existing lamp base to offer multiple power type power station with a lot of features.

3. US prior art: U.S. Pat. No. 7,897,277 Meyer et al, disclosure the Reversible battery cartridge which are use the AC batteries cartridge a backup power for the all kind of lamp which mainly for power fail application. This is nothing to do with USB ports and USB charger application. So there is totally different with current invention related to (1) USB ports+(2) USB Charging+(3) Outlet supply power source+(4) LED light and Universal lamp base to fit for all kind of existing lamp base so not occupy any new desk top space because (5) the Universal Desk base is overlay top of the existing lamp base. Furthermore, the current invention has (6) LED light incorporate with the above listed (1) (2) (3) (4) (5) so it become a unique practical Universal Power station because (7) the current invention is not only supply one kind of power to charger different electric or digital-data device(s).

4. US prior art—U.S. Pat. No. 6,474,823 Disclosure the laptop computer with top illumination light which is not for the AC power source into USB related circuit to transfer to the DC current to charge DC 5 Volt electric device. The Computer input-end current is 120 VAC but it pass though the computer its transformer already transfer to output-end current at 19Volt 6 Amp VDC at transformer output-end or other high voltage DC current and then there is no any USB Charger circuit inside the computer so the computer's external transformer which directly to delivery 5 VDC current to the to the USB Port so the computer system which is not same as current inventions the input-end current is 120 VAC though USB Charger inside circuit and more than circuit-inside or IC or DC-to-DC circuit to change to get the output-end for 5 VDC and most important all laptop computer USB ports has data transfer which is not allow for the Quickly charging system especially for 2010 definition for USB Charging-ports has minimum 1.0 to 5 Amp or higher without any data transfer definition.

The total circuit and concept is different because computer prior art use the EXTERNAL Transformer which not belong to computer itself parts to transfer the 120V Outlet power. Though EXTERNAL transformer got 5 VDC current (Outside the computer). The Computer itself input-end current is 5 VDC and output-end current of USB ports also is 5 VDC so it proof, Computer itself is no any USB Charger circuit inside.

5. US Prior art: U.S. Pat. No. 8,562,187 SMED disclosure FIG. 2 function for AC outlet-module has the PCBA to transfer the input AC current to 15Volt 2A to turn on the said LED or to change the input AC current to US power outlet or Other country outlet. This is different with the current invention for AC outlet-unit which is directly to deliver the AC current from input-end directly to the AC current output-end no need any circuit help if added any PCBA to help will have some voltage dropped increase electric resistance. Also, The Smed other output for 15Volt DC which is not same as the current invention for USB charging-ports output-end need DC5V with market available USB-port type to connect with all communication, computer, mobile phone wire's specifications so it is not replaceable. From SMED teach 15 VDC 2 Amp current is supply to the LED light which LED light operation voltage is 15 VDC and SMED did not show the inner circuit or IC or other circuit to make the 15 VDC to pass though these other electric parts & accessories to change to the USB charging ports which 2010 definition has minimum 1.0-5 Amp or higher as SMED whole content did not teach 2.0 Amp how to charge the I-pad™ and can share the 2.0 Amp for all LED light and the Quickly USB charging-ports. The SMED teach use power cord 36 has connector 7 to outlet connector 5. These is totally different for current invention's outlet-unit which no need any power cord 36 to build the electric delivery from desk top lighting device to the other electric device. The current invention outlet-unit has all outlet-receiving ends and can directly plug-into the other electric device male-prong to get electricity.

The current invention also has major difference with '187 SMED for below details.

5-1. Transformer change AC to DC to 15Volt 2 Amp DC current to power LED or other and USB port.

This is not workable for the Ivan's because 15Volt DC is too high and will damage the be-charged items or create the Overheat so ned get help from IC or more circuit-inside or DC-to-DC circuit to make $2^{nd}$ time voltage change or adjust so can give USB charging-ports export-end for minimum 1.0-5 Amp or higher current at DC 5 Volt.

So the '187 SMED 15Volt DC just to supply power to the Plurality of LEDs and does not charged other be-charged 5V batteries because too high voltage and too small 2 Amp current which does not share for LED light and USB Charging-port need minimum 1.0-5 Amp current at the same time.

5-2. '187 SMED not teach the USB ports is Quickly Charging-port min. has 1.0 Amp Charging capacity at the DC 5Volt and how to share the 2.0 Amp current for both LED and Quickly charging-ports need minimum 1.0-5 Amp.

5-3. '187 SMED not teach any Quickly charging capacity and details to delivery from USB port to Be-charged items.

5-4. '187 SMED not teach the 2nd circuit-inside or IC or DC-DC circuit which incorporate with the Transformer's circuit-kits or Transformer's circuit-inner inside the Outside Transformer housing or inside the lighting housing.

5-5. '187 SMED not discuss USB charging-port at DC 5Volt and Connection for Be-Charged items. The USB-port 30 distribution the current to what purpose for 15Volt DC current this too dangerously to use super high voltage 15Volt DC to charge 5Volt batteries of the said be-charged items which is not meet US safety regulation by the USB-Charging port requirements including UL or ETL or other test lab. not like current invention details describe all USB Charging-port at DC 5 Volt with Min. 1 Amp to 5 Amp has safety authority certifications to charge the be charged device Energy storage unit or assembly so can let be-charged item can operate.

5-6. '187 SMED transfer 15Volt 2 Amp DC current which SUPPLY power to LEDs or others. This is not a current invention discussed to charge be-Charged items such as the ipad which need 2.1 Amp or higher to charge properly. SMED 15Volt not only too risk for Too high voltage to charge the Be-charged inside batteries but also has too few current to charge single one piece i-pad, it is impossible to charge i-pad or i-phone at same time which current invention did teach for any combination for more higher amperage needed such as 2.1 Amp, 3.1 Amp, 4.2 Amp. 2.4 Amp, 4.8 Amp and all meet the safety standard for USB Charging-port has 5.0Volt DC range for output voltage and not harm to other be-charged device which inside battery is 5.0Volt range.

5-7. '187 SMED lack of the $2^{nd}$ or more circuit-inside inside the Device as current invention. The $2^{nd}$ or more circuit-unit which may has $2^{nd}$ transformer because if need to SUPPLY ANY LIGHT SOURCE, It may need one Big Power output such as 5VOLT 5 Amp for Plurality of LEDs Including color changing LEDs (White LED 20 pcs plug Warm white 20 pcs) so need one transfer as the '187 SMED needed. But also need to have current to the said USB Charging-port(s) which may need 5Volt 4.8 Amp so one transformer is not enough and not good to supply 2 applications. So the current invention need $2^{nd}$ or more circuit so can has 1" Circuit-inner to supply the USB Charging-ports and $2^{nd}$ or more circuit-inside to supply current to other application including plurality of LED, Super Big power consumer CFL, Energy saving bulb, LED bulbs, time display (May use separated batteries), or Controller need such as IP cam, motion sensor, IR for dim light help IP cam, wireless communication, motion sensor all these other added functions.

6. US Prior art: U.S. Pat. No. 8,758,031 Cheng et. teach the inside wall USB charger device which is not same as the current invention. Also, Cheng's filed date is Jul. 23, 2012 which is too late than current inventions. Also, this is for the Power Box inside wall has USB charger. Not same as current invention.

7. US prior art: U.S. Pat. Nos. 7,742,293, 8,116,007, 8,432,667 STRAUSER teach the music player has pedestal support or foot to put ground the exemplary audio device (system) 10 has a system console 24 supported by a pedestal 20. The system console 24 typically has controls (e.g. volume, play, stop, etc.), displays and indicators. In this exemplary system 10, music or karaoke content comes from a digital music player 80 that is inserted into a cradle 81 (see FIG. 8) and connected to audio inputs 99 of the exemplary system 10. Even STRAUSER had teach the USB plug to power the music-player as below content; In a preferred embodiment, the cradle 81 is stepped as disclosed in the parent application, "DIGITAL MUSIC PLAYER CRADLE ATTACHMENT," Which is included by reference. Thereby, the cradle 81 supports a large variety of music players 80 of varying sizes and shapes. In such, the music player 80 sits in a cradle 81. Power is provided from a power port (e.g. USB port) 21, into which the power cable plug 82 (e. g. USB plug) is connected to provide power to the music player 80. But it is different with current invention for (1) not desktop items because pedestal 20 for ground installation (2) not people hand reachable distance to charge the other electric device furthermore need to walk to far distance which more trouble than bend body to get power from power strips or outlets (3) No any light source to offer indicator light or any illumination (4) the music player (80) its do not supply the power to other device which is different with current invention is music device has built-in circuit and transfer input current by circuit-inside or IC or DC-to-DC circuit to arrange or adjust to get DC 5Volt to charge the other electric device. So, this is not same as current invention for desktop definition and people will stay for a while to charge the other device.

8. U.S. Pat. No. 8,899,797 which for has USB port install on the movable (Movable parts & accessories or Organizer, Or Addable parts & Accessories) (may add the USB-unit or USB-Module or Outlet-unit or Outlet-Module on the MOVEABLE or ADDED parts of Desk lamp)

The '797 who is filed on Aug. 26, 2012 after Co-inventor's U.S. Pat. No. 8,783,936 (#GGG-2011) Public date on Dec. 15, 2011. and '797 patent has one prior filed and abandonment as below because it adaptor the phone's custom-pin plug to connect with phone female custom-pin end to build the electric and audio signal delivery, so this is not like the current invention has all USB-port which is female USB receiving ends on the desktop item and though the male-plug kits to of USB wire which has male-plug ends on 2 ends and one end connect with Desktop female USB port and other male plug end inert into the be-Charged device.

Hereof, The comparison for the 2006-020-9530 as below:

1. '9530 has bulb-socket so it is not the Built-in LED lamp. This maximum can add LED bulb Lamp device.
   Fact: Column (0005) Line 10
   A terminal housing is disposed relative to the neck second portion, a bulb socket including a seat portion is attached to the terminal housing, and a shell portion of the terminal housing is shaped to receive the base of a light bulb.
2. '9530 The Transformer and Bulb-socket in parallel connection. So, the light source is powered 120Volt current which is not built-in LED lamp device
   Fact Column (0006), The lamp support may also house a transformer electrically coupled to the power cord in parallel to the bulb socket.
3. '9530 The $2^{nd}$ socket on the edge of the support or base is Custom Pin-Out, do not have regular USB charging-port so only can charge 1 model of phone as Contact (44) both all for Customer Pin-Out design. This is limited for one and ONLY ONE item can be charged.
   FACT [0007] alternatively, the lamp may include a second socket disposed on the support, the socket having a first end directed internally of the support and coupled to the speaker and a second end positioned externally on the support for connecting to a media device compatible cable.
4. '9530 do not have any wire from charging contact (44) or outside socket (50) needed while charging the phone. Because the contact (44) or Outside socket (50) both is custom pin-out construction and the phone just directly plug into this Custom Pin-Out can directly charger . . . . This is only limited one and ONLY ONE phone can be charged. Not like current invention use common USB-Female-receiving end, and charging wire's USB insert male-plug to deliver the current and the though charging wire's other ends to connect with the electric or digital device.
   The audio output cable (17) though Round Plug (17a) to transmit the data to speaker (15) (15a), Audio Output cable (17) one end to Music media device (100) and the other end to Speaker (15a) (15b)
   FACT [0019] As illustrated in FIGS. 1 and 2, an audio output cable 17 is electrically connected via a plug 1711 at one end to each of speakers 15a and 15b. As illustrated in FIGS. 2 and 4, the other end of audio cable 17 may be fed through an orifice 19 in support 12 and be operable to connect, for example, to the headset jack or other audio output terminal of media player 100 as indicated. Alternatively, as illustrated in FIGS. 1 and 3, the orifice 19 may house a connector (not shown) for plug connecting to a plug 17b of output cable 17
5. '9530 do not has built-in LED light source, only can install the LED bulb at the bulb-base. Not like the co-inventor's (3) issued patents or co-pending case has LED built-in as light source, No Bulb-Base at all.
   FACT (0021) line 10 The light source 24 (e.g. incandescent bulb, halogen lamp, Fluorescent bulb, or one or more LEDs) is mounted in the bulb socket 20 and positioned in a plurality of positions relative to the support 12 by arrangement of the Flexible neck 14.
6. '9530 contact (44) is Custom Pin-Out type which only can charge one and ONLY one model of the phone. Also, the Recess Slot which also become Big limited to fit one and ONLY one phone.
   FATC (0025) As illustrated in FIG. 2, the recess 42 is provided on the top surface of the support 12 for receiving the media player 100. A plurality of contacts 44 are formed at the base or on a Wall of the recess 42.
7. '9530 Only can charge one and ONLY ONE phone because (A) Recess (42) size is fixed (B) The contact (44) need align precisely to the phone contact so can charge one and Only One. Not like Ivan the charging port is common USB-Port.
   FACT (0026) Recess 42 is shaped to snugly receive a lower portion of media device 100 so as to align or mat tightly couple electrical contacts 46 on the media device 100 with contacts 44 of support 12, and thereby act as a socket for media device 100. Contact between contacts 44 of support 12 and contacts on media device 100 (not shown) for example may permit a rechargeable battery housed wholly within media device 100 to charge. Contacts 44 and media device 100 contacts are adapted to mating tightly couple with each other so that DC voltage can be supplied to the rechargeable battery of media device 100 for charging through the coupled contacts 44 and media device 100 contacts. In addition, if the media player 100 includes audio output contacts in proximity to the charging contacts, ones of coupled contacts 44 may be connected to speakers 15a and 15b via an internal cable (not shown) as an alternative to audio output cable 17.
8. '9530 unit only can charge one and ONLY One phone and the charge contact all is Custom Pin-Out type. The current invention's items have USB-port which can work with any USB-Port charging wires to connect with the other electric device and digital device.
   FACT [0027] In accordance with an alternative arrangement of the present invention and with reference to FIG. 4, a charging circuit is excluded from lighting apparatus 10, and contacts 44 are electrically connected to a socket 50 dis posed on an exterior surface of support 12. Connection between contacts 44 and socket 50 are provided through internally disposed cable 51.
9. '9530 use custom Pin-Out construction on the contact (44) and Outer socket (50) which same as LEE Example i-pod wires for custom pin-out so can fit and charge one and only One phone . . . . Not like the other end on the computer as USB-port which Ivan patent claimed.
   FACT (0027) Line 2 Socket 50 is adapted to interface with the charging and/or data cable associated with media player 100. For example, an IPod media player sold by Apple Inc. typically employs a cable to connect the IPod to a computer via the computer's USB port. This cable has a custom pinout on one end which connects to the IPod device and a USB connection on the other end Which mates With the USB port on a computer.
10. '9530 device can transmit BOTH DATA and CHARGING. This is not happened at current invention item because current invention item only has the CHARGING FUNCTION. This is not same on basic CHARGING of CHARGER device!! So, this is totally different with current invention's CHARGER patent.

Fact (0027) Line14 to 19 The cable allows both transmission of data between the computer and the IPod and charging of the IPod's internal battery through the USB port on the computer.

11. '9530 device cable is associated audio media device & get power from the inner charging-circuit and get power from CUSTOM PIN-OUT contact (44) or Outer socket (50) This is totally different with Ivan's can charge and ONLY CHARGE many different electric or digital device. Not one and ONLY one as LEE claimed and details description for AUDIO MEDIA DEVICE (100).

FACT (0027) Line 2 Socket 50 is adapted to interface with the charging and/or data cable associated with media player 100.

So, From Above (11) points different with (2006-020-9530), The current invention any issued or co-pending filing do not have any same or similar with '9530. Furthermore, the '9530 on 2006 is no charging capability over 1.0 Amp as wiki report shown all the history and data so the charring capability and Not allowed the Digital or electric data to delivery on old date 2006, so that is not like current invention for quick charge USB Charging-Port as above discussion and wiki data !

Also, the (2006-020-9530) for contact (44) and Outer socket (50) has below text;

The said USB receiving end (USB port) is one end of USB-Charging cable which same as all laptop computer USB receiving end, not USB custom pin-out, not USB mini, Not USB compact, Not USB other name which is the other end of the said USB-Charging cable which only fit for limited number of the electric or digital device.

9. US abandonment public prior art US 2009-006-7161 NOGOTA

The Foldable mirror set is not Desktop installation. That is travel unit not let people to install on desktop surface always.

The Power from the Computer and which is not quickly charger (2010 just had final definition for USB charging ports has min. 1 to 5 Amp) and has very limited current less than 500 ma not like current invention has minimum 1.0 Amp up to 5 Amp for definition of the USB Charging-Ports release on 2007 and update on 2010.

'161 NOGOTA (Column 015 line 8 to 11) The electricity source of the light-emitting element 3 provided in the upper cover 1 is supplied by means of connecting the circuit unit 31 to a lead 4, connecting the lead 4 to the USB port terminal 41, Also, the computer USB is not charger into the Foldable mirror into foldable mirrors' internal rechargeable battery. The Computer is SUPPLY the current to the foldable mirror while the USB Male plug (41) of the wire (4) from the foldable mirror (do not have any be charged items has the USB male plug on the device) into the computer ports and has power. Not charging into rechargeable battery and storage inside the rechargeable ready to use. This is total different because the current inventor has (1) The current invention said the desktop item has its own AC power source which is connect with desktop housing, The electricity source of the light-emitting element 3 provided in the upper cover 1 is supplied by means of connecting the circuit unit 31 to a lead 4, connecting the lead 4 to the USB port terminal 41, and connecting the USB port terminal 41 to an electronic apparatus 5 which is capable of providing a power supply. (Column 15 line 9-13) The electricity source of the light-emitting element 3 provided in the upper cover 1 is supplied by means of connecting the circuit unit 31 to a lead 4, connecting the lead 4 to the USB port terminal 41, and connecting the USB port terminal 41 to an electronic apparatus 5 which is capable of providing a power supply. '161 NOGOTA get power from computer 5 which not from AC power source as above FIG. 3A or FIG. 3B (2) '161 NOGOTA (Column 015 Line 7 and line 8) The circuit unit 31 is provided with one or a plurality of light-emitting elements 3. Which means Nagota do not have any circuit for Quickly USB Charging-port which has minimum 1.0-5 Amp big current arrangement (3) '161 teach (Column 18 line 8 to 11) Alternatively, one or a plurality of USB insertion slot terminals 42 can be provided to allow for the connection of external digital element(s) 6, thereby achieving an effect of expansion slot(s). which is not a USB charging ports for digital element and NOGOTA did not teach how to get the power from circuit 31 and any relation for current type or voltage or amperage because NOGOTA claimed the light source can be LED or incandescent bulb but from Computer (5) get into is DC current which supply to LEDs. But, NOGOTA claim the LED can be incandescent (AC light source) so it is big question for this product is not existing basing on the '161 conflict description. [0017] As shown in FIG. 1 and FIG. 2, one or a plurality of light-emitting elements 3 can be provided at the insides of the upper cover 1 and the lower cover 2. The light-emitting element 3 can be a LED or bulb.

The foldable mirror does not have any internal transformer to change incoming AC current to DC current.

The foldable mirror had no outside transformer get power from outlet AC power source.

So, this prior art is nothing to do with current invention.

10. Daneil, Quirky Ember "Portable study lamp with USB port and power outlets, Jan. 28, 2011.

US Quirky device is a portable study lamp with USB port and power outlet

And as the Sep. 15, 2015 Third party page 45 show very clear "Quirky confession the device is "PORTABLE STUDY LAMP and POWER STRAP➔ WANT A LAMP INTEGRATED BOTH OF FUNCTION", and the page 45 show apply the power-strap on wall-outlet and light is hanging on the wall . . . . (This is totally different the definition of current invention for DESKTOP ITEM, No need dictionary to explain the meaning for "Desktop items" vs. "Portable POWER-STRAP & PORTABLE Study Light".

This is strong-evidence for (Quirky "Quirky confession the device is "PORTABLE STUDY LAMP and POWER STRAP➔ WANT A LAMP INTEGRATED BOTH OF FUNCTION" is not for the permanently installation on desk top items. This is totally different categories for (Portable device) vs. (Current invention for only for permanently desktop items except people not use or replace it.

However, the different for both as below discussion, including:

The current invention is;

a. Non-portable device, and never can put into backpack to carry anywhere often (supported by FIG. 1, 2, 3, 4, 5, 6, 7, 8, 9, 10, 11).

b. Permanently install on desktop which will not move evenly because always put on desktop surface and it is big and heavy and impossible to fit into backpack. (supported by FIG. 1, 2, 3, 4, 5, 6, 7, 8, 9, 10, 11).

c. Has Big size or big base or too heavy stop fall out from desk top surface (supported by FIG. 1, 2, 3, 4, 5, 6, 7, 8, 9, 10, 11).

d. Has the bendable arms which is sealed by plastic or chemical coated to form soft touch surface (Supported by FIG. 11 and FIG. 13 and FIG. 14)
e. Current invention has adjustable arm or bar or rod which has base which is 90 degree install on the LED desktop base (Supported by FIG. 8, 9, 11, 12)
f. The USB port install base wherein the base and base of flexible arms is on vertical or around 90-degree relation and not can changeable angle (Supported by FIG. 8, 9, 11, 12)
g. All USB-port is face outside install on the base contour side wall to prevent water or ash get into the USB-Charging port(s) to make the electric shortage or overheat because accumulated dust or ash to reduce the electric contact-surface. (Support by FIG. 7, 8, 11, 12 and FIG. 1, 2, 3, 4, 5, 6)
h. Quirkily not use Transformer for outside AC-to-DC power source which is AC-wired because Quirky is one of extension cord and add snake-house arms LED for light. (Supported by FIG. 3→ 3C) (FIG. 5→5C) (FIG. 9→ 9c)
i. Quirkily has no any the added functions such as 1. FIG. 23 Lava light with moving reflector, miniature moving effects, or FIG. 24 project built-in image forming-piece or outside object lighted-image or lighted-patterns or light-beam, or FIG. 25 liquid supplier, or FIG. 26 air-freshener or air-fragrances or moisture functions, or FIG. 27 digital LED clock, or LCD alarm clock offer time, date, weather, sound, 8 switch for adjust, setting, selection for colorful and desired brightness, or FIG. 29 offer Air-flow, lighted patterns, lighted-image or light-beam, or FIG. 28 lighted candy or food supplier or vending machine all have the said LED light-source building to supply area-illumination (Support by Ivan FIG. 22, 24, 25, 26, 27, 28, 29).
j. Added function need different DC working voltage such as super brightness LED Or COB LED (Chip-on-board LED which is same as dice LED have to install on the Pronged circuit board, this is not new, Just Nick-Name of Chip-on-board same as Dice-on-Board—DOB) need to use 6V or higher which is not same as LED light or USB port 3/5Volt. Quirky did not have this kind of other DC-to-DC current to offer other added-function because Quirky do not have other added-functions for extension cord with LED light, No Air-flow, No cosmetic mirror, No Clock or alarm clock, No air-sprayer, No music, No speaker, No project the object or built-in image-forming-unit lighted-patterns or lighted-image or light-beam. The current invention had this. (supported by FIG. 15+16+18 LED matrix, array, circle+FIG. 23, 24, 25, 26, 27, 28, 29 for added-functions into LED light-device and meet the current invention Claim add limitation)
k. The LED light device of one of Desktop items, the said adjustable arm or bar or tube or pole must have longer length which need higher than people waist to shoulder and need width must from base location to people at least one eye this width, so people can use while reading or working. The current invention LED lighting is Big-size or Big-base or heavy unit, so it is not able to move like Quirky extension-cord very light so can put base in any movable location(s) for each time carry out to new place so Quirky just need short arms or bar or tube. The current invention because different concept, construction, application so must be much longer than cross section length of LED Desktop light Cross section! This means the current invention from FIG. 1 to FIG. 6 the arm/bar/pole/tube (Y-axis) or height need close from people waist to shoulder. The (X-axis) or aid width need to from base-location to people eyes position (Normally people will put big and heavy bas away from right or left arms, so the width needs min. have 1 foot or more.→this is not happening on Quirky (Refer to Third-party submission date on Sep. 18, 2015) Page 45 and 46→ Show it is not for Desktop items, Page 25 show the light use on the wall outlet and on the bed. Page 46 show on the Floor.→ This because quirky is use Power strip as base and add one snake house and put a single LED on top,)

Furthermore, Quirky copy co-inventor earlier filed cases (#BB-2008) U.S. Ser. No. 12/232,035 Filed on Sep. 10, 2008 Public Jan. 9, 2009, now is patent U.S. Pat. No. 7,824,185 issued date Nov. 2, 2010) . . . . As for the LED-unit has Flexible-arms is same as FIG. 6 of PARENT Case of (#AA-2008 Filed May 12, 2008). These 2 (#BB-2008) and (#AA-2008=Mar. 5, 2009 Public=May 12, 2008 Filed) so therefore Quirky did not filed USA patent because it is combining both Ivan 2 concept.

So, the Quirky Jan. 28, 2011 is 2 years later after check Ivan the (#AA-2008) and (#BB-2008) to combine to make the said Quirky Jan. 28, 2011 announcement instead of filed the USA patent filing.
→ These limitations should be covering the Quirky whatever he said the PORTABLE Lighting!!

11. China patent 2007-2015 3487 Miss Lin Wa-Yeh filed on Jun. 11, 2007 issued Jun. 25, 2008 '487, from the electric drawing can see that patent disclosure the light source is connect with AC current and the said AC/DC transformer only supply the 3/5V current into the USB ports, Not link to the (Light source) so that is the typical AC power light source. Even at the text said light source can use LED but at 2007 Jun. 11 did not had super bright white LED has market available can use for desk-lamp further said as current invention use a Plurality number of LEDs or recently COB LED-unit at that time before the 2007 June. The current invention listed the major difference at:
a. The LED is Plurality LEDs arrangement for geometric positions to get desired area illumination.
(Reason: On 2007 it is impossible for white color super bright LEDs+Cost issues) Even do not have COB for built-in plurality of the LED dice into one piece including square, rectangular, even 2017 came out for circle type.
b. The current invention details listed the current get from:
b-1: outside AC-to-DC transformer so can get $1^{st}$ DC. Also, the current invention had $2^{nd}$ added functions, so may incorporate with built-in at least one of DC-to-DC circuit to make more than one or only one DC to fit for LED light source or-and added function or IC or USB export ports for same or different Current. (This is not even existing and mentioned by China 2007 filed patent for concept, application for use Outside transformer)
→ So this claim should be granted allowance!
b-2: Inside AC-to-DC transformer to get $1^{st}$ DC. The same incorporated with inner one or more than one DC-to-DC circuit to get 2nd/3rd/$4^{th}$ DC circuit to let different LEDs or added functions to use which may use same or many different voltages. Such as LED array may need 6 Volt operation voltage which is not all same within 3/5 Volt.
Especially the COB or the High brightness output LED. (This is not happening on the 2007 for the more LEDs==Because update technical for different LED especially for super brightness or super power saving energy, assembly cost need use different working voltage with USB export 5Volt current).

b-3: Inside AC-to-DC transformer to supply same current to LED or-and another added device. (This is other features no shown on quirky or China 2007 patent to disclose at all) . . . .

These (3) Specialized my filing feature has these Big Difference for LED desktop light. Which power by AC-wired Is different by (Outside AD-to-DC transformer) because all inner electric parts is different at all!

12. U.S. Pat. No. 7,736,033 Patel
    '033 Patel teach one lamp has the cigarette lighter round output receptacle and to receiving the (210) screw in by thread round transformer which transfer from 12Volt to USB output voltage 5Volt which is not same as the current invention has the UBS-receiving port which directly offer the 5Volt current to another electric device.

This prior art been argued so many times. Not know why examiner cannot find one of prior art is similar with current application to let us know has real prior art existing. Not use this old prior art.

13. U.S. Pat. No. 8,687,392 (1) and U.S. Pat. No. 8,687,392(2) Sims et al '392 this is other application which said the device itself need has the (50 of FIG. 1) capacitor or other energy storage element while the power converter is operating in the standby mode beside the AC-DC power convertor circuit (122 of FIG. 1) and plus other monitor system (54 of FIG. 1) This is not same as current invention for non-itself energy storage device or capacitor to make this expensive circuit for the current invention. So, this is nothing to do with current invention because from AC power source is unlimited power no need to waste money for power saving.

14. U.S. Pat. No. 8,853,884 GENANNT BERGHEGGER et al
    '884 teach the how to save power while the current is not operation. This kind of circuit is not use for Outlet which is only get power from AC power source only through the inner conductive receptacles to supply the current to inserted into male AC plug no matter when the male AC plug into or not into the receptacle, no any switch to control it. Same as USB ports output current, the current USB-port always relates to AC power source and through AC-to-DC transformer or at least one of DC-to-DC circuit so can get the preferred DC current volt to the said USB-port or other added functions again no any controller to make power less consumption or become big current to supply the current. That is fixed Amperage and voltage for each USB port.

So, this is nothing to do with current invention because from AC power source is unlimited power no need to waste money for power saving 15. U.S. Pat. No. 8,783,936 Chien
    This is the co-inventor parent filing case which has all same drawing with current invention. So, it is not the any prior art vs. tis continuously filing case.

The current invention earlier co-pending filed case including:
1. (#BB-2008) U.S. Ser. No. 12/232,035 Filed on Sep. 10, 2008 Public Jan. 9, 2009, now is patent U.S. Pat. No. 7,824,185 issued date Nov. 2, 2010) . . . . As for the LED-unit has Flexible-arms is same as FIG. 6 of PARENT Case of (#AA-2008 Filed May 12, 2008). These 2 (#BB-2008) and (#AA-2008=Mar. 5, 2009 Public=May 12, 2008 Filed) so therefore Quirky did not filed USA patent because it is combining both Ivan 2 concept.

So, the Quirky Jan. 28, 2011 is 2 years later after check Ivan the (#AA-2008) and (#BB-2008) to combine to make the said Quirky Jan. 28, 2011 announcement instead of filed the USA patent filing.

From (A-1) and (A-2) Both is enough to argue with Anabel for Quirky Is not the inventor for these (Power strip) and Outlet+USB+LED . . . . As above 3 Evidence.

A-3: From Quirky photos show, everyone know the Main-unit is (Power strip with USB and Outlet). There is No one will use the Quirky items for desk top lamp for reading.

A-3-1: Quirky items for short arms which not higher than people sited-shoulder height or not has horizon-axis for min. half-chest length . . . . The shorter arms not have vertical-height, it only can be treated for PROTABLE or WORKING TOURCH . . . . Meaning from Desk Lamp . . . . This should be having enough height above people shoulder or front arms height and has horizon-axis min. ½ chest width, so can let people have good desk lamp.

A-3-2: Quirky base is 100% can recognized is (Power strip) . . .

A-3-3: Quirky main-unit is (Power strip) so easily can carry, but same time, while it is power-strip for main-housing➔ Then it is very easily to portable or put into Backpack . . . . However, All Market Desk Lamp is very difficult to put into backpack and carry. Because Desk top lamp must very goo
d installation on desk top surface because need to overcome 3 kind of Force at any time . . . (Desk top Lamp) must overcome below 3 force including:
  (A-3-3-1) Super Heavy 14 gauge-wire (US safety standard) if has outlets-unit for min. 6 feet long. Quirky power strip is not way to overcome this heavy 14 gauge 6 feet long wire weight . . . . So, is there any market power strip is there any one Can put on desktop and no fall from desktop?? The answer is NO!!
  (A-3-3-2) The weight from Top LED-unit has LEDs and housing or another optics-lens, PCB.
  (A-3-3-3) Arms or LED-Box/housing weight on horizon-axis so can let LED desk lamp not fall down or These 3 Weight can overcome only while the Desk Lamp has (1) Bigger Main-Base so can let all
  Top LED-unit housing or/and horizon arms center-of-gravity can fall within the Bigg-main base range. Or (2) The main-base must add weight-unit to overcome the center-of-gravity of top LED-unit housing and horizon arms weight So, this is not possible to add on the Quirky shown photos for (Power strips because inside is full of the metal piece for outlets and USB circuit!!

Hence, these are all arguments with Anabel. The Quirky is Not the 1st one inventor for his photos because Ivan already show on parent filed case (#AA) and (#BB) and (#CCC) all these 3 cases drawing show very clear Quirky cannot filed USA *patens* so use publication on some medium.

(2) China patent=2007 Filed, this is very earlier date. Almost same year of Steve Jobs (Apply) came out 1st iPhone on 2007.

The difference with current invention:
1. From China patents show the circuitry for incandescent radiation light source (105)
2. From the Chien patent the circuitry show the Incandescent or other light source is work under the AC current while the Input AC power (100) from outside AC wire (101) and the AC current will go through the conductive-trace or wire to the incandescent bulb (105) and has one on-off switch (103) to turn on or turn off the AC current into the AC power light source.

From whole China patent background, brief drawing, details description did not discuss anything for the LED light source at all only show on the claim 5 said all kind of light source(s) but lack of support from the anywhere of the whole patent for how to get work for DC-Operated LED can use shown circuitry which is AC current deliver to the light source (105).

Basing on the $2^{nd}$ times discussion of the top 2 Prior art for (A) Quirky and (B) China patent, both is invalid US prior art not only for above list discussion, but also current inventor had earlier than Quirky filed date Jan. 22, 2011 as below evidences;

Evidence A;

FIG. 1+2+3+8+9=U.S. Pat. No. 7,824,185 (#BB-05) Ser. No. 12/232,035—Sep. 22, 2010F (extension cord has outlet and LED and 3 contact-points.

Evidence B.

FIG. 6=U.S. Pat. No. 7,722,230 (#41) (#AA-08) Filed on 2008

Evidence C;

Column1 Line44 (USB port)+FIG. 10C=U.S. Pat. No. 8,998,462 (#CCC-10) Multiple Surface LED Light filed on Nov. 19, 2010, U.S. Ser. No. 12/950,017 Public date on May 24, 2012 Public Number 2012-012-7708 now is US patent and issued on Apr. 7, 2015.

Evidence D; (Child Filed patent of #CCC-2010)

FIG. 3+4+6+7+8+9=(#FFF) U.S. Ser. No. 13/117,227 for the PUB PDF File.

Evidence E:

(#UU-2010) filed on Nov. 3, 2010 U.S. Ser. No. 12/938,628 on PUB PDF The current invention is different with the $3^{rd}$ group of US (17) prior art including:

16. U.S. Pat. Nos. 7,736,033 and 8,545,039 Patel. The Lamp Base with Electric device recharge receptacle & means. The BHART's disclosure the Outlets device and the Cigar lighter build on the lamp base. The Lamp base make the input AC current transfer to output current to automobile current (12 Volt), then the Automobile Cigarette make the input current from (12 VDC) to USB end current (5 Volt). This means the Bhart's device at least need 2 expensive circuit/Transformer to get the USB Charger's output current from (120 VAC wall outlets) to (USB Current 5 VDC). This is not economical and none of people need 12 Volt DC for house use at all. The current invention direct installs the USB Charger unit which transfer the input-end 120 V AC to output-end 5 VDC so this is practically.

17. US Prior Public 2011-017-703

'703 disclosure rotatable & concealable device which only has the outlets device with manual switch. This is directly for 120 VAC outlets power source directly though metal piece and delivery 120 VAC to the rotabel & concealable device's receptacles to offer 120 VAC current while the other device's plug means connect with the said receptacle.

'703 patent fail to disclosure the any USB charger concept, circuit, design and application so not have any related with the current invention for USB charger and the current invention device use Overlay to sit on existing lamp base to offer multiple power type power station with a lot of features.

18. US prior art: U.S. Pat. No. 7,897,277 Meyer et al,

'277 disclosure the Reversible battery cartridge which are use the AC batteries cartridge as the backup power for the all kind of lamp which mainly for power fail application. This is nothing to do with USB ports and USB charger application. So, there is totally different with current invention related to (1) USB ports+(2) USB Charging+(3) Outlet supply power source+(4) LED light and Universal lamp base to fit for all kind of existing lamp base so not occupy any new desk top space because (5) the Universal Desk base is overlay top of the existing lamp base.

Furthermore, the current invention has (6) LED light incorporate with the above listed (1) (2) (3) (4) (5) so it become a unique practical Universal Power station because (7) the current invention is not only supply one kind of power to charger different electric or digital-data device(s).

19. US prior art—U.S. Pat. No. 6,474,823

'823 disclosure the laptop computer with top illumination light which is not for the AC power source into USB related circuit to transfer to the DC current to charge DC 5 Volt electric device. The Computer input-end current is 120 VAC but it pass though the computer its transformer already transfer to output-end current at 5 VDC and then there is no any USB Charger circuit inside the computer so the computer's external transformer which directly to delivery 5 VDC current to the to the USB Port so the computer system which is not same as current inventions the input-end current is 120 VAC though USB Charger inside circuit to get the output-end for 5 VDC.

The total circuit and concept are different because computer prior art use the EXTERNAL Transformer which not belong to computer itself parts to transfer the 120V Outlet power. Though EXTERNAL transformer gets 5 VDC current (Outside the computer). The Computer itself input-end current is 5 VDC and output-end current of USB ports also is 5 VDC so its proof, Computer itself is no any USB Charger circuit inside.

20. US Prior art: U.S. Pat. No. 8,562,187 SMED

'187 disclosure FIG. 2 function for outlet-module has the PCBA to transfer the input AC current to 15Volt 2A to turn on the said LED or to change the input AC current to US power outlet or Other country outlet. This is different with the current invention for AC outlet-unit which is directly to deliver the AC current from input-end directly to the AC current output-end. Also, The Smed other output for 15Volt DC which is not same as the current invention for DC5V with market available USB-port type to connect with all communication, computer, mobile phone wire's specifications so it is not replaceable. The SMED teach use power cord 36 has connector 7 to outlet connector 5. These is totally different for current invention's outlet-unit which no need any power cord 36 to build the electric delivery from desk top lighting device to the other electric device. The current invention outlet-unit has all outlet-receiving ends and can directly plug-into the other electric device male-prong to get electricity.

The current invention also has major difference with '187 SMED for below details.

5-1. Transformer change AC to DC to 15Volt 2 Amp DC current to power LED or other and USB port.

This is not workable for the Ivan's because 15Volt DC is too high and will damage the be-charged items or create the Overheat. The Ivan transformer must be 5Volt DC with.

So, the '187 SMED 15Volt DC just to supply power to the Plurality of LEDs and cannot charged other be-charged 5V batteries.

5-2. The '187 SMED not teach the USB ports is Quickly Charging-port min. has 1.0 Amp Charging capacity at the DC 5Volt.

5-3. The '187 SMED not teach any Quickly charging capacity and details to delivery from USB port to Be-charged items.

5-4. The '187 SMED not teach the 2nd circuit-inside which incorporate with the Transformer's circuit-kits or Transformer's circuit-inner inside the Outside Transformer housing or inside the lighting housing.

5-5. The '187 SMED not discuss USB charging-port at DC 5Volt and Connection for Be-Charged items. The USB-port 30 distribution the current to what purpose for 15Volt DC current this too dangerously to use super high voltage 15Volt DC to charge 5Volt batteries of the said be-charged items which is not meet US safety regulation by the USB-Charging port requirements including UL or ETL or another test lab. not like current invention details describe all USB Charging-port at DC 5 Volt with Min. 1 Amp to 5 Amp has safety authority certifications to charge the Be-charged device Energy storage unit or assembly so can let be-charged item can operate.

5-6. The '187 SMED transfer 15Volt 2 Amp DC current which SUPPLY power to LEDs or others, this is not a current invention discussed to charge be-Charged items such as the iPad which need 2.1 Amp or higher to charge properly. SMED 15Volt not only too risk for Too high voltage to charge the Be-charged inside batteries but also has too few current to charge single one-piece iPad, it is impossible to charge iPad or iPhone at same time which current invention did teach for any combination for more higher amperage needed such as 2.1 Amp, 3.1 Amp, 4.2 Amp. 2.4 Amp, 4.8 Amp and all meet the safety standard for USB Charging-port has 5.0Volt DC range for output voltage and not harm to other be-charged device which inside battery is 5.0Volt range.

5-7 The '187 SMED lack of the $2^{nd}$ or more circuit-inside inside the Device as current invention. The $2^{nd}$ or more circuit-unit which may has $2^{nd}$ transformer because if need to SUPPLY ANY LIGHT SOURCE, it may need one Big Power output such as 5VOLT 5 Amp for Plurality of LEDs Including color changing LEDs (White LED 20 pcs plug Warm white 20 pcs) so need one transfer as the '187 SMED needed. But also need to have current to the said USB Charging-port(s) which may need 5Volt 4.8 Amp so one transformer is not enough and not good to supply 2 applications. So the current invention need $2^{nd}$ or more circuit so can has $1^{st}$ Circuit-inner to supply the USB Charging-ports and $2^{nd}$ or more circuit-inside to supply current to other application including plurality of LED, Super Big power consumer CFL, Energy saving bulb, LED bulbs, time display (May use separated batteries), or Controller need such as IP cam, motion sensor, IR for dim light help IP cam, wireless communication, motion sensor all these other added functions.

21. US Prior art: U.S. Pat. No. 8,758,031 Cheng et.

'031 Teach the inside wall USB charger device which is not same as the current invention. Also, Cheng's filed date is Jul. 23, 2012 which is too late than current inventions. Also, this is for the Power Box inside wall has USB charger. Not same as current invention.

22. 23. 24. US prior art: U.S. Pat. Nos. 7,742,293, 8,116,007, 8,432,667 STRAUSER '293, '007, '667 teach the music player has pedestal support or foot to put ground the exemplary audio device (system) 10 has a system console 24 supported by a pedestal 20. The system console 24 typically has controls (e.g. volume, play, stop, etc.), displays and indicators. In this exemplary system 10, music or karaoke content comes from a digital music player 80 that is inserted into a cradle 81 (see FIG. 8) and connected to audio inputs 99 of the exemplary system 10.

Even Strauser had teach the USB plug to power the music-player as below content;

In a preferred embodiment, the cradle 81 is stepped as disclosed in the parent application, "DIGITAL MUSIC PLAYER CRADLE ATTACHMENT," Which is included by reference. Thereby, the cradle 81 supports a large variety of music players 80 of varying sizes and shapes. In such, the music player 80 sits in a cradle 81. Power is provided from a power port (e.g. USB port) 21, into Which the power cable plugs 82 (e. g. USB plug) is connected to provide power to the music player 80. But it is different with current invention for (1) not desktop items because pedestal 20 for ground installation (2) not people hand reachable distance to charge the other electric device furthermore need to walk to far distance which more trouble than bend body to get power from power strips or outlets (3) No any light source to offer indicator light or any illumination (4) the music player (80) it does not supply the power to other device which is different with current invention is music device has built-in circuit and transfer input current to DC 5Volt to charge the other electric device. So, this is not same as current invention for desktop definition and people will stay for a while to charge the other device.

25. U.S. Pat. No. 8,899,797

'797 has USB port install on the movable (Movable parts & accessories or Organizer, Or Addable parts & Accessories).

(may add the USB-unit or USB-Module or Outlet-unit or Outlet-Module on the MOVEABLE or ADDED parts of Desk lamp).

The '797 who is filed on Aug. 26, 2012 after Co-inventor's U.S. Pat. No. 8,783,936 (#GGG-2011) Public on Dec. 15, 2011. and '797 patent has one prior filed and abandonment as below because it adaptor the phone's custom-pin plug to connect with phone female custom-pin end to build the electric and audio signal delivery, so this is not like the current invention has all USB-port which is female USB receiving ends on the desktop item and though the male-plug kits to of USB wire which has male-plug ends on 2 ends and one end connect with Desktop female USB port and other male plug end inert into the be-Charged device.

26. US Prior art 2006-020-9530 SCHAAK as below:

11-1. '530 has bulb-socket so it is not the Built-in LED lamp. This maximum can add LED bulb Lamp device.
Fact: Column (0005) Line 10
A terminal housing is disposed relative to the neck second portion, a bulb socket including a seat portion is attached to the terminal housing, and a shell portion of the terminal housing is shaped to receive the base of a light bulb.

11-2. '530 The Transformer and Bulb-socket in parallel connection. So, the light source is getting 120Volt current which is not built-in LED lamp device
Fact: Column (0006)
The lamp support may also house a transformer electrically coupled to the power cord in parallel to the bulb socket.

11-3. '530, The $2^{nd}$ socket on the edge of the support or base is Custom Pin-Out, not regular USB-Port so only can charge 1 model of phone as Contact (44) both all for Customer Pin-Out design. This is limited for one and ONLY ONE item can be charged!!

FACT;

[0007] Alternatively, the lamp may include a second socket disposed on the support, the socket having a first end directed internally of the support and coupled to the speaker and a second end positioned externally on the support for connecting to a media device compatible cable.

11-4. '530, No any wire from charging contact (44) or outside socket (50) needed while charging the phone. Because the contact (44) or Outside socket (50) both is custom pin-out construction and the phone just directly plug into this Custom Pin-Out can directly charger . . . . This is only limited one and ONLY ONE phone can be charged. Not like current invention use common USB-Female-receiving end and Charging wire's USB insert male-plug to deliver the current and the though charging wire's other ends to connect with the electric or digital device.

The audio output cable (17) though Round Plug (17a) to transmit the data to speaker (15) (15a), Audio Output cable (17) one end to Music media device (100) and another end to Speaker (15a) (15b)

FACT;

[0019] As illustrated in FIGS. 1 and 2, an audio output cable 17 is electrically connected via a plug 1711 at one end to each of speakers 15a and 15b. As illustrated in FIGS. 2 and 4, the other end of audio cable 17 may be fed through an orifice 19 in support 12 and be operable to connect, for example, to the headset jack or other audio output terminal of media player 100 as indicated. Alternatively, as illustrated in FIGS. 1 and 3, the orifice 19 may house a connector (not shown) for plug connecting to a plug 17b of output cable 17

11-5. '530, do not has built-in LED light source, only can install the LED bulb at the bulb-base. Not like the co-inventor's (3) issued patents or co-pending case has LED built-in as light source, No Bulb-Base at all.

FACT;

(0021) line 10 The light source 24 (e.g. incandescent bulb, halogen lamp, Fluorescent bulb, or one or more LEDs) is mounted in the bulb socket 20 and positioned in a plurality of positions relative to the support 12 by arrangement of the Flexible neck 14.

11-6. '530, The contact (44) is Custom Pin-Out type which only can charge one and ONLY one model of the phone. Also, the Recess Slot which also become Big limited to fit one and ONLY one phone.

FATC;

(0025) As illustrated in FIG. 2, the recess 42 is provided on the top surface of the support 12 for receiving the media player 100. A plurality of contacts 44 are formed at the base or on a Wall of the recess 42.

11-7. '530, only can charge one and ONLY ONE phone because (A) Recess (42) size is fixed (B) The contact (44) need align precisely to the phone contact so can charge one and Only One. Not like Ivan the charging port is common USB-Port!!

FACT;

(0026) Recess 42 is shaped to snugly receive a lower portion of media device 100 to align or Mattingly couple electrical contacts 46 on the media device 100 with contacts 44 of support 12, and thereby act as a socket for media device 100. Contact between contacts 44 of support 12 and contacts on media device 100 (not shown) for example may permit a rechargeable battery housed Wholly Within media device 100 to charge. Contacts 44 and media device 100 contacts are adapted to Mattingly couple with each other so that DC voltage can be supplied to the rechargeable battery of media device 100 for charging through the coupled contacts 44 and media device 100 contacts. In addition, if the media player 100 includes audio output contacts in proximity to the charging contacts, ones of coupled contacts 44 may be connected to speakers 15a and 15b via an internal cable (not shown) as an alternative to audio output cable 17.

11-8. '530, The LEE unit only can charge one and ONLY One phone and the charge contact all is Custom Pin-Out type. The current invention's items have USB-Port which can work with any USB-Port charging wires to connect with the Other electric device and digital device.

FACT;

[0027] In accordance with an alternative arrangement of the present invention and with reference to FIG. 4, a charging circuit is excluded from lighting apparatus 10, and contacts 44 are electrically connected to a socket 50 dis posed on an exterior surface of support 12. Connection between contacts 44 and socket 50 are provided through internally disposed cable 51.

11-9. '530 use custom Pin-Out construction on the contact (44) and Outer socket (50) which same as LEE Example iPod© wires for custom pin-out so can fit and charge one and only One phone . . . . Not like the other end on the computer as USB-port which Ivan patent claimed.

FACT;

(0027) Line 2 Socket 50 is adapted to inter face with the charging and/or data cable associated with media player 100. For example, an iPod media player sold by Apple Inc. typically employs a cable to connect the iPod to a computer via the computer's USB port. This cable has a custom pinout on one end which connects to the iPod device and a USB connection on the other end Which mates With the USB port on a computer.

11-10. '530 device can transmit BOTH DATA and CHARGING. This is not happening at current invention item because current invention's item only has the CHARGING FUNCTION. This is not same on basic CHARGING of CHARGER DEVICE!! So, this is totally different with Ivan's CHARGER patent.

Fact; [0027] Line14 to 19 The cable allows both transmission of data between the computer and the iPod and charging of the iPod's internal battery through the USB port on the computer.

11-11. '530 device cable is associated audio media device & get power from the inner charging-circuit and get power from CUSTOM PIN-OUT contact (44) or Outer socket (50), This is totally different with Ivan's can charge and ONLY CHARGE many different electric or digital device. Not one and ONLY one as LEE claimed and details description for AUDIO MEDIA DEVICE (100).

FACT'; [0027] Line 2 Socket 50 is adapted to inter face with the charging and/or data cable associated with media player 100.

Also, US (2006-020-9530) SCHAAK for contact (44) and Outer socket (50) has below text;

The said USB receiving end (USB port) is one end of USB-Charging cable which same as all laptop computer USB receiving end, not USB custom pin-out, not USB mini, Not USB compact, Not USB other name which is the other end of the said USB-Charging cable which only fit for limited number of the electric or digital device.

27. US abandonment public prior art US 2009-0067-161
    '161, The Foldable mirror set is not Desktop installation. That is travel unit not let people to install on desktop surface always.

The Power from the Computer and which is not quickly charger and has very limited current less than 500 ma not like current invention has minimum 1.0 Amp up to 5 Amp for definition of the USB Charging-Ports release on 2007 and update on 2010.

Also, the computer USB is not charger into the Foldable mirror into foldable mirrors' internal rechargeable battery. The Computer is SUPPLY the current to the foldable mirror while the USB Male plug into the computer ports and has power. Not charging into rechargeable battery and storage inside the rechargeable ready to use.

The foldable mirror had no any internal transformer to change incoming AC current to DC current.

The foldable mirror had no outside transformer get power from outlet AC power source.

So, this prior art is nothing to do with current invention.

SO, From Above (12) $3^{rd}$ lot US prior arts points different with '530 (2006-029-530), The current invention any issued or co-pending filing no any same or similar with '530. Furthermore, the '530 on 2006 is no charging capability over 1.0 Amp as wiki report shown all the history and data so the charring capability and Not allowed the Digital or electric data to delivery on old date 2006, so that is not like current invention for quickly charge USB Charging-Port as above discussion and wiki data!

28. US Prior Art US 2010/0296298 Martin, J R. U.S. Ser. No. 12/761,514 Filed on Apr. 16, 2010
    The '298 teach one Rea-Beveled Mirror (12a) of Rear-Beveled cut edge (12) of FIG. 4 and FIG. 5 or the Rear-Beveled Mirror (14a) of mirror (14) of FIG. 7 shown the special made mirror which is out-of-date mirror design.

Further, from FIG. 7 and FIG. 8 shown the light-strip (14) and LED light source (14-2) which is light strips (14) to fit within the beveled-edge (12a) which is out-of-date because update LED arrangement is dice or chip for Surface mounted on rigid-piece printed-circuit-board and which is just inward to emit light to the curved magnify-mirror to let the curved-mirror-surface work as reflector to emit all light to front which is diffusion light effect emit out to form plurality of the parallel light-beam so not dark and bright area on be-lighted object. The current invention cosmetic mirror is one of magnify have N-time magnify for vanity mirror or cosmetic mirror. Not the focus light effects like '298 get focus as FIG. 6 for all '298 concepts and construction and details.

Furthermore, the said current invention for the other side may is N-time magnify which the N-number is 1 (×1 times), the Surround light on the perispher is from the vertical position flexible printed-circuit-board (which is not available on 2010 because the chip-on-board or dice-on-board not available at market because too expensive and too difficult to make reasonable cost for application yet).

From the '298 for beveled edge mirror (12) (14) with the beveled-edge (12a) (14a) to arrange LED light-beam to form focus on front which will cause the center is Big brighter lighted spots and hurt people eyes for '298 design. The current invention apply for cosmetic is for diffusion light-beams to front for plurality of parallel light-beam to make front panel or area for even brightness without the super-bright focus light-beam.

So, the '298 is not same and not right for the optics-design and concept so not same as current invention spirit and construction and optics-theory (diffusion vs. focus).

Furthermore, the current invention mirror device have other construction for (1) magnify the image from 2 to N-time (N is any number) so it will be curved lens (2) The LED(s) is vertically or horizon offer illumination to the said object or mirror surface directly without the troublesome beveled-edge mirror-area(s) which will reflected (18 side walls of the light chamber 46 may include a reflective material to reflect light from the LED light strips 14 through the rea-side bevel 12a) or refracted light beams to make bad light-performance. Also, the (3) '298 need install the J-chamber (20) which is not practical for current invention for installation the mirror with beveled-aged (12a). and (4) the current invention preferred $2^{nd}$ side of LED lighted-mirror with normal non-magnify mirror also illumination so this is not existing for the said '298 for single side mirrors for '298 device.→So this is nothing to do with '298 patent for concept, application, feature, installation, optics-theory, mirror type, optic-focus vs. diffusion, light-beam emit out directly without go through the beveled-ages, two mirrors with rotating features.

29. US 2012-0294015 (SMED) as earlier discussion for all difference.

30. US 2008-0091250 (Powell) therapy LED desk lamp
    '250 POWELL teach a portable DC power source [0012 line 5 to 8] for easily carry to patient room or do therapy.
    '250 power teach a controller (126) which is (0017)
    (Line 2 to 3) line [selecting the operating mode of the desk lamp 140], or
    (line 4 to line 5) [electronic communication with the LED array 108], or
    [line 6 to line] include a display and user to select a broad-spectrum light for general uses such as reading,
    → These are common LED light device from market place and not a patentable on 2007 when the iPhone came out year!
    Powell same as current invention to have this basic LED desk lamp to add powell its features to add
    a. "Therapy treatment light wave light-beam including infra-red, blue, red light beam→ (The current invention for reading or working is not use this light color)
    b. Portable device→ (not same as current invention is non-portable device and big-size or weight bas permanently install on desktop before replacing it).
    c. [Column 1 (0014) Line5] The '250 for brightness is very bright for 1,000 to 2,000 lux→ (This high brightness same as jail-torch light is not use for people reading or working indoor and this brightness will hurt people eyes while long time reading for student, '250 also did not have any anti-glare optic-piece to protect eye, or
    d. [Column 1 (0016) line 6} for 15-30 inch around 1 to 2.5 feet has 450 lux (This is too bright for people reading → (this is not same as current invention for reading or working or accent light which not allow so bright to heart people eyes especially without the anti-glare protection at all.

e. [Column 2 line 10] include a controller 226 which can include a display and user inputs
→ Which means this is not like current invention for simple switch or sensor for lower cost desk lamp.
f. [Column 1 (0011) line 5 to 8] for battery power easily carry to patient room or do therapy.
[Column 2 (0018) line 10] The desk lamp 240 may be powered by an internal or external portable power source such as battery. The battery power source may provide the desk lamp 240 with power such that AC power is not required."
For both embodiment all had the same portable power source is batteries.
→ This is different with current invention for LED and added functions need more power and batteries do not supply this kind of other added function for power consumptions.
g. [Column 2 (0018) line 15] The batteries may be stored within or proximate to the base 242 or within the LED module 246. The LED module 246 may include one or more LEDs 208, like LED array 108 as described previously.→Different with current invention the plurality is not powered by batteries at all.
So→ The said '250 is not same as LED light of the current invention describe for (a) DC battery power source vs. AC plug-wire (b) portable LED light vs. permanent install on desk top (c) LED light beam for infra-red or blue vs. white light beam only (d) controller is variety functions and memory vs. simple switch or sensor (e) therapy treatment LED desktop light vs. reading or working only without therapy function. (f) movable LED light-module with built-in batteries power source and control vs. non-movable LED light source.

Basing on US patent office have much more the LED desktop light including above discussed LED desktop light of SEMD or others still can get US patents basing on (1) basic LED desktop light with ADDED features so can grant US patents as many of prior arts.

[line 7 to line] allow the user to activate desired therapeutic wave-length so light such as red, yellow, blue, green or infra-red wavelengths or a combinations thereof to treat various conditions.
which had a very complicated data-storage 31. US Prior art US 2011=0228449 (KEEBLER et al) Filed on Mar. 18, 2010 Public Sep. 22, 2011
=→ [0026] Regarding FIG. 3, a plurality of direct current powered devices 305, 310, 315 which may be powered by a universal power supply system 100 in accordance with an example embodiment are depicted. In one example a common network router 305 is depicted which receives DC power from the second Plug 300A. in second examples, a multiple media player (i-pod) 310 is depicted which receives DC power from the second plug 300B. In the third examples, a cellular telephone 315 receives DC power from the second plug 300B. In each of these examples, the second plug 300A, 300B, 300C are different in physical dimensions (i.e., device specific) and may operate at different direct current voltages as is shown in FIG. 1 → so '449 teach all be charge item→ Device i-pod or others is not USB female receiving port(s) and the device have different direct current voltage as in shown in FIG. 1.
Also, '449 The said universal power supply system 100, That is lack of
(1) No any USB ports with only 1 output current around 5V+/−20% and min. 1 Amp current up or more Amp.

(2) No any LED light to offer the area illumination for reading or work or accent light Amp current up or more Amp.
(3) Most important offer many different voltage DC currents not like current invention only export the 5Volt+/−20% to charge be-charged products.

32. US 2010-0046249 (Mai) for Diffusion film
'249 Mai teach a film with diffusion and need use plurality of substrates made of different material to get the (light incidence surface) and (light emission surface) for different surface of plurality of layer.→This is too complicated than market available for much better optics-lens to make the narrow LED light beam as back light and make the said light diffusion to even brightness.
From Co-inventor co-pending case (#K) U.S. Ser. No. 11/498,874 which also had the optics-piece (5') (5") for incidence and (5") emission surface and back LED light to get even brightness filed on Aug. 4, 2006 which is CIP of Ser. No. 10/954,189 filed on Oct. 1, 2004. Also, the both (5') and (5") is made by injection resin, Not even need to make plurality of layers of the film.
From current invention (#K) U.S. Ser. No. 11/498,874 has other many US prior art which is easier than the filed date Aug. 4, 2006 including U.S. Pat. No. 2,779,630 Clausen, U.S. Pat. No. 5,964,516 Lai, U.S. Pat. No. 6,669,468 pesu, U.S. Pat. No. 6,709,126 Leen, U.S. Pat. No. 6,846,0098 Bourdelais, U.S. Pat. No. 7,538, 832 Hong, US 2006-0062019 Young, US 2007-0076437 all related for the Optics-piece for make light-beam arrangement.
→ So, Mai teach totally nothing to do with the current invention because current invention will not use this kind of plurality of layer of optic-film etc.

Below is Group 4 (4 US prior arts) individual or combination VS current invention comparison:

33. US Prior Art: 2009-0154-148 Meyer
(3-1) From Current invention [Abstract line 10] stating "The said USB charger only has charging function no any data transmit and only have one input power source not more than one and charging capacity minimum 1.0 Amp up for quickly charge from USB-Charging-ports by 2 male USB-plugs' USB-wire to the device's female USB-ports."
And [0056] last paragraph of current invention publication text stating" Also, all the current invention only accept ONLY ONE input current not allow more than one input current such as normal time is AC power and change to DC power while power fail which will had a lot of controller or additional circuit need to do which may have more risk for fire case happened.
'148 Out-of-date for USB 1.1 which only can get 100 to 500 ma output as Wikipedia USB history, '148 Out-of-date USB-port filed on Jan. 30, 2007 USB-pot (124) get power from transformer which is steady input current from household electricity AC power while have AC power connection. However, While AC power is loss, the USB-port (124) is getting unsteady and unknown DC Voltage current. 4 pcs or rechargeable batteries may be fully charged @ 1.5×4=6Volt DC which will cause be-charged other products inner lithium batteries exposed . . . and 4 pcs secondary rechargeable battery DC Voltage will drop very quickly right after the 4 pcs secondary battery supply power to USB-port (124) from Fully charged @ 1.5V x4=6Volt to 5.5Volt to 5 Volt useless low voltage charging to 4.5 volt, 4.0Volt, 3.6 volt . . . . However, the Be-Charged product inner lithium batteries DC voltage become higher and higher. So, The secondary supply power through USB-ports (124) is too risk for too high-voltage from beginning at @ 1.5×4=6.0Volt until 4 pcs secondary batteries drop from fully charged to @ 1.25V× 4=5.00Volt this is ONLY SAFETY DC voltage from 4 pcs secondary battery to supply current to the USB-port (124). V.S.→Current invention had multiple times on filed text STRONG EMPHASIZE ONLY ONE INPUT DC CURRENT INTO THE USB-PORT(S) as above listed on [Abstract] and Column [0056] for big improvement for WRONG AND RISK for Exposure and Fire Hazard of '148 have unsteady secondary batteries to supply power to USB while AC power loss.

➔ So this is very clear the current invention (USB ports) no like ['148 Meyer] have 2 input power source, One is from (AC-to-DC transformer) while have AC power, one is (secondary battery) while AC power loose!! This is 2 input power sources, so the current invention is totally different for 1. Electric design 2. Concept 3. Construction 4. Application ➔ Hence, ['148 Meyer] is not proper prior art and totally different application, categories compare with current invention.

(3-2) '148 Meyer from FIG. 8 and FIG. 9 can see the Input AC (108) go through (AC/DC adaptor), the current go to USB-Port (124) and also go to lamp model (810) so, the output from AC/DC adaptor is for USB-Charger current that is 5Volt DC and also supply to the Light source, so light source also input is 5Volt. ➔ This means (USB port) and (Light source) both in-put is DC 5Volt.

The current invention the $1^{st}$ DC out from AC-to-DC is not for USB-port that is means is not 5Volt DC. And $1^{st}$ DC have to go through at least one of DC-to-DC or IC or other circuit or switch to get $2^{nd}$ or more DC current and $2^{nd}$ DC is for USB-ports. At least one of $1^{st}$ or more DC current for at least one of IC, switch, light source, and other additional function(s).

So, the '148 have 5Volt DC for USB ports and Light source. VS current invention USB ports is not same as LED light and current invention have $1^{st}$, $2^{nd}$ more DC which only $2^{nd}$ is 5Volt DC rest for light source(s) is not 5Volt DC. Also, current invention has at least one DC-to-DC, IC, Other circuit, other backup battery to supply different DC current for many other functions.

'148 is similar with other US prior art (SMED), The USB port and light source both is same DC current basing on the (SMED) text as below:

[column 3 line 50] USB Module (30) have USB-port (30a)→So the USB-Ports is not built-in housing of Desk top item or Time Piece or Desk lamp.

[Column 3 line 51] Both USB module (30) and outlet module (5) support in cover (31)=→Prove again, The Module are separated with the housing of the Desk Top item or time piece or desk lamp.

[Column 3 line 56] Both USB module (30) and outlet module 95) are electrically connected to the PCB 32→Prove again is separated unit(s)

Also, The USB Transformer (33) and Outlet Transformer (34), these have 2 transformers for PCB→this is not acceptable for current invention.

Also, The SMED inside the Base has Both (USB Module==AC operated) and (Outlet Module=AC operated) inside the (Base)=→current invention item has no any AC operated inside the Housing!!

Also, SMED (USB transformer) is only can do ONE OF;
[column 3 line 58]→Supply power to Lamp 15V 2 Amp or Alternative
[Column 3 line 64]→As FIG. 3 Only supply power to USB (30)
or
[Column 4 line 1]=→(USB transformer) supply accepted voltage to Lamp and it ALSO supply to the USB.

Above SMED concept is supported by same concept [Column 3 line 39]→USB Transformer export power to lamp . . . . ALSO supply same current to USB-PORT!!
→This means (Lamp and USB-port same voltage) as everyone know USB need is 5 Volt, so this means the lamp also is 5 Volt.
(3-3): '148 show the USB port 124, Par. 0062 and FIG. 8 USB-port 124 and USB port 124 for charging, parts 0063 ➔ '148 both FIG. 8 and FIG. 9 show the USB-port 124 is get power from the AC-to-DC transformer. However, this is conflict AC-to-DC transformer also supply the DC current to secondary to charge the (4 rechargeable battery).

This means to supply DC current to USB-port (124) need to be DC 5.0Volt and do not too low or do not charge other external device(s). So the AC-to-DC transformer export current will be 5.0Volt DC for USB-port (124).

Same time the AC-to-DC output 5 Volt DC to charge the secondary batteries 4 battery and each rechargeable battery voltage for low level is 0.9-1.0 Volt empty and fully charged is around 1.30-1.35 Volt. Because the AC-to-DC is continuously to charge the 4 battery so total voltage will be 1.35×4=5.4Volt. The '148 said while AC loose, the secondary supply power to USB-port (124). This means the USB-port will have super high voltage to charge other be-charged products so will cause the be-charged products such as i-phone or i-pad to be exposure or fire-hazard.

This is First 1 point for '148 is not practically.
s
3-4; '148 USB Port while AC loss➔ The output from secondary battery set will be over 5.34 volt is one of non-workable for all market safety standard and never can get UL or ETL approval, so do not sell at market place.
3-5: '148 apply the USA patent on Jan. 30, 2007 and at that time no any USB port been official issues and Jan. 30, 2007 maximum for USB-port export current for 500 ma as current invention attached the Wikipedia [USB Charging port" Definition is release on 2007 and DCP (Dedicated charging port) (DCP) w/o data supported and only can do for 500 ma at 5Volt➔ VS compare with current invention specified the USB charging-port basing update 2010 definition can get min. up to 1.0 Amp to 5 Amp. This is basing on the USB-port definition and development history. So '148 filed patent on Jan. 30, 2007 is not even have (Definition for USB Charging port especially for DCP model) and also 2007 do not have any USB 3.0 for have bigger charging capacity up to 1.5 A to 5 Amp.
➔ This is clear on the current invention claim for update technical.
3-6: '148 only show the USB port on drawing and FIG. 8 and FIG. 9 do not have any word to export any current. Further, 148 secondary battery preferred is AA, CC, DD for 4 pcs to get fully charged is @ 1.35Volt×

4=5.4Volt which is too high to cause the be-charged products inside battery super high temperature and cause exposure and get fire harzard is one that no test lab allow to get safety certification. Because AC-to-DC circuit continue charge while AC power existing.

3-7: Further '148 also teach while AC loose, the Secondary batteries will supply power to USB port (124). The total capacity of the secondary 4 pcs AA battery or DD battery which is not sufficient current to supply 1.5 A to 5 Amp to be-charged items. For 2 reason.

(3-7-1) In 2007, only have super lower export current 500 ma to charge so it will take forever to charge i-phone or i-pad.

(3-7-2) rechargeable battery for each size such as AA battery only less than 1 Amp and '148 while power fail needs to supply power to LED light source (106) and also the USB port (124). This may only several minutes to supply power so this is not practical and not a functions people needed.

3-8: '148 USB port is directly getting power from AC-to-DC current and input to the USB port (124). This is not same as current invention.

V.S. The current invention gets AC-to-DC circuit $1^{st}$ DC current and $1^{st}$ DC current go through at least one DC-to-DC circuit to change to $2^{nd}$ or more different voltage DC current so can supply to (1) USB port exemplary for 5.0Volt,
(2) LED light source maybe for 12Volt 2 Amp current,
(3) desktop existing or additional functions including at least one of
  (3-1) airflow which created by motor+fan+Air-flow channel which may need 6Volt DC,
  (3-2) IC maybe is 3.5 Volt DC
  (3-3) blue tooth audio circuit is 6Volt
  (3-4) Time/alarm clock/weather station normal time is 12➔ Change to 3Volt DC and
    while power fail work with backup separated 3Volt Lithium or 2 pcs of LR44 or
    1154 botton backup battery.

So, the circuit of '148 for USB port (124) and LED light source (106) both is used the same current out of the (AC-to-DC) circuit is not practically.
because LEDs for sufficient brightness for reading for normal reading light need is 400 Lumens and power needed for get this bright for 12Volt DC for less Amp.

3-9:

From '148 FIG. 8 and FIG. 9 show the input the LED light source current still same as USB-pot (124) DC 5 Volt, then, this need Super Big current on DC 5Volt (this means 2.4 times bigger current needed) for supply power to the '148 light source for normal time . . . .

For AC loss, the 4 rechargeable battery (rechargeable battery current capacity is around only 40-60% less power of Alkaline battery). Voltage for fully charged is @ 1.35 (Standard is 1.2Volt). So 5Volt DC to supply the LED light source for need over 5 Amps which means the (4 pcs batteries rechargeable) is no way can supply LED (106) and at the same time supply to the current to USB-port (124).

VS. Current invention➔

The current out of (AC-to-DC transformer) have to incorporate with at least one or more than one (DC-to-DC circuit) to create different voltage to supply many different function ➔ At least one LED light source(s) which need 400 Lumens after passing through the front cover or lens ! !

Or like the current invention one of alternative circuit system different with '148 is $1^{st}$ DC current out of built-in or external (AC-to-DC transformer) is supply to LED light source which may is 12Volt DC (Most low cost because 12Volt is most common use for transformer than output 5Volt). Then, the 12Volt $1^{st}$ DC go through the at least one of Built-in (DC-to-DC) to change $1^{st}$ DC input LED light to change $1^{st}$ DC to $2^{nd}$ or more different voltage $2^{nd}$ or $3^{rd}$ or $4^{th}$ DC current(s) to supply maybe 3Volt, 3.5Volt, 6 Volt, 12Volt to built-in additional function(s) . . . . Also, have one for DC 5Volt to supply to the said USB-Charging ports have minimum 1.0 Amp to 5.0 Amp (USB charging definition announced on 2010) with different specification for inner construction or (USB Charging port) . . . . This is not existing on Jan. 30, 2007.

3-10:

Basing on Patent law. The '148 apply is out-of-date USB-port which only have 500 ma export current VS current invention filed on 2011 which has the minimum 1.0 to 5 Amp export current basing on new specification.

Basing on above USB port history and non-practically for '148 disclosure and current invention need at least one or more than one (DC-to-DC circuit) to make right arrangement to get right DC Voltage for each different functions including (USB port) (LED light source) (other additional DC operated functions).

34. U.S. Prior 2011-008-4660 filed on Mar. 11, 2010 MCSWEVN '660 shown the wall charger with removable charger parent filed case 61/249,933 filed on Oct. 8, 2009 which is later than Co-inventor U.S. application Ser. No. 11/806,285 filed on May 31, 2007 which is CIP of U.S. application Ser. No. 10/883,747 filed on Jul. 6, 2004.

The co-inventor '285 is for Plug-in wall outlet LED light have conductive piece to supply power. Which has its filing history as below:

(#R-2007) U.S. Ser. No. 11/806,285, and (Inventor's #R) filed on May 31, 2007 which also a multiple functions LED light device which are the continuously filing of the (#B-2005) U.S. Pat. No. 7,318,652 for multiple functions Wall Cover filed on Mar. 31, 2005. The current invention is continuously filing of One of Child case (#R-1) US application Ser. No. 14/739, 397 filed on Jun. 15, 2015 allowanced on Nov. 21, 2018 and issued on Jan. 22, 2018 for claims 1-8 and 10-12.

The (#R-1) '397 parent filed case is Ser. No. 11/806,285 filed on May 31, 2007.

The claims 1-8 and 10-12 had all the '660 description for USB ports (1) cigarette plug has 12 Volt DC input from AC-to-DC circuit and cigarette plug have one other DC-to-DC circuit to change from 12V DC to 5Volt DC to supply USB charge port needed 5V DC.

(2) The wall plug-in AC-to-DC circuit directly to supply 5Volt DC to $2^{nd}$ USB charge ports to
supply 5Volt DC to charge other products.

V.S. Both (1) and (2) USB still fall within the Co-inventor earlier filed case (397) and its parent filed case '285 filed on May 31, 2007 claim and scope.

So, '660 US prior art is not proper for current invention!

35. U.S. Prior. U.S. Pat. No. 8,545,039 PATEL=filed on May 18, 2010 and parent filed on Apr. 20, 2007 '039 shown the Bulb lamp base with cigarette plug unit to get the lamp base built-in AC-to- DC current at 12Volt or 24 volt DC current and
the said cigarette plug unit has built-in other DC-to-DC circuit to change from 12 or 24Volt DC current to USB charge ports needed 5 Volt DC to allow charge other products. The movable cigarette plug unit mainly can use for car working voltage 12Volt.

From '039 same as the [Meyer USB port] Even the '039 filed date on May 18, 2010 still use the USB 1.0 or USB. 2.0 have 5Volt 100 ma up to high power USB port still 500 ma. This is cross reference [Meyer USB port] maximum is 500 ma by cross reference '039 filed on May 18, 2010 and the Meyer USB port filed on Jan. 30, 2007 at those Old days. Meyer USB ports is out of date item and only can supply 500 ma for high output USB. → '039 Column 3 line 11 to line 19!

From '039 show the bulb lamp at column 6 line 26 to 36 shown the illumination element (50)

is 110 to 120 VAC with 10-20 amp is one of incandescent bulb.

It also can prove from the FIG. 3 shown the plug (56) and wire (54) get the into the lamp base at (58) and inner wire (60) directly to the top illumination element (50) to confirm the illumination element (50) is AC powered incandescent bulb which is not same as current invention LED area and/or indicator light illumination. So, the circuit compare with current invention for LED light source is totally different.

Further, the current invention the said AC-to-DC and at least one of DC-to-DC circuit all are installed within the desktop items or desktop power station. Not like '039 one of the DC-to- DC is built-in cigarette plug. Not inside the desk top lamp base.

More important this kind of LED

So, '039 is totally different with current invention.

36. Combination or ['148 Meyer] and ['660 McSweyn] ['039 Patel]

(6-1) One important comparison can prove {'148 Meyer=Filed on Jan. 30, 2007 USB port have high power export between USB 1.0 and USB 2.0 for 100 ma at lower type and maximum is 500 ma at high output model}

→ From '039 same as the [Meyer USB port] Even the '039 filed date on May 18, 2010 still use the USB 1.0 or USB. 2.0 have 5Volt 100 ma up to high power USB port still 500 ma. This is cross reference [Meyer USB port maximum is 500 ma by cross reference '039 filed on May 18, 2010 and the Meyer USB port filed on Jan. 30, 2007 at those Old days. Meyer USB ports is out of date item and only can supply 500 ma for high output USB. → '039 Column 3 line 11 to line 19!

(6-2) Combine the ['148 Meyer] and ['660 McSweyn] and ['039 PATEL]

'148 Meyer FIG. 8 and FIG. 9 show the out-of-date USB1.0 or USB 2.0 which has the lower output is 100 ma or have high-output 500 ma. This is what the Current invention liste d the details of [Wikipedia inside text] Including the official definition for [USB Charging port] definition announced on 2007 for max. have 500 ma output.

(6-3) '660 MCSWEYN is later filed date than Co-inventor's Pending case (Filed on 2007 and still pending for LED light with built-in conductive piece to supply power to other products).

'660 MCSWEYN is later filed than current inventor for Wall plug-in Device which can trace patent filed case back to 2004 as forgoing depicts.

(6-4) Further From ['039 Patel] Further detail discuss the (Column 2 line 19 to line 32) to discuss very details "In more recent years, many different type and voltage of batteries have been developed and adopted by manufactures. For Example, Nickel metal hydride (Ni Metal Hydride) cell has a nominal voltage of 1.2 Volt, and through at full high charge they may be as high as 1.5Volt (So prove above discussion for '148 is not working and not a safety item! Basing on Meyer's 4 pcs rechargeable battery will get full charge @ 1.5× 4=6.0Volt, which supply to Meyer's USB-Port (124) will caused i-phone or i-pad inner battery exposure at once. Because USB-Charging-port have to be around 5.0Volt export).

(6-5) Further ['039 patel Column 2 line 25 to 29] detail the be-charged products inside Lithium ion (Li+) batteries that typically are chargeable to about 4.1 to 4.2 Volt for single cells and lithium polymer (li-Poly) battery typically are chargeable to about 4.3 to 4.4 Volt range . . . . (So, prove again '148 rechargeable batteries @ 1.5V×4=6.0Volt DC to charge the (Li+) or (Li-Poly) will cause the Both Lithium battery exposure at once because too high voltage.

(6-6) So, Combine the 3 prior art compare with current inventor earlier filed case for Wall mounted light with conductive-piece to supply power to other device shown the current inventor DO NOT COMBINE these 3 US prior arts. It should said the current 2 Prior arts {'039 PATEL} and {'660 McSWEN} combine current inventor's 130 earlier filed case to file US patents.

(6-7) Re '148 USB port (124) and secondary battery and LED light source (106) is not reasonable for FIG. 8 and FIG. 9 and FIG. 1A, 1B combination for USB-Ports (124) will cause the be-charged item inner rechargeable batteries exposure basing on the above ['039 PATEL] double confirm the [Wiki Pedia definition of USB-Charging port on 2007 and official definition "DCP" USB 3.0 on 2010] so can prove the ['148 USB port (124)] is out-of-date and '148 FIG. 8 and FIG. 9 have fire hazard so it is wrong to arrange into '148 system . . . . Further, '148 did not teach any details except only one words USB-Port (124) lack, of any description except on FIG. 8 and FIG. 9 show USB-Port (124).

(6-8) From Current invention [Abstract line 10] stating "The said USB charger only has charging function no any data transmit and only have one input power source not more than one and charging capacity minimum 1.0 Amp up for quickly charge from USB-Charging-ports by 2 male USB-plugs' USB-wire to the device's female USB-ports."

And [0056] last paragraph of current invention publication text stating" Also, all the current invention only accept ONLY ONE input current not allow more than one input current such as normal time is AC power and change to DC power while power fail which will had a lot of controller or additional circuit need to do which may have more risk for fire case happened.

→ So this is very clear the current invention (USB ports) no like ['148 Meyer] have 2 input power source, One is from (AC-to-DC transformer) while have AC power, one is (secondary battery) while AC power loose!! This is 2 input power sources, so the current invention is totally different for 1. Electric design 2. Concept 3. Construction 4. application→ Hence, ['148 Meyer] is not proper prior art and totally different application, categories compare with current invention.

(6-9) Even, ['148 MEYER USB port 124] is workable. The current invention also make Alternative circuit to change for circuit design to make big difference as below:

AC power source into Built-in or external outside transformer AC-to-DC circuit to get $1^{st}$ DC and this 1" DC different with USB-charging port needed 5.0V Minimum 1.0 to 5 Amp current to supply LED light source. And At least one of built-in DC-to-DC circuit(s) to change input $1^{st}$ DC current to $2^{nd}$ and more DC current to supply o distribute at least one of USB-ports, others DC operated additional function(s).

Even, keep the same or revised claim

AC power source into built-in or external outside transformer AC-to-DC circuit to get $1^{st}$ DC which is 5.0Volt minimum have 1.0 A to 5 Amp export DC current to charge other be-charged device(s). And, At least one of built-on DC-to-DC circuit to change the said built-in $1^{st}$ DC current to $2^{nd}$ or more DC current(s) to supply or distribute to at least one of LED light source and other optional DC operated addition DC-operated functions.

To overcome the ['148 Meyer] Only one transformer AC-to-DC circuit to get only one DC current have to be 5.0Volt DC to supply following dangerously desk lamp:

(a) charge 4 pcs secondary rechargeable battery (4 pcs lower-level voltage @1.0Volt×4=4.0Volt be charged but full-charged will be @ 1.5V×4=6.0Volt to supply to USB-Port while AC lose to charge be-charge other products to cause exposure!)+

(b) supply to USB charging port (5Volt DC) but while AC lost input will be 6.0Volt to charge other be-charged items to cause exposure or fire hazard+

(c) also supply to LED light source (5Volt DC to LEDs for 400 Lumens, 4 pcs battery is not enough power for this kind of 400 Lumens brightness after went through front lens).

37. U.S. Prior. U.S. Pat. No. 8,545,039 PATEL=filed on May 18, 2010 and parent filed on Apr. 20, 2007 '039 shown the Bulb lamp base with cigarette plug unit to get the lamp base built-in AC-to-DC current at 12Volt or 24 volt DC current and the said cigarette plug unit has built-in other DC-to-DC circuit to change from 12 or 24Volt DC current to USB charge ports needed 5 Volt DC to allow charge other products. The movable cigarette plug unit mainly can use for car working voltage 12Volt.

PATEL ''642 column [0029] line "which plug 56 might be inserted, in automobiles manufactured in the US, and in most vehicles maker throughout the world, the standard auto voltage is 12Volt DC. Thus, it is useful for conversion circuit to convert 115 VAC into 12V DC . . . .

→ This is evidence, why '039 want to use the cigarette-unit because want to use for not only for the Bulb lamp-base but also movable plug-unit MAINLY CAN USE FOR CAR WORKING VOLTAGE 12VOLT.

→ This is not only for function, application concept different but also it is double cost and labor to make a desk top item or desk top lamp.

Conclusion→ This is different concept, construction, idea, application, cost, design with current invention.

From '039 show the bulb lamp at {Public '642 column [0029] line 13 to line 14} or [issued '039 patent column 6 line 26 to 36] shown the illumination element (50) is 110 to 120 VAC with 10-20 amp is one of incandescent bulb.

→ This means the PATEL '039 illumination need wattage is 1,100 Watt to 2,400 watt which is too big power consumption VS current invention.

→ The current invention the biggest power-consumption is USB-Charge which is 4.5-5.5 Volt DC and current between 1.0-10 Amp which 4.5 to 55 Watt, so the current invention illumination power consumption is less than USB charging-circuit. So this is big difference for application, power consumption design, energy needed. The '039

→ It also can prove from the FIG. 3 shown the plug (56) and wire (54) get the into the lamp base at (58) and inner wire (60) directly to the top illumination element (50) to confirm the illumination element (50) is AC powered incandescent bulb which is not same as current invention Energy Saving AC powered light-source area and/or indicator light illumination. So, the circuit compare with current invention for LED light source is totally different.

→ Further, the current invention the said AC-to-DC and at least one of DC-to-DC circuit all are installed within the desktop items or desktop power station. Not like '039 or '064 one of the DC-to-DC is built-in cigarette plug. Not inside the desk top lamp base. So, '064 or '039 is totally different with current invention.

38. US Prior Art: 2010/003-9792 & 2009-015-4148 Meyer (3-4) From Current invention "The said USB charger only has charging function no any data transmit and only have one input power source not more than one input DC voltage for USB and light-source, and charging capacity minimum 1.0 Amp up for quickly charge from USB-Charging-ports by 2 male USB-plugs' USB-wire to the device's female USB-ports."→ This is a battery power light device.

→ And 2016-009-1196 [0164] of current invention publication text stating" Also, all the current invention only accepts ONLY ONE input current not allow more than one input current such as normal time is AC power and change to DC power while power fail which will have a lot of controller or additional circuit.

→Current invention had multiple times on filed text STRONG EMPHASIZE ONLY ONE INPUT DC CURRENT INTO THE Desk lamp and only one DC to light source as above listed on Column [0164] for difference with MEYER's '792 concept for backup batteries to supply illumination while AC power lost to supply power to USB while AC power loss.

→ So this is very clear the current invention (USB ports) no like ['148 Meyer] have 2 input power source for illumination, One is from (AC-to-DC transformer) while have AC power, one is (secondary battery) while AC power lost!! This is 2 input power sources, so the current invention is totally different for 1. Electric design 2. Concept 3. Construction 4. Applications.→ Hence, ['148 Meyer] is not proper prior art and totally different application, categories compare with current invention.

(3-5) '148 Meyer from FIG. 8 and FIG. 9 can see the Input AC (108) go through (AC/DC adaptor), the current go to USB-Port (124) and also go to lamp model (810) so, the output from AC/DC adaptor is for USB-Charger current that is 5Volt DC and also supply to the Light source, so light source also input is 5Volt.→ This means (USB port) and (Light source) both inputs are DC 5Volt.

→ The current invention the $1^{st}$ DC out from AC-to-DC is not for USB-port that is means is not 5Volt DC. And $1^{st}$ DC have to go through at least one of DC-to-DC or IC or other circuit or switch to get $2^{nd}$ or more DC current and $2^{nd}$ DC is for USB-ports. At least one of $1^{st}$ or more DC current for at least one of IC, switch, light source, and other additional function(s).
➔ So, the '148 have 5Volt DC for USB ports and Light source. VS current invention USB ports is not same as LED light and current invention have $1^{st}$, $2^{nd}$, more DC which only $2^{nd}$ is 5Volt DC rest for light source(s) is not 5Volt DC. Also, current invention has at least one DC-to-DC, IC, Other circuit, other backup battery to supply different DC current for many other functions.

39. US Prior art 2006-020-9530 SCHAAK 11-1. '530 has bulb-socket so the light source is getting 120Volt current without the Built-in C-to-DC circuit for LED bulb.

Fact:

[Abstract] Line 6 to line 9➔

A bulb socket is attached to the terminal housing to the support, a bulb socket is attached to the terminal housing to receive a light bulb. A power cord electrically couples the bulb socket to a battery compartment or to an electric plug.
➔ So, the bulb is direct work with the AC power source without any circuit inside or outside the light source unit. This is different with current invention has at least one circuit to get light-source operating current.

Column (0005) Line 10

A terminal housing is disposed relative to the neck second portion, a bulb socket including a seat portion is attached to the terminal housing, and a shell portion of the terminal housing is shaped to receive the base of a light bulb.
➔ So, the bulb is direct work with the AC power source without any circuit inside or outside the light source unit. This is different with current invention has at least one circuit to get light-source operating current.

11-2. '530 column [0024] line 2 to line ➔ The Transformer and bulb-socket in parallel connection. But light source (24) is incandescent-bulb which need get AC 120Volt current, so '530 without the built-in AC-to-DC circuit for energy saving LED bulb or '530 is not built-in LED light-source lamp device Fact:

Column (0006)

The lamp support may also house a transformer electrically coupled to the power cord in parallel to the bulb socket.

11-3. '530, The $2^{nd}$ socket on the edge of the support or base is Custom Pin-Out, not regular USB-Port so only can charge 1 model of phone as Contact (44) both all for Customer Pin-Out design. This is limited for one and ONLY ONE item can be charged!!

Fact:

[0007] Alternatively, the lamp may include a second socket disposed on the support, the socket having a first end directed internally of the support and coupled to the speaker and a second end positioned externally on the support for connecting to a media device compatible cable.

FACT;

The '530 column [0007] line 1 to line 5➔ $2^{nd}$ socket disposed on the support, the socket one end is connected with speaker and other end is connect to a media device compatible cable.
➔ So, the second socket is for AUDIO function, Not the charging function.

Fact;

[column 0012] line 1 to line 4 ➔ "By way of overview and introduction, described is a lighting apparatus having a cocking station for charging a media player and a speaker assembly for outputting audio files stored on the media player.

Fact:

From FIGS. 1, 2, 3, 4 show the media player (100) is typical MP3 or MP4. Not same as Apple or other cellar phone after 2007 Apple $1^{st}$ phone shown on the world.
➔ 2006 media player is MP3 or MP4 and before 2010 there is no any apple USB ports for phone device. so, the '530 patent said "media player" is one of MP3 or MP4. Nothing to do with the USB-ports to charging the phone device at 2006 year,
➔ So, this is nothing to do with the phone charging system with USB-ports.

11-4. '530, Column [0025] line 3➔ A plurality of contactors (44) are formed at the base or on a wall of recess (42).

Fact:

Page 3 Column [0025] Line 3, A charging circuit of the circuit board 64 is electrically interconnected to contacts 44, and to the transformer 40 in order to obtain, for example, a DC voltage generated by the charging circuit . . . .

Fact;

Column [0025] Line 9 "This DC voltage may be fed to contact 44 to charge a discharged, rechargeable battery within media device 100 as a detail below"
➔ So, the '530 charging system is charge MP3 or MP4 media-play (100) through a plurality of contactors (44) which is not same as USB-port of USB-unit at all.

Fact;

Column [0027] line 21➔ Accordingly, socket 50 is configured to match the pinout on media player 100 for which recess 42 of lighting apparatus 10 is designed to accept. Thus, in the example above, when socket 50 is configured to match the pinout of an ipod media device, the i-pod is be place in recess and a standard ipod cable is connect between socket 50 and the USB port of a computer.
➔ So, this is just on revised for update USB-charger which the USB-port should be on the desk top items or desk top lamp as current invention. And, connected by USB wire has male-USB-plug insert into desk top item or lamp female USB-port and other USB wire has pinout (or micro-USB male plug) to insert into be charged item.➔ So, The '530 is just make totally different arrangement to charge the Fact:

Column [0025] '530 has special wire (51) connect charging contact (44) and outside socket (50) while charging the media player. Because the contact (44) or Outside socket (50) both is custom pin-out construction and the MP3 or MP4 just directly plug into this Custom Pin-Out can directly charger.
➔ So, This is only limited one and ONLY ONE specified MP3 or MP4 (media player) can be charged. Also, the current invention for charging-port need to be USB-port specification like computer. The '503 socket (50) is custom pinout not like current invention use common USB-Female-receiving socket and Charging wire's USB insert male-plug to deliver the current and the though charging wire's other ends to connect with the electric or digital device.→This basing on 2006 no i-phone, even i-phone have USB-port not 64 pinout need wait till 2010 for i-phone 3. So '503 is just reversed to make socket (50) for custom pinout which is just reversed than current invention.

11-5: The audio output cable (17) though Round Plug (17a) to transmit the data to speaker (15) (15a), Audio Output cable (17) one end to Music media device (100) and another end to Speaker (15a) (15b)

FACT;

[0019] As illustrated in FIGS. 1 and 2, an audio output cable 17 is electrically connected via a plug 1711 at one end to each of speakers 15a and 15b. As illustrated in FIGS. 2 and 4, the other end of audio cable 17 may be fed through an orifice 19 in support 12 and be operable to connect, for example, to the headset jack or other audio output terminal of media player 100 as indicated. Alternatively, as illustrated in FIGS. 1 and 3, the orifice 19 may house a connector (not shown) for plug connecting to a plug 17b of output cable 17

11-6. '530, do not has built-in LED light source, only can install the LED bulb at the bulb-base. Not like the co-inventor's (3) issued patents or co-pending case has LED built-in as light source, No Bulb-Base at all.

FACT;

(0021) line 10 The light source 24 (e.g. incandescent bulb, halogen lamp, Fluorescent bulb, or one or more LEDs) is mounted in the bulb socket 20 and positioned in a plurality of positions relative to the support 12 by arrangement of the Flexible neck 14.

11-7. '530, The contact (44) is Custom Pin-Out type which only can charge one and ONLY one model of the phone. Also, the Recess Slot which also become Big limited to fit one and ONLY one phone.

FATC;

[0025] As illustrated in FIG. 2, the recess 42 is provided on the top surface of the support 12 for receiving the media player 100. A plurality of contacts 44 are formed at the base or on a Wall of the recess 42.

11-8. '530, Only can charge one and ONLY ONE phone because (A) Recess (42) size is fixed (B) The contact (44) need align precisely to the phone contact so can charge one and Only One. Not like Ivan the charging port is common USB-Port!!

FACT;

[0026] Recess 42 is shaped to snugly receive a lower portion of media device 100 to align or Mattingly couple electrical contacts 46 on the media device 100 with contacts 44 of support 12, and thereby act as a socket for media device 100. Contact between contacts 44 of support 12 and contacts on media device 100 (not shown) for example may permit a rechargeable battery housed Wholly Within media device 100 to charge. Contacts 44 and media device 100 contacts are adapted to Mattingly couple with each other so that DC voltage can be supplied to the rechargeable battery of media device 100 for charging through the coupled contacts 44 and media device 100 contacts. In addition, if the media player 100 includes audio output contacts in proximity to the charging contacts, ones of coupled contacts 44 may be connected to speakers 15a and 15b via an internal cable (not shown) as an alternative to audio output cable 17.

11-9. '530, The unit only can charge one and ONLY One phone and the charge contact all is Custom Pin-Out type. The current invention's items have USB-Port which can work with any USB-Port charging wires to connect with the Other electric device and digital device.

FACT;

[0027] In accordance with an alternative arrangement of the present invention and with reference to FIG. 4, a charging circuit is excluded from lighting apparatus 10, and contacts 44 are electrically connected to a socket 50 disposed on an exterior surface of support 12. Connection between contacts 44 and socket 50 are provided through internally disposed cable 51.

11-10. '530 use custom Pin-Out construction on the contact (44) and Outer socket (50) which same as LEE Example i-Pod© wires for custom pin-out so can fit and charge one and only One phone . . . . Not like the other end on the computer as USB-port which Ivan patent claimed.

FACT;

(0027) Line 2 Socket 50 is adapted to inter face with the charging and/or data cable associated with media player 100. For example, an iPod media player sold by Apple Inc. typically employs a cable to connect the i-Pod to a computer via the computer's USB port. This cable has a custom pinout on one end which connects to the iPod device and a USB connection on the other end Which mates With the USB port on a computer.

11-11. '530 device can transmit BOTH DATA and CHARGING. This is not happening at current invention item because current invention's item only has the CHARGING FUNCTION. This is not same on basic CHARGING of CHARGER DEVICE!! So, this is totally different with Ivan's CHARGER patent.

Fact; [0027] Line14 to 19 The cable allows both transmission of data between the computer and the iPod and charging of the iPod's internal battery through the USB port on the computer.

11-12. '530 device cable is associated audio media device & get power from the inner charging-circuit and get power from CUSTOM PIN-OUT contact (44) or Outer socket (50), This is totally different with Ivan's can charge and ONLY CHARGE many different electric or digital device. Not one and ONLY one as LEE claimed and details description for AUDIO MEDIA DEVICE (100).

FACT';

Line 2 Socket 50 is adapted to inter face with the charging and/or data cable associated with media player 100.

Also, US (2006-020-9530) SCHAAK '530 for contact (44) and Outer socket (50) has below text;

The said USB receiving end (USB port) is one end of USB-Charging cable which same as all laptop computer USB receiving end, not USB custom pin-out, not USB mini, Not USB compact, Not USB other name which is the other end of the said USB-Charging cable which only fit for limited number of the electric or digital device 40. For any combination for above SCHAAK '530 and PATEL '642 and MEYER '792 SCHAAK '530

1. SCHAAK '530 fail to explicitly teach: No DC-to-DC circuit to get at least one second DC current(s). Further,
   (1-1) '530 charging socket (50) is same as contact (44) both are the custom pinout to match the MP3 or MP4 configuration, so it is totally reverse with current invention for charging-socket is USB-port which is not same as '530.
   (1-2) Also, '530 be-charged products only for MP3 and MP4 is one of medium player with data delivery and not a phone or communication device.
   (1-3) '530 light source also is not same as current invention for built-in LEDs or replaceable LED-bulb or CFL bulb inside has circuit to change the input AC-power to AC-light-source operating current. Even, '530 has transformer (40) inside which only purpose is to supply DC to the contact (44) charging PCB (64) and nothing to do with the AC-power-light-source which '530 use incandescent bulb, fluorescent tube.
   ➔ So, SCHAAK is nothing to do with the current invention for (1) No USB-port built-in light device (2) '530 is charging MP3 or MP4 with custom pinout configuration different with USB-port(s) Specification (3) be charging products only for the one model of MP3 or MP4 (4) AC light source has nothing circuit or AC-to-DC circuit to change to operating current (5) power consumption for incandescent is over 50-100 Watt which is not same as current invention for LED light-source or energy saving bulb which is less than 10 Watt, so current invention said USB-charging-system have bigger wattage than illumination to make difference for '530.

Examiner claimed (2) Patel '642 had DC-to-DC circuit however, the cigarette-plug is detachable and use for the car cigarette-socket is the main purpose for '642 Patel.

This is not same as the current invention for built-in housing DC-to-DC which is not movable or detachable also can not apply to car cigarette-socket. Patel mainly want to have USB-ports is detachable and moveable to use for traffic equipment which is not same as current invention.

(3) The MEYER '792 teach is (3-1) 2 power for light source while have or lost home electricity, and the light source is powered by the 5Volt DC same as USB-port or powered by 4 pcs rechargeable batteries while lost AC home electricity for power fail desk lamp device.→This is different with current invention for LED light-source or AC-powered light-source both only one power to supply without power fail light functions.

Further, (3-2) the MEYER '792 both USB-port and light-source use the same 5Volt DC power while have AC home electricity by FIGS. 8, 9.➔ This is different with current invention for (3-2-a) $1^{st}$ DC is higher voltage for light-source which is higher than USB 5Volt need current. Or (3-2-b) $1^{st}$ AC is for AC-light-source inside has built-in circuit to change AC 110V to AC-light-source operating current. And light device has AC-to-DC to get USB needed power with or without AC-outlet and at least one on/off switch.

(3-3-c) 1st DC to supply LED and USB both is 5Volt and at least one DC-to-DC circuit To supply the power to others.

These are major difference comparison with current invention.

4. For any combination for above SCHAAK '530 and PATEL '642 and MEYER '792

SCHAAK '530 has no USB-port for desk lamp and use 110V AC light source 50-100 W.

PATEL '642 No USB built-in desk lamp and it is detachable and not built-in the desk top item. Charging only 100-500 ma (0.5 Amp for out-of-date charging)

Column [0004] last paragraph.

and light source is Bulb (110-120V 50-60 amp) Column [0028] last paragraph.

MEYER '792 desk lamp is power fail light device with rechargeable circuit and battery. Has LED light source, But LED light source and USB port is same 5.0Volt DC operated from FIGS. 8, 9.

So, only MEYER '792 has both LED light source and USB-port. All other 2 No (a) Build in USB-port and (b) LED light source basing on 2006 and 2007 those years Super bright LED especially the white color is Not existing at all.

Meyer, lack of any description only said (USB ports) shown on FIGS. 8, 9 and even check FIGS. 8, 9 still different with current invention concept, idea, construction, features. So, Any combination for above 3 Prior arts is not even similar with current invention and it can simple compare by current invention FIGS. 3A, 3B.

41. Other combination and comparison for 12 desk lamp related case(s):

1. {U.S. Pat. No. 6,666,563 Brown} Illumination Device (Apr. 12, 2002 Filed)
2. {U.S. Pat. No. 7,295,608=Reynolds} Desk lamp with therapy LED light (Sep. 26, 2002 filed)
3. {U.S. Pat. No. 7,040,783 CHRISTINSON} Adjustable clamp-on lamp with Ball-head (filed on Apr. 12, 2004)
4. {US 2006,0209-530 SCHAAK} Lamp with personal audio player (Filed Jun. 9, 2006)
5. {'148 Meyer U.S. Pat. No. 7,897,277} Desk lamp with USB-port (124) (Filed on Jan. 30, 2007)
6. {US 2008-009-1250 POWEL} Desk lamp with therapy (Oct. 24, 2007 Filed)
7. {'039 PATEL U.S. Pat. Nos. 7,736,033 8,545,039} Desk lamp with Outlet and USB-Port (Filed May 18, 2010)
8. {U.S. Pat. No. 8,562,187 SMED} Powered base for a lamp (May 18, 2011 Filed)
9. {U.S. Pat. No. 8,783,936 CHIEN} Desk top items with LED has USB unit or USB Module (Filed Jun. 16, 2011) Reference Cited for [U.S. Pat. No. 7,897,277 B2* March 2011 Meyer et. Al 429/100]
10. {U.S. Pat. No. 8,899,797 SCHAAK} Lamp with desk Organizer and electronics stand (Filed on Aug. 6, 2012)
11. {U.S. Pat. No. 9,103,543 MARQUARDT} Lamp tablet docking station (Filed on Jul. 11, 2013) Reference Cited for [20100039-792 B2* February 2010 Meyer et. Al 429/100
12. {U.S. Pat. No. 8,915,608 CHIEN} Desk top item with LED has USB-unit or USB-module (Filed on Dec. 13, 2013)

After ['148 Meyer] US Patent office still issue 7 patents and each have USB-port related items.

From these (7 issued patents) after ['148 Meyer] and even 2 cases had listed

['148 Meryer] are listed on [Reference Cited for Case 9 and Case 11].

This means the ['148 Meyer is not workable item],

And also 7 later filed case have different arrangement so granted the US patents issued.

➔ Basing on the above listed discussion 44 comparison of US and China prior arts. There has none is proper prior art for current invention. Hereafter for more discussion for current invention features.

To make clearer for the current invention has big improvement than all US prior arts which mainly not same categories with current invention as bellow list is $2^{nd}$ times for more detail's comparison for (7) US and China prior arts as below:

1. Daniel Quirky Ember "Portable study lamp with USB port and power outlets, Jan. 28, 2011.

US Quirky device is a portable study lamp with USB port and power outlet

And as the Sep. 15, 2015 Third party page 45 show very clear "Quirky confession the device is "PORTABLE STUDY LAMP and POWER STRAP➔ WANT A LAMP INTEGRATED BOTH OF FUNCTION", and the page 45 show apply the power-strap on wall-outlet and light is hanging on the wall . . . . (This is totally different the definition of current invention for DESK- TOP ITEM, No need dictionary to explain the meaning for "Desktop items" vs. "Portable POWER-STRAP & PORTABLE Study Light".

This is strong-evidence for (Quirky "Quirky confession the device is "PORTABLE STUDY LAMP and POWER STRAP➔ WANT A LAMP INTEGRATED BOTH OF FUNCTION" is not for the permanently installation on desk top items. This is totally different categories for (Portable device) vs. (Current invention for only for permanently desktop items except people not use or replace it.

However, the different for both as below discussion, including:

The current invention is;

l. Non-portable device, and never can put into backpack to carry anywhere often (supported by FIG. 1, 2, 3, 4, 5, 6, 7, 8, 9, 10, 11).

m. Permanently install on desktop which will not move evenly because always put on desktop surface and it is big and heavy and impossible to fit into backpack. (supported by FIG. 1, 2, 3, 4, 5, 6, 7, 8, 9, 10, 11).

n. Has Big size or big base or too heavy stop fall out from desk top surface (supported by FIG. 1, 2, 3, 4, 5, 6, 7, 8, 9, 10, 11).

o. Has the bendable arms which is sealed by plastic or chemical coated to form soft touch surface (Supported by FIG. 11 and FIG. 13 and FIG. 14)

p. Current invention has adjustable arm or bar or rod which has base which is 90 degree install on the LED desktop base (Supported by FIG. 8, 9, 11, 12)

q. The USB port install base wherein the base and base of flexible arms is on vertical or around 90-degree relation and not can changeable angle (Supported by FIG. 8, 9, 11, 12)

r. All USB-port is face outside install on the base contour side wall to prevent water or ash get into the USB-Charging port(s) to make the electric shortage or over-heat because accumulated dust or ash to reduce the electric contact-surface. (Support by FIG. 7, 8, 11, 12 and FIG. 1, 2, 3, 4, 5, 6)

s. Quirkily not use Transformer for outside AC-to-DC power source which is AC-wired because Quirky is one of extension cord and add snake-house arms LED for light. (Supported by FIG. 3➔ 3C) (FIG. 5→5C) (FIG. 9➔ 9c)

t. Quirkily does not have any the added functions such as 1. FIG. 23 Lava light with moving reflector, miniature moving effects, or FIG. 24 project built-in image forming-piece or outside object lighted-image or lighted-patterns or light-beam, or FIG. 25 liquid supplier, or FIG. 26 air-freshener or air-fragrances or moisture functions, or FIG. 27 digital LED clock, or LCD alarm clock offer time, date, weather, sound, 8 switch for adjust, setting, selection for colorful and desired brightness, or FIG. 29 offer Air-flow, lighted patterns, lighted-image or light-beam, or FIG. 28 lighted candy or food supplier or vending machine all have the said LED light-source building to supply area-illumination (Support by Ivan FIG. 22, 24, 25, 26, 27, 28, 29).

u. Added function need different DC working voltage such as super brightness LED Or COB LED (Chip-on-board LED which is same as dice LED have to install on the Pronged circuit board, this is not new, Just Nick-Name of Chip-on-board same as Dice-on-Board—DOB) need to use 6V or higher which is not same as LED light or USB port 3/5Volt. Quirky did not have this kind of other DC-to-DC current to offer other added-function because Quirky do not have other added-functions for extension cord with LED light, No Air-flow, No cosmetic mirror, No Clock or alarm clock, No air-sprayer, No music, No speaker, No project the object or built-in image-forming-unit lighted-patterns or lighted-image or light-beam. The current invention had this. (supported by FIG. 15+16+18 LED matrix, array, circle+FIG. 23, 24, 25, 26, 27, 28, 29 for added-functions into LED light-device and meet the current invention Claim add limitation)

v. The LED light device of one of Desktop items, the said adjustable arm or bar or tube or pole must have longer length which need higher than people waist to shoulder and need width must from base location to people at least one eye this width, so people can use while reading or working. The current invention LED lighting is Big-size or Big-base or heavy unit, so it is not able to move like Quirky extension-cord very light so can put base in any movable location(s) for each time carry out to new place so Quirky just need short arms or bar or tube. The current invention because different concept, construction, application so must be much longer than cross section length of LED Desktop light Cross section! This means the current invention from FIG. 1 to FIG. 6 the arm/bar/pole/tube (Y-axis) or height need close from people waist to shoulder. The (X-axis) or aid width need to from base-location to people eyes position (Normally people will put big and heavy bas away from right or left arms, so the width needs min. have 1 foot or more.→this is not happening on Quirky (Refer to Third-party submission date on Sep. 18, 2015) Page 45 and 46➔ Show it is not for Desktop items, Page 25 shown the light use on the wall outlet and on the bed. Page 46 shown on the Floor.➔ This because quirky is use Power strip as base and add one snake house and put a single LED on top,)

Furthermore, Quirky copy co-inventor earlier filed cases (#BB-2008) U.S. Ser. No. 12/232,035 Filed on Sep. 10, 2008 Public Jan. 9, 2009, now is patent U.S. Pat. No. 7,824,185 issued date Nov. 2, 2010) . . . . As for the LED-unit has Flexible-arms is same as FIG. 6 of PARENT Case of (#AA-2008 Filed May 12, 2008). These 2 (#BB-2008) and (#AA-2008=Mar. 5, 2009 Public=May 12, 2008 Filed) so therefore Quirky did not filed USA patent because it is combining both Ivan 2 concept.

So, the Quirky Jan. 28, 2011 is 2 years later after check Ivan the (#AA-2008) and (#BB-2008) to combine to make the said Quirky Jan. 28, 2011 announcement instead of filed the USA patent filing.

➔ These limitations should be covering the Quirky whatever he said the PORTABLE Lighting!!

2. China patent 2007-2015 3487 Miss Lin Wan-Yeh filed on Jun. 11, 2007 issued Jun. 25, 2008

From the electric drawing can see that patent disclosure the light source is connect with AC current and the said AC/DC transformer only supply the 3/5V current into the USB ports, Not link to the (Light source) so that is the typical AC power light source. Even at the text said light source can use LED but at 2007 Jun. 11 did not had super bright white LED has market available can use for desk-lamp further said as current invention use a Plurality number of LEDs or recently COB LED-unit at that time before the 2007 June.

The current invention listed the major difference at:

c. The LED is Plurality LEDs arrangement for geometric positions to get desired area illumination.

(Reason: On 2007 it is impossible for white color super bright LEDs+Cost issues) Even do not have COB for built-in plurality of the LED dice into one piece including square, rectangular, even 2017 came out for circle type.

d. The current invention details listed the current get from:

b-1: outside AC-to-DC transformer so can get $1^{st}$ DC. Also, the current invention had $2^{nd}$ added functions, so may incorporate with built-in at least one of DC-to-DC circuit to make more than one or only one DC to fit for LED light source or-and added function or IC or USB export ports for same or different Current. (This is not even existing and mentioned by China 2007 filed patent for concept, application for use Outside transformer) → So this claim should be granted allowance!

b-2: Inside AC-to-DC transformer to get $1^{st}$ DC. The same incorporated with inner one or more than one DC-to-DC circuit to get $2^{nd}/3^{rd}/4^{th}$ DC circuit to let different LEDs or added functions to use which may use same or many different voltages. Such as LED array may need 6 Volt operation voltage which is not all same within 3/5 Volt.

Especially the COB or the High brightness output LED. (This is not happening on the 2007 for the more LEDs==Because update technical for different LED especially for super brightness or super power saving energy, assembly cost need use different working voltage with USB export 5Volt current).

b-3: Inside AC-to-DC transformer to supply same current to LED or-and another added device. (This is other features no shown on quirky or China 2007 patent to disclose at all) . . . .

These (3) Specialized my filing feature has these Big Difference for LED desktop light. Which power by AC-wired Is different by (Outside AD-to-DC transformer) because all inner electric parts is different at all!

3. U.S. Pat. No. 7,736,033 Patel

Patel teach one lamp has the cigarette lighter round output receptacle and to receiving the (210) screw in by thread round transformer which transfer from 12Volt to USB output voltage 5Volt which is not same as the current invention has the UBS-receiving port which directly offer the 5Volt current to another electric device.

This prior art been argued so many times. Not know why examiner cannot find one of prior art is similar with current application to let us know has real prior art existing. Not use this old prior art.

4. U.S. Pat. No. 8,687,392 (1) and U.S. Pat. No. 8,687,392 (2) Sims et al

This is other application which said the device itself need has the (50 of FIG. 1) capacitor or other energy storage element while the power converter is operating in the standby mode beside the AC-DC power convertor circuit (122 of FIG. 1) and plus other monitor system (54 of FIG. 1) This is not same as current invention for non-itself energy storage device or capacitor to make this expensive circuit for the current invention. So, this is nothing to do with current invention because from AC power source is unlimited power no need to waste money for power saving.

5. U.S. Pat. No. 8,853,884 GENANNT BERGHEGGER et al

Teach the how to save power while the current is not operation. This kind of circuit is not use for Outlet which is only get power from AC power source only through the inner conductive receptacles to supply the current to inserted into male AC plug no matter when the male AC plug into or not into the receptacle, no any switch to control it. Same as USB ports output current, the current USB-port always relates to AC power source and through AC-to-DC transformer or at least one of DC-to-DC circuit so can get the preferred DC current volt to the said USB-port or other added functions again no any controller to make power less consumption or become big current to supply the current. That is fixed Amperage and voltage for each USB port.

So, this is nothing to do with current invention because from AC power source is unlimited power no need to waste money for power saving 6. U.S. Pat. No. 8,783,936 Chien This is the co-inventor parent filing case which has all same drawing with current invention. So, it is not the any prior art vs. tis continuously filing case.

The current invention earlier co-pending filed case including:

2. (#BB-2008) U.S. Ser. No. 12/232,035 Filed on Sep. 10, 2008 Public Jan. 9, 2009, now is patent U.S. Pat. No. 7,824,185 issued date Nov. 2, 2010) . . . . As for the LED-unit has Flexible-arms is same as FIG. 6 of PARENT Case of (#AA-2008 Filed May 12, 2008). These 2 (#BB-2008) and (#AA-2008=Mar. 5, 2009 Public=May 12, 2008 Filed) so therefore Quirky did not filed USA patent because it is combining both Ivan 2 concept.

So, the Quirky Jan. 28, 2011 is 2 years later after check Ivan the (#AA-2008) and (#BB-2008) to combine to make the said Quirky Jan. 28, 2011 announcement instead of filed the USA patent filing.

From (A-1) and (A-2) Both is enough to argue with Anabel for Quirky Is not the inventor for these (Power strip) and Outlet+USB+LED . . . . As above 3 Evidence.

A-3: From Quirky photos show, everyone know the Main-unit is (Power strip with USB and Outlet). There is No one will use the Quirky items for desk top lamp for reading.

A-3-1: Quirky items for short arms which not higher than people sited-shoulder height or not has horizon-axis for min. half-chest length . . . . The shorter arms not have vertical-height, it only can be treated for PROTABLE or WORKING TOURCH . . . . Meaning from Desk Lamp . . . . This should be having enough height above people shoulder or front arms height and has horizon-axis min. ½ chest width, so can let people have good desk lamp.

A-3-2: Quirky base is 100% can recognized is (Power strip) . . .

A-3-3: Quirky main-unit is (Power strip) so easily can carry, but same time, while it is power-strip for main-housing→ Then it is very easily to portable or put into Backpack . . . . However, All Market Desk Lamp is very difficult to put into backpack and carry. Because Desk top lamp must very goo d installation on desk top surface because need to overcome 3 kind of Force at any time . . . (Desk top Lamp) must overcome below 3 force including:

(A-3-3-1) Super Heavy 14 gauge-wire (US safety standard) if has outlets-unit for min. 6 feet long. Quirky power strip is not way to overcome this heavy 14 gauge 6 feet long wire weight . . . . So, is there any market power strip is there any one Can put on desktop and no fall from desktop?? The answer is NO!!

(A-3-3-2) The weight from Top LED-unit has LEDs and housing or another optics-lens, PCB.

(A-3-3-3) Arms or LED-Box/housing weight on horizon-axis so can let LED desk lamp not fall down or These 3 Weight can overcome only while the Desk Lamp has (1) Bigger Main-Base so can let all Top LED-unit housing or/and horizon arms center-of-gravity can fall within the Bigg-main base range. Or (2) The main-base must add weight-unit to overcome the center-of-gravity of top LED-unit housing and horizon arms weight So, this is not possible to add on the Quirky shown photos for (Power strips because inside is full of the metal piece for outlets and USB circuit!!

Hence, these are all arguments with Anabel. The Quirky is Not the $1^{st}$ one inventor for his photos because Ivan already show on parent filed case (#AA) and (#BB) and (#CCC) all these 3 cases drawing show very clear Quirky cannot filed USA patens so use publication on some medium.

7. China patent is Filed on 2007, this is very earlier date. Almost same year of Steve Jobs (Apply) came out $1^{st}$ iPhone on 2007.

The difference with current invention:

3. From China patents show the circuitry for incandescent radiation light source (105)
4. From the China patent the circuitry show the Incandescent or other light source is work under the AC current while the Input AC power (100) from outside AC wire (101) and the AC current will go through the conductive-trace or wire to the incandescent bulb (105) and has one on-off switch (103) to turn on or turn off the AC current into the AC power light source.

From whole China patent background, brief drawing, details description did not discuss anything for the LED light source at all only show on the claim 5 said all kind of light source(s) but lack of support from the anywhere of the whole patent for how to get work for DC-Operated LED can use shown circuitry which is AC current deliver to the light source (105).

Basing on the $2^{nd}$ times discussion of the top 2 Prior art for (A) Quirky and (B) China patent, both is invalid US prior art not only for above list discussion, but also current inventor had earlier than Quirky filed date Jan. 22, 2011 as below evidences;

Evidence A;

FIG. 1+2+3+8+9=U.S. Pat. No. 7,824,185 (#BB-05) Ser. No. 12/232,035—Sep. 22, 2010F (extension cord has outlet and LED and 3 contact-points.

Evidence B.

FIG. 6=U.S. Pat. No. 7,722,230 (#41) (#AA-08) Filed on 2008 Evidence C;

Column1 Line44 (USB port)+FIG. 10C=U.S. Pat. No. 8,998,462 (#CCC-10) Multiple Surface LED Light filed on Nov. 19, 2010, U.S. Ser. No. 12/950,017 Public date on May 24, 2012 Public Number 2012-012-7708 now is US patent and issued on Apr. 7, 2015.

Evidence D; (Child Filed patent of #CCC-2010)

FIG. 3+4+6+7+8+9=(#FFF) U.S. Ser. No. 13/117,227 for the PUB PDF File.

Evidence E:

(#UU-2010) filed on Nov. 3, 2010 U.S. Ser. No. 12/938,628 on PUB PDF The current invention is different with the $3^{rd}$ group of (21) US prior art including below:

1. U.S. Pat. Nos. 7,736,033 and 8,545,039 Patel. The Lamp Base with Electric device recharge receptacle & means. The BHART disclosure the Outlets device and the Cigar lighter build on the lamp base. The lamp base made the input AC current transfer to output current to automobile current (12 Volt), then the Automobile Cigarette make the input current from (12 VDC) to USB end current (5 Volt).

This means the BHART device at least need 2 expensive circuit/Transformer to get the USB Charger's output current from (120 VAC wall outlets) to (USB Current 5 VDC). This is not economical and none of people need 12 Volt DC for house use at all.

The current invention direct installs the USB Charger unit which transfer the input-end 120 VAC to output-end 5 VDC so this is practically.

2. US Prior Public 2011-017703 rotatable & concealable device which only has the outlets device with manual switch. This is directly for 120 VAC outlets power source directly though metal piece and delivery 120 VAC to the rotatable & concealable device's receptacles to offer 120 VAC current while the other device's plug means connect with the said receptacle.

'703 patent fail to disclose the any USB charger concept, circuit, design and application so not have any related with the current invention for USB charger and the current invention device use Overlay to sit on existing lamp base to offer multiple power type power station with a lot of features.

3. US prior art: U.S. Pat. No. 7,897,277 Meyer et al, disclosure the Reversible battery cartridge which are use the AC batteries cartridge as the backup power for the all kind of lamp which mainly for power fail application. This is nothing to do with USB ports and USB charger application. So, there is totally different with current invention related to (1) USB ports+(2) USB Charging+(3) Outlet supply power source+(4) LED light and Universal lamp base to fit for all kind of existing lamp base so not occupy any new desk top space because (5) the Universal Desk base is overlay top of the existing lamp base.

Furthermore, the current invention has (6) LED light incorporate with the above listed (1) (2) (3) (4) (5) so it become a unique practical Universal Power station because (7) the current invention is not only supply one kind of power to charger different electric or digital-data device(s).

4. US prior art—U.S. Pat. No. 6,474,823 Disclosure the laptop computer with top illumination light which is not for the AC power source into USB related circuit to transfer to the DC current to charge DC 5 Volt electric device. The Computer input-end current is 120 VAC but it pass though the computer its transformer already transfer to output-end current at 5 VDC and then there is no any USB Charger circuit inside the computer so the computer's external transformer which directly to delivery 5 VDC current to the to the USB Port so the computer system which is not same as current inventions the input-end current is 120 VAC though USB Charger inside circuit to get the output-end for 5 VDC.

The total circuit and concept are different because computer prior art use the EXTERNAL Transformer which not belong to computer itself parts to transfer the 120V Outlet power. Though EXTERNAL transformer gets 5 VDC current (Outside the computer). The Computer itself input-end current is 5 VDC and output-end current of USB ports also is 5 VDC so its proof, Computer itself is no any USB Charger circuit inside.

5. US Prior art: U.S. Pat. No. 8,562,187 SMED disclosure FIG. 2 function for outlet-module has the PCBA to transfer the input AC current to 15Volt 2A to turn on the said LED or to change the input AC current to US power outlet or Other country outlet. This is different with the current invention for AC outlet-unit which is directly to deliver the AC current from input-end directly to the AC current output-end. Also, The SMED other output for 15Volt DC which is not same as the current invention for DCSV with market available USB-port type to connect with all communication, computer, mobile phone wire's specifications so it is not replaceable. The SMED teach use power cord 36 has connector 7 to outlet connector 5. These is totally different for current invention's outlet-unit which no need any power cord 36 to build the electric delivery from desk top lighting device to the other electric device. The current invention outlet-unit has all outlet-receiving ends and can directly plug-into the other electric device male-prong to get electricity.

The current invention also has major difference with '187 SMED for below details.

5-1. Transformer change AC to DC to 15Volt 2 Amp DC current to power LED or other and USB port.
   This is not workable for the Ivan's because 15Volt DC is too high and will damage the be-charged items
   or create the Overheat. The Ivan transformer must be 5Volt DC with.
   So, the '187 SMED 15Volt DC just to supply power to the Plurality of LEDs and cannot charged other be-charged 5V batteries.

5-2. The '187 SMED not teach the USB ports is Quickly Charging-port min. has 1.0 Amp Charging capacity at the DC 5Volt.

5-3. The '187 SMED not teach any Quickly charging capacity and details to delivery from USB port to Be-charged items.

5-4. The '187 SMED not teach the 2nd circuit-inside which incorporate with the Transformer's circuit-kits or Transformer's circuit-inner inside the Outside Transformer housing or inside the lighting housing.

5-5. The '187 SMED not discuss USB charging-port at DC 5Volt and Connection for Be-Charged items. The USB-port 30 distribution the current to what purpose for 15Volt DC current this too dangerously to use super high voltage 15Volt DC to charge 5Volt batteries of the said be-charged items which is not meet US safety regulation by the USB-Charging port requirements including UL or ETL or another test lab. not like current invention details describe all USB Charging-port at DC 5 Volt with Min. 1 Amp to 5 Amp has safety authority certifications to charge the Be-charged device Energy storage unit or assembly so can let be-charged item can operate.

5-6. The '187 SMED transfer 15Volt 2 Amp DC current which SUPPLY power to LEDs or others, this is not a current invention discussed to charge be-Charged items such as the iPad which need 2.1 Amp or higher to charge properly. SMED 15Volt not only too risk for
Too high voltage to charge the Be-charged inside batteries but also has too few current to charge single one-piece iPad, it is impossible to charge iPad or iPhone at same time which current invention did teach for any combination for more higher amperage needed such as 2.1 Amp, 3.1 Amp, 4.2 Amp. 2.4 Amp, 4.8 Amp and all meet the safety standard for USB
   Charging-port has 5.0Volt DC range for output voltage and not harm to other be-charged device which inside battery is 5.0Volt range.

5-7 The '187 SMED lack of the $2^{nd}$ or more circuit-inside inside the Device as current invention. The $2^{nd}$ or more circuit-unit which may has $2^{nd}$ transformer because if need to SUPPLY ANY LIGHT SOURCE, it may need one Big Power output such as 5VOLT 5 Amp for
Plurality of LEDs Including color changing LEDs (White LED 20 pcs plug Warm white 20 pcs) so need one transfer as the '187 SMED needed. But also need to have current to the said USB Charging-port(s) which may need 5Volt 4.8 Amp so one transformer is not enough and not good to supply 2 applications. So the current invention need $2^{nd}$ or more circuit so can has $1^{st}$ Circuit-inner to supply the USB Charging-ports and $2^{nd}$ or more circuit-inside to supply current to other application including plurality of LED, Super Big power consumer CFL, Energy saving bulb, LED bulbs, time display (May use separated batteries), or Controller need such as IP cam, motion sensor, IR for dim light help IP cam, wireless communication, motion sensor all these other added functions.

5-8 [column 3 line 50] USB Module (30) have USB-port (30a)→So the USB-Ports is not built-in housing of Desk top item or Time Piece or Desk lamp.

5-9 [Column 3 line 51] Both USB module (30) and outlet module (5) support in cover (31)=→Prove again, The Module are separated with the housing of the Desk Top item or time piece or desk lamp.

5-10 [Column 3 line 56] Both USB module (30) and outlet module 95) are electrically connected to the PCB 32→Prove again is separated unit(s)
   Also, The USB Transformer (33) and Outlet Transformer (34), these have 2 transformers for PCB→this is not acceptable for current invention.
   Also, The SMED inside the Base has Both (USB Module=AC operated) and (Outlet Module=AC operated) inside the (Base)=→Ivan items have no any AC operated inside the Housing!!
   Also, SMED (USB transformer) is funny only can do ONE OF;

5-11 [column 3 line 58]→Supply power to Lamp 15V 2 Amp
   or Alternative 5-12 [Column 3 line 64]→As FIG. 3 Only supply power to USB (30) or 5-13 [Column 4 line 1]=→(USB transformer) supply accepted voltage to Lamp and it ALSO supply to the USB.
   5-14 This concept is supported by same concept [Column 3 line 39]→USB Transformer export power to lamp . . . . ALSO supply same current to USB-PORT!!→This means (Lamp and USB-port same voltage) as everyone know
USB need at 5 volt DC, so this means the lamp also is 5 Volt DC.

6. US Prior art: U.S. Pat. No. 8,758,031 Cheng et. teach the inside wall USB charger device which is not same as the current invention. Also, Cheng's filed date is Jul. 23, 2012 which is too late than current inventions. Also, this is for the Power Box inside wall has USB charger. Not same as current invention.

7. 8, 9, US prior art: U.S. Pat. Nos. 7,742,293, 8,116,007, 8,432,667 STRAUSER teach the music player has pedestal support or foot to put ground the exemplary audio device (system) 10 has a system console 24 supported by a pedestal 20. The system console 24 typically has controls (e.g. volume, play, stop, etc.), displays and indicators. In this exemplary system 10, music or karaoke content comes from a digital music player 80 that is inserted into a cradle 81 (see FIG. 8) and connected to audio inputs 99 of the exemplary system 10.
   Even STRAUSER had teach the USB plug to power the music-player as below content;
   In a preferred embodiment, the cradle 81 is stepped as disclosed in the parent application, "DIGITAL MUSIC PLAYER CRADLE ATTACHMENT," Which is included by
reference. Thereby, the cradle 81 supports a large variety of music players 80 of varying sizes and shapes. In such, the music player 80 sits in a cradle 81. Power is provided from a power port (e.g. USB port) 21, into Which the power cable plugs 82 (e. g. USB plug) is connected to provide power to the music player 80. But it is different with current invention for (1) not desktop items because pedestal 20 for ground installation (2) not people hand reachable distance to charge the other electric device furthermore need to walk to far distance which more trouble than bend body to get power from power strips or outlets (3) No any light source to offer indicator light or any illumination (4) the music player (80) it does not supply the power to other device which is different with current invention is music device has built-in circuit and transfer input current to DC 5Volt to charge the other electric device. So, this is not same as current invention for desktop definition and people will stay for a while to charge the other device.

10. U.S. Pat. No. 8,899,797 which for has USB port install on the movable (Movable parts & accessories or Organizer, Or Addable parts & Accessories).

(may add the USB-unit or USB-Module or Outlet-unit or Outlet-Module on the MOVEABLE or ADDED parts of Desk lamp).

The '797 who is filed on Aug. 26, 2012 after Co-inventor's U.S. Pat. No. 8,783,936 (#GGG-2011) Public on Dec. 15, 2011. and '797 patent has one prior filed and abandonment as below because it adaptor the phone's custom-pin plug to connect with phone female custom-pin end to build the electric and audio signal delivery, so this is not like the current invention has all USB-port which is female USB receiving ends on the desktop item and though the male-plug kits to of USB wire which has male-plug ends on 2 ends and one end connect with Desktop female USB port and other male plug end inert into the be-Charged device.

11. US Prior art 2006-020-9530 as below:
1. '9530 show bulb-socket so it is not the Built-in LED lamp. This maximum can add LED bulb Lamp device.
   Fact☐Column (0005) Line 10
      A terminal housing is disposed relative to the neck second portion, a bulb socket including a seat portion is attached to the terminal housing, and a shell portion of the terminal housing is shaped to receive the base of a light bulb.
2. '9530 show the Transformer and Bulb-socket in parallel connection. So, the light source is getting 120Volt current which is not built-in LED lamp device
   Fact shown on Column [0006]
      The lamp support may also house a transformer electrically coupled to the power cord in parallel to the bulb socket.
3. '9530 show the 2$^{nd}$ socket on the edge of the support or base is Custom Pin-Out, not regular USB-Port so only can charge 1 model of phone as Contact (44) both all for Customer Pin-Out design. This is limited for one and ONLY ONE item can be charged!!
   FACT shown on [0007] Alternatively, the lamp may include a second socket disposed on the support, the socket having a first end directed internally of the support and coupled to the speaker and a second end positioned externally on the support for connecting to a media device compatible cable.
4. '9530 show no any wire from charging contact (44) or outside socket (50) needed while charging the phone. Because the contact (44) or Outside socket (50) both is custom pin-out construction and the phone just directly plug into this Custom Pin-Out can directly charger . . . . This is only limited one and ONLY ONE phone can be charged. Not like Ivan's use common USB-Female-receiving end and Charging wire's USB insert male-plug to deliver the current and the though charging wire's other ends to connect with the electric or digital device.
   The audio output cable (17) though Round Plug (17a) to transmit the data to speaker (15) (15a), Audio Output cable (17) one end to Music media device (100) and another end to Speaker (15a) (15b)
   FACT shown on [0019] As illustrated in FIGS. 1 and 2, an audio output cable 17 is electrically connected via a plug 1711 at one end to each of speakers 15a and 15b. As illustrated in FIGS. 2 and 4, the other end of audio cable 17 may be fed through an orifice 19 in support 12 and be operable to connect, for example, to the headset jack or other audio output terminal of media player 100 as indicated. Alternatively, as illustrated in FIGS. 1 and 3, the orifice 19 may house a connector (not shown) for plug connecting to a plug 17b of output cable 17
5. '9530 shown do not has built-in LED light source, only can install the LED bulb at the bulb-base. Not like the co-inventor's (3) issued patents or co-pending case has LED built-in as light source, No Bulb-Base at all.
   FACT shown on [0021] line 10 The light source 24 (e.g. incandescent bulb, halogen lamp, Fluorescent bulb, or one or more LEDs) is mounted in the bulb socket 20 and positioned in a plurality of positions relative to the support 12 by arrangement of the Flexible neck 14.
6. '9530 shown the contact (44) is Custom Pin-Out type which only can charge one and ONLY one model of the phone. Also, the Recess Slot which also become Big limited to fit one and ONLY one phone.
   Fact shown on [0025] As illustrated in FIG. 2, the recess 42 is provided on the top surface of the support 12 for receiving the media player 100. A plurality of contacts 44 are formed at the base or on a Wall of the recess 42.
7. '9530 shown only can charge one and ONLY ONE phone because (A) Recess (42) size is fixed (B) The contact (44) need align precisely to the phone contact so can charge one and Only One. Not like Ivan the charging port is common USB-Port!!
   Fact shown on [0026] Recess 42 is shaped to snugly receive a lower portion of media device 100 to align or Mattingly couple electrical contacts 46 on the media device 100 with contacts 44 of support 12, and thereby act as a socket for media device 100. Contact between contacts 44 of support 12 and contacts on media device 100 (not shown) for example may permit a rechargeable battery housed Wholly Within media device 100 to charge. Contacts 44 and media device 100 contacts are adapted to Mattingly couple with each other so that DC voltage can be supplied to the rechargeable battery of media device 100 for charging through the coupled contacts 44 and media device 100 contacts. In addition, if the media player 100 includes audio output contacts in proximity to the charging contacts, ones of coupled contacts 44 may be connected to speakers 15a and 15b via an internal cable (not shown) as an alternative to audio output cable 17.
8. '9530 show the LEE unit only can charge one and ONLY One phone and the charge contact all is Custom Pin-Out type. The current invention's items have USB-Port which can work with any USB-Port charging wires to connect with the Other electric device and digital device.
   FACT shown on [0027] In accordance with an alternative arrangement of the present invention and with reference to FIG. 4, a charging circuit is excluded from lighting apparatus 10, and contacts 44 are electrically connected to a socket 50 dis posed on an exterior surface of support 12. Connection between contacts 44 and socket 50 are provided through internally disposed cable 51.

9. '9530 LEE use custom Pin-Out construction on the contact (44) and Outer socket (50) which same as LEE Example iPod© wires for custom pin-out so can fit and charge one and only One phone . . . . Not like the other end on the computer as USB-port which Ivan patent claimed.

Fact shown on (0027) Line 2 Socket 50 is adapted to inter face with the charging and/or data cable associated with media player 100. For example, an iPod media player sold by Apple Inc. typically employs a cable to connect the iPod to a computer via the computer's USB port. This cable has a custom pinout on one end which connects to the iPod device and a USB connection on the other end Which mates With the USB port on a computer.

10. '9530 LEE device can transmit BOTH DATA and CHARGING. This is not happening at Ivan item because Ivan item only has the CHARGING FUNCTION. This is not same on basic CHARGING of CHARGER DEVICE!! So, this is totally different with Ivan's CHARGER patent.

Fact shown on [0027] Line14 to 19 The cable allows both transmission of data between the computer and the iPod and charging of the iPod's internal battery through the USB port on the computer.

11. '9530 LEE device cable is associated audio media device & get power from the inner charging-circuit and get power from CUSTOM PIN-OUT contact (44) or Outer socket (50). This is totally different with Ivan's can charge and ONLY CHARGE many different electric or digital device. Not one and ONLY one as LEE claimed and details description for AUDIO MEDIA DEVICE (100).

FACT shown on [0027] Line 2 Socket 50 is adapted to inter face with the charging and/or data cable associ- ated with media player 100.

Also, US (2006-020-9530) for contact (44) and Outer socket (50) has below text;

The said USB receiving end (USB port) is one end of USB-Charging cable which same as all laptop computer USB receiving end, not USB custom pin-out, not USB mini, Not USB compact, Not USB other name which is the other end of the said USB-Charging cable which only fit for limited number of the electric or digital device.

12. US abandonment public prior art US 2009-006-7161

The Foldable mirror set is not Desktop installation. That is travel unit not let people to install on desktop surface always.

The Power from the Computer and which is not quickly charger and has very limited current less than 500 ma not like current invention has minimum 1.0 Amp up to 5 Amp for definition of the USB Charging-Ports release on 2007 and update on 2010.

Also, the computer USB is not charger into the Foldable mirror into foldable mirrors' internal rechargeable battery. The Computer is SUPPLY the current to the foldable mirror while the USB Male plug into the computer ports and has power. Not charging into rechargeable battery and storage inside the rechargeable ready to use.

The foldable mirror had no any internal transformer to change incoming AC current to DC current.

The foldable mirror had no outside transformer get power from outlet AC power source.

So, this prior art is nothing to do with current invention.

SO, from above (12) $3^{rd}$ lot US prior arts points different with LEE (2006-020-9530), The current invention any issued or co-pending filing no any same or similar with LEE's '9530. Furthermore, the '9530 on 2006 is no charging capability over 1.0 Amp as wiki report shown all the history and data so the charring capability and Not allowed the Digital or electric data to delivery on old date 2006, so that is not like current invention for quickly charge USB Charg- ing-Port as above discussion and wiki data!

13. US Prior Art US 2010/0296298 Martin, JR. U.S. Ser. No. 12/761,514 Filed on Apr. 16, 2010

The '298 teach one Rea-Beveled Mirror (12a) of Rear- Beveled cut edge (12) of FIG. 4 and FIG. 5 or the Rear-Beveled Mirror (14a) of mirror (14) of FIG. 7 shown the special made mirror which is out-of-date mirror design.

Further, from FIG. 7 and FIG. 8 shown the light-strip (14) and LED light source (14-2) which is light strips (14) to fit within the beveled-edge (12a) which is out-of-date because update LED arrangement is dice or chip for Surface mounted on rigid-piece printed-circuit-board and which is just inward to emit light to the curved magnify-mirror to let the curved-mirror-surface work as reflector to emit all light to front which is diffusion light effect emit out to form plurality of the parallel light-beam so not dark and bright area on be-lighted object. The current invention cosmetic mirror is one of magnify have N-time magnify for vanity mirror or cosmetic mirror. Not the focus light effects like '298 get focus as FIG. 6 for all '298 concepts and construction and details.

Furthermore, the said current invention for the other side may is N-time magnify which the N-number is 1 (×1 times), the Surround light on the contour is from the vertical position flexible printed-circuit-board (which is not available on 2010 because the chip-on-board or dice-on-board not available at market because too expensive and too difficult to make reasonable cost for application yet).

From the '298 for beveled edge mirror (12) (14) with the beveled-edge (12a) (14a) to arrange LED light-beam to form focus on front which will cause the center is Big brighter lighted spots and hurt people eyes for '298 design. The current invention apply for cosmetic is for diffusion light-beams to front for plurality of parallel light-beam to make front panel or area for even bright- ness without the super-bright focus light-beam.

So, the '298 is not same and not right for the optics-design and concept so not same as current invention spirit and construction and optics-theory (diffusion vs. focus).

Furthermore, the current invention mirror device have other construction for (1) magnify the image from 2 to N-time (N is any number) so it will be curved lens (2) The LED(s) is vertically or horizon offer illumination to the said object or mirror surface directly without the troublesome beveled-edge mirror-area(s) which will reflected (18 side walls of the light chamber 46 may include a reflective material to reflect light from the LED light strips 14 through the rea-side bevel 12a) or refracted light beams to make bad light-performance. Also, the (3) '298 need install the J-chamber (20) which is not practical for current invention for installation the mirror with beveled-aged (12a). and (4) the current invention preferred $2^{nd}$ side of LED lighted-mirror with normal non-magnify mirror also illumination so this is not existing for the said '298 for single side mirrors for '298 device.→So this is nothing to do with '298 patent for concept, application, feature, installation, optics- theory, mirror type, optic-focus vs. diffusion, light-beam emit out directly without go through the beveled-ages, two mirrors with rotating features.
14. US 2012-0294015 (SMED) as earlier discussion for all difference.
15. US 2008-0091250 (POWELL) therapy LED desk lamp
    '250 POWELL teach a portable DC power source [0012 line 5 to 8] for easily carry to patient room or do therapy.
    '250 power teach a controller (126) which is (0017)
    (Line 2 to 3) line [selecting the operating mode of the desk lamp 140], or
    (line 4 to line 5) [electronic communication with the LED array 108], or
    [line 6 to line] include a display and user to select a broad-spectrum light for general uses such as reading,
    ➔ These are common LED light device from market place and not a patentable on 2007 when the iPhone came out year!
    Powell same as current invention to have this basic LED desk lamp to add POWELL its features to add
    h. "Therapy treatment light wave light-beam including infra-red, blue, red light beam ➔ (The current invention for reading or working do not have these light color)
    i. Portable device ➔ (not same as current invention is non-portable device and big-size or weight bas permanently install on desktop before replacing it).
    j. [Column 1 (0014) Line5] The '250 for brightness is very bright for 1,000 to 2,000 lux ➔ (This high brightness same as jail-torch light is not use for people reading or working indoor and this brightness will hurt people eyes while long time reading for student, '250 also did not have any anti-glare optic-piece to protect eye, or
    k. [Column 1 (0016) line 6} for 15-30 inch around 1 to 2.5 feet has 450 lux (This is too bright for people reading ➔ (this is not same as current invention for reading or working or accent light which not allow so bright to heart people eyes especially without the anti-glare protection at all.
    l. [Column 2 line 10] include a controller 226 which can include a display and user inputs
    ➔ Which means this is not like current invention for simple switch or sensor for lower cost desk lamp.
    m. [Column 1 (0011) line 5 to 8] for battery power easily carry to patient room or do therapy.
    [Column 2 (0018) line 10] The desk lamp 240 may be powered by an internal or external portable power source such as battery. The battery power source may provide the desk lamp 240 with power such that AC power is not required."
    For both embodiment all had the same portable power source is batteries.
    ➔ This is different with current invention for LED and added functions need more power and batteries do not supply this kind of other added function for power consumptions.
    n. [Column 2 (0018) line 15] The batteries may be stored within or proximate to the base 242 or within the LED module 246. The LED module 246 may include one or more LEDs 208, like LED array 108 as described previously.→Different with current invention the plurality is not powered by batteries at all.
    So ➔ The said '250 is not same as LED light of the current invention describe for (a) DC battery power source vs. AC plug-wire (b) portable LED light vs. permanent install on desk top (c) LED light beam for infra-red or blue vs. white light beam only (d) controller is variety functions and memory vs. simple switch or sensor (e) therapy treatment LED desktop light vs. reading or working only without therapy function. (f) movable LED light-module with built-in batteries power source and control vs. non-movable LED light source.
    Basing on US Patent office have much more the LED desktop light including above discussed LED desktop light of SEMD or others still can get US patents basing on (1) basic LED desktop light with ADDED features so can grant US patents as many of prior arts.
    [line 7 to line] allow the user to activate desired therapeutic wave-length so light such as red, yellow, blue, green or infra-red wavelengths or a combination thereof to treat various conditions.
    which had a very complicated data-storage
16. Re: US Prior art US 2011=0228449 (KEEBLER et al) Filed on Mar. 18, 2010 Public 9-22, 2011
    ➔ [0026] Regarding FIG. 3, a plurality of direct current powered devices 305, 310, 315 which may be powered by a universal power supply system 100 in accordance with an example embodiment are depicted. In one example a common network router 305 is depicted which receives DC power from the second Plug 300A. in second examples, a multiple media player (i-pod) 310 is depicted which receives DC power from the second plug 300B. In the third examples, a cellular telephone 315 receives DC power from the second plug 300B. In each of these examples, the second plug 300A, 300B, 300C are different in physical dimensions (i.e., device specific) and may operate at different direct current voltages as is shown in FIG. 1 ➔ so '449 teach all be charge item ➔ Device i-pod or others is not USB female receiving port(s) and the device have different direct current voltage as in shown in FIG. 1.
    Also, '449 The said universal power supply system 100, That is lack of
    (1) No any USB ports with only 1 output current around 5V+/−20% and min. 1 Amp current up or more Amp.
    (2) No any LED light to offer the area illumination for reading or work or accent light Amp current up or more Amp.
    (3) Most important offer many different voltage DC currents not like current invention only export the 5Volt+/−20% to charge be-charged products.
17. US 2010-0046249 (Mai) for Diffusion film
    '249 Mai teach a film with diffusion and need use plurality of substrates made of different material to get the (light incidence surface) and (light emission surface) for different surface of plurality of layer. ➔ This is too complicated than market available for much better optics-lens to make the narrow LED light beam as back light and make the said light diffusion to even brightness.
    From Co-inventor co-pending case (#K) US Ser. No. 11/498,874 which also had the optics-piece (5') (5") for incidence and (5") emission surface and back LED light to get even brightness filed on Aug. 4, 2006 which is CIP of Ser. No. 10/954,189 filed on Oct. 1, 2004. Also, the both (5') and (5") is made by injection resin, Not even need to make plurality of layers of the film.
    From current invention (#K) U.S. Ser. No. 11/498,874 has other many US prior art which is easier than the filed date Aug. 4, 2006 BOURDELAIS, U.S. Pat. No. 7,538,832 Hong, US 2006-0062019 Young, US 2007-0076437 all related for the Optics-piece for make light-beam arrangement.

→ So, Mai teach totally nothing to do with the current invention because current invention will not use this kind of plurality of layer of optic-film etc.

→ Basing on the above listed 3 group discussion for all (17) US and China prior arts it is no any proper prior art for current invention. Hereafter for more discussion for current invention features.

18. US Prior Art: 2009-015-4148 Meyer (18-1) From Current invention [Abstract line 10] stating "The said USB charger only has charging function no any data transmit and only have one input power source not more than one and charging capacity minimum 1.0 Amp up for quickly charge from USB-Charging-ports by 2 male USB-plugs' USB-wire to the device's female USB-ports."

And [0056] last paragraph of current invention publication text stating" Also, all the current invention only accept ONLY ONE input current not allow more than one input current such as normal time is AC power and change to DC power while power fail which will had a lot of controller or additional circuit need to do which may have more risk for fire case happened.

'148 Out-of-date for USB 1.1 which only can get 100 to 500 ma output as Wikipedia USB history, '148 Out-of-date USB-port filed on Jan. 30, 2007 USB-pot (124) get power from transformer which is steady input current from household electricity AC power while have AC power connection. However, While AC power is loss, the USB-port (124) is getting unsteady and unknown DC Voltage current. 4 pcs or rechargeable batteries may be fully charged @ 1.5×4=6Volt DC which will cause be-charged other products inner lithium batteries exposed . . . and 4 pcs secondary rechargeable battery DC Voltage will drop very quickly right after the 4 pcs secondary battery supply power to USB-port (124) from Fully charged @ 1.5V×4=6Volt to 5.5Volt to 5 Volt useless low voltage charging to 4.5 volt, 4.0Volt, 3.6 volt . . . . However, the Be-Charged product inner lithium batteries DC voltage become higher and higher. So, the secondary supply power through USB-ports (124) is too risk for too high-voltage from beginning at @ 1.5×4=6.0Volt until 4 pcs secondary batteries drop from fully charged to @ 1.25V x 4=5.00Volt this is ONLY SAFETY DC voltage from 4 pcs secondary battery to supply current to the USB-port (124). V.S.→Current invention had multiple times on filed text STRONG EMPHASIZE ONLY ONE INPUT DC CURRENT INTO THE USB-PORT (S) as above listed on [Abstract] and Column [0056] for big improvement for WRONG AND RISK for Exposure and Fire Hazard of '148 have unsteady secondary batteries to supply power to USB while AC power loss.

→ So this is very clear the current invention (USB ports) no like ['148 Meyer] have 2 input power source, One is from (AC-to-DC transformer) while have AC power, one is (secondary battery) while AC power loose!! This is 2 input power sources, so the current invention is totally different for 1. Electric design 2. Concept 3. Construction 4. Applications → Hence, ['148 Meyer] is not proper prior art and totally different application, categories compare with current invention.

(18-1): '148 show the USB port 124, Par. 0062 and FIG. 8 USB-port 124 and USB port 124 for charging, parts 0063→ '148 both FIG. 8 and FIG. 9 show the USB-port 124 is get power from the AC-to-DC transformer. However, this is conflict AC-to-DC transformer also supply the DC current to secondary to charge the (4 rechargeable battery).

This means to supply DC current to USB-port (124) need to be DC 5.0Volt and it is not accepted for too low or charge other external device(s). So, the AC-to-DC transformer export current will be 5.0Volt DC for USB-port (124).

Same time the AC-to-DC output 5 Volt DC to charge the secondary batteries 4 battery and each rechargeable battery voltage for low level is 0.9-1.0 Volt empty and fully charged is around 1.30-1.35 Volt. Because the AC-to-DC is continuously to charge the 4 battery so total voltage will be 1.35×4=5.4Volt. The '148 said while AC loose, the secondary supply power to USB-port (124). This means the USB-port will have super high voltage to charge other be-charged products so will cause the be-charged products such as I-phone or I-pad to be exposure or fire-hazard.

This is First 1 point for '148 is not practically.

18-3; '148 USB Port while AC loss→ The output from secondary battery set will be over 5.34 volt is one of non-workable for all market safety standard and never can get UL or ETL approval for lab. testament, so can sell at market place.

18-4: '148 apply the USA patent on Jan. 30, 2007 and at that time no any USB port been official issues and Jan. 30, 2007 maximum for USB-port export current for 500 ma as current invention attached the Wikipedia [USB Charging port" Definition is release on 2007 and DCP (Dedicated charging port) (DCP) w/o data supported and only can do for 500 ma at 5Volt→ VS compare with current invention specified the USB charging-port basing update 2010 definition can get min. up to 1.0 Amp to 5 Amp. This is basing on the USB-port definition and development history. So '148 filed patent on Jan. 30, 2007 is not even have (Definition for USB Charging port especially for DCP model) and also 2007 do not have any USB 3.0 for have bigger charging capacity up to 1.5 A to 5 Amp.

→ This is clear on the current invention claim for update technical.

18-5: '148 only show the USB port on drawing and FIG. 8 and FIG. 9 do not have any word to export any current. Further, 148 secondary battery preferred is AA, CC, DD for 4 pcs to get fully charged is @1.35Volt× 4=5.4Volt which is too high to cause the be-charged products inside battery super high temperature and cause exposure and get fire hazard is one that no test lab allow to get safety certification. Because AC-to-DC circuit continue charge while AC power existing.

18-6: Further '148 also teach while AC loose, the Secondary batteries will supply power to USB port (124). The total capacity of the secondary 4 pcs AA battery or DD battery which is not sufficient current to supply 1.5 A to 5 Amp to be-charged items. For 2 reason.

(18-6-1) In 2007, only have super lower export current 500 ma to charge so it will take forever to charge I-phone or I-pad.

(18-6-2) rechargeable battery for each size such as AA battery only less than 1 Amp and '148 while power fail to supply power to LED light source (106) and also the USB port (124). This may only several minutes to supply power, so this is not practical and not a functions people needed.

18-7: '148 USB port is directly connected with power from AC-to-DC current and input to the USB port (124). This is not same as current invention.

V.S. The current invention for AC-to-DC circuit $1^{st}$ DC current and $1^{st}$ DC current go through at least one DC-to-DC circuit to change to $2^{nd}$ or more different voltage DC current so can supply to (2) USB port exemplary for 5.0Volt, (2) LED light source maybe for 12Volt 2 Amp current, (3) desktop existing or additional functions including at least one of (3-1) airflow which created by motor+fan+Air-flow channel which may need 6Volt DC, (3-2) IC maybe is 3.5 Volt DC (3-3) blue tooth audio circuit is 6Volt (3-4) Time/alarm clock/weather station normal time is 12➔ Change to 3Volt DC and while power fail work with backup separated 3Volt Lithium or 2 pcs of LR44 or 1154 small backup battery.

So, the circuit of '148 for USB port (124) and LED light source (106) both is used the same current out of the (AC-to-DC) circuit is not practically.

because LEDs for sufficient brightness for reading for normal reading light need is 400 Lumens and power needed for get this bright for 12Volt DC for less Amp.

18-8:

From '148 FIG. 8 and FIG. 9 show the input the LED light source current still same as USB-pot (124) DC 5 Volt, then, this need Super Big current on DC 5Volt (this means 2.4 times bigger current needed) for supply power to the '148 light source for normal time . . . .

For AC loss, the 4 rechargeable battery (rechargeable battery current capacity is around only 40-60% less power of alkaline battery). Voltage for fully charged is @1.35 (Standard is 1.2Volt). So 5Volt DC to supply the LED light source for need over 5 Amps which means the (4 pcs batteries rechargeable) is no way can supply LED (106) and at the same time supply to the current to USB-port (124).

VS. Current invention➔

The current out of (AC-to-DC transformer) have to incorporate with at least one or more than one (DC-to-DC circuit) to create different voltage to supply many different function ➔ At least one LED light source(s) which need 400 Lumens after passing through the front cover or lens!!

Or like the current invention one of alternative circuit system different with '148 is $1^{st}$ DC current out of built-in or external (AC-to-DC transformer) is supply to LED light source which may is 12Volt DC (Most low cost because 12Volt is most common use for transformer than output 5Volt). Then, the 12Volt $1^{st}$ DC go through the at least one of Built-in (DC-to-DC) to change $1^{st}$ DC input LED light to change $1^{st}$ DC to $2^{nd}$ or more different voltage $2^{nd}$ or $3^{rd}$ or $4^{th}$ DC current(s) to supply maybe 3Volt, 3.5Volt, 6 Volt, 12Volt to built-in additional function(s) . . . . Also, have one for DC 5Volt to supply to the said USB-Charging ports have minimum 1.0 Amp to 5.0 Amp (USB charging definition announced on 2010) with different specification for inner construction or (USB Charging port) . . . . This is not existing on Jan. 30, 2007.

18-9:

Basing on Patent law. The '148 apply is out-of-date USB-port which only have 500 ma export current VS current invention filed on 2011 which has the minimum 1.0 to 5 Amp export current basing on new specification.

18-10

MEYER is same as SMED

Both ($1^{st}$ DC) to USB and also GO to LAMP. So, both should be 5Volt DC . . . ➔ The current invention never is 5Volt as $1^{st}$ DC . . . ($1^{st}$ DC is NEVER for USB CHARGING PORT). The current invention the said USB Charger should be $1^{st}$ DC➔ Go through AT LEAST ONE OF DC-to-DC or IC or circuit then get (USB Charger port needed DC)➔ That is $2^{nd}$ DC, So, different with the (MEYER FIG. 8 and FIG. 9).

Basing on (MEYER FIG. 8 and FIG. 9)➔ So each Claim (USB Charging Ports DC current), I have to said (NOT SAME AS LED LAMP Current)! This word is Make Big difference with not only MEYER but also SMED (See Top explanation !!)

Basing on above USB port history and non-practically for '148 disclosure and current invention need at least one or more than one (DC-to-DC circuit) to make right arrangement to get right DC Voltage for each different function including (USB port) (LED light source) (other additional DC operated functions).

19. U.S. Prior 2011-008-4660 filed on Mar. 11, 2010 MCWEYN

'660 shown the wall charger with removable charger parent filed case 61/249,933 filed on Oct. 8, 2009 which is later than Co-inventor U.S. application Ser. No. 11/806,285 filed on May 31, 2007 which is CIP of U.S. application Ser. No. 10/883,747 filed on Jul. 6, 2004.

The co-inventor '285 is for Plug-in wall outlet LED light have conductive piece to supply power. Which has its filing history as below: (#R-2007) U.S. Ser. No. 11/806, 285, and (Inventor's #R) filed on May 31, 2007 which also a multiple functions LED light device which are the continuously filing of the (#B-2005) U.S. Pat. No. 7,318,652 for multiple functions Wall Cover filed on Mar. 31, 2005. The current invention is continuously filing of One of Child case (#R-1) U.S. application Ser. No. 14/739,397 filed on Jun. 15, 2015 allowanced on Nov. 21, 2018 and issued on Jan. 22, 2018 for claims 1-8 and 10-12.

The (#R-1) '397 parent filed case is Ser. No. 11/806,285 filed on May 31, 2007.

The claims 1-8 and 10-12 had all the '660 description for USB ports (1) cigarette plug has 12 Volt DC input from AC-to-DC circuit and cigarette plug have one other DC-to-DC circuit to change from 12V DC to 5Volt DC to supply USB charge port needed 5V DC.

(2) The wall plug-in AC-to-DC circuit directly to supply 5Volt DC to $2^{nd}$ USB charge ports to supply 5Volt DC to charge other products.

V.S. Both (1) and (2) USB still fall within the Co-inventor earlier filed case (397) and its parent filed case '285 filed on May 31, 2007 claim and scope.

So, '660 US prior art is not proper for current invention!

20. U.S. Prior. U.S. Pat. No. 8,545,039 PATEL filed on May 18, 2010 and parent filed on Apr. 20, 2007 '039 shown the Bulb lamp base with cigarette plug unit to get the lamp base built-in AC-to-DC current at 12Volt or 24 volt DC current and the said cigarette plug unit has built-in other DC-to-DC circuit to change from 12 or 24Volt DC current to USB charge ports needed 5 Volt DC to allow charge other products. The movable cigarette plug unit mainly can use for car working voltage 12Volt.

From '039 same as the [Meyer USB port] Even the '039 filed date on May 18, 2010 still use the USB 1.0 or USB. 2.0 have 5Volt 100 ma up to high power USB port still 500 ma. This is cross reference [Meyer USB port maximum is 500 ma by cross reference '039 filed on May 18, 2010 and the Meyer USB port filed on Jan. 30, 2007 at those Old days. Meyer USB ports is out of date item and only can supply 500 ma for high output USB. → '039 Column 3 line 11 to line 19!

From '039 show the bulb lamp at column 6 line 26 to 36 shown the illumination element (50) is 110 to 120 VAC with 10-20 amp is one of incandescent bulb.

It also can prove from the FIG. 3 shown the plug (56) and wire (54) get the into the lamp base at (58) and inner wire (60) directly to the top illumination element (50) to confirm the illumination element (50) is AC powered incandescent bulb which is not same as current invention LED area and/or indicator light illumination. So, the circuit compare with current invention for LED light source is totally different.

Further, the current invention the said AC-to-DC and at least one of DC-to-DC circuit all are installed within the desktop items or desktop power station. Not like '039 one of the DC-to-DC is built-in cigarette plug. Not inside the desk top lamp base.

More important this kind of LED. So, '039 is totally different with current invention.

21. Combination or ['148 Meyer] ['660 MCWEYN] ['039 Patel]

(21-1) One important comparison can prove {'148 Meyer=Filed on Jan. 30, 2007 USB port have high power export between USB 1.0 and USB 2.0 for 100 ma at lower type and maximum is 500 ma at high output model}

→ From '039 same as the [Meyer USB port] Even the '039 filed date on May 18, 2010 still use the USB 1.0 or USB. 2.0 have 5Volt 100 ma up to high power USB port still 500 ma. This is cross reference [Meyer USB port maximum is 500 ma by cross reference '039 filed on May 18, 2010 and the Meyer USB port filed on Jan. 30, 2007 at those Old days. Meyer USB ports is out of date item and only can supply 500 ma for high output USB. → '039 Column 3 line 11 to line 19!

(21-2) Combine the ['148 Meyer] and ['660 MCWENY] and ['039 PATEL]

'148 Meyer FIG. 8 and FIG. 9 show the out-of-date USB1.0 or USB 2.0 which has the lower output is 100 ma or have high-output 500 ma. This is what the Current invention listed the details of [Wikipedia inside text] Including the official definition for [USB Charing port] definition announced on 2007 for max. have 500 ma output.

(21-3) '660 MCSWEYN is later filed date than Co-inventor's Pending case (Filed on 2007 and still pending for LED light with built-in conductive piece to supply power to other products).

'660 MCSWEYN is later filed than current inventor for Wall plug-in Device which can trace patent filed case back to 2004 as forgoing depicts.

(21-4) Further From ['039 Patel] Further detail discuss the (Column 2 line 19 to line 32) to discuss very details "In more recent years, many different type and voltage of batteries have been developed and adopted by manufactures. For Example, Nickel metal hydride (Ni-Metal Hydride) cell has a nominal voltage of 1.2 Volt, although, at full high charge they may be as high as 1.5Volt (So prove above discussion for '148 is not working and not a safety item. Basing on Meyer's 4 pcs rechargeable battery will get full charge @1.5× 4=6.0Volt, which supply to Meyer's USB-Port (124) will caused i-phone or i-pad inner battery exposure at once. Because USB-Charging-port have to be around 5.0Volt export).

(21-5) Further ['039 patel Column 2 line 25 to 29] detail the be-charged products inside Lithium ion (Li+) batteries that typically are chargeable to about 4.1 to 4.2 Volt for single cells and lithium polymer (li-Poly) battery typically are chargeable to about 4.3 to 4.4 Volt range, so prove again '148 rechargeable batteries @ 1.5V×4=6.0Volt DC to charge the (Li+) or (Li-Poly) will cause the Both Lithium battery exposure at once because too high voltage.

(21-6) So, Combine the 3 prior art compare with current inventor earlier filed case for Wall mounted light with conductive piece to supply power to other device shown the current inventor DO NOT COMBINE these 3 US prior arts. It should said the current 2 Prior arts {'039 PATEL} and {'660 MCSWEN} combine current inventor's 130 earlier filed case to file US patents.

(21-7) Re '148 USB port (124) and secondary battery and LED light source (106) is not reasonable for FIG. 8 and FIG. 9 and FIG. 1A, 1B combination for USB-Ports (124) will cause the be-charged item inner rechargeable batteries exposure basing on the above ['039 PATEL] double confirm the [Wikipedia definition of USB-Charging port on 2007 and official definition "DCP" USB 3.0 on 2010] so can prove the ['148 USB port (124)] is out-of-date and '148 FIG. 8 and FIG. 9 have fire hazard so it is wrong to arrange into '148 system. And, '148 did not teach any details except only word USB-Port (124) lack, of any description except on FIG. 8 and FIG. 9 show USB-Port (124).

(21-8) From Current invention [Abstract line 10] stating "The said USB charger only has charging function no any data transmit and only have one input power source not more than one and charging capacity minimum 1.0 Amp up for quickly charge from USB-Charging-ports by 2 male USB-plugs' USB-wire to the device's female USB-ports."

And [0056] last paragraph of current invention publication text stating" Also, all the current invention only accept ONLY ONE input current not allow more than one input current such as normal time is AC power and change to DC power while power fail which will had a lot of controller or additional circuit need to do which may have more risk for fire case happened.

→ So this is very clear the current invention (USB ports) no like ['148 Meyer] have 2 input power source, One is from (AC-to-DC transformer) while have AC power, one is (secondary battery) while AC power loose!! This is 2 input power sources, so the current invention is totally different for 1. Electric design 2. Concept 3. Construction 4. application→ Hence, ['148 Meyer] is not proper prior art and totally different application, categories compare with current invention.

(21-9) Even, ['148 MEYER USB port 124] is workable. The current invention also made alternative circuit to change for circuit design to make big difference as below:

AC power source into Built-in or external outside transformer AC-to-DC circuit to get $1^{st}$ DC and this 1" DC different with USB-charging port needed 5.0V at minimum 1.0 to 10 Amp or 12 Watt to 60 Watt current to supply LED light source. And At least one of built-in DC-to-DC circuit(s) to change input 1" DC current to $2^{nd}$ and more DC current to supply o distribute at least one of USB-ports, others DC operated additional function(s).

Even, keep the same or revised claim

AC power source into built-in or external outside transformer AC-to-DC circuit to get $1^{st}$ DC which is 5.0Volt minimum have 1.0 A to 5 Amp export DC current to charge other be-charged device(s). And, At least one of built-on DC-to-DC circuit to change the said built-in $1^{st}$ DC current to $2^{nd}$ or more DC current(s) to supply or distribute to at least one of LED light source and other optional DC operated addition DC-operated functions. To overcome the ['148 Meyer] Only one transformer AC-to-DC circuit to get only one DC current have to be 5.0Volt DC to supply following dangerously desk lamp:

(d) charge 4 pcs secondary rechargeable battery (4 pcs lower-level voltage @1.0Voltx4=4.0Volt be charged but full-charged will be @ 1.5V×4=6.0Volt to supply to USB-Port while AC lose to charge be-charge other products to cause exposure!)+

(e) supply to USB charging port (5Volt DC) but while AC lost input will be 6.0Volt to charge other be-charged items to cause exposure or fire hazard+

(f) also supply to LED light source (5Volt DC to LEDs for 400 Lumens, 4 pcs battery is not enough power for this kind of 400 Lumens brightness after go through front lens).

It is appreciated the current invention is unique and is not same as below listed (21) USA pending or patents cases. This also exemplary for all below allowed patents basing on each one had its own features, and each is not able to combine any others pending or patents combination so can get issues:

Other combination and comparison for 12 desk lamp related case(s):

13. {U.S. Pat. No. 6,666,563 Brown} Illumination Device (Apr. 12, 2002 Filed)
14. {U.S. Pat. No. 7,295,608=Reynolds} Desk lamp with therapy LED light (Sep. 26, 2002 filed)
15. {U.S. Pat. No. 7,040,783 CHRISTINSON} Adjustable clamp-on lamp with Ball-head (filed on Apr. 12, 2004)
16. {US 2006,0209-530 SCHAAK} Lamp with personal audio player (Filed Jun. 9, 2006)
17. {U.S. Pat. No. 7,897,277 Meyer US 7,897,277} Desk lamp with USB-port (124) (Filed on Jan. 30, 2007)
18. {US 2008-009-1250 POWEL} Desk lamp with therapy (Oct. 24, 2007 Filed)
19. {'039 PATEL U.S. Pat. Nos. 7,736,033 8,545,039} Desk lamp with Outlet and USB-Port (Field May 18, 2010)
20. {U.S. Pat. No. 8,562,187 SMED} Powered base for a lamp (May 18, 2011 Filed)
21. {U.S. Pat. No. 8,783,936 CHIEN} Desk top items with LED has USB unit or USB Module (Filed Jun. 16, 2011) Reference Cited for [U.S. Pat. No. 7,897,277 B2*3/2011 Meyer et. Al 429/100]
22. U.S. Pat. No. {8,899,797 SCHAAK} Lamp with desk Organizer and electronics stand (Filed on Aug. 6, 2012)
23. {U.S. Pat. No. 9,103,543 MARQUARDT} Lamp tablet docking station (Filed on Jul. 11, 2013) reference Cited for [20100039-792 B2*2/2010 Meyer et. Al 429/100
24. {U.S. Pat. No. 8,915,608 CHIEN} Desk top item with LED has USB-unit or USB-module (Filed on Dec. 13, 2013)

Hereof, To clear make definition for the above discussed many type of the Chargers and each type has its own USB or Outlet specification such as USB-1.0, USB-2.0, or new standard for USB-3.0 or Outlet for 1,850 Watt (for desktop lighted mirror has the USB-charging ports and hair dryer AC outlets), 1,650 Watt (for regular AC outlets not for hair dryer or heater use) as convention market available type which all fall within the current invention scope and claims but these specification is well known and not related to the current invention's parts-name definition, as below:

1. (#U-1)=USB-unit Charger: The Unit means it is an individual charger has only charger purpose to have one input-current and passing though inner own circuit to make input current change to one output current to charger other device from its own USB charging-port(s). This unit can be housed or without any hosing and install within the said desk-top housing and all live-wired or electric-carried parts & accessories not touchable by people except the USB-port(s). Here said CHARGING purpose is to has higher electric voltage from circuit and overcome the be-charged energy storage unit such as the recharge batteries so the energy storage unit can be charged and supply the power to the be-charged device's circuit to use. NOT directly from USB Charging port to SUPPLY the other device DIRECTLY to the Circuit (lack of Energy storage unit) so can supply power for other device has electricity to make operation. The current USB Charging-port is to Charge only the Energy Storage means, not directly to SUPPLY POWER to other device (lack of energy storage unit).

Also, the current invention's USB-Charging port only take 1 and only 1 of the input power source(s) or current and passing through inner circuit to come out the DC current on desired voltage and amperage. It cannot have more than one different input current such as AC or DC current as input current or it will be destroyed totally the output current because inner circuit is fixed for one and only one current specification.

Some applications the USB-Unit is just a USB receiving port which connect with the outside housing's transformer, adaptor, inventor, converter which has its built-in circuit to change from AC power source to DC current and from outside housing into the USB conductive receiving-end allow the inserting USB male-prong to insert to deliver the DC current.→This kind of USB receiving port also is a USB-Unit.

2. (#U-2)=Outlet-unit charger: The unit it is an individual POWER SUPPLIER device and only supply power not CHARGE device which has outlet-receptacle(s) which can receive the other device's prongs to deliver or supply the AC current from the OUTSIDE Housing's outlet-unit power source though the outlet-unit's port (s) conductive piece assembly to other device's prong to get into other device's circuit to power other device. This unit can be housed or without any hosing and install within the said desk-top housing and all live-wired or electric-carried parts & accessories not touchable by people except the Outlet no electric carried outside parts (s).

3. (#U-3)=USB-Module Charger: This module is not a single USB-Unit Charger. It will be any combination for any number of the (aaa) USB-Unit(s) or/and (bbb) Outlet-unit(s) has its own number of the USB-port(s) or/and Outlet-port(s) to connect with other electric wires or USB charge cable and by the said wire or cable plugs to plug into electric or digital data device's female receiving-port which may has all kind of custom-pin construction in Type A, Type B, Type C so can charge by USB charging port(s) for supplying the DC or/and by the Outlet-unit(s) for supplying the AC current to other devices(s).

This unit can be housed or without any hosing and install within the said desk-top housing and all live-wired or electric-carried parts & accessories not touchable by people except the non-carry electric parts of the said USB-port(s) and/or Outlet-unit(s).
4. (#U-4)=Sealed-unit: This is a unit which has desired combination for any number of USB-unit(s) or/and outlet-unit(s) arrangement or combination and sealed or house into one piece of the housing, compartment, space, container and the related circuit(s) and construction have to pass each country's required for related safety standard(s) and get test labs' certification for this sealed unit or construction for the desktop item. The sealed unit only also can pass the related safety standard and get safety certification by itself of USB or/and Outlet sealed unit which not including the other housing parts or accessories non-related to the USB or Outlet.

This sealed unit any live-wire or electric-carried parts & accessories need to be sealed or housing or enclosure within the housing, desktop items, container, space so can pass the US Safety standard requirement(s).

5. (#U-5)=Universal Charger: This is charger which has finished housing and electric-contactor such as prong means, or wired, or quickly-connector(s) which not only can incorporate with the said desk-top items but it also can use for other applications. One of preferred embodiment is market available USB-2.1 Amp Charger has 3 USB-ports with fixed or foldable traveling prongs. This can install within the current invention desk-items housing by wired or outlets or conductive piece assembly and it also can take apart from the desk-top item's housing and carry with people to plug-into Wall outlets anywhere to charger the computer, communication, consumer electric items or any electric or digital data devices while prong means plug-into outlet on wall or power strip's outlets. This is definition for universal charger for current desk-top items.
6. (#U-6)=USB female receiving means on the desktop items=It equivalent to (USB-Charging-ports released on 2007 and upgrade on 2009) to receiving the USB male plugs from USB-wire, USB-cable which has 2 male plugs on 2 wire/cable ends. One is for Type A and one end may for Min-USB or Micro-USB or other custom-pin construction which are same as be-charged device's USB-Female receiving port so can though the USB wire or USB cable or Jump cable or Bridge cable to build the electric current delivery from the desktop USB Charging-ports to charge the other device's inner energy storage items which is rechargeable battery, recharge battery assembly or any type of energy storage device which offer the electricity to desktop item electricity.

The current invention USB Charging-port has big charging capacity min. over 1.0 Amp up 5 Amp or more which as above discussed USB Charging-port standard release on 2007 and upgrade on 2009. Most important is current invention USB Charging-port only for charging function and DO NOT have any electric data delivery. Or/This will slow down the charging speed or make overheat or whatever bad for the said current invention.

7. (#U-7)=Outlet female receiving piece=It equivalent to (Outlet port) to receiving the other electric or digital data device's prong means so can deliver the AC current from outlet-port(s) through the conductive piece or assembly to the other electric or digital data device inserting prongs directly without passing through any electric controller or circuit whenever the prongs insert into the said Outlet female receiving piece.
8. (#U-8)=Desk Top items has more than one functions: Which is a products has LED or other light source which the said LED or other light source including the LED as an indicator light to show charging or charging status, not only limited for LED(s) is a LED light source for supply LED light beam for illumination. The desktop has more than one electric function which means Not only for illumination but also has $2^{nd}$ functions which can make people eye, ear, nose, mouth, skin to see, hear, smell, eat, drink, feel or is a video or an audio or an image or a sound related things. The said $2^{nd}$ function is existing products which available at market for people to buy and put on desktop or any surface where people will stay, work, sleep as above discussed.

The said other light source which including the Bulb, Incandescent bulb, CFL, Energy saving bulb, Florescent tube, PL light or any other light source available from marketplace.

9. (#U-9)=Base of light device: The base including the adjacent pole, bar, stand, step, curved surface, edge, contour or all the surfaces for the base of the light device except the light source and the shade. The said USB-port, USB-unit, USB-module, or Outlet-port, Outlet-unit, Outlet-module, or Sealed-unit, or Universal-unit, or rotatable module can fit within or install or attached or overlay or underlay on anywhere of the said base of the Light device which may has any kind of the light source including Bulb, Incandescent bulb, florescent, LED Bulb, CFL, LED tube, EL, OEL, organic EL.

The current invention also including the Base of Light device has built-in USB-Charging ports and this base or base has built-in light source can sell individually at the marketplace.

These above (9) details description has more clearly for some parts & accessories which use for current invention. It is appreciated that all above listed, discussed, co-inventor pending or co-pending or issued prior arts or embodiment, details, specification, arrangement, constructions has its replaceable, alternative, improvement or equivalent functions should still fall within the current invention scope.

BRIEF DESCRIPTION OF THE DRAWINGS

The desktop system is illustrated in the figures of the accompanying drawings which are meant to be exemplary and not limiting, in which like reference numerals are intended to refer to like components, and in which:

FIGS. 15, 16, 17 is a bottom view of one of preferred a lighting source for an embodiment of the desktop system.

FIG. 16A is one of preferred a lighting source which is LED or CFL bulb powered by AC power application(s).

FIGS. 18, 19, 19A, 20 is an isometric top view of parent filing cases (#CCC) is a rotatable power station for an embodiment of the desktop system.

FIGS. 21-1 and 22 is an LED light has built-in mirror for emit out enough light brightness to front people, objects to show the people or object image into mirror or image capture device.

FIG. 23 is an isometric top view of one of preferred liquid or fluid lava light applications.

FIG. 24 is an isometric top view of one of preferred image or pin-hold image projection LED light applications in an eighth embodiment.

FIGS. 21-1, 22, 25-1, 25-2, 25-3, 25-4 is one preferred desk, floor, wall mounted LED light has built-in plurality of LEDs light source to emit enough brightness to front people or objects to form brighter, clear people or object image into built-in at least one (1) Mirror, (2) Magnify Mirror(s), (3) camera, (4) video, (5) phone with camera, video, or both camera and video.

FIGS. 26-1, 26-2 is one of time, alarm clock with built-in LED '8' segments or 7 LED segments display or LCD display having LED back light display LED light having built-in charging system

FIGS. 30A1, 30A2, 30B1, 30B2, 30B3, 30B4, 30C1, 30C2, 30C3, 30C4, 30C5, 30C6, 30C7, 30D1, 30D2, 30D3, 30D4 is detail description for USB-unit, USB-Module, Outlet-unit, Outlet-module, sealed-unit, Universal unit and all related parts for reference.

FIGS. 30E1, 30E2 is an isometric view of parent filed case some preferred arrangement.

FIG. 30F1 show alternative construction LED light as FIG. 1.

FIGS. 30G, 30H, 30I, 30J show all different outlet with or without $2^{nd}$ or more wire for LED light device.

FIGS. 31, 31A, 31B, 31C disclosure the $1^{st}$ embodiment for floor light or ground lighting.

FIGS. 32, 32A, 32B, 32C disclosure the $2^{nd}$ floor lamp, garden light or ground lighting device has the base with desire USB port(s) or outlet(s) including 6 kind of circuits.

FIGS. 33, 33A, 33B, 33C disclosure the 3rd embodiment for floor light or ground lighting has outside transformer.

FIGS. 33, 33A, 33B, 33C disclosure LED light including the—FIGS. 3A, 3B, 3C, 3D for USB or wireless or USB and wireless charger-unit(s).

FIGS. 34, 34A, 34B, 34C disclosure the $4^{th}$ embodiment which has the plurality of (1) fixed or (2) wired movable, detachable, dis-assemble, re-assemble; USB or wireless charging-unit(s).

FIG. 34B disclosure built-in or added-on table, plate which has also has organizer to allow people to put the stationary, tools, phone, i-pad.

FIGS. 35, 35A, 35B, 35C disclosure the No. 5 embodiment which has base has 120Volt AC power get into the base by prong-wire.

FIGS. 36, 36A, 36B, 36C, 36D disclosure the floor light for indoor applications at marketplace.

FIGS. 37-1 to 37-9 disclosure prefer but not limited for 9 design of the said floor lamp or floor electric device.

FIG. 38 disclosure preferred but not limited for 11 design of the said wall light or lamp for the residence, office, building.

FIGS. 40-40k, 40m-40n, and 40p-40z7 disclosure preferred but not limited for 32 design of the said wall light or wall mounted lamp.

FIGS. 42 to 42e disclosure preferred but not limited for 6 design of the said wall light or wall mounted lamp f.

All details discussion can review co-inventor's US pending or issued patent including (#CCC-10) U.S. Pat. No. 8,998,462 and its child (#CCC-1) U.S. Ser. No. 14/642,169 and (#CCC-2) Ser. No. 14/793,262 filing cases (#FFF=Ser. No. 13/863,073) (#RRR=Ser. No. 13/858,604) (#TTT=Ser. No. 13/870,253) (#A-05 U.S. Pat. No. 7,810,985) (#B-05 U.S. Pat. No. 7,318,653) (#F-05 U.S. Pat. No. 7,651,365).

Figure 51:
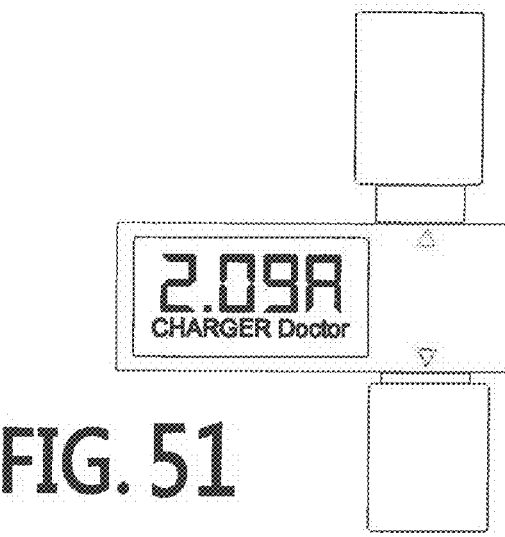
Figure 52:
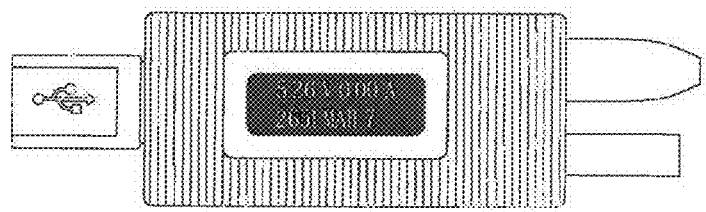

FIGS. 51, 52 show the 2010 announced update USB ports definition and Specification as above background details Wikipedia data.

FIGS. 53A, 53B show one of preferred power strip or extension cord have built-in at least one wired and movable, detachable, dis-assemble, and re-assemble; USB or wireless charging-unit(s).

FIGS. 53C, 53D show USB and wireless unit and each has built-in space for wire-arrangement to arrange wire between main housing and charging-unit for people to coil or roll wire outside the main housing.

Figure 53E:
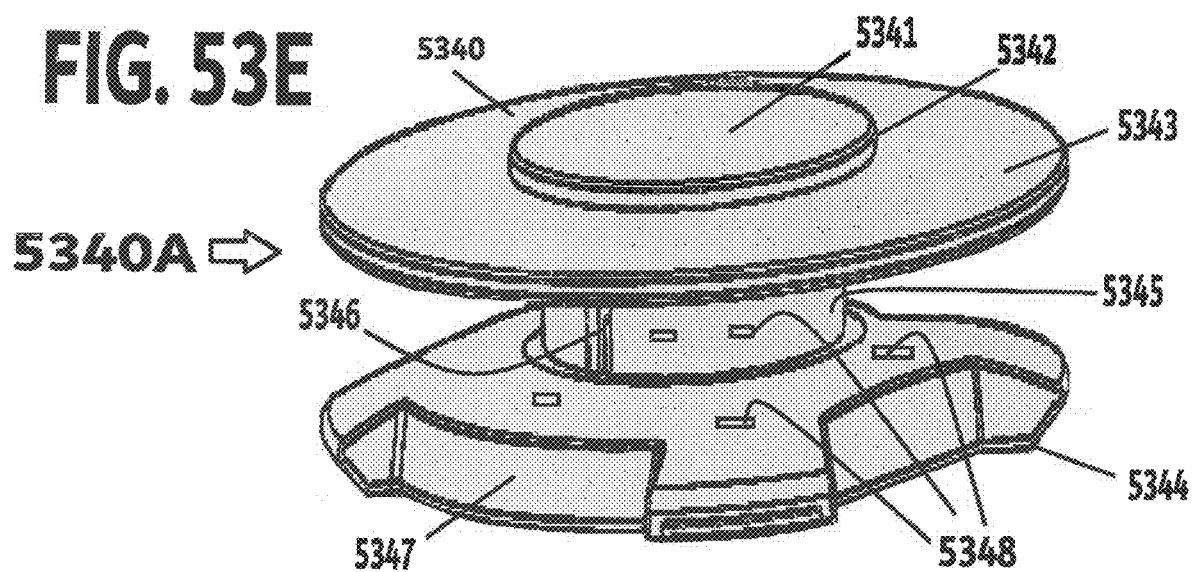
Figure 53F:
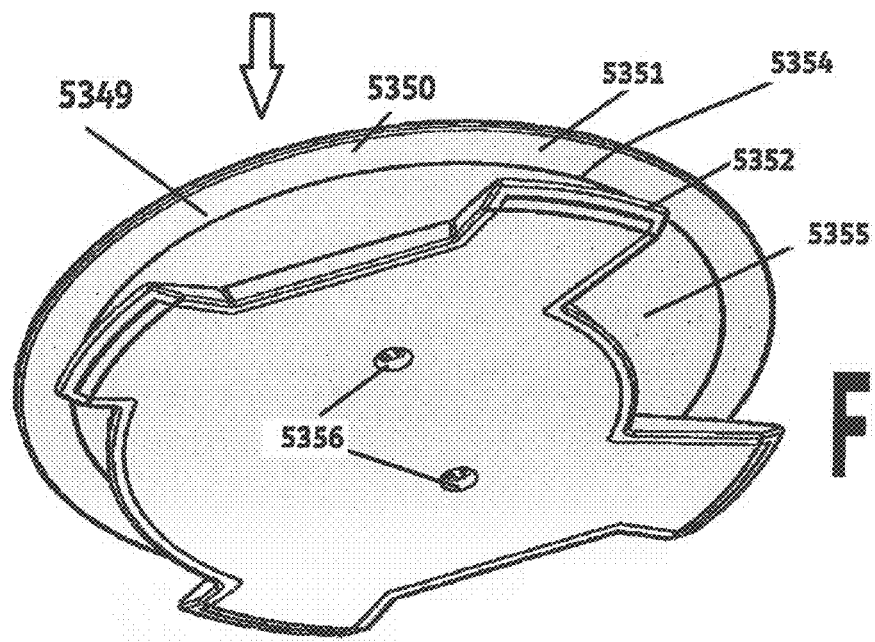

FIGS. 53E, 53F show one of preferred construction of an USB or wireless (Qi) charging-units brief construction on top, side, bottom.

Figure 55:
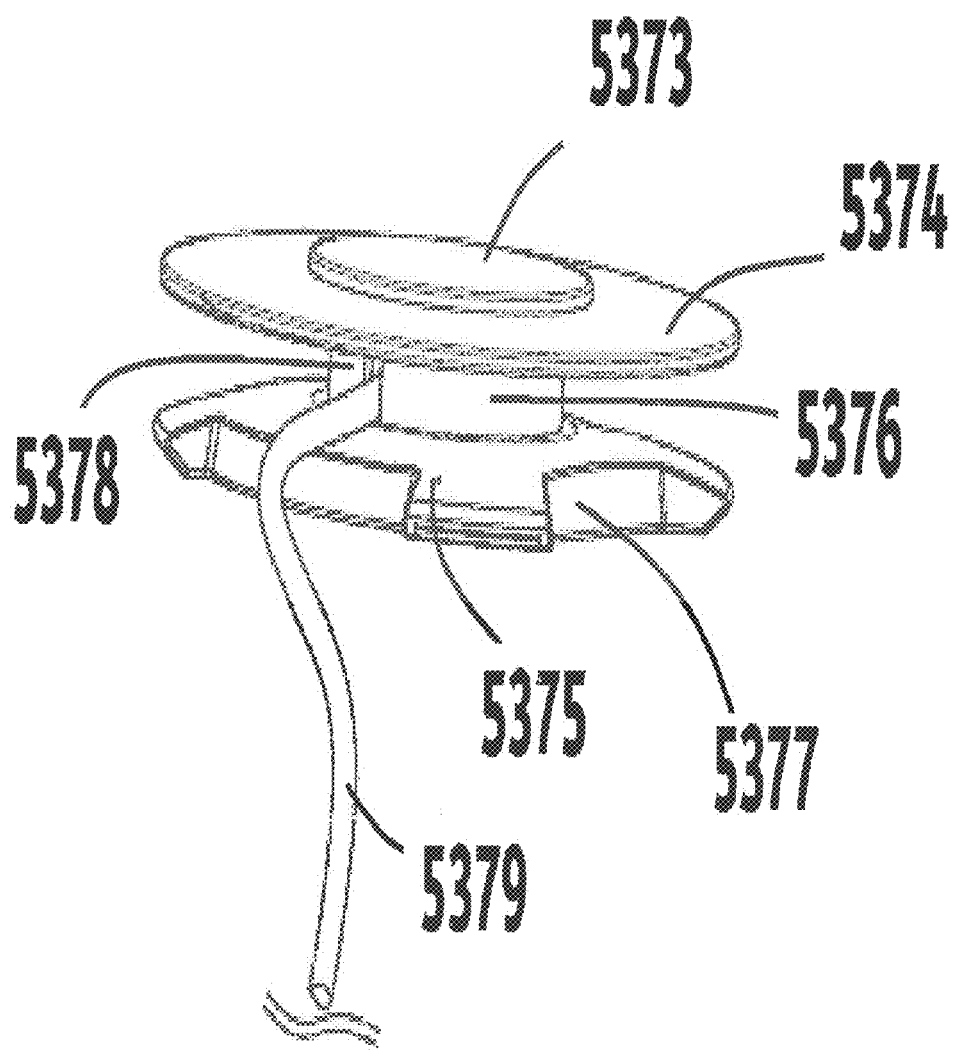

FIGS. 54, 55 show one of preferred construction of an USB or wireless charging-unit with wire from main housing to charging unit(s), and one preferred construction.

Figure 56:
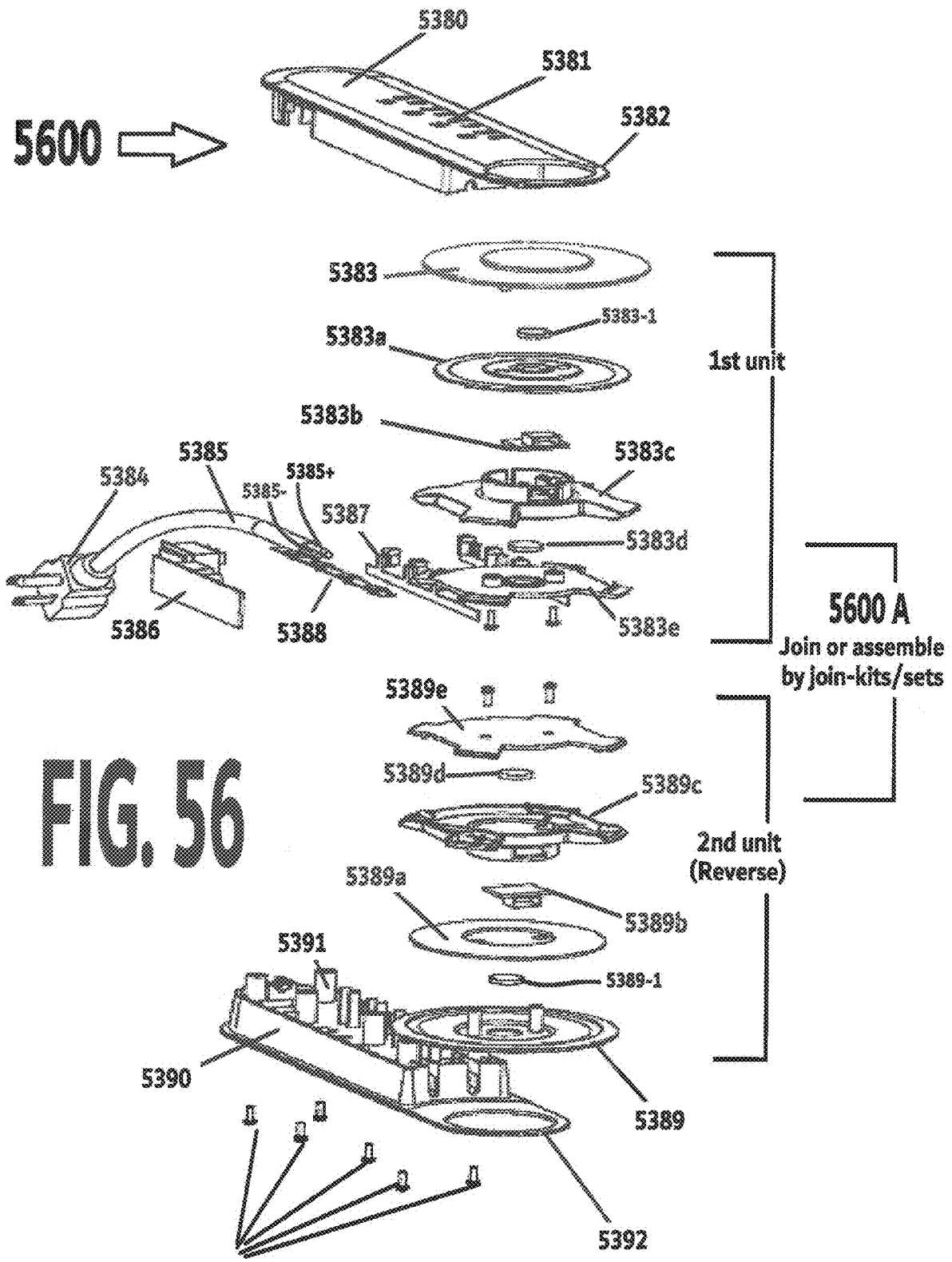

FIG. 56 show one of preferred power strip or extension cord has two charging-units join together to fit within the main housing extension-parts to coil or roll the wire outside of main housing.

FIGS. 57, 58, 59, 60 show some preferred electric products has movable, detachable, dis-assembly, re-assemble USB or wireless (Qi) charging-unit(s) fit within extension-parts or base and each charging-unit has built-in space for wire-arrangement to make simple pull out or receive wire within the space of each charging-unit(s).

surge or other protection circuitry, (B) IC or conductive piece or other electric parts to supply at least one second voltage or Amp DC current to said USB ports or LEDs for illumination or LEDs to show at least one charging, power, surge, and other protection or other status indicator light, and (C) other market extension cord all DC charging-unit(s) is fixed forever on the said main housing of extension cord or all wire arrangement is not built-in said each of detachable charging-unit(s).

DETAILED DESCRIPTION OF THE PREFERRED EMBODIMENTS

The present invention provides improvements over the sealed units disclosed in U.S. patent application Ser. Nos. 12/502,661, 12/292,580, 12/566,322, 11/498,874, 11/527,629, 12/622,000, and 12/624,621 has below details filing and issued date
(#I-1) Ser. No. 12/502,661 filed on Jul. 14, 2009, Jan. 1, 2013 issued (Later than parent filing date)
(#J-2) Ser. No. 12/292,580 filed on Nov. 21, 2008, Nov. 6, 2012 issued (Later than parent filing date)
(#M-1) Ser. No. 12/566,322 filed on Sep. 24, 2009, Pending case
(#K-06) Ser. No. 11/498,874 filed on Aug. 4, 2006, Pending case.
(#L) Ser. No. 11/527,629 filed on Sep. 27, 2006, Oct. 1, 2013 issued (Later than parent filing date)
(#HH-09) Ser. No. 12/622,000 filed on Nov. 19, 2009, May 17, 2013 issued (Later than parent filing date)
(#II-09) Ser. No. 12/624,621 filed on Nov. 24, 2009, and Nov. 6, 2012 issued (later than parent filing date)
, which have uniform dimensions and shapes to fit into the same uniformly dimensioned compartment and thereby enable the universal sealed unit to fit into a variety of LED light devices. This invention has more features, functions, and effects to allow people to buy any electric device or digital data device with the additional convenience of including outlet-unit(s) to supply electric power to other device(s), or USB-unit(s) to supply different types of electric power to other device(s). The current invention uses a universal module which can have any combination of the following parts or accessories, including: circuit, conductive piece, contactor, receiving ends, output-ends, input-ends, electric parts and accessories, prong(s), rotating kits, cable with a plug, cable with USB-plug(s), printed circuit board, flexible printed circuit board, wires, a cable, a digital data cable, a conductive piece, or any related electric parts or accessories available from the marketplace to get electric power from a prong-cable, USB-cable has USB-plug(s), prong(s), or USB-receiving port has all kind of custom-Pins, outlet-unit's or USB-unit's receiving-end(s) (hereafter as outlet-ports or USB-ports) and supply power to a variety of electric devices.

The universal module has a same power-supplying function as the "sealed-unit" for the "LED light devices" described in the inventor's issued U.S. Pat. No. 8,342,732 (#I-1), U.S. Pat. No. 8,305,846 (#J-2), U.S. Pat. No. 8,231,246 (#EE-1), U.S. Pat. No. 8,002,456 (#GG-08), U.S. Pat. No. 7,726,839 (#V-08), U.S. Pat. No. 7,726,841 (#W-08), U.S. Pat. No. 7,726,869 (#Y-08), U.S. Pat. No. 7,618,150 (#S-07), and U.S. Pat. No. 7,722,230 (#AA-08) and U.S. patent application Ser. No. 12/566,322 (#M-1), Ser. No. 12/073,889 (#X-08), Ser. No. 12/894,865 (#T-1), Ser. No. 12/003,809 (#V-08) or the "outlet device" of the inventor's U.S. Pat. No. 7,824,185 (#BB-08). Furthermore, the interchangeable "sealed-unit or battery-pack" of the inventor's U.S. patent application Ser. No. 12/622,000 (#HH-09), Ser. No. 12/295,562 (#HH-1) also utilizes concepts shared by the present invention.

Figure 1:
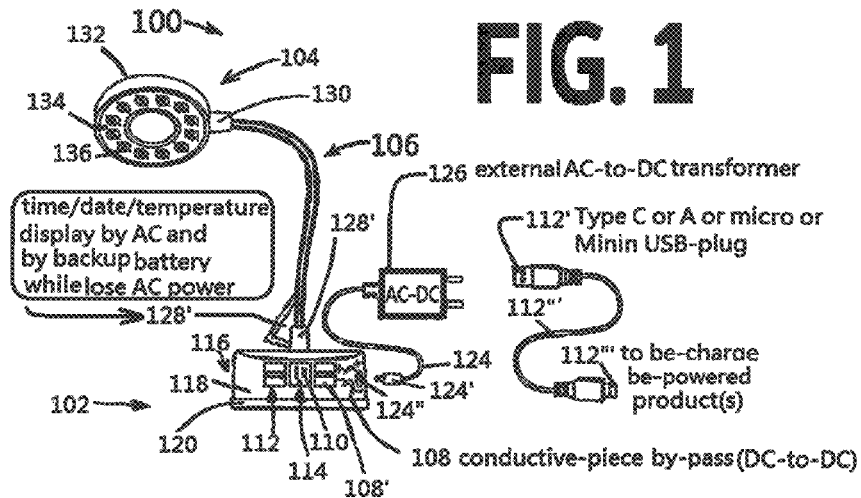
FIG. 1 is an isometric side view of one of preferred the desktop or floor or wall mounted lighting in a first embodiment.

FIG. 1 is a front view of one of preferred desk, floor, wall-mounted item or light or electric device or at least power strip, extension cord, power station (not plug-in transformer) (100) has at least one (A) plurality LED (136) in-series or in-parallel connection for preferred geometric spacing or arrangement, and at least one (a) fixed, or (b) wired movable, detachable, dis-assemble, re-assemble, separate able charging-unit(s) selected from wireless charging-unit (32808 of FIG. 32, 33808 of FIG. 33) or USB-unit(s) (112) has USB Charging-port(s) (108'). Said one of wireless (Qi) or USB charging-unit(s) as above discuss specification released on 2007 and upgrade on 2010 preferred having charging capacity minimum 2.1 Amp to 20 Amp or higher than 20 Amp (or, from 5 watt to 100 watt). Wherein, the said fixed or movable wireless (Qi) or USB Charging-unit(s) does not have digital data or electric data delivery. Any products before 2007 out-of-date USB charging from the USB port only 500 ma which is too small and too slow charging speed and may has over-heating for fire risk. The current invention's said USB charging-ports has more strictly for USB Charging port(s) material, specification for quick charging function(s) having minimum 2.1 A to 20 Amp for USB charging-unit as FIGS. 30-1, 30-2, 30-3, 30-4 description including preferred combination selected from USB-unit, USB-module, Sealed-unit, Universal-unit, or USB module arrange or fit within at least one (A) desktop, floor, and wall-mounted LED lighting or item(s), or (B) at least one power strip, extension cord, and USB power station; having minimum 2.1 Amp or higher amperage such as 3.1 Amp, 3.4 Amp, 4.8 Amp, 7.2 Amp, 9.6 Amp for public area for many people use at same time.

The current inventions disclosure the history of i-phone development including (A) 2007 had $1^{st}$ i-phone, (B) 2012 discontinue legacy ports (multiple pin device) and change to incorporate with USB port(s) which is one of female receiving-port to receive male-plug of USB-wire which has at least two male-plugs, (C) from 2019 i-phone start have quick wall USB-charger has output over 10 Watt or 2.1 Amp up to 30-40 Watt follow Samsung 2018 for quick charger. The said USB development on the above discussion to make clear definition for quick charger, before Samsung 2018, phone supplier does not have more than 15 Watt. This is one of difference with USB charging port before 2007. Even, USB specification been discussed inside Physics textbook or initial USB specification discussed and announced decades ago but marketplace do not have charging capacity bigger than 500 ma and majority power is from computer output-end not from plug-in outlet charger.

Furthermore, current invention for charging-unit(s) has big difference with market USB charging-port preferred, the current invention USB charging-unit(s) and its built-in USB-port(s) only output or deliver DC power and does not have any digital or electric data delivery. Move out data delivery of current invention has big improvement including (A) save wire cost for (i) between AC-to-DC output end(s) and wired charging-port(s), (ii) external jump or link USB-wire; because move out data delivery, the wire only need two electrodes copper wire inside for positive and negative electricity and no need other 2 electric-poles for data delivery, or (B) (BB) increase the flexibility of wire so can easily coil or wrap or roll the wire for preferred wire-arrangement. The current invention only have DC power delivery by 2 cooper wire inside compare with wire delivering DC power and data delivery needed 4 copper wires inside so wire become more easy bend, coil, roll, wrap within space of wire-arrangement.

From FIG. 1, show one of preferred examples which is not limited all alternative, replacement, equal functions for specifications, arrangement, installation. Wherein, the desk, floor, mounted item or light or electric device(s) (100) built-in USB-Unit(s) (112) has USB Charging-ports (108) for charging at least one (a) energy-storage unit or assembly, (b) the rechargeable batteries (not shown); inside the other electric or digital data device(s). Wherein, FIG. 1 is one of preferred desktop, floor, wall-mounted item, light, or electric device(s) or at least power strip, extension cord, power station (not plug-in transformer) (100) has 2 USB-units (112) and 1 outlet-unit (114) on base front wall, or preferred arrange on back or attached, added housing parts (128'). Hereof, the current invention preferred to arrange USB-Unit (s) or Outlet-unit(s) on base front wall, so people can easily to reach without move or turn direction of the items to use USB or outlet unit(s). However, for Outlet-unit(s) or Outlet-Module(s) can put on back because it may only one time installation to supply power to the other electric device(s) such as printer, scanner, fax machine, and not every-day need to plug into the Outlet-unit or Outlet-Module. For some consumer, prefer to put on front or sides for easily operation because they use laptop computer daily.

The first one of preferred desktop, floor, wall-mounted item, light, or electric device(s) or at least power strip, extension cord, power station (not plug-in transformer) (100) has 12 LED USB light powered by a DC power source through USB-wire male plug (112') or external transformer (126) having a round or barrel plug (124').

Wherein, for built-in desktop, floor, wall-mounted item, light, or electric device(s), or at least power strip, extension cord, power station (not plug-in transformer); (a) transformer 126), (b) AC-to-DC (612*c* of FIG. 6), or (c) inside circuit-kits (612*c* of FIG. 6); has same function as the external transformer (126) or external DC power source (not shown).

Wherein, at least one of said (a) transformer (126), (b) AC-to-DC circuit (612*c* of FIG. 6), or (c) inside circuit-kit (612*c* of FIG. 6) to change AC power source current into $1^{st}$ DC current to supply to the light, extension cord parts which need the highest DC voltage.

Figure 6:
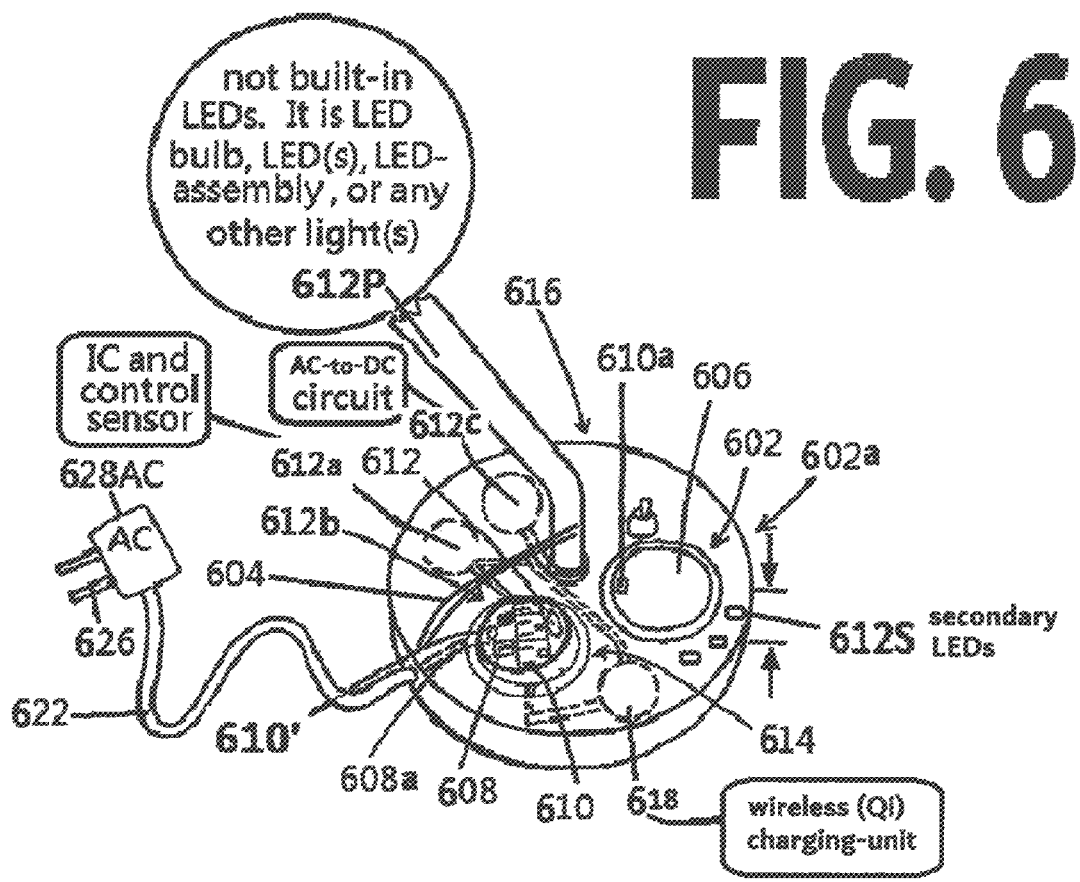
FIG. 6 is an isometric view of light applications in an alternate configuration.

One of alternative power system for current invention as FIG. 6, The items, light, or extension cord has AC-Plug wire (628AC) connect with the AC outlets and get the AC current into the inside desktop, floor, wall-mounted item, light, or electric device(s), or at least power strip, extension cord, power station (not plug-in transformer) circuit-inner which has at least one of the transformer (not shown), AC-to-DC circuit (612*c*), circuit-inner (612*c*) to make said item, light, extension-cord input AC current to change to 1st DC current and go through other or at least one electric parts & accessories (612*a*), DC-to-DC circuit (612*a*), IC (612*a*) to adjust, arrange, distribute said the $1^{st}$ DC current to at least one or more different DC voltage or DC Amp $2^{nd}$ DC power or current to deliver the $1^{st}$ or/and $2^{nd}$ DC current into said at least one (a) USB (608) or wireless (Qi) (618) Charging-unit(s), (b) primary LED (612P) or secondary LED (612S) light source.

From FIG. 1, show one of preferred embodiment are powered by (A) male USB plug (112') of external DC power source USB wire (112") or (B) round barrel plug (124') of external transformer (126) wire (124). Wherein, female USB receiving or input port(s) (108) or export DC power USB-unit (112) both has said 2010 specification of quick charger USB charging-unit(s). The embodiment includes an adjustment arm (106). Hereof, the 12 LEDs (136) as primary light source for people reading or working or selfie illumination to offer enough, different white color area illumination.

Figure 50:
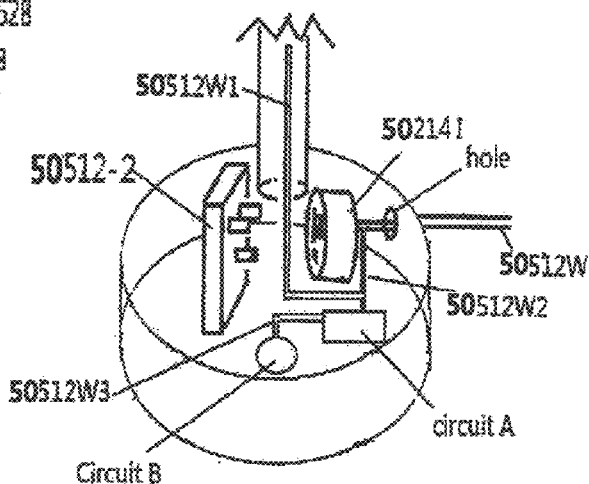

FIG. 1 is a front view of one preferred desktop, floor, wall-mounted item, light, or electric device(s), or at least power strip, extension cord, power station (not plug-in transformer) (100) has built-in LED light source (136) which has different kelvin temperature white color LEDs to let people change, select, mixing cool-white and warm-white light beam for working, reading, selfie. The embodiment (100) having export DC power USB-unit(s) (112) and input DC power USB charging-port(s) (108). Wherein, the said quick charging specification which define DC power delivery has minimum 2.1 Amp as viki-encyclopedia experiment data FIGS. 50, 51, and specification required said USB Charging unit only can delivering DC current without any digital data transmit functions.

FIG. 1, show the $1^{st}$ one preferred embodiment of item, light, extension cord (100) can charge rechargeable batteries inside other electric or digital data device(s) minimum from 2.1 Amp or higher as definition of quick USB Charging system. From FIG. 1, the embodiment (100) has 2 USB units (108) (112) and 1 outlet-unit (114), built-In 12 LEDs (136), and is powered (A) by a USB-plug wire (112') from external DC power source, or (B) by a round or barrel plug-wire (124) from external transformer built-in AC-to-DC circuit to change input AC power to DC power. The said export DC power USB charging-unit(s) (112) supply minimum 2.1 Amp matching 2010 definition of quick charging system. Wherein, said one of male plug of USB-wire (112") is for input DC power connected with one of external DC power source or external AC-to-DC transformer (126) power source, or be-charged, be-supplied DC power device, and at least one others mal plug of USB-wire is output DC power to be-charged or be-supplied power device female USB-port(s).

From FIG. 1 show the base of item, light, extension cord having input receiving-port(s) (124") which connect with built-in base conductive piece (108) to deliver the input power directly to said DC USB output-port(s) (112); while the input DC power is same as the USB output power. This directly by-pass the input DC power to export DC power USB export-port can save a lot of money, time, resource to make built-in AC-to-DC circuit which need go through a lot of expensive laboratory test fee to get safety certification.

Furthermore, From FIG. 1 also show one extra frame, rack, housing parts (128') is one of install, arrange, add on, dis-assemble, re-assemble, movable to install or arrange at least one (a) displayer to show at least one time, date, temperature, '8 shape" LED segment(s), LCD displayer having LEDs back-light illumination, wireless charging-unit(s), diffusor, air-flow device, air-freshener, air-fragrancy, essential oil sprayer, and other electric function or device(s) as column notes.

Figure 2:
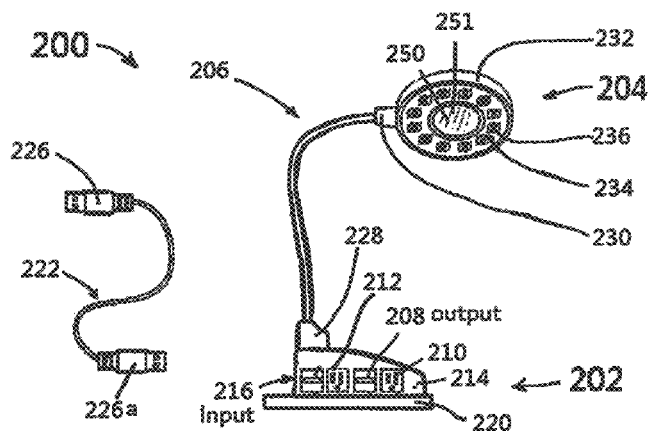
FIG. 2 is an isometric side view of one of preferred the desktop or floor or wall mounted lighting in a second embodiment.

FIG. 2 is a side view of the desk top items of the first preferred embodiment has a preferred shape, or preferred diameter round or circle; light source housing (232) for 12 space-apart LEDs (236) offering enough brightness for people reading, work, selfie. Wherein, the light source housing (232) has inner space (250) to fit at least one (a) a mirror, (b) magnify lens, and (c) mirror and magnify lens (251). While LED light emit enough brightness to front people, object(s), or surface or desktop; for people to operate at least one (a) work, (b) reading, (c) makeup, (4) make cosmetic, and (5) handle selfie; through the said built0in mirror and-or magnify lens/mirror to get at least one (i) reflected face, body, environment image on mirror, (ii) enlarge the image to reading or see, (iii). The lens, mirror, or combination let people to see or magnify image or object(s), surrounding area(s). It also makes said be-lighted objects has super big size and clear image for aged people easily read. Wherein, the embodiment (200) has flexible hose, arm, pole, extendable and retractable bar (206) to bend to fix distance against the front people and/or objects to let people not hold by hand for long time.

FIG. 2 is a side view of the first preferred embodiment of a desk top item (200) has LEDs (236), 1 USB-unit for output power (208), 1 USB-unit for input power (216), 2 outlet-units (210) (212) on the side of the base (214). The LED light has 12 LEDs (236) and USB-Plug-Wire (222) has at least two male plug(s) (226) (226a) similar with above discussed model which powered LED light (206). Said the export DC power USB-unit(s) (208) has number of USB-port(s) to quick charge the other electric or digital device built-in energy storage unit or assembly including recharge-able batteries (not shown).

Figure 3:
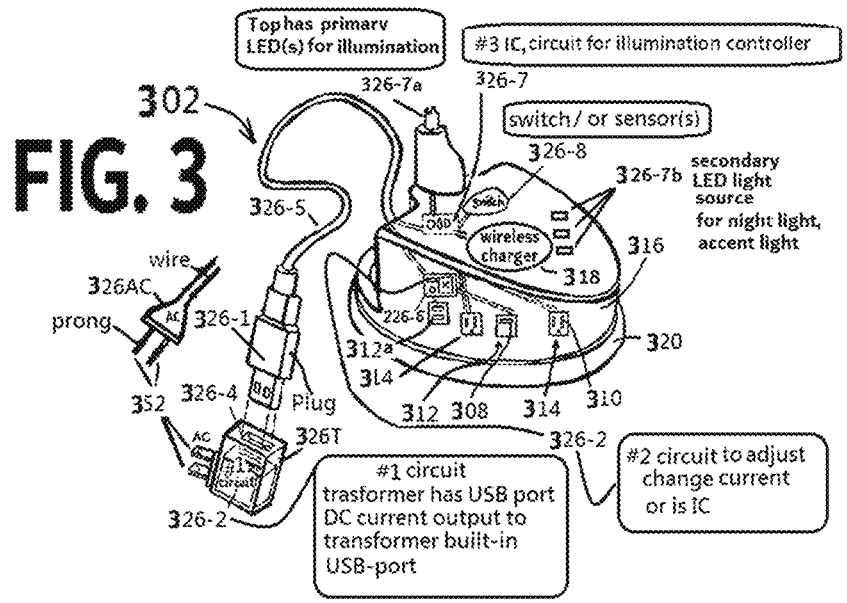
FIG. 3 is an isometric view of one of preferred base unit of FIG. 2.
Figure 3A:
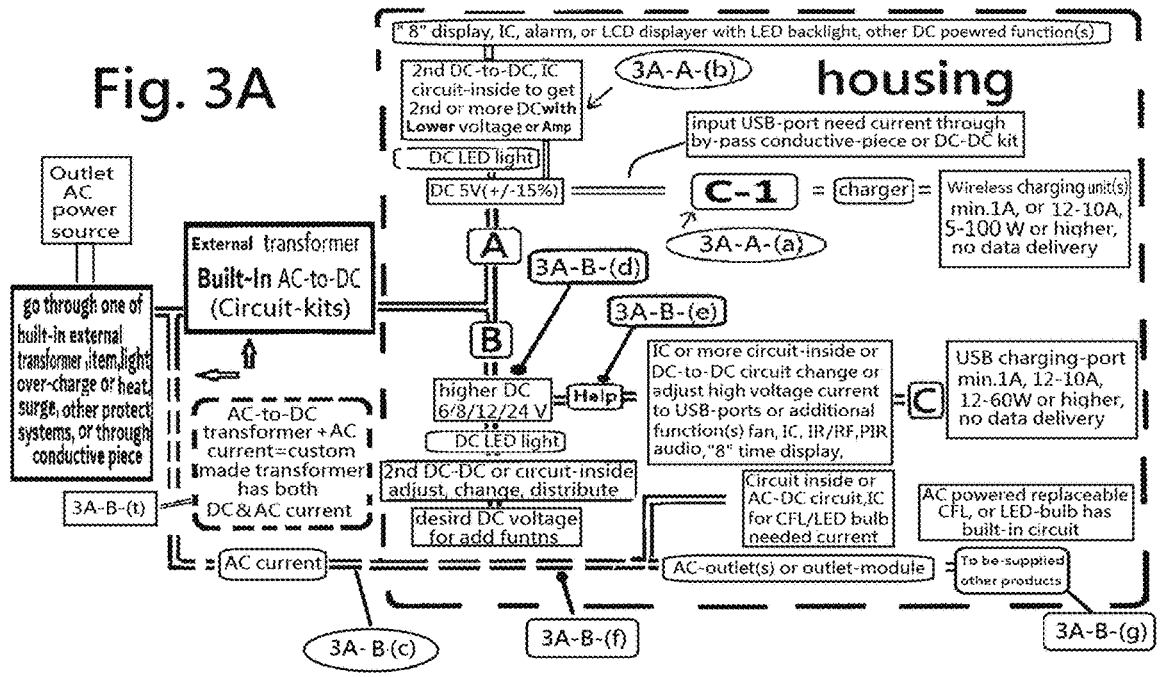
FIG. 3A and FIG. 3B is one of preferred an working diagram for the power source, USB Charging ports, light source, Outlet-unit with related circuit-kits, circuit-inner, more than on circuit-inside & IC & DC-to-DC relation of the base unit of FIGS. 1 to 13 and FIGS. 32 to 50.
Figure 3B:
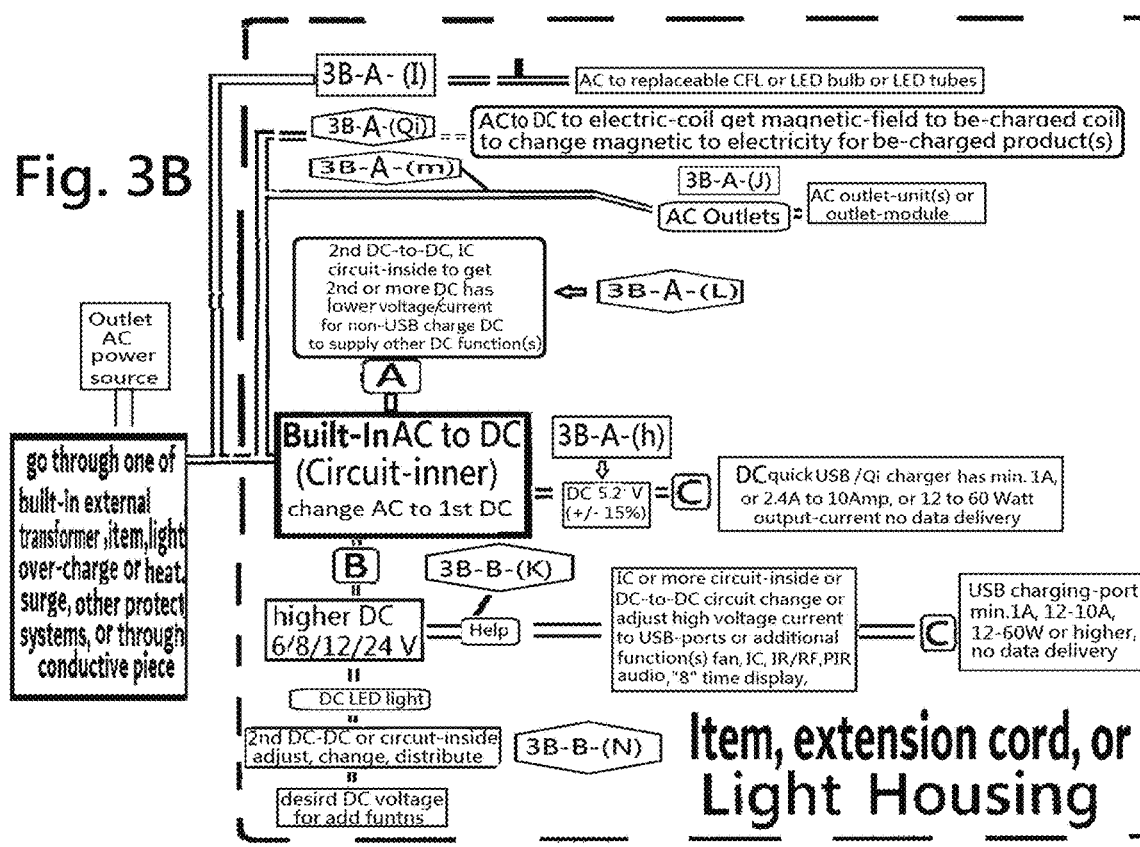

FIG. 3A and FIG. 3B shows the preferred working charter for same AC power source though at least one AC-to-DC transformer, circuit-kits, and circuit-inner get the 1st DC power at desired DC voltage or DC Amperage. The said item, light, extension cord optional arrange to supply AC current to said Outlet-unit or outlet-module. The 1st DC current supply to any combination LED(s), 2nd or more, or colorful LED light source, additional function(s), wireless (Qi) charging-unit(s) depend on different consideration. The item, light, extension cord further incorporated with at least one IC, DC-to-DC circuit, circuit-inside, conductive piece, and electric parts to make change, adjust, lower, distribute, and arrange 1" DC current to $2^{nd}$ DC current or more different voltage or/and Amperage DC current to supply to the Built-in LED, LED bulb, EL element, Organic EL element (Or called OEL), or other DC operated IC, added functions.

From FIG. 3A

→ This is AC power source connect outside AC-to-DC transformer which has or does not have built-in at least one surge protection, over-heat or voltage, or other electric protection system which external or built-in items, light, extension cord AC-to-DC circuitry change input AC power for 1" DC power or current.

3A-A: (a) From $\boxed{A}$ show the $1^{st}$ DC power or current is 5V DC (+/−15%) or alternative 6 or 12 VDC → offer to DC LED light source, or 1st DC go through at least one 2nd DC-to-DC, IC, conductive piece, and circuit-inside $\boxed{3A\text{-}A\text{-}(b)}$ to get 2nd or more different voltage, amperage DC power or current to supply, distribute, offer to at least one (i) "8 shape" LED segment(s), (ii) LCD displayer having LED back light, (iii) IC for time operation, (iv) alarm, (v) speaker, (vi) air flow, fan, or air condition device, (vii) essential oil, humility, stem, moisture, air fragrance, air freshener diffusor, (viii) built-in other or additional electric function(s), device(s), and (ix) at least one (a) fix, (b) wired movable, detachable, separate able, dis-assemble, and re-assemble; USB and wireless charging-unit, (b) From $\boxed{3A\text{-}A\text{-}(b)}$ one of alternative example said 1st DC power or current (5 VDC) or alternative 6 or 12V DC though the DC-to-DC circuit, or IC, or more than one of the circuit-inside to get 2nd DC power or current at DESIRE Voltage → To make operation for the Built-in LEDs, DC Powered light source, or DC powered optional other function(s).

(c) From $\boxed{3A\text{-}A\text{-}(a)}$ or $\boxed{C\text{-}1}$ shows the DC 5Volt arrange to item, light, extension cord built-in circuit, coil piece to supply wireless charging-unit(s) for wireless charging function. It is appreciated the said DC 5V can be DC 12V for alternative output DC voltage from external transformer AC-to-DC circuitry.

(d) From $\boxed{3A\text{-}B\text{-}(c)}$ shown one of optional, the item, light, extension cord having separated AC wire to supply input AC power to built-in female receiving outlet-port(s) of Outlet-unit or Outlet-module to supply AC power to external AC operated product(s) while product male AC plug insert into female receiving outlet-port(s).

3A-B: (d) Form $\boxed{B}$ or $\boxed{3A\text{-}B\text{-}(d)}$ show the $1^{st}$ DC current having preferred any DC Voltage and Amperage which may as 6, 9, 12, 24 higher volt than Wireless and-or USB charging-port(s) DC Volt but these higher DC voltage power is good (1) for lower cost because market already had for decades and cost is very low, (2) to directly or through DC-to-DC circuit to supply to at least one (1) DC powered built-in LED(s) connect in-series or in-parallel or both in-series and in-parallel which need higher than charging-unit(s) needed voltage, (2) other DC powered electric parts & accessories, (3) or elements for desired functions, and (4) wireless or wired charging-unit(s) needed higher input DC power.

(e) From $\boxed{3A\text{-}B\text{-}(e)}$ shown the 1st DC current through at least one IC, DC-to-DC circuit, built-in circuit, circuit-inside, and more than one of circuit-inside to change the 1st DC power or current to 2nd DC or more different voltage and-or amperage DC power or current such as one preferred example show through (help) $\boxed{3A\text{-}B\text{-}(e)}$ to get $\boxed{C}$ USB or wireless charging-unit(s) needed DC Volt power or current after said 1st DC power or current went though the change or adjust or distribute proper DC power or current to said Wireless or USB charging-units.

(f) Optional, the item, light, extension cord device has AC power after go through surge protection circuitry or conductive piece go through AC wires as shown on 3A-B-(f) to supply AC power to at least one (1) female receiving outlet-port(s), (2) AC powered LED bulb or CFL Bulb which has built-in at least one AC-to-DC circuit, IC, circuit inside, distribution, wireless control system to make said LED or CFL bulb for desired function(s), light effect(s), color(s), brightness by control, adjust, setting, remote system, switch.

(g) From 3A-B-(t) Optional, the item, light, extension cord device may has the custom made special outside transformer or is separated AC wires outside the market regular 6, 9, 12, 24 DCV transformer to save the cost to make the special custom made transformer.

(h) From 3A-B-(g) optional, said item, light, extension cord has the 2nd AC light source which is not same as the above LED(s) or DC powered light source.

From FIG. 3B

→ This is AC power source go through at least one surge protection, over-heat protection, over-charge protection, short-circuit protection circuitry, GFCI protection circuitry, other protection circuitry, and conductive piece; directly get into item, light, or extension cord housing for 1st AC current and connect with inside AC-to-DC transformer for 1st DC current. A 3B-A: (h) From FIG. 3B 3B-A-(I) shown, the 1st AC current is (120 ACV) through at least one protection circuit, and conductive piece; get into said item, light, or extension cord inner AC-to-DC circuit to get one of 1st DC power and said $1^{st}$ DC power go through more circuit-inside to change or arrange the one of 1st DC current to $2^{nd}$ more lower DC power or current to offer built-in circuitry, IC, wireless signal receiver, IR or RF receiver, Wi-Fi receiver to set, adjust, change, select at least one color, brightness, color mixing, color changing, freeze color, automatically changing color, bright or dim light, sensor or no-sensor light, function selection(s) and (i) From 3B-A-(Qi) The $1^{st}$ AC current is (120 ACV) to get DC supply the built-in electric-coil sets to change DC to magnetic-power and wireless to supply magnetic-power to be-charged products receiving magnetic or electric coil to change magnetic-power into electric DC power to charge be-charged products built-in rechargeable battery or energy storage unit(s), and (j) From 3B-A-(m) shown the 1st AC power through conductive means or wires to supply AC power to at least one female receiving AC-outlet port(s). From 3B-A-(m) shown optional for item, light, or extension cord has AC conductive wire to connect with Outlet-unit or outlet-module or universal kits or sealed unit which has built-in AC receptacle kits or assembly.

(k) From 3B-A-(L) or A shown the 1st AC power went through at least one (1) surge, GFCI, short-circuit, over-heat, over-charge, or over-load protection circuitry, (2) conductive-piece and get into built-in AC-to-DC circuit to get $1^{st}$ DC power having different voltage or different amperage with USB charging-unit(s) needed to supply power for built-in DC operated function(s), device(s). wherein, said $1^{st}$ DC power go through at least one DC-to-DC circuitry, inner IC, more circuit-inside, wired or wireless control system, one of blue tooth, IR, RF, Z-way, Zigbee, Wi-Fi or other wireless controller(s), and just go through conductive wire; to supply the said $2^{nd}$ DC to at least one Wireless or/and USB charging-unit(s) and other preferred DC powered function(s) or device(s) built-in said item, light, or extension cord.

(K) From 3B-A-(h) or C The $1^{st}$ DC current is DC 5.2 or higher than 5.0Volt so can make quick USB Charging functions from built-in USB output end has 5.2 or higher than 5.0V DC current to charge other products' inner rechargeable batteries. and

3B-B:

(L) Same as 3B-A-(I) shown the $1^{st}$ AC current is (120 ACV) may supply the 120 VAC to the AC powered light source including CFL or CFL bulb which has pre-arranged or built-in AC-to-DC circuitry to change input AC power to DC power for internal at least one LED(s), IC, control circuit, wireless controller receiving system, one of blue tooth, IR, RF, Z-way, Zigbee, Wi-Fi or other wireless controller(s), and just go through conductive wire. Wherein LED or CFL bulb has screw base or other base to connect with input AC power.

(M) Same as 3B-A-(m) shown one of preferred optional has the $1^{st}$ AC current has conductive wires to connect with the outlet-unit or outlets-module. And, also, (N) From _____ or B show one of preferred optional for item, light, or extension cord has $1^{st}$ DC current come from inside housing AC-to-DC circuitry is higher DC voltage which higher than USB charging-unit(s) needed and it is at least one 6, 9, 12, 15, 18, 24 Voltage having preferred amperage current to supply power to the at least one non-USB charging-unit(s), DC powered light source, and optional added or other DC power products for desired functions.

Figure 3C:
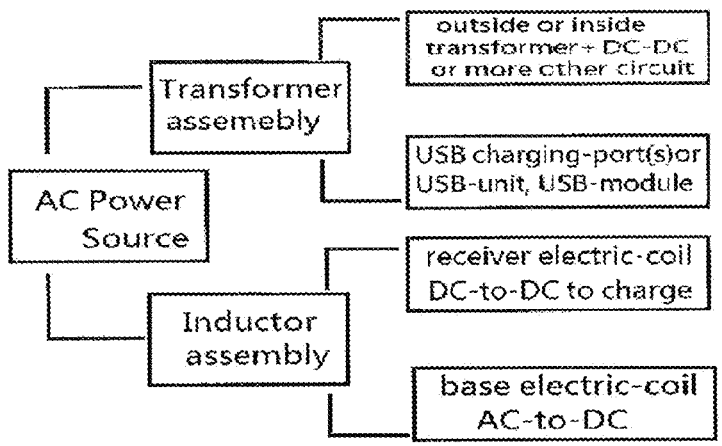
FIG. 3C show two charging systems comparison for (1) USB charger (2) wireless (Qi) charger and parts difference configure to desktop, floor, wall mounted LED lighting device(s).
Figure 3D:
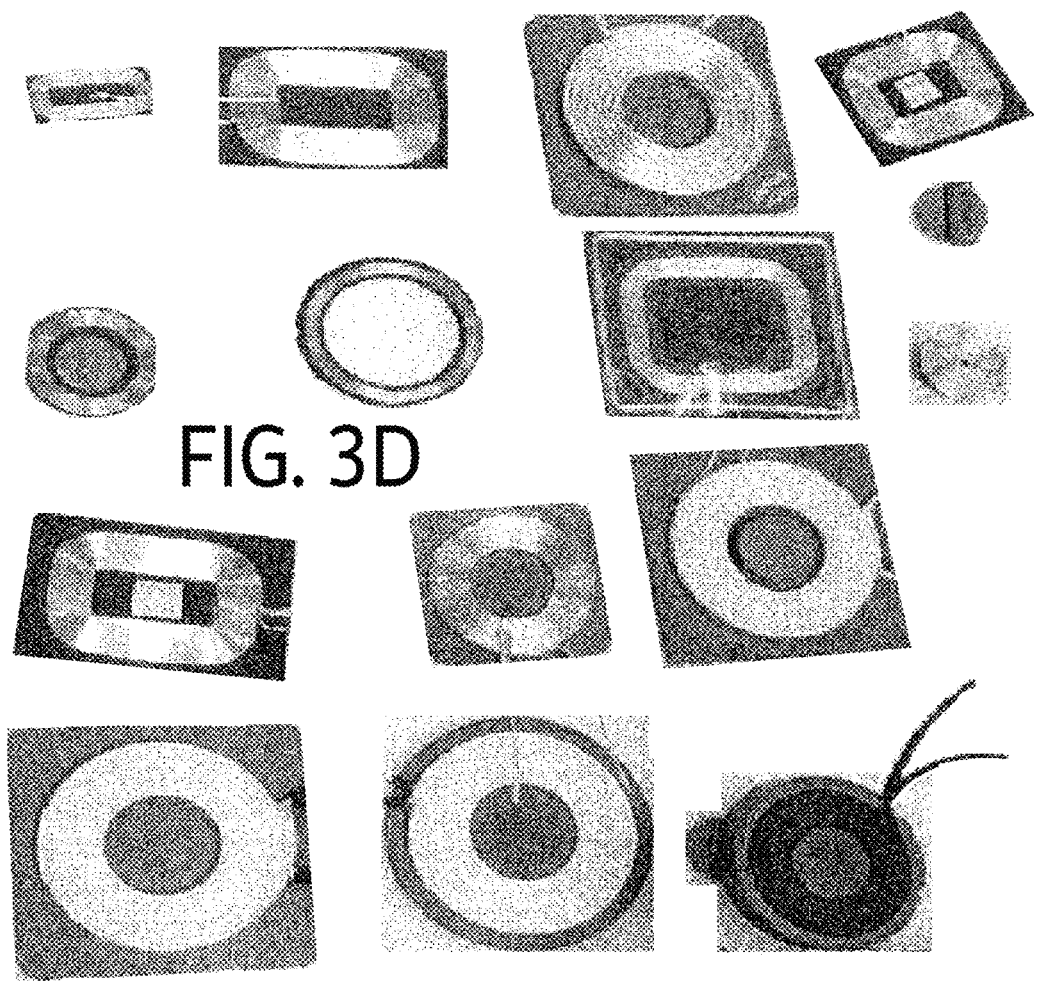
FIG. 3D shown preferred some electric-coils size and wire thickness for different electric-coil configure to desktop, floor, wall mounted LED lighting device(s) and received-end electric coils.

FIG. 3C and FIG. 3D show 2 charging system comparison for (1) USB charger (2) wireless charger and parts difference. FIG. 3D shown all kind of electric-coils size and wire thickness for different base electric-coil and received-end electric coils.

FIG. 3C show two charging systems comparison for (1) USB charger (2) wireless (Qi) charger and parts difference configure to desktop, floor, wall mounted LED lighting device(s).

FIG. 3D shown preferred some electric-coils size and wire thickness for different base electric-coil configure to desktop, floor, wall mounted LED lighting device(s) and received-end electric coils.

FIG. 3 is an isometric view of one of preferred base (320) of FIG. 2 having at least one (a) fixed, (b) wired movable, detachable, separate able, dis-assemble, and re-assemble; USB (308) or wireless (318) charging-unit(s), for at least one desk, floor, wall mounted LED light or other electric device light application (302) with all kinds of alternate configuration.

From FIG. 3 shows a preferred embodiment (302) has outside transformer (326T) connect with AC power source by prongs (352) or AC-Plug & Wire (326AC). The said desk top item, light, extension cord (302) has 4 receiving-ends (310) (312) (312a) (314) including one USB-unit(s) (312) (312a) having numbers of USB-port(s) (308) to share preferred output power from AC-to-DC circuitry (326T) to charge the energy storage unit or assembly of item, light, extension cord (302). The item, light, or extension cord (302) not only have USB Charging-ports (308) or-and Wireless (Qi) charging-unit(s) (318), but also supply AC power by outlet-port (314) of outlet-unit (310) for AC operated electric or digital data device(s). Wherein, the said DC charging power output from AC-to-DC (326T) circuitry is one of 1,000 ma, 2,100 ma, 2,400 ma, 4,500 ma, 6.9 Amp, 9.0 Amp depend market wanted for family or office where need a big charging capacity to charge in short time. Wherein, said D.C. power output from at least one USB-units (312) (312a), wireless (Qi) charging-unit (318), and A.C. power output from outlet-unit (310) to charge or supply external electric or digital data device(s) such as an iPhone™ and iPad™ for DC current by USB-unit's (312) (312a) USB Charging-port(s) (308) or by wireless charging-unit (318). Said item, light, or extension-cord (302) supply AC power to others device such as laptop computer by outlet-unit (314). Said item, light, or extension-cord supply not only external AC, DC powered product through USB-unit (312) (312a), Wireless charging-unit (318), outlet-unit (314) for different DC or AC power but also has at least one primary LED light source (326-7a), and secondary LED light source(es) (326-7b). Wherein, said item, light, or extension cord (302) has DC light source available from marketplace for any desire type including at least one LED bulb (FIG. 16A), CFL bulb (FIG. 16A), fluorescent tube, or Energy saving light source, EL or OEL, LED light source; may has bulb-base (FIG. 16A) need to install inside lamp or bulb holder (not shown).

From FIG. 3 show the more than one circuit-inside (326-2) (326-7) including an adjust circuit (#2) for charger, and at least one (a) IC and-or control, distribution circuit (#3) (326-7) to control at least primary LED (326-7a) for illumination and-or secondary built-in 2nd or color LED(s) (326-7b) for at least one (a) color changing, (b) color selection, (c) mixing cool, warm white color or Red, Green, Blue color, (d) auto or manual, and (e) select color, duration, cycle, flash, and fade-in and face out. Furthermore, the said item, light, or extension cord (302) has preferred switch/or sensor(s) kits (326-8) for set, change, select, adjustable at least color, brightness, duration, cycles, time period of primary (326-7a) and-or secondary (326-7b) LEDs for night light or accent light beside the primary purpose by primary LED(s) (326-7a) illumination. Wherein, said circuit (326-2) (326-7) has at least one AC-to-DC circuit, circuitry, IC, sensor, wireless system, and plurality of conductive wires to deliver the current from outside transformer (326T) or built-in AC-to-DC circuit to get into the housing (316) and through the circuit-inner (not shown) and more than one of circuit-inside (326-2) (326-6) (326-7) which marked as Circuit (#2) and IC, or Circuit (#3) to adjust or change or arrange the 1st or 2nd or 3rd DC power having preferred DC voltage and-or DC amperage for at least (1) primary LED light source (326-7a), (2) secondary light source (326-7b); for at least one (aa) primary illumination, (bb) secondary night light or-and accent light, (cc) an USB (312) (312a) and-or wireless (318) Charging-unit, and (dd) other optional built-in item, light, or extension cord (302) function(s) or device(s); as above FIG. 3A shown and details. It is appreciated any alternative, replacement, equal functions for USB-unit(s), Wireless Charging-unit(s), LEDs, light source still should fall within the current and co-pending filed cases including at least one concepts, idea, description, and claims scope.

FIG. 3 shows a second preferred embodiment (302) which has 2 USB-unit(s) (312) (312a) has USB charging-port(s) (308) or-and wireless charging-unit(s) (318) to supply DC power to charge the energy-storage units by the said USB (312) (312a) or-and wireless (Qi) (318) Charging-unit(s) having minimum 2.1 Amp or 10 to 100 Watt, It also has an outlet-unit (314) has outlet-ports (310) to supply AC power through external product(s) male-prong(s). Said the item, light, or extension cord has different AC and-or DC power output for USB and-or wireless (Qi) (318) charging-unit(s) and has AC outlet-unit(s) (314) to supply AC power to the said preferred AC operated electric or digital data device(s).

The USB-unit(s) (312) (312a) has USB charging-port(s) (308) or wireless charging-unit (318); both has minimum DC current charging capacity at 2.1 Amp which equivalent 2.100 ma, or higher Amperage such as 2,100 ma or 3.4 Amp or 4.8 Amp, 8.2 Amp, 9.6 Amp or more powerful units, or has wireless charging power from 10-200 Watt through wireless charging-unit(s) (318); to charge the rechargeable batteries inside of the different electric or digital data device(s) such as an iPhone™ and iPad™ that have different requirement for charging current.

The Outlet-unit (314) has outlet-port (310) which get power from the outlet's power source which has unlimited AC current and will go through the conductive material and piece or assembly to supply the power to the outlet-unit (314) of items, light, or extension cord main housing to the prongs while the male AC-plug(s) of the other electric or digital device insert into the said item, light, or extension-cord outlet-port(s)(310).

Figure 4:
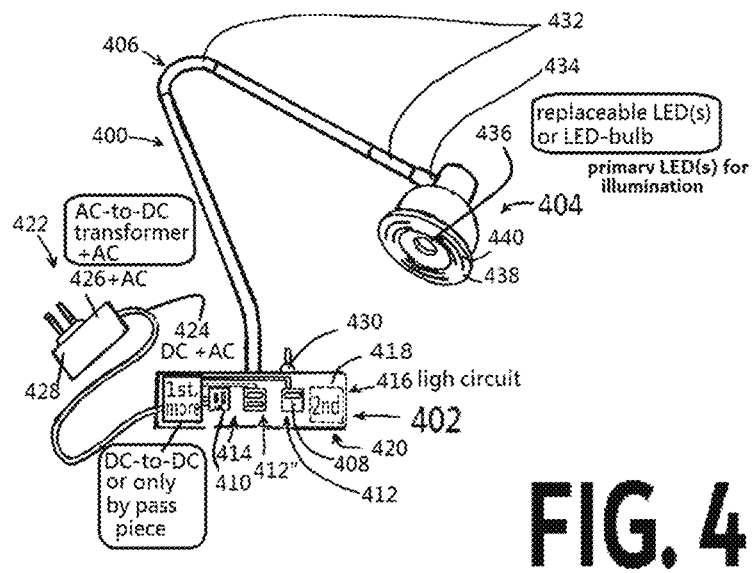
FIG. 4 is an isometric side view applications lighting in a third embodiment.

FIG. 4 is an isometric side view of (a) one of preferred the desktop or floor or wall mounted LED light, item, or extension cord (400), or (b) at one of preferred an individual desktop item (400) or desktop applications (400); having built-in USB (412) (412") or wireless (Qi) (not shown) charging-unit(s); each of USB or wireless charging-unit is at least one (a) fixed, (b) wired movable, detachable, separate able, dis-assemble, and re-assemble from main housing of item, light, extension-cord.

Wherein, said one preferred embodiment (400) has 2 USB-units (412) (412") including 3 USB charging-ports (408) and number of wireless (Qi) charging-unit(s). Wherein, the DC power of 2 USB-ports (408) share the USB-unit (412") total 2.4 Amp+3.1 Amp=5.5 Amp. Or, the 1 USB-port (408) of USB-unit (412) has 3.1 Amp for very quickly charging-power to charge be-charged products in short time.

Furthermore, the said item, light, or extension cord has built-in at least one AC outlet-unit (410) or AC-outlet module has at least one outlet-port; to supply AC power to external AC operated products. Wherein, the said item, light, or extension-cord not only incorporate with USB or-and wireless (Qi) charging-unit(s) but also supply AC power by Outlet-port (412) to external AC operated products.

One of preferred example, DC current from USB Charging-ports (408) for an iPad™ iPhone™, and AC current from outlet-port (410) for laptop computer or other device which can get AC current power from the outlet-unit. The USB-unit (412) or wireless (Qi) (not shown) get power from an external special transformer (426T+AC) to get desired 1st DC current, and at the same time item, light, extension-cord also has built-in outlet-unit get AC power while AC prong (428) insert into AC outlets and directly deliver AC power same as AC power source outlets to said item, light, or extension-cord (400) built-in outlet-unit (414). Hereof, the said item, light, or extension-cord has LED bulb or CFL bulb light-source lighting because the outside transformer (426T+AC) is a special custom made model has extra AC conductive wire to deliver AC power to AC operated LED or CFL Bulb. Hence, said item, light, or extension-cord has not only special custom made external transformer (426+

AC) can offer the extra AC current into housing to operate the AC power light source including CFL bulb or CFL bulb, but also supply DC power to USB or wireless (Qi) charging-unit or additional built-in DC operated function(s), device(s) such as motor, IC, DC-to-DC circuit. The said DC power export for USB or wireless (Qi) charging-unit is not limited for DC 5V for 1st DC current which may higher than DC5Volt and though the more than one inner-circuit (charger adjust circuit) (light circuit) or DC-to-DC circuit or IC to make the higher voltage 1st DC current change or adjust or arrange to DC 5 or lower DC Volt so can safety to charge the energy storage device and for other electric parts those needed lower DC voltage for operating.

FIG. 4 shows one of preferred embodiment (400) of the invention having the outside transformer (426T+AC) to supply not only AC but also DC power into item, light, or extension-cord. The customer made or special external transformer which get power from the AC outlet power source (not shown) by prongs (426) and the said item, light, or extension-cord (400) has 2 USB-unit(s) (412) (412') with different power output (2 USB units has 3 USB-ports) including 3.4 A from USB-port (412) or 2.4 A from USB-port (412") which has its 3 USB Charging-port(s) and all USB output-port(s) share minimum 3.1 or 3.4 A charging capacity to charge the energy-storage unit or assembly including rechargeable batteries inside of the computer, communication, or consumer electric products including the power bank which has a lot of rechargeable batteries assembly inside. such as an iPhone™ and iPad™ for DC current And, base, arm, bar housing (402) has built-in 1 outlet-unit (414) has 1 outlet-port (410) to supply AC power deliver into the said other electric or digital data device(s)'s while the male-prong(s) of external AC operated device insert into the said base, arm, pole, bar housing (402) AC outlet receiving port(s) (410). For one of preferred example, the external AC operated product(s) is one laptop computer. Here of item, light, or extension-cord has the light source is at least one (a) AC powered light source including LED bulb, CFL bulb, (b) DC powered light source including EL, OEL (Organic Electro-luminescent element or light source), LEDs.

FIG. 4 shows preferred embodiment (400) which has 2 USB-units (412) (412') and 1 outlet-unit (414) to allow people to charge DC current power to an iPad™, iPhone™ by the USB Charging port(s) (408), or wireless (Qi) charging-unit(s) (not shown). Besides, embodiment (400) also supply AC power to the laptop computer, or other device by outlet-unit(s) (410) or outlet-Module(s)(410). Both can get power from the USB-unit(s) (408) or wireless charging-unit(s) and outlet-unit (410). The drawing also shows the differences between the earlier discussed preferred embodiments. All such alternative designs, and any improvements or devices with an equivalent function or that are replaceable by the preferred items will still fall within the scope of the current invention, including variations disclosed in the inventor's other patents and patent applications may also fall within the scope of the current invention.

The difference or variation or replaceable or alternative or replaceable including following parts for current invention;
(a) Light source
(b) Installation location
(c) Installation space, compartment, room, housing, construction
(d) USB Charging-port 1.0 A, 2.1 A, 3.1 A, 1.2 A, 2.4 A, 3.6 A, 4.2 A, 4.8 A, 7.2 A, 9.6 A or any combination for the USB ports, or wireless (Qi) charging-unit(s) has output power from 5 Watt to 200 Watt depend on market requirement.
(e) Power source come from: (e-1) AC Plug wire, (e-2) USB plug wire, (e-3) Outside housing Transformer, or invertor, or adaptor, or converter (e-4)
(f) Function of items. Light, or extension-cord: The item, light, or extension-cord it is one of original existing product which people use without at least one (a) LED illumination, (b) LED secondary LED night light or LED accent light, (c) USB or-and wireless charging-unit(s). The current invention add the said at least one (a), (b), and (c) into existing product(s) function to become one brand new products has multiple function(s) and has at least three functions out of five function(s) selected from (1) Primary area illumination, (2) secondary LED accent or night light, (3) USB charging function, (4) Wireless Charging functions, and (5) Existing product existing function(s).

Figure 5:
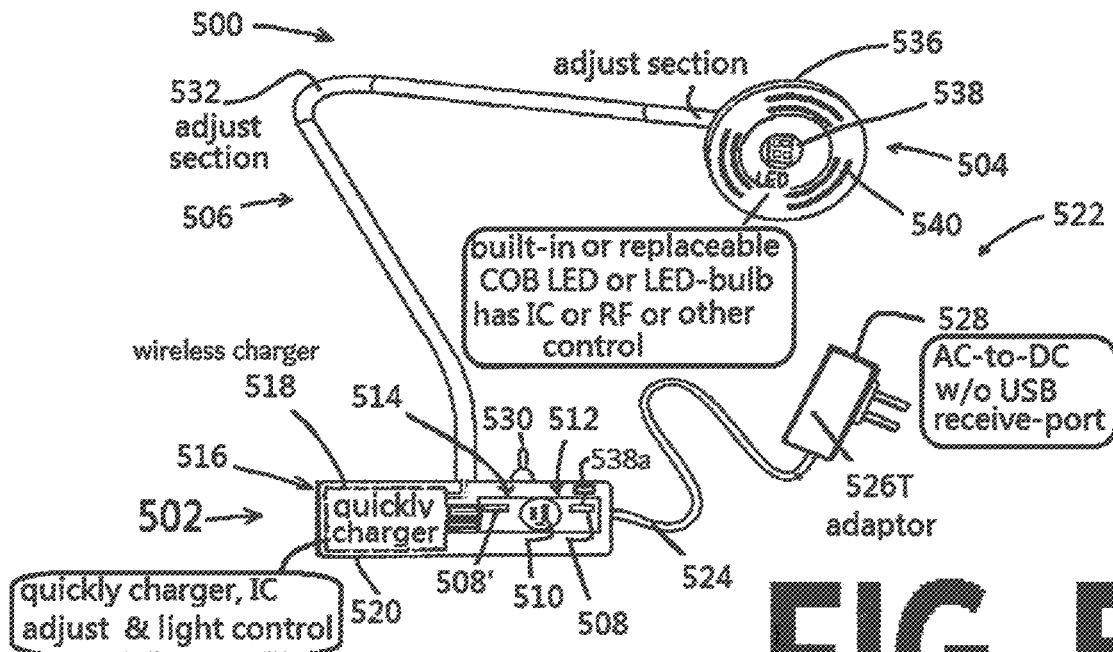
FIG. 5 is an isometric side view of one of preferred applications in a fourth embodiment.

FIG. 5 shows a third preferred embodiment of said one of item, light, extension-cord (500) is an LED lighting fixture for desk, floor, wall-mounted application having adjustable arms (506) and adjust section (532) to enable adjustment at least one (a) illumination direction, (b) height, (c) orientation, and (d) direction, and angle of the LED lamp (536) to provide the best illumination. Wherein, item (500) has built-in one module (512) having built-in 2 USB charging-port (508) (508') export minimum 2.1 Amp or higher charging capability. One of preferred example each USB-port of USB-unit (508) (508') output 3.1 Amp so 2 pcs USB-port to share total output power up to 6.2 Amp for quickly charge be-charged device(s). Furthermore, the module (512) also has 1 outlet-unit (510) has 1 outlet-port. While use universal module (512) can save cost than the above-discussed items with a plurality of separated piece of said USB-units and outlet-units and said USB module (512) can go through laboratory test and get only module safety certification so can put into any base housing and no need to do test for all different top shape and different LED(s) arrangement is one of other important improvement earlier products without using universal module, sealed unit.

Said items (500) incorporated a UL listed transformer (526T) which is directly or go through a AC-plug wire; plugged into an AC power source outlet to get 120 Volt AC power and transfer by AC-to-DC circuit inside external transformer (526T) to get 1st DC power for non-USB DC operated built-in items function(s), or device(s). Said 1st DC power go through at least one circuit-inside (520), DC-to-DC circuit (520), IC (520), and wireless control system (520) to change higher Voltage 1st DC to 2nd or more DC power has different DC voltage or DC amperage for at least one (a) USB charging-unit (508) has DC 5V, (b) primary LED light source (538) including plurality of chip, dice, dip, COB LEDs for primary illumination for people work, reading, selfie, cosmetic, reflect people or objects image, (c) secondary LED light source (538a) install anywhere of embodiment (500) for night light or accent light has preferred at least one color changing, color selection, color mixing, brightness adjustable, or other light function(s) or effect(s). (d) wireless (Qi) charging-unit(s) (518).

Wherein, some U.S. Prior arts filed before 2010 said USB-unit which is out-of-date because it similar with USB-Hub which is not only deliver DC current but also deliver electric signal or electric data which has at least 4 electric-trace to carry DC current and digital data. Furthermore, the earlier U.S. prior art such as U.S. Pat. Nos. 6,936,936, 7,453,233, 7,239,111, 8,624,550 which do not (a) have any protect circuit such as surge protection in front of AC-to-DC circuit and (b) have export charging power is not same as current invention for quick charger by minimum output power for USB-unit(s) is at voltage 5.2Volt having capacity from 2.1 Amp to 20 Amp and-or wireless charging-unit(s) has minimum output power is 12 Watt up to 200 Watt. (c) do not have soft and light weight USB wire because current invention inner cooper only have two string for only deliver positive and negative DC electricity which is not same as earlier out-of-date USB wire has 4 cooper string inside to delivery not only DC power but also deliver electric data. So, the earlier date USB Charging-ports definition release before 2007 is not same as update on 2010 for quick charging function. Said, out-of-date USB-unit(s) always only limited to deliver 500 ma and had heat issues and problem. The 2010 new USB Charging-ports has minimum charging capability 2.1 Amp (As Viki encyclopedia evidence shown on FIGS. 50, 51) up to much higher power amperage and 2010 standard do not allow the digital data delivery while charging the said energy-storage unit or assembly which may is a rechargeable batterie. Any out-of-date before 2007 USB charger is not possible to get safety and steady and quickly charger compare with 2007 release and 2010 update for new USB Charging-ports which has none over-heat and has NO digital data delivery while charging.

FIG. 5 is an isometric side view of one of preferred the desktop or floor or wall mounted LED light having at least one fixed, wired movable, detachable, separate able, dis-assemble, and re-assemble; USB or wireless charging-unit(s), for at least one desk, floor, wall mounted LED light or other electric device light application. FIG. 5 is one a preferred item, light, or extension-cord embodiment of current invention. One example of embodiment is a desk top item (500) is an LED lighting fixture (536) with adjustable arms (506) to enable the LED lamp to be moved to a desired height, orientation, direction, and/or angle to get the best illumination to people. The built-in USB-Module which has 2 USB-unit (512) (512') and 1 outlet-unit (514) inside one USB-Module which have a lower cost than other above-discussed 2 separated USB-units (512) (512') and separated 1 outlet-units because they do not need to be made as compact. The desk top item is powered the transformer (526T) or a UL listed transformer (526T) that receives power from a wall-outlet for 120 Volt AC current rather than the USB plug and wire of the first preferred embodiment. This kind of DC current from outside housing transformer (526T) already changed from AC to DC current can save a lot of work and labor for inner circuit because no need change AC to DC inside the desk top items housing. The inside housing circuit can be a simple or add other functions such as light sensor, photo sensor, motion sensor, blue tooth, infra-red wireless controller, wireless controller with Wi-fi, APP software controller, or other wired or wireless operation, color changing, brightness changing, timer, time delay, image display, project image display, optics filter to reduce glare for vision improvement or other added functions, features, performance, effects for people eye, nose, mouth, ear, skin, body to make people more convince to use the desktop items has built-in USB-Unit, USB-Module, sealed unit, universal unit, outlet-unit, Outlet-module as above discussed.

One important features of current invention embodiment while said desk, floor, wall-mounted items, light, or extension-cord incorporated with external transformer (526T) and had male connect plug in preferred type, so said desktop items or embodiment become universal model for all over the world. The current invention no need to change any inner circuit just change the outside housing transformer and AC-male plug specification or prong(s) specification, then, same desktop items with same inner circuit can sell all over the word.

FIG. 6. is an isometric view of one of preferred the base unit of FIG. 5 having at least one fixed, wired movable, detachable, separate able, dis-assemble, and re-assemble; USB or wireless charging-unit(s), for at least one desk, floor, wall mounted LED light or other electric device light application with an alternate configuration. FIG. 6. show one of preferred embodiment of current invention item, light, or extension-cord. The embodiment (602) has AC plug & wire (628 AC) to get AC outlets power source which has go through at least one surge protection, over-heat, over-charge, short-circuit, GFCI protection circuit (shown on FIGS. 3A, 3B) to get AC power input into housing. The input 120 VAC power though the inside housing AC-to-DC circuit (not shown) to get the 1st DC power and the 1st DC power is at least one (A) 5 Volt DC current by inside circuit (Charger Circuit) and can directly to non-USB output-end, (B) the said 1st DC power is DC 6/9/12/15/18/24 Volt DC though the inside at least one circuit-inside, IC, DC-to-DC circuit, and wireless control system receiver-kits to change, set, adjust, select, or arrange the said higher 1st DC power to at least one 2nd or more different voltage or different amperage DC power for at least one (1) USB (608) or wireless charging-unit(s) (618), (2) Primary LED light source(s) (612*p*), (3) secondary LED light source(s) (612S), (4) other built-in function(s) or device(s) such fan, motor, mirror, diffusor, time piece, alarm clock, accent light, night light, project light, candle light, image projection light with body glow light. And, said USB (608) or wireless (618) charging-unit; the said embodiment (602) can safety charge the other electric products. Here of the said Light source (612P) is one of AC power and get power from inside housing AC conductive wires or AC distribution-circuit to supply AC power to AC operated LED bulb, CFL bulb, or AC light source.

From FIG. 6 shows one of alternative USB (608), Wireless (618) charging-unit(s) and AC outlet-unit(s) (610) into one combination-unit (612) which is built-in the embodiment (602) base (616). Wherein, said combination-unit (612) is one rotating multiple surface power station which has the built-in USB-module (610') has 2 USB-unit with 2 USB port (608') preferred for 2 USB ports has 2.4+2.4=4.8 Amp, Outlets-module (610) has 3 outlet-units with 3 outlet-port and has controller (612*a*) (612*c*) (610) to install the preferred motion sensor, touch switch, wireless communication device, wi-fi set, APP receiver and code setting device, remote controller, IP Cam or other added function for the said Universal-unit. Module-unit, USB-unit, Outlet-unit or the desktop item(s) while the said Desktop items has much thicker base so can install the said Rotating multiple surface power station inside the thicker housing.

From FIG. 6 shown the wired plug (628 AC) has prong (626) has no any circuit inside so can deliver the wall-outlet 120Volt direct to the base (616) 3 outlets (610) to let people to connect with the desk top laptop, or speaker or lava light or other electric or digital devices which need 120Volt AC current to operation. The said base (616) not only has rotatable module (612) and but also has additional outlet-unit (610) or outlet-module(s) (610) to allow to charge or supply AC power to the other AC operated electric or digital device which need AC current input to make operation. It also can has more outlet-unit(s) (610) up to 1 to N number (N can be any number) as long as the base can fit within the plurality number of the said Outlet-unit(s) (610) so the current invention's desk top items base can replace the market existing power-strips which lay on the ground to supply the same 120Volt current.

Figure 7:
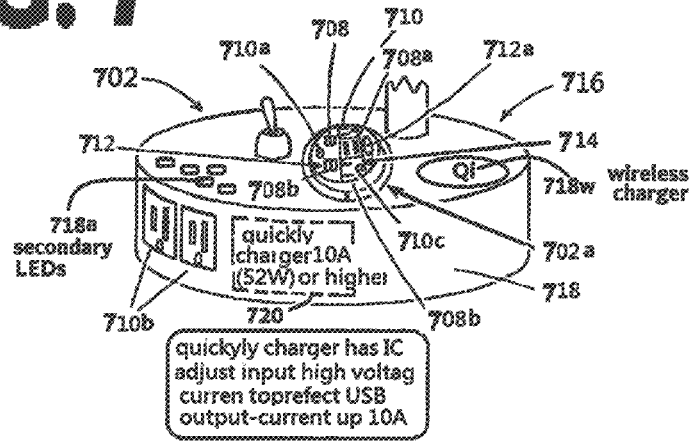
FIG. 7 is an isometric view of light applications in an alternate configuration.

FIG. 7 also shows the fourth preferred embodiment (602) having at least one (a) fixed, (b) wired movable, detachable, separate able, dis-assemble, and re-assemble; USB or wireless charging-unit(s), for at least one desk, floor, wall mounted LED light or other electric device light application with an alternate configuration. Wherein, The big base (616) of the Desk top item has sufficient space within so can install all kind of USB-unit(s) (608), Outlet-unit(s) (610), USB-module(s) (510"), Outlet-module(s) (510'), Sealed-unit (508') controller (612a) (612c) for all kind of operation for desktop items or products arranged into a rotating or non-rotating multiple surface power station (608) which has number of the said USB-unit(s), outlet(s) and/or Outlet-unit(s), Universal unit has number has relatively universal compartment, or space, or room to fit within, The said such big base (616) of the desk top item (602) can also be powered by wind power, chemical power, battery power, a generator, transformer, adaptor, inverter, inductor, etc. Also, the multiple surface Power station (608) has the inside IC or more than one of circuit-inside to help or adjust or change the input high voltage 1st DC current to become a safety USB charging-ports DC 5Volt current. Furthermore, FIG. 7 embodiment (702) also has (1) secondary LED light source (718a), (2) wireless (Qi) charger system (718W) besides said (3) primary LED light source (not show), (4) LED or CFL AC operated bulb having bulb-base, (5) USB charging system (708), (6) Outlet module (708b), and (7) outlet-unit(s) (710b). And, all kind of power on/off, selection, adjustable, rotating, toggle switch, and sensor, and wireless receiving system to control the said at least on light illumination, charging functions.

FIG. 7 shows that the base of the desk top item (702) of preferred embodiment incorporate with different light source application (Light source is not shown) may be made thicker or higher to accommodate bigger size electric parts and accessories to save a lot of the cost of super compact, slim, or cute size electric parts and accessories. Furthermore, the thicker or higher base (718) can also accommodate a rotating USB-unit(s) or USB-module that can be rotated from a first surface to a second surface so that the first surface of the USB-module will look nice when the USB-unit(s) or module is not in use. Details of the rotating power station (708) or said USB module (708) can be understood from FIGS. 18,19, 19-A and 20, the details of which are explained in the inventor's PARENT FILING U.S. patent application Ser. No. 13/117,227 (#FFF-11) and Ser. No. 12/950,017) (#CCC-10) U.S. Pat. No. 8,998,462 and its child (#CCC-1) Ser. No. 14/642,169 and (#CCC-2) Ser. No. 14/793,262 filing cases. It will be appreciated that the details disclosed in the co-pending application may be applied to the present embodiments without departing from the scope of the current invention.

All the above discussed the USB Charging-port(s) of current invention as the definition released on 2007 and update 2010 for (AAA) Quick charger which minimum had 2.1 Amp to 5.0 Amp charging capability.

(BBB) While quickly charger with higher over 2.1 Amp capacity, not allow for any digital or electric data transit or deliver by same USB-unit or USB-Module or USB Charging-ports.

(CCC) the out of date earlier than 2007 has limited for charging capacity less than 500 ma or so and has risk for overheat because the USB-ports the specification or construction or conductive cross section is too few to carry bigger current go thought and cause over-heat and has fire risk.

(DDD) The USB charging ports of current invention only allow one of input power source not workable for more than one input power source current such as sometime is AC and while power fail use DC battery power as input power.

(EEE) The USB charging ports as current invention only has Charge DC current by USB-port or SUPPLY AC power by Outlet unit. Do not have any digital/electric data delivery or transmit for quickly charger USB-Port as current invention.

(FFF) The current invention has housing, space, compartment, room to install the said circuit and related electric parts & accessories inside the desktop housing.

(GGG) The current invention has movable, removable, Universal USB-Charger unit can install, movable, removable, replace feature too.

(HHH) The current invention USB-Charging ports incorporate with jump-wire or bridge-wire or USB-wires has 2 male plug and one plug into the Desktop USB charging-ports and one other male-plug into the Other device's USB-Plug receiving ends (device's USB-port) to make the current delivery from Desktop to the other device.

(III) The said USB-Wires has 2 mail plugs, the 2 male plugs can be any type including Type A, Type B, Type C for construction.

(JJJ) The said USB-Wire has 2 male plugs, the every-one plug needs to match the USB-female receiving ports for Pins. Maybe the same or different on the size can be standard Type A, Mini USB, or Micro USB specification as long as the receiving-end match the Plug-in-end for pins.

Figure 8:
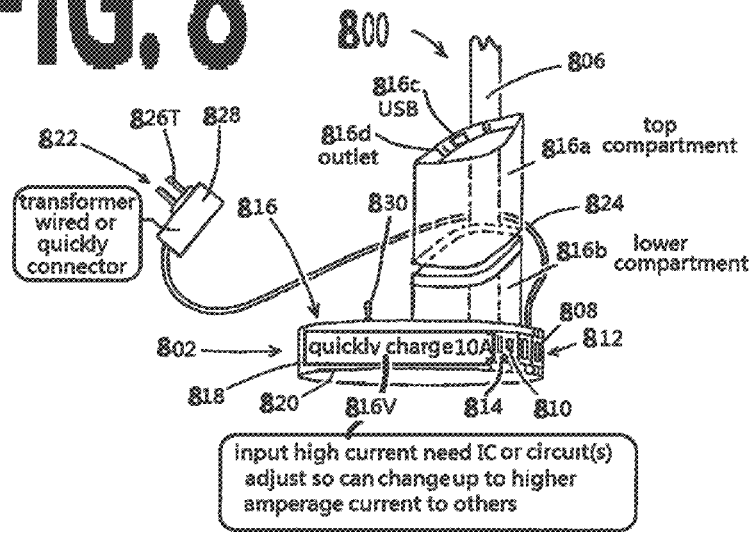
FIG. 8 is an isometric side view of one of preferred the base unit of FIG. 5 light applications in an alternate configuration.

FIG. 8 shows the first preferred embodiment (800) incorporate with different light source application (Light source is not shown), which has a thicker or higher base (802) to provide a bigger space to arrange bigger size electric parts and accessories to save the cost of super compact, slim, or cute electric parts and accessories, and which also can load rotating multiple surface power station (608 of FIG. 6) which is parent filing (#CCC) U.S. Pat. No. 8,998,462 and its child (#CCC-1) Ser. No. 14/642,169 and (#CCC-2) Ser. No. 14,793,262 filing cases as above disclosure which has built-in plurality of the said USB-unit(s) or a rotating USB-Module so that a first surface of the USB-module (608) or power station (608) will look nice when the USB-unit(s) or USB-Module is not in use. Details of the rotating USB module are shown in FIGS. 18, 19, 19A, and 20.

From FIG. 8 shown the outside housing transformer (826T) has prong (822) to connect with outlets from wall or extension cord to get AC power source and pass though the circuit-kits (828) inside the transformer (826T) to change the 120V AC to desired 1st DC current and deliver by conductive wire (824) into the desktop item's base (802) which has the more than one of circuit-inside or IC or DC-to-DC circuit (as notes details) (816V) which to change or adjust or arranged for at least one (a) USB or wireless charging-unit(s) output-end DC current, (b) DC powered Light source, (c) DC powered other functions & products; those operated by said at least one $1^{st}$, $2^{nd}$, and third or fourth DC current, so can make at least one (aa) USB charging-port (bb) DC powered light source, (cc) DC powered other electric products, wireless controller, sensor, switch, IC, and preferred electric parts or accessories; work properly. Furthermore, the light source on the embodiment (800) can be a AC powered light source including CFL or CFL Bulb which is detachable, replaceable from the desktop items (800) incorporate the above discussed all kind of said AC-plug wire, external transformer, or special custom made transformer (426 T+AC) as FIG. 4 discussed.

From the FIG. 8 also shown the preferred embodiment (800) which the said Desk Top item is a lighting has preferred light source may select from AC powered light source including CFL or LED bulb or tube as light source. Said embodiment (800) has big base (802) and the rear-side of base has 3 or plurality of the outlet-unit(s) from Number 1 to any number so it can connect with other electric or digital data devices to supply or charge the other devices. The embodiment (800) get power from all kind of external transformer as above discussed or get power from special design transformer (426T+AC of FIG. 4) or traditional transformer or AC-to-DC circuit(s) inside or outside base. Said special custom made transformer (426T+AC of FIG. 4) go thought built-in at least one circuitry, IC, or more circuitry not only supply the $1^{st}$ or $2^{nd}$ or $3^{rd}$ DC current to the USB-units and DC light source but also supply AC current to the said plurality of the AC Outlet-unit(s) while the said custom made special transformer has special design From FIG. 8, The plurality of outlet-units (814) or Outlet-module (808) can install on rear-ends or side wall of base (802) of the lighting device (800) so it can have nice and net wires arrange on the surface such as desktop or floor for floor lamp base. This kind of arrangement for lighting device base will save people to use a lot of power strips or power cords or extension cord which is ugly and occupied too many wall-outlet space and outlets. This is other feature for current invention has a plurality of Outlet-unit (814) or outlet-module (808) on the base (802) of ling device (800). It can add the surge protection (shown on FIGS. 3A, 3B) before AC current get into any other circuit and 3 outlet-unit(s) or 3 outlet-module so can have 1 more Plus feature of current invention for safety protection systems.

FIG. 8, further has built-in number of (a) Fixed, (b) detachable, added-on, rotatable, movable, multiple levels, plurality storage space(s); compartment(s) to let people to arrange stationary, cosmetic kits or items, hair clipper, necklace, bracelet, ear rings, rings, key, pen, pencil, or small person carried items. Furthermore, One of preferred compartment can install or arranged at least one (a) fixed, or (b) wired detachable, movable, dis-assemble, re-assembly (A) USB or wireless charging-unit(s), (B) phone, camera, video, cam device to make selfie work. (3) Fan, time displayer, liquid or humility or essential oil diffusor, (4) motor, bladeless fan, (5) alarm clock with or without wake-up light, sleep light with countdown function, (6) Wireless receiving system to connect with at least one IR, RF, blue tooth, Z-way, ZigBee, Wi-Fi; with download APP to make wireless control or operation.

Figure 9:
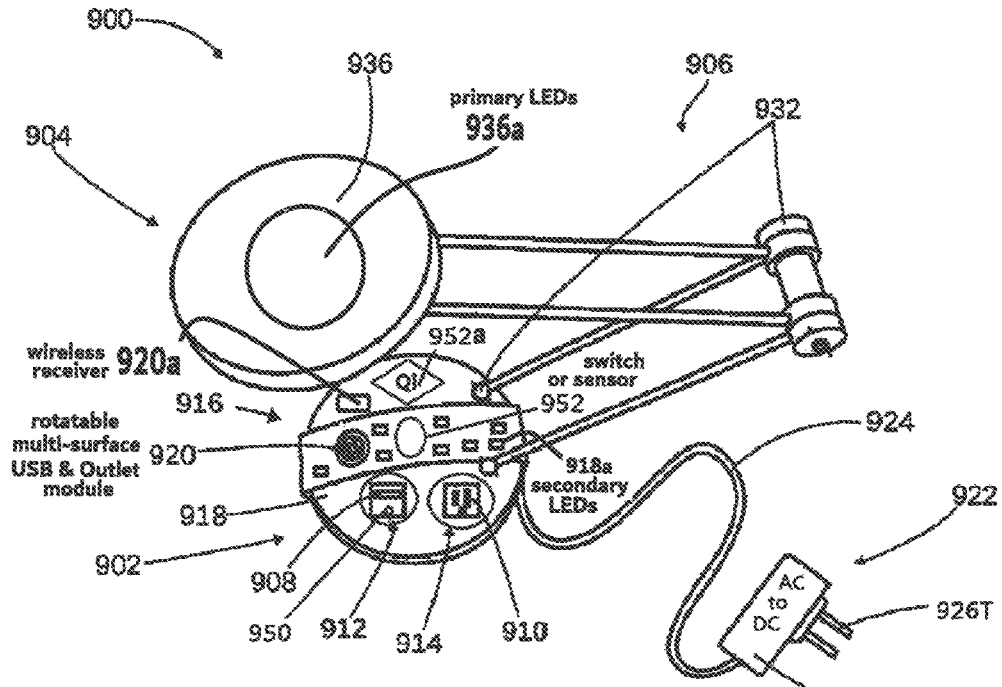
FIG. 9 is an isometric top view of light applications in a fifth embodiment.
Figure 10:
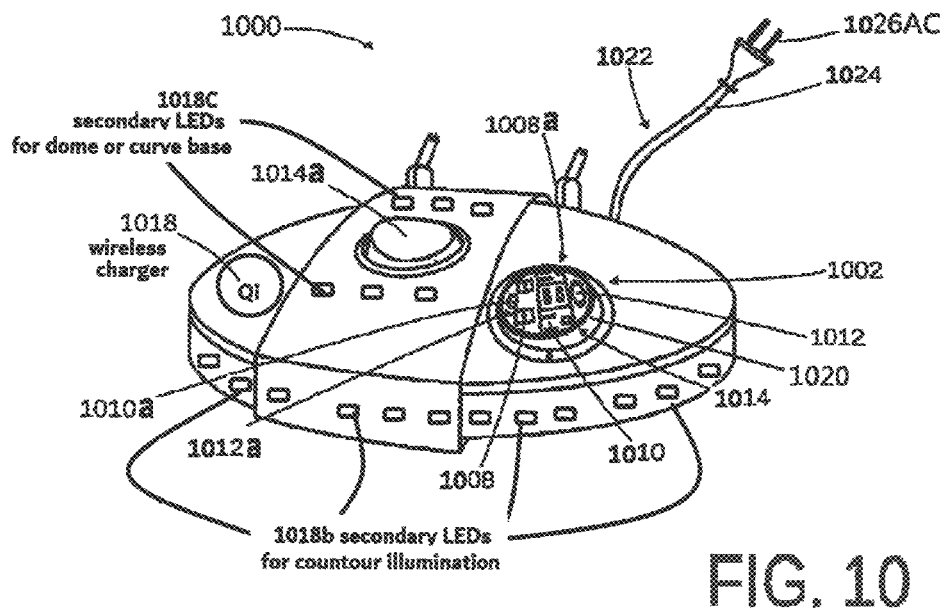
FIG. 10 is an isometric view of LED light or other electric device light applications.

FIGS. 9, 10, show one of alternative preferred embodiments which is one LED desk, floor, wall-mounted LED light or items (900) has primary LEDs (936a) and secondary LEDs (918a) as DC light source which is at least one LED, LEDs, EL, Organic EL (OEL). Said embodiment (900) has a thicker or higher base (918), and which can add rotating multiple surface power station (920) or it can called USB-modules or outlet-module with a plurality of USB-unit(s) or/and Outlet-unit(s) or/and a plurality of other receiving means (hereafter as other-ports) to increase the number of function(s), feature(s), effect(s), and/or performance(s), the said rotating power station (920) or rotating USB-module or rotating outlet-module having more than 1 surface and the capability of changing the surface for different purposes as FIGS. 18, 19, 19A and 20 shown.

From the FIG. 9 shown the any kind of LED light source (936a) (918a) for embodiment (900) which has 2 rotatable Module (912) (914) and each of rotatable module (912) (914) has at least one (a) fixed, (b) wired movable, detachable, separate able, dis-assemble, and re-assemble; USB or wireless charging-unit(s). And, each rotatable Module (912) (914) built-in desire number of the USB-Units or/and Outlet-unit or/and USB-Module (912) or/and Outlet-module (914) or/and sealed-unit (912) (914) or/and universal-unit (912) (914) to get desired functions. The embodiment (900) also has switch, sensor, or controller (952) to turn-on or turn-off the said Light source (936a) (918a). The base (918) has LED indicator light (950) install on the rotatable module's or main base (918) surface to show charging status. The Multiple surface power station (920) has at least one 1 USB port can offer up to 3.1 Amp and wireless (Qi) charging system (952a) and wireless receiver system (920a) to receive at least one Wireless receiving system to connect with at least one IR, RF, blue tooth, Z-way, ZigBee, Wi-Fi; with download APP to make wireless control or operation.

From FIG. 9 shown the base (918) of the said embodiment (900) which may has any type of the LED light source which has the Rotatable module (920) or single outlet or USB charger or wireless charger rotating module (912) (914) which has at least one (a) USB-Unit(s), (b) outlet-unit(s), and (c) optional third applications LED light source for charging status indicator lighting. The said base (918) not only has rotatable module and but also has additional outlet-unit, or outlet-module(s), or USB/Wireless charging-unit(s) to allow to charge or supply AC power to the other electric or digital device which need AC current input to make operation.

From FIG. 10 shown one of preferred items, light has a thicker and curved base (1002) for embodiment (1000) has desire primary light source (not shown) for illumination and secondary LED light source (1018b)(1018c) are arranged on desired location such as (1) base wall as LEDs (1018b), or within the curved base (1018c) to glow the whole dome cover of curved base.

The desk lamp (1000) has wired plug (1026AC) to connect with wall-outlet and has AC current input into inside housing circuit-inner (not show) to transfer the wall-outlet's 120V 60 Hz current into the 1st DC current different with USB-unit(s) needed, and also supply the wall-outlet's 120V 60 hz current to the Outlet-unit(s).

The said LED primary light source is one of COB LED, plurality LEDs arranged in geometric shape with preferred spacing. The said embodiment (1000) turn-on or turn-off by the switch or sensor or remote control, or wireless, or blue-tooth, or wi-fi controller with update APP software can download from internet or others network. Wherein, said wireless receiver (not shown) is installed within the base (1002). The said 1st DC current is higher voltage than the 2nd' 3rd, 4th, more different voltage or different amperage DC current. That means 1st DC current higher than 5Volt for non-USB charging-unit needed voltage and said 1st DC supply to other DC products. The 1st DC power go through at least one DC-to-DC circuit, IC, more than one of circuit-inside; to change or adjust or arrange the 2nd' 3rd, 4th, more different voltage or different amperage DC current to said DC functions or DC powered products built-in said embodiment (1000).

From FIG. 10 shown the one of alternative embodiment is desk lamp (1000) which has 1 rotatable Module (1014) of one of rotatable power station (1020) or USB/Outlet module (1020) has built-in desire number of the 1. USB-Units (1008), or/and
2. Outlet-unit (1010), or/and 3. USB-Module (combine the 2 USB-units into one piece and in one housing or PCB), or/and
4. Outlet-module (combine the 3 outlet-units into one piece and in one housing or PCB) or/and sealed-unit (has more than one of UBS-unit(s), or/and
5. sealed-unit(s) (USB-unit of Outlet-unit inside a sealed housing), or/and
6. universal-unit (at least has one USB-unit or/and outlet-units has housing to fit into more than one of the housing or compartments which within many of the desk top items housing)
7. primary LED light source for illumination for reading, work, selfie
8. secondary LED light for accent light, night light, indicator light, status indicate light
9. wireless receiving kits to get at least one Wireless receiving system to connect with at least one IR, RF, blue tooth, Z-way, ZigBee, Wi-Fi; with download APP to make wireless control or operation.
10. Wireless charging-unit(s)

to get desired functions. It also has controller or switch for turn-on or turn-off the said Light source for desk lamp or desktop item's existing function(s). The one LED indicator light (1010*a*) on the one of the rotatable module's surface for shown the charging status FIG. 11. shows a other preferred embodiment (1100) which is powered by solar power and stores the 1st DC current which is solar electricity inside rechargeable batteries to provide enough 2nd DC current power which at the lower or higher DC voltage depend on the solar module and rechargeable batteries designed. And, the 2nd DC current to charge other electric or digital data device(s) through circuit-inside housing, IC, DC-to-DC circuit to change or adjust or arrange $2^{nd}$ DC current become 3rd DC or 5Volt DC current get into the built-in USB-unit(s) which has only conductive piece without any (a) transformer, (b) outside or inside circuit; within the housing. Furthermore, the said embodiment (1100) has built-in female receiving outlet to input AC power while solar power module not work properly. So, the said embodiment (1100) become same functions as above discussed FIGS. 1, 2, 3, 4, 5, 6, 7, 8, 9, 10 embodiment(s) has quickly charging system by USB and wireless charging-unit(s).

Figures 11, 11A:
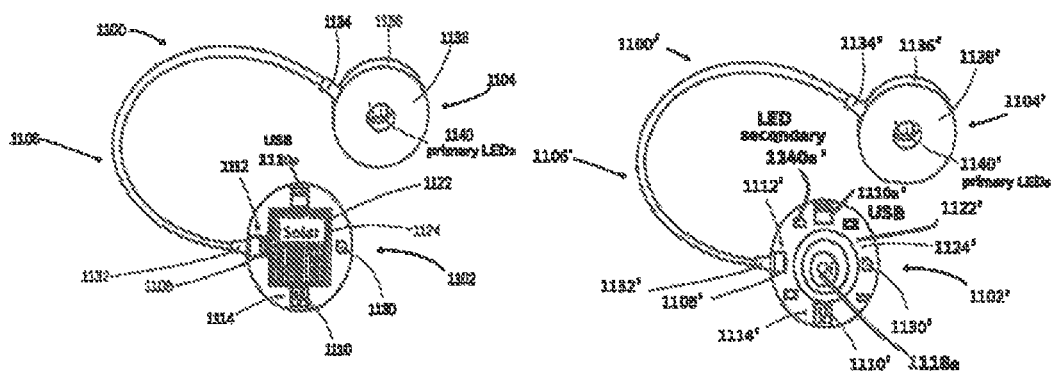
FIGS. 11, 11A is an isometric top view of one of preferred the desktop or floor or wall mounted LED light having at least one fixed, wired movable, detachable, separate able, dis-assemble, and re-assemble; USB or wireless charging-unit(s).

From FIG. 11A, show one of embodiment (1100') which is similar with FIGS. 4, 5, 9. The embodiment (1100') has
(a) big wireless charging-unit (1118*a*) on center of base (1102'),
(b) primary LED (1140') has at least one cool white and warm white color LEDs for reading, working, selfie, cosmetic illumination,
(c) secondary LEDs (1140*a*') has at least one Red, Green, blue LED for at least one color changing, color selection, color mixing, auto or manual color changing, brightness selection, adjustment, timer, countdown,
(d) functions selection between auto-On-Off, Motion sensor,
(e) back light for film, art, display, display, photo, slide, printing, painting piece; for at least one accent light, night light, project image light, selfie light, candle light.
(g) wireless receiver kits connect with at least one IR, RF, blue tooth, Z-way, ZigBee, Wi-Fi; with download APP to make wireless control or operation.
(h) USB charging unit(s)
(i) outlet unit(s);
those parts functions as above discussed for FIGS. 1, 2, 3, 4, 5, 6, 7, 8, 9, 10.

Figures 12, 12A:
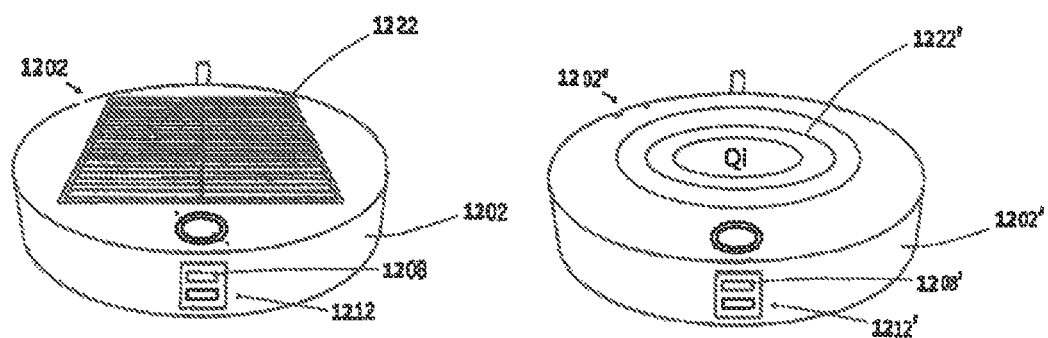
FIGS. 12, 12A is an isometric view of one of preferred the base unit of FIGS. 11, 11A LED light or other electric device light applications.

FIGS. 12, 12*a* show big drawing for FIGS. 11, 11*a* for base (1202') (1202) to show solar module (1222) and Wireless charging-unit(s) (1222'), USB charging-unit(s) (1208) (1212) (1208') (1208'), and switch or sensor unit(s).

Figure 13:
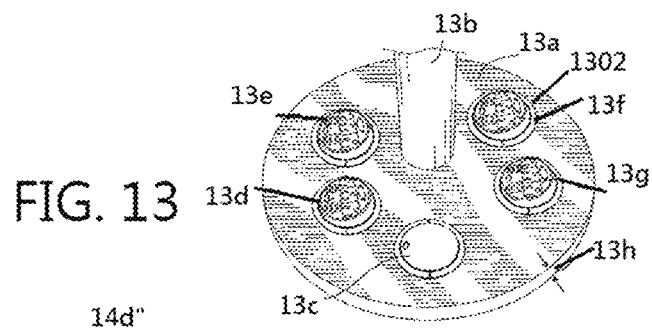
FIG. 13 is an isometric view of LED light or other electric device light applications.

From the FIG. 13 also shown the preferred embodiment is one of Desk Top item for prefer light source (not shown) may select from AC powered light source including LED bulb, CFL. The embodiment has big base (13*a*) for publication areas such train station, airport, harbor waiting room use. The big bas has built-in plurality multiple surface(s) rotating module(s) which has different surface has different assortments of USB, Wireless charging-unit(s) and outlet-unit(s) (1302) (13*c*) 913*d*) (13*e*) (13*g*) which can rotate to one of the surface has built-in desired number of USB, Wireless charging-unit(s) and outlet-unit(s). Some rotating module rotate to one of surface (13*d*) (13*e*) (13*g*) (13*f*) and each may different assortment of USB/Wireless charging-unit(s), Outlets-unit(s), some is only show one of flat surface may or may not have built-in desired color LEDs to tell people certain message such as illumination, No one USE, or other message show on flat surface.

Figure 14:
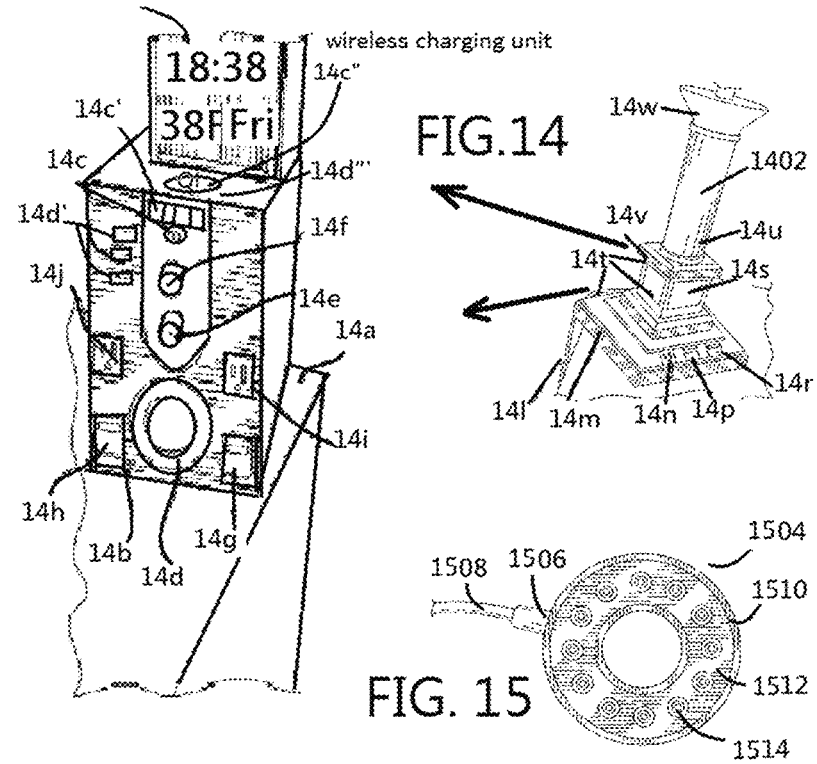
FIG. 14 is an isometric view of one of desk, floor, wall mounted LED light or other electric device light applications.

FIG. 14 shows desk top items (1402) has at least one primary LED DC light source (not shown) or AC power source including CFL (not shown). Said item, light of current invention has preferred function(s) or device fit within anywhere of said desk, floor, wall-mounted item or light is at least one (a) USB-unit(s), USB-module (14*g*) (14*h*) or wireless charger-unit(s) (14*c*'') to charge energy-storage unit or assembly inside the other electric or digital device(s), (B) outlet-unit(s) (14*i*) (14*j*) to supply power to AC operated products, (C) secondary LED light source (14*c*') (14*d*') supply at least accent light, night light, indicator light, (D) switch (14*e*), sensor (14*f*) for set, adjust, select at least one color, brightness, sensor range, function(s), (E) displayer (14*d*'') to show at least one time, date, week, month, calendar, temperature, (F) speaker, air outlet, diffusor output-end (14*d*) to spray, diffusing at least one (i) essential oil, humility, moisture, air-fragrance, air-freshener, (ii) audio, sound, music, (iii) air-flow.

Wherein, the items (1402) has at least one a radio, time piece, weather station display, fruit blender, food machine, liquid machine, LED lighting, light fixture, image projector, image, lighted mirror, power station, rotating power station, electric fan, heater or any conventional items with LED means built-in to offer the area illumination, or shown digital time, or shown image, or shown the charging status.

From FIG. 14 shown the said other functions or the said USB or wireless charging-unit(s) or Outlet-unit(s) can install on the anywhere of the base, pole, steps, flat areas of the said Desk top items and not limited only on the base one surface. The current invention for all application has at least one of the 1st DC current created by the transformer inside or outside the housing and the 1st DC current through at least one (a) DC-to-DC circuit, (b) IC, and (c) more than one circuit-inside; to get 2nd or $3^{rd}$ or more different current. The said 1st or 2nd or 3rd DC current has the desire voltage to offer the current to at least one (aa) DC light source, (bb) USB or wireless charging-unit(s), (ccc) DC operate other electric parts & accessories, and (dd) DC powered added function(s).

FIG. 14 shows desk top items (1402) has LED (14*d*')(14*c*) for function is at least one indicator light, night light, accent light, candle light; to shown the charging status or power-on-off status and USB-unit(s) (14*g*) (14*h*), USB-module(s), or outlet-unit(s) (14*i*)(14*j*) install on the pole (14*u*) or base (14*m*) or part of the said items or light (1402) to charge other electric or digital device(s). The items or light (1402) has at least one of the existing functions including a (i) radio (FIG. 27),
(ii) timepiece or Digital Alarm clock (FIG. 21),
(iii) time or temperature, weather station display & pinholes image project & music player with LED(s) (FIGS. 14, 26-2),
(iv) fruit blender (FIG. 25),
(v) food machine (FIG. 28),
(vi) liquid machine (FIG. 25),
(vii) LED lighting (FIGS. 1 to 10, 23, 24),
(viii) light fixture (FIGS. 1 to 10 and FIGS. 11 to 13),
(ix) projector (FIGS. 24, 26-1),
(x) electric fan (FIG. 29),
(xi) lighted cosmetic mirror or selfie LED light device (FIGS. 21,21-1, 22, 25-1, 25-2, 25-3, 25-4),
(xii) power station (FIGS. 1 to 13, 21 to 29).
(xiii) heater or any conventional items (FIG. 29) with more LED built-in as indicator light (FIGS. 6,7,9,13 and FIGS. 20,21 install on module surface),
(xiv) the said LED light source to offer the area illumination (FIGS. 1,2,5 as light source),
(xv) device to show digital time (FIGS. 14, 21, 26-1, 26-2, 27, 29),
(xvi) device to show image (FIGS. 21,21-1, 22, 25-1, 25-2, 25-3, 25-4, 25), and (xvii) device to show charging status (FIGS. 6,7,9,13 and FIGS. 20,21 on module surface).

Wherein, The said other functions or the said USB-unit(s) or Outlet-unit(s) can install on the anywhere of the base, pole, steps, flat areas of the said Desk top items and not limited only on the base one surface.

Figure 15:
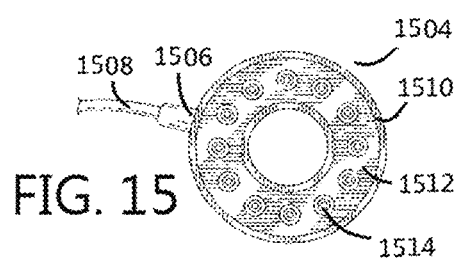

FIG. 15. Show one of preferred arrangement for plurality of primary LEDs (1514) with a geometric shape housing (1510). Here, the said housing (1510) is donut shape having preferred space (1512) chip, dice, dip LEDs fit within. The said housing is assembled with connector piece (1506) and flexible arm, bar, pole which has at least one of flexible, bendable features.

FIGS. 16, 17 show different primary LEDs (1614) (1714) (1814) arrangement within the LEDs housing (1694) (1704) has different size, brightness, color temperature, power consumption, specification, with anti-glare to easily viewing, with anti-reflection optic-lens or film for clear reading arrangement while used for LED lighting that has at least one of function(s) is offering the area illumination in the above-discussed preferred embodiments and same as for other lighting items including the floor light device or wall mounted lighting or clip-on lighting device.

FIGS. 18, 19, 19A, 20, 13 show details of parent filing (#CCC) U.S. Pat. No. 8,998,462 and its child (#CCC-1) Ser. No. 14/642,169 and (#CCC-2) Ser. No. 14/793,262 filing cases has the Rotating Multiple Surface power station (1904) has the LED light source and the USB charging-port(s) and Outlet-ports where USB-module with at least one USB-units and a plurality of additional receiving means (hereafter as Additional-ports) such as USB-unit(s), outlet-unit(s), Internet-unit(s), adaptor-unit(s), other light source means, or other light sources with appropriate parts and accessories.

Figure 21:
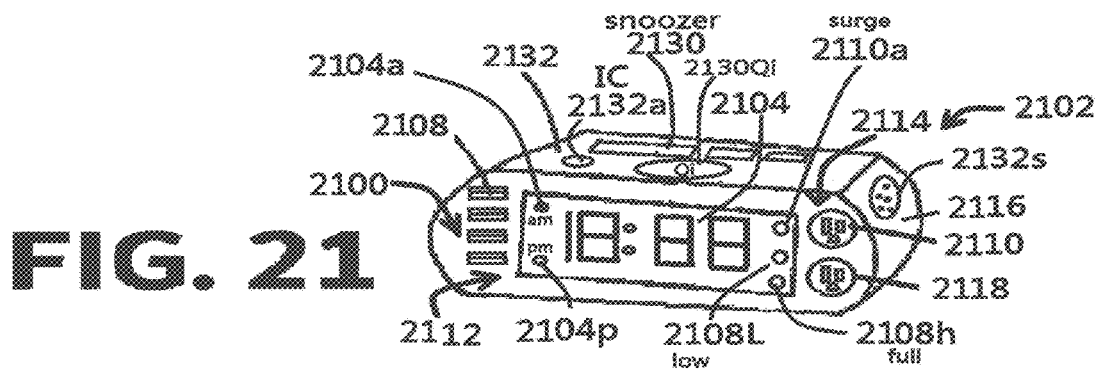
FIG. 21 is an LED alarm clock having (1) '8-shape" LED segments or (2) LCD display with LEDs back light; to show at least one time, date, day, month, year, am/pm, temperatures display.

FIG. 21, 14, 26-1, 26-2, 27 show time related products as below:

FIG. 21 is an LED alarm clock (2102) has (1) '8-shape" LED segments or (2) LCD display with LEDs back light; to show at least one time, date, day, month, year, am/pm, and temperatures display. The embodiment (2102) of the desktop system has built-in USB (2108) and-or wireless (Qi) (2130) charging-unit(s) with backup battery (not shown) for power shut down time keep time related (a) IC, (b) electric parts keep operation without stopping at least one of time related functions.

FIG. 21 shows one of preferred desk item and it is one alarm clock with light that is similar with FIGS. 14, 26-1, 26-2, 27. From FIG. 21 show details for desk top digital alarm clock or time related products. The time related product (2102) has built-in '8' display (2104) to offer illumination to show at least one time, date, weather, am/pm, alarm on or off, and surge on or off. The alarm clock (2102) powered by home AC power source and supply DC power to at least one (a) '8 shape' LED segment(s),
(b) LCD displayer having LEDs back light,
(c) at least on IC, DC-to-DC circuitry, speaker, buzzer, switch(s), push on/off switch, and switch for time adjustment; to keep time operation accurately,
(d) radio, music, song, blue tooth download audio data,
(e) at least one USB, wireless (Qi) charging-unit(s) or system, and
(f) wireless receiving-system to receive wireless signals to set, adjust, change, select desired function(s) or effect(s) or performance.

The AC power source go through built-in or external AC-to-DC circuit to change from AC power to 1st DC voltage current such as 12, 9, 6 or 5 volt DC. The 1st DC voltage choice basing on the highest operation voltage needed for electric function or components needed inside said alarm clock or time related products. It can be plurality of LEDs connected in-series so the operating voltage is higher than USB charging-unit needed DC 5 volt. It can be USB charging-system needed 5Volt DC is highest than plurality of LED connected in parallel, or IC to operate time functions.

The alarm clock is only one of preferred embodiment of current invention and it should not limit for current invention claims. The products (2102) has major components and each operating DC voltage including;

(A) USB charging-port (2108) around 5(+/−15%) voltage DC,
(B) IC (2132*a*) for time related functions around 3 volt DC (2916),
(C) "8" time display (2104) around 3 volt DC,
(D) Buzzer, alarm, speaker (2132*s*) around 3Volt DC,
(E) LEDs for status indicator light circuit (not shown),
(F) LED indicator light (2110*a*) for different color around 1.3 to 2.1Volt,
(G) am/pm indicator (2104*a*) (2104*p*) LED light around 1.3 to 2.1Volt depend on difference colors LEDs,
(H) count down timer (not shown),
(I) alarm setting and wake-up lighting,
(J) other wireless or wired device.

So, for some application the 1$^{st}$ DC voltage pick-up the highest voltage needed for USB charging-port that is 5 (+/−15%) voltage DC power which is not same as the LED desk reading or working lamp for FIG. 1,2, 3 the highest voltage DC components is plurality of LED(s) or replaceable LED-Bulb for illumination which preferred is 12Volt DC.

The other components for above listed (B) (C) (D)(E)(F) (G)(H) (I) (J) listed more other functions because all are lower voltage than the 5Volt DC, so said highest voltage 1st DC inside products at least one of DC-to-DC circuit(s) to change to 3Volt for IC (2132*a*), '8" display (2104), buzzer, speaker, or alarm (2132*s*), or 1.3 to 2.1Volt DC for different color LEDs (2110*a*) (2108L) (2108*h*) to show at least one of (i) charging status (2108L) (2108*h*), (ii) AM/PM (2904*a*)

(2104p), (iii) On/Off status of alarm, surge protection (2110a), (iv) other indicator or illumination.

Figures 4, 25:
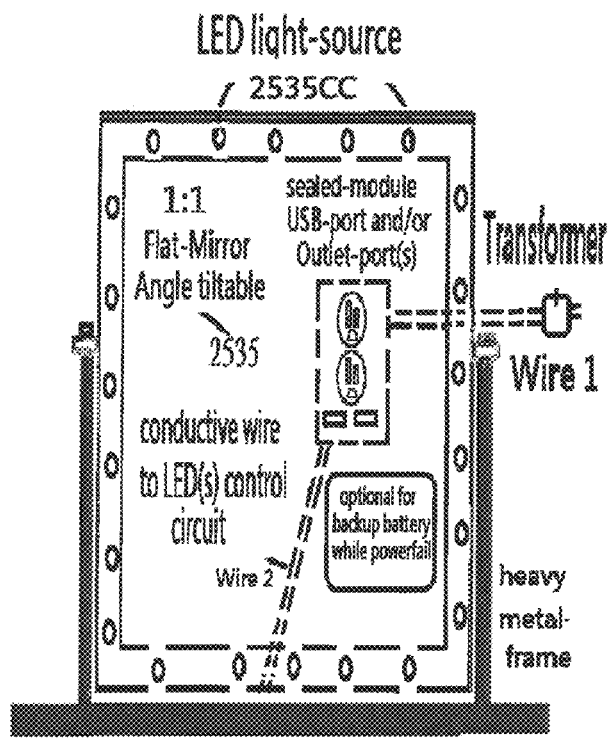
FIG. 25 is an isometric top view of one of preferred liquid supplier device which has built-in charging device in a ninth embodiment.

FIGS. 21-1 is similar with FIGS. 25-3, 25-4 for more than one side mirror which is different with FIG. 22, 25-1, 25-2 for only one side mirror, show one of LED light preferred embodiment (2110) for current invention for desk, floor, wall-mounted item, light. These FIGS. 21-1, 22, 25-1, 25-2, 25-3, 25-4 is a LED light device (2110) has built-in plurality LEDs (2110a) to emit out enough brightness to front people, objects to show the people or object image into mirror (or image capture device such as mobile phone, camera, cam device, video device(s); for people to work, makeup, cosmetic, selfie.

wherein plurality of LED(s) (2110a) arranged to emit light out from preferred location such as contour, side(s), edge(s) so can offer evenly brightness to front object(s) or person; wherein, the said LED light (2110) with or without at least one (a) mirror (2135), (b) rack (2110c) or suction cup (2110c) or attachment kits (2110c) to install extra magnify-mirror(s) (not shown) or image/sound capture device such as phone, camera, video camera, cam device on center location of LED light surface; wherein, the said plurality LEDs housing configure to a rotatable, height adjustable, or angle adjustable frame, bracket, rack, shelf, stand, or tripod; the plurality light beam emit out from contour, edge, sides of preferred shape, size; one of preferred shape of LED light housing (2110) is one of round (2200), rectangular (2110), or geometric shape; wherein said capture or reflected image is one of (i) people face only, or (ii) part or top body, or (iii) whole body into (1) built-in, or (2) added-on (A) mirror (2135), (B) image and sound capture device(s) by suction-cup or rack (2110c).

From FIGS. 21-1 is similar with FIGS. 25-3, 25-4 for more than one side mirror which is different with FIG. 22, 25-1, 25-2 for only one side mirror, is the one other preferred Wherein, said single tilt able mirror has plurality of LEDs arrange on edge, contour, or other location(s) as above discussed location(s). FIG. 21-2 is one side mirror (2135) only can tilt angle not rotating to others surface. FIG. 21-1 show one of single side, tilt able, rectangular mirror has preferred size to show people partial face, face, partial body, whole body image by enough brightness LED light beam which having as even as possible brightness to form perfect reflected image on the mirror. Wherein, said mirror (2135) has heavy base or triangle back base to let mirror stand up for preferred angle for horizon or flat surface. For tilt able mirror (2135) has two poles, arms, bars with built-in angle adjustment-kits (Same as 2212 of FIG. 22) to make the single mirror (2135) tilt to preferred angle. Said LED light has built-in mirror also has built-in at least one module (2135a), sealed unit (2135a); which has at least one USB or Wireless charger system with or without outlet fit within the space of base or added on back of mirror (2135) by traditional skill such as glue, double side tape, hook and loop tape, screw, sonic sealing, or other available kits to fix the said one of sealed unit, module including at least one (a) fixed or movable, or detachable USB and-or Wireless charging-unit(s), (b) outlet(s), (c) sensor, (d) switch, (e) wireless receiving control system; as above all discussion. Wherein, the sealed unit (2135a) can be any geometric shape housing to arranged fit within the base space, back of mirror and connect with AC Transformer (2135c) which is directly plug-in or has separated AC-plug wire to connect said AC-to-DC circuit box of said external transformer (2135c).

FIG. 25-3 is similar with FIG. 21-1, 25-4 show one of preferred alternative or replace models of FIG. 21-1 mirror but this is alternative is only one of preferred examples, it should not limit other alternative or replace models. Wherein, the mirror (2135) is a tilt angle 1 to N-times magnify flat, geometric shape, or rectangular shape mirror has a heavy metal base (2135e) which has joint-piece to hold the mirror and allow tilt the mirror for desire degree.

From FIG. 25-3 is similar with FIGS. 21-1, 25-4 for rectangular mirror, or similar round shape mirror of FIGS. 22, 25-1, 25-2 show the mirror (2535) is a tilt angle 1 to N-times magnify flat, geometric shape, or rectangular shape mirror has a tooling injected base (2542) which has joint-piece (not shown) on mirror housing to tilt mirror (1535) degree. The mirror (2535) incorporate one of one of preferred module or Outlet module (2588) which has at least one of USB charging-system (2588U) or wireless (Qi) charging-system (2588W) which connect with built-in AC-to-DC circuit (not shown) or external transformer (2535T) AC-to-DC circuit to change the home AC power source to 1st voltage DC for higher than charging voltage power for non-charging function(s) or device. And, 1st voltage DC for higher than charging voltage power go through the DC-to-DC (including just only conductive-piece such as wires, conductive piece(s) only) to get the 2nd DC power for USB and-or Wireless (Qi) charging-unit needed DC. Wherein, said LED light having mirror (2535) has built-in conductive piece (2535W2) to deliver home AC to the said built-in AC outlet(s) to supply AC to external AC operated product(s). And, the module (2588) has conductive wire or piece (2535W2) to connect with at least one (a) LED light-source, (b) control circuit, (c) wireless receiving control system, (4) IC, (5) LED functions or light effect control circuit, and (6) sensor, (7) switch, (8) blue tooth, Zigbee, Zig-Way, Wi-Fi system, and (9) download APP control software; to make control for preferred function(s) or device(s) built-in said LED light by wired or wireless for at least one (aa) color, (bb) brightness, and (cc) functions. All or more details discussion also shown on all above details and all co-pending filed case. For current one of examples of LED light with built-in mirror, this is just discussing one of the said LED lighted cosmetic mirror (2535). Furthermore, the said LED light with built-in mirror also has built-in (a) back-up battery (2588B) while AC power fail to supply LED light-source and desired other function(s) or (b) input USB port (2588UI) to input DC power into LED light for operating all preferred function(s).

From FIG. 25-3 is similar with FIGS. 21-1, 25-4 for rectangular mirror, or similar round shape mirror of FIGS. 22, 25-1, 25-2 show LED light has built-in one geometric shape mirror (2535) which has center big size mirror (2535) and two sides has two fixed or hinge mirror-assembly-set(s) (2534) (2533). Wherein, the said mirror assembly set are (A) 3 pcs (2536,2537,2538) and (B) 1 pc (2533) inside two sides each mirror-assembly set having preferred number(s) of N-Times magnify mirror(s) (2533) (2536) (2537) (2538) for each assembly-set. It also can have some added-on (i) mirror(s) piece (not shown) or (ii) clipper, holder, suction cup (as FIG. 21-1 show 2153c) to hold phone, camera, video camera, cam device(s); to attached on said any one of mirror, mirror assembly-set(s) by (a) magnetic attach-kits, (b) 3M tape, (c) suction cup, (d) rack, holder, (e) other fix or attach kits. Wherein, each mirror (2533) (2535) (2537) (2538) or mirror assemble-sets has desired number added-on N-times magnify cosmetic mirrors (not shown) to attached on any location of the said center and two sides mirrors assembly-set surface which can be in round, or round with tilt-able angle magnetic base.

From FIG. 25-3 is similar with FIGS. 21-1, 25-4 for rectangular mirror, or similar round shape mirror of FIGS. 22, 25-1, 25-2 has bas (2539) has plurality of additional functions select from (i) outlets (2545), (ii) blue-tooth (2541) for audio (2543) function(s), (iii) at least one of blue tooth, IR, RF, Zee-way, Zigbee, Wi-fi, and download APP control software, (iii) remote control receiver (2542), (iv) wireless transmitting, communication, or cloud device (not shown), (v) WI-FI transmitter (2544) and download APP for remote control systems, (vi) signal receiving-end (2547) to receive input digital data, power, DC current, ear-phone, internets.

From FIG. 25-3 is similar with FIGS. 21-1, 25-4 for rectangular mirror, or similar round shape mirror of FIGS. 22, 25-1, 25-2 has the same USB or OUTLET module (2588) as above discussion. From FIG. 25-3 the base (2539) has built-in at least on additional function(s) may select from at least one;

(1) 2 outlet(s) (2588O),
(2) 1 output USB charging-port(s) (2588UO) and 1 input USB port(s) (2588UI),
(3) one AC-plug wire (2588 W1) or external transformer (2588T),
(4) conductive-wire or piece (2588w2) to connect built-in control system, or some electric parts & accessories, $2^{nd}$ secondary LED light source(s) for night light, accent light, wakeup light, candle light, circuit or IC or circuit to operate the desire function(s),
(5) back-up battery power for power fail time (2588B),
(6) Blue tooth for audio functions,
(7) IR or RF remote control related items,
(8) all kind of motion, moving, photos, radar sensor or any combination(s),
(9) all kind manual, electric, electronic, wireless switch(s),
(9) time, date, weather, calendar display with or without alarm system,
(10) internet, Wi-Fi extender, wireless communication system; beside the built-in LED light-source and USB-charging ports and both related circuit, electric-parts & accessories.

FIG. 25-4 is similar with FIGS. 21-1, 25-3 so do not make detail description.

From 22 similar with FIGS. 21-1, 25-1, 25-2, 25-3, 25-4 show LED light having built-in or added-on cosmetic mirror by suction cup or rack has
(i) plurality numbers LED light source (2211),
(ii) LED tub,
(iii) preferred other type LED light source
; fit inside of the housing (2210).

The said housing has joint-piece (2212) to make the geometric shape LED light here preferred round shape. Wherein, the said round shape housing (2210a) has extra features or function(s) which is at least one (a) tilt function, (b) rotating along the joint-piece (2212), (c) emit enough brightness from contour, edge, fame to make as even as possible light beam spread to front position object(s) or people, (d) housing had center area (2210) enable to add at least one (i) mirror, (2) double sides mirror, (3) add rack or suction cup or other frame, holder to install the added-on mirror(s) and-or image capture device(s) on center location to capture or reflect at least one (aa) face only, (bb) partial of body, (cc) whole body for selfie, cosmetic, makeup, reading, working.

Wherein, said the LED light added-on or built-in mirror can be one side as FIGS. 21-1, 25-3, 25-4 or multiple sides FIGS. 22, 25-1, 25-2. The said each mirror 21-1, 22, 25-1, 25-2, 25-3, 25-4 has preferred additional functions is at least one (a) mirror to reflect image of be-reflected object(s), (b) LED light-source offer desired colors, brightness illumination, and (c) USB or wireless charging-unit(s) to charge external be-charged device. The LED light has additional electric parts or accessories is at least one (i) outlets, (ii) motion/moving/photo/radar sensor or desired combination, (iii) power fail illumination by backup-battery, (iv) weight-unit to increase mirror light weight, (v) magnify mirror for ×N (N=magnify times) such as magnify 10 times is '×10", such as 8 times magnify is "×8".

Figure 22:
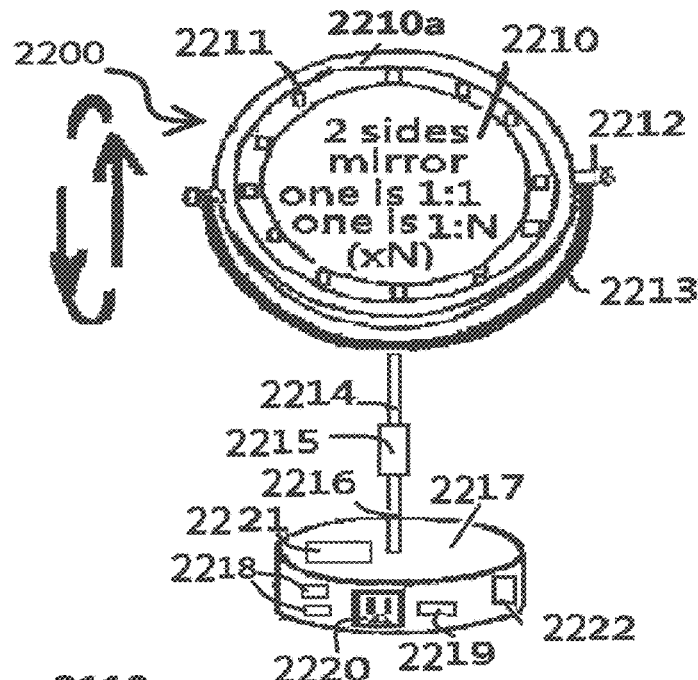
Figures 1, 21:
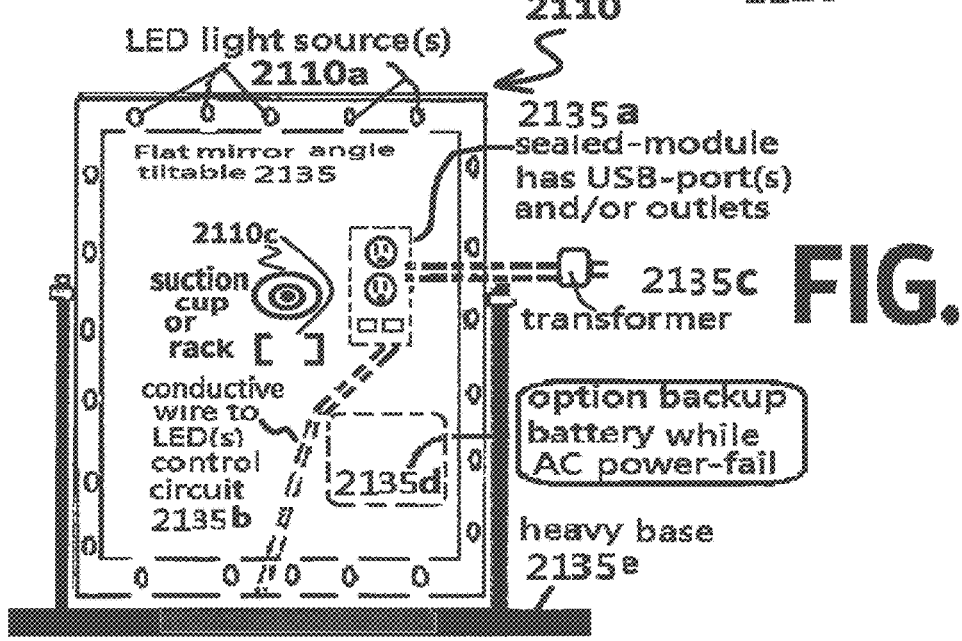

From FIG. 22 similar with following FIGS. 21-1, 25-1, 25-2, 25-3, 25-4 as above discussed for at least one (1) LED desk lamp, (2) time products, and (3) the LED light having mirror; has AC power source go through the said built-in or external transformer AC-to-DC circuit to change home AC electric power to 1st DC voltage to supply the highest DC voltage components for this one preferred example is plurality of LED light source(s) having desired in-series or in-parallel connection. This is one of preferred, and it should not limit the highest DC voltage for other function(s) or device(s) or other system or other electric parts. It is appreciated the 1st voltage DC current also can be none highest voltage of DC and it can boost up by booster-circuit to raised lower 1st voltage DC to higher 2nd or more higher DC voltage to higher or more low voltage for some special consideration still fall within the current invention as long as incorporated at least one of DC-to-DC circuit or even simple conductive-piece for distribute DC current, all these should be still belong to definition for DC-to-DC circuit coverage.

Wherein, the current preferred 1st voltage DC incorporate with at least one of DC-to-DC circuit to get 2nd or 3rd or more different voltage or different amperage of DC current(s) to supply to optional one or at least one of additional function(s) selected from (i) outlet, (ii) outlet up to 1,850 watt so can plug at least hair-dryer(s), (iii) motion, photo, moving, radar sensors or any combination(s), (iv) wireless device, (v) audio device, (vi) air-flow or cold air device has blade, or blade-less for hot or cold or desire temperatures air, (vii) blue tooth, wi-fi, download APP, IR, RF, remote for remote control the preferred function(s).

FIG. 22 show embodiment (2200) which is similar with following FIGS. 21-1, 25-1, 25-2, 25-3, 25-4 embodiment has base (2217) has at least one of built-in input-power (2219) or output-power (2218) USB ports may select from Type A, B, C, D, E, F, G or any combinations to input or output DC power from embodiment (2200). The input power USB ports (2219) is to supply DC power to internal function(s), or input USB port (2219) deliver DC power to charge embodiment (2200) built-in rechargeable battery (2221). While electricity shut-down, built-in battery supply DC power to keep non-USB charging functions keep normal function(s).

Wherein, the plurality of LED light-source(s) (2211) built-in embodiment to emit enough light beam is at least one (a) cool white, (b) warm white, (c) mixing cool and warm white color light beam to front positioned people(s), object(s), or space. Wherein, plurality of white color LEDs install on preferred location(s) is at least one (a) contour, (b) edge, (c) sides, (d) periphery, (e) rim, (f) week, (g) circumference, (h) outer ring, (i) fringe, (j) brink, and (k) verge; of the LED light one of body (2210a) to make all LEDs light beam emit to as big as big front area having even brightness so can get people face, part of body, whole body for as even as possible brightness which depend on how big the LED light one body such as FIGS. 22, 25-1, 25-2 for LED light has more than one side, rotatable mirror those is similar with FIGS. 21-1, 25-3, 25-4 for LED light has flat, none rotatable mirror; each had preferred for wall-mounted size, desktop size, floor size to get desired even illumination for people (a) partial of face, (b) whole face, (c) partial of body, (d) more than half body, (e) whole body; for at least one (i) reading, (ii) working, (iii) selfie, (iv) capture image, (v) reflect image into mirror(s), (vi) reflect and magnify image into mirror, (vii) reflect image into single or more than one mirror with or without rotating different surface mirror function(s), and (viii) other people work.

It is appreciated the current invention has quickly USB or wireless (Qi) charge-system which can offer up to 20 Amp or 100 Watt power which is not even discuss from all prior arts as above listed (7) and (43) and some US issued patents. This is the current invention unique features and patent claims. The current invention may use 40 Watt, 50 Watt, 100 Watt or more higher charging capacity by current invention (a) fixed, or (b) wired and movable, detachable, dis-assemble, and re-assemble; USB or wireless charging-unit(s).

From FIG. 22 is one of many preferred examples (2200) that show the one body (2210a) has center-area (2210) surrounded by plurality of LED(s) (2211). The said center-area has one of rack or holder (2110c of FIG. 21-1) to install the image capture device for selfie work. The said center-area has one mirror with or without magnify function(s) and the mirror with or without suction-cups or other rack (2110c of FIG. 21-1) to install image capture device(s) on center of mirror so can take photos for selfie. Furthermore, said one body (2210a) with or without mirror is fit within 2 sides loosen-and-tighten kits (2212) which can adjust angle, tilt of said the one body (2210a) so change the LED(s) light beam emit angle and direction.

Wherein, the said 2 sides loosen-and-tighten kits (2212) on two end of partial circle frame, holder (2213). Wherein, the said partial circle frame, holder (2213) had one extendable-and-retractable or length-adjustable pole, bar, elongate piece, tube (2214) (1116) with height adjust-kit (2215) to get desired height.

Wherein, said one-body (2210) has angle and height adjustable function, so LED light beam emit direction is adjustable to any angle and on any height. Plus, said one-body (2210a) is one of geometric shape with preferred size in order to people can get even brightness light for at least one (a) partial of face, (b) whole face, (c) partial of body, (d) more than half body, (e) whole body; for at least one (i) reading, (ii) working, (iii) selfie, (iv) capture image, (v) reflect image into mirror(s), (vi) reflect and magnify image into mirror, (vii) reflect image into single or more than one mirror with or without rotating different surface mirror function(s), and (viii) other people work. It is appreciated the FIG. 21-1, 22 is only two preferred example for any geometric shape, any size of said LED light to emit enough light beam (not limited only cool, warm, mixing cool and warm light) to make as even as possible lighted (a) people partial face, body, or (b) object, or (c) front space. It also appreciated all loosen-and-tighten kits (2212) or partial circle holder (2213) or stand (2214) (2215) and height adjust-kit (2215) can be any kind of alternative piece, equal functions piece, replaceable piece should still fall within the current invention scope, idea, concept, and claims.

FIG. 22 similar with following FIGS. 21-1, 25-1, 25-2, 25-3, 25-4 base (2217) optional has the outlet(s) (2220) which can supply AC power to external device(s) such as high-power consumption external device such as 1,850 Watt hair dryer. And, LED light (2200) have at least one radar sensor, motion sensor, switch, photo sensor, wireless control system, IR, RF, Z-way, Zig-Bee, Wi-Fi, and download APP (2222) to set, change, adjust, select preferred function(s), color, brightness, duration time, cycles of said LED light (2200). Wherein, plurality of white color LEDs install on preferred location(s) is at least one (a) contour, (b) edge, (c) sides, (d) periphery, (e) rim, (f) week, (g) circumference, (h) outer ring, (i) fringe, (j) brink, and (k) verge; of the LED light one of body (2210a). It is appreciated one of preferred embodiment here is one of cosmetic mirror which is replaceable FIG. 21-1 which the base (2217) also has built-in adjustable height of the mirror fame (2513) which hold the mirror housing (2210a). Hereof, the mirror at least having 2 sides or surfaces one is 1:1 and other side has (×N) (N is enlarging times) such as (×8) means is 8 times magnify times.

From FIG. 25-1 is similar with 22, 25-2 for LED light has rotatable, more than one mirrors, which is not same as FIGS. 21-1, 25-3, 25-4 show the LED light has one side, none rotatable cosmetic mirror (2523); has plurality of LED(s) (2511) fit within the contour or front surface of the said mirror to offer enough brightness LED cool, warm, or cool and warm white light beam to front location people(s), object(s), or space to get as even as possible illumination and has preferred wired or wireless control system to make at least one colors and adjustable brightness to reflect the be-reflected object(s).

The base (2517) has desired specification of all kind at least one sensor(s), switch(s), both sensor(s), wireless control system receiving system, and switch(s) to operate at least one (i) On/off, (ii) select color, (iii) adjust brightness, (iv) desired function including motion, radar, moving, photo sensor(s) or any combination(s), (v) detect temperature(s). Or, One of preferred embodiment, the said neck has one of (a) air-flow, air-freshener, humility diffusor, (b) audit device, speaker, microphone install with the neck while the LED light has big neck or tube or bar as FIG. 14 shown.

One of preferred embodiment, the said USB charging-port(s) (2519) is powered by external transformer (not shown) geometric shape and construction male-plug insert into the female receiving-end (2522) and use by-pass kits which just 2 pcs conductive-wire(s) or conductive-piece or conductive-trace on PCB to connect with at least one of USB-port(s) to supply the DC voltage exist from the male-plug of the said external transformer as FIG. 1 shown. From FIG. 25-2 shown the direct input USB charging port needed DC voltage from LED light base input receiving port(s) (25431) go through only built-in by-pass piece to supply output USB charging port(s) (2530).

FIG. 25-2 similar with FIGS. 22, 25-1 and tiny different with FIGS. 21-1, 25-3, 25-4. however, all these embodiments and all alternative, equal function, replaceable embodiment with same concept, idea, scope still same as current invention discussed items. All these embodiments for LED light having built-in mirror(s) has weight-unit or heat-sink inside the base to increase total weight of said lighted cosmetic-mirror or eliminated the heat created by plurality of LED(s) or LED/CFL bulb. From FIG. 25-2 LED light having round mirror but it is not rotatable mirror. The FIG. 25-2 LED light has plurality LEDs arrange on contour to emit enough brightness to front people, and the base (2527) has built-in location, space, slot, gap, groove, holder (2528) to install image capture device or sit for image capture device. Wherein, said image capture device is at least one (a) mobile phone, having image capture function(s), (b) camera, (c) video camera, (d) cam device, and (d) mirrors having at least one (i) magnify function, (ii) rotatable functions, (iii) tilt able function(s), (iv) added-on mirror or capture by attachable rack, holder, suction cup, movable kits; wherein the capture device is not limit capture the image or reflect image but also capture sound, music, melody, audio.

FIGS. 21-1, 22, 25-1, 25-2, 25-3, 25-4 is one preferred desk, floor, wall-mounted items, light, extension cord has built-in plurality of LEDs light source to emit enough brightness to front people or objects to form brighter, clear people or object image into built-in at least one (1) Mirror, (2) Magnify Mirror(s), (3) camera, (4) video, (5) phone with camera, video, or both camera and video; to allow people make cosmetic or make selfie to catch image to see or to save or to transmitting to internet, clouds, other people phone, other people computer device(s); said the LED light has built-in at least one charging system, outlet, suction cup, holder for phone, camera, video device(s).

FIGS. 23, 24, 25, 26, 27, 28, 29 and 30 show all kinds of desk, floor, wall-mounted items, light, extension cord (2300) (2400) (2500) (2600) (2700) (2800) (2900) for current LED light invention preferred example, and these preferred examples offer function(s), effects(s), and/or performance(s) to people's eye, nose, mouth, and/or ears for a period of time while people are working, resting, sleeping, makeup, selfie, or standing. Wherein said built-in LED light function(s) is at least on
(a) Light source for illumination or indicator light,
(b) Quickly USB charging-port has minimum 2.1 Amperage by USB or minimum 8 Watt wireless charging capacity,
(c) at least one USB and-or wireless charging-system function and one more desktop items its existing functions,
(d) more than one current type selected from $1^{st}$ DC current, $2^{nd}$ DC current, $1^{st}$ AC current, $2^{nd}$ AC current to get charger and one more function of desktop items its original existing function(s).

FIGS. 23, 24, 25, 26, 27, 28, and 29 show all kinds of desk top items which offer function(s), effects(s), performance(s) to people's eyes, nose, mouth, and ears so that people stay nearby for a period of time as they work, rest, sleep, or stand. The desk, floor, wall-mounted items, light, extension cord each have at least one
(A) LED for area illumination or indicator light to shown charging status or create image for time or projection or visible images as above discussed,
(B) Has at least one wireless (Qi) charging system has minimum wireless charging-system from 5 Watt up to 200 Watt depend on the said input current and magnetic-coil sets. and
(C) have at least one USB-unit(s) has its own quickly Charging-system(s) has minimum 2.1 Amp to 200 Amp for USB charging capacity as specification release on 2007 and update on 2010 to charge energy-storage unit or assembly including rechargeable-battery inside of the other electric or digital data device(s) and are install inside products which function(s) is at least one
1. generate, exhibit, or provide light beams, or offer at least one area, indicator light, selfie illumination,
2. show, present, capture, reflect the image including of a projection, reflection image, a time display, a clock, person partial face or partial body or whole body,
3. Offer or play music, sound, melody, audio sound,
4. Display photos, digital signals, pin-holes images or light patterns on near-by or remote away distance with or without refractive lens to enlarge the mini image on slide, film, printing piece to larger viewing size image
5. Create or produce the air flow at a desired temperature, moisture, steam, smells,
6. Diffuse air-fragrance, air freshener, smell, essential oil,
7. Candlelight has flicking or moving flame and glow light to illuminate art, logo, photo, heat or water transfer film, sticker with or without the image or lighted patterns project to near-by or remote away distance surface,
8. Offer the liquid, coffee/tea, and/or food, and
9. to serve as any other conventional market available electric or consumer device Wherein, the said all kinds of desk, floor, wall-mounted items, light, extension cord (2300) (2400) (2500) (2600) (2700) (2800) (2900) for current LED light invention preferred example offer charging functions at locations where people will stay around for period time for working, reading, taking selfie, make cosmetic, make up face.

Wherein, the said all kinds of desk, floor, wall-mounted items, light, extension cord (2300) (2400) (2500) (2600) (2700) (2800) (2900) for current LED light invention preferred example include at least one of its existing function(s) for people eye, ears, nose, mouth, skin to feel or sense or eat or smell or see or hear and the device let people to can easily to reach, touch, operate, or manage the said desk top device.

The device has desire number of the USB-Unit, USB-Module, Outlet-unit, Outlet-module, Sealed-unit, or Universal-unit for USB charging function(s), and-or has desired number of the Wireless (Qi) coil device(s); installed, arranged, or within the device's substrate(s), base, pole, housing. And, said desk, floor, wall-mounted items, light, extension cord (2300) (2400) (2500) (2600) (2700) (2800) (2900) for current LED light invention preferred example is arranged on the location, or place where people will stay for period of time, such as a desk, table, bed, chair, land, grass, or wherever else people work, rest, sit, stand, sleep, makeup, make cosmetic, operate selfie, or a take nap.

As noted above, the said desk, floor, wall-mounted items, light, extension cord (2300) (2400) (2500) (2600) (2700) (2800) (2900) for current LED light invention preferred example may offer (a) electric signals, (b) wireless signal, (c) visible or audio or smell or food or air functions; related to people's eyes, ear, nose, mouth, or body, such as illumination, sound, images, brightness, visual effects, smell, water, liquid, food, wind, moisture, airflow or any conventional functions of electric devices. Wherein, said function(s) is at least one (i) LED lighting, (ii) a clock, (iii) projector machine, (iv) image to see, (v) reflect or capture image into mirror or image/audio capture device, (vi) digital photo frame, (vii) time display, (viii) air freshener, (ix) electric perfume freshener, (x) moisturizer function(s), (xi) electric fan, electric heater, (xii) electric steam spreader, (xiii) electric cooler, (xiv) electric air conditioner, or (xv) other conventionally available items has its own existing functions(s) that can be placed to hand-reachable distance so people can easily reach, touch, operate, or manage the objects.

The desk top items may be powered by a direct current (DC) power source limited solar, generator, DC battery power bank, Or alternating current (AC) power source having appropriate electric parts and accessories or components is at least one (i) circuit, (ii) IC, (iii) DC-to-DC circuit, (iv) sensor, (v) a motion sensor, (vi) timer, (vii) time delay, (viii) timer, (ix) resilient kits, (x) conductive kits, (xi) transformer, (xii) inverter, (xiii) adaptor, (xiv) wire, (xv) prongs, (xvi) UL listed adapter, (Xvii) PIR remote controller, (xviii) infrared controller, (xix) wireless controller, (xx) blue-tooth controller, (xxi) Internet controller, (xxii) Wi-fi controller, (xxiii) master power controller, (xxiv) APP software, and (xxv) AC power outlet-unit(s); to offer electric current at desired current, or different voltage (Volt), different amperage (Amp or ma) which sufficient to achieve a desired charging time and desktop its own existing function(s).

Wherein, said USB-unit(s) has its USB Charging-port(s) only for charging energy-storage unit or rechargeable batteries inside the other electric or digital device(s) without electric data transfer function. If a plurality of USB-units is provided, the USB-units can be arranged to have different output power or one input DC power share by plurality of USB-unit(s). Wherein, the current LED light may optional has additional outlet-units to supply AC power to other products with or without surge protection circuit(s).

Electric or digital data device(s) that may be charged by the USB-unit(s) is one of an MP3 or MP4 player, smart phone, computer, iPhone™, iPad™, video game, digital visual equipment, communication equipment, and other consumer electric products; has the rechargeable batteries application such as Power bank for storage power tank.

The preferred desk top item's function(s) may be turned on or turned off for a predetermined time by at least one switch, sensor, timer, photo sensor, motion sensor, time delay, master control power controller, infra-red wireless, remote controller, wireless controller, APP software, Wi-fi or internet or network wireless controller, and Z-wave remote controller.

Wherein, at least one USB or wireless (Qi) charging-unit female port(s) is one of (a) fixed or (b) wired detachable, movable, dis-assemble, re-assemble unit(s), (c) has a removable cover to prevent from (i) kids to touch, (ii) prevent dust, water, moisture getting into the receiving port(s).

Said USB-unit, USB-module, Sealed-unit, or Universal unit charge other electric or digital product(s) can be (1) movable, (2) detachable, (3) separate able, (4) re-assemble, (5) dis-assemble from the desk, floor, wall-mounted items, lighting, extension-cord. Each of unit(s) has its own space, gap, ditch, space, or other valley between walls, and those is within the unit housing to coil, wrap, pull, extend, receiving wire between (aa) item, lighting, extension-coxd and (bb) wired unit.

For this purpose, the USB-unit(s) or USB-module(s) need wired in order to disassembled from the desk top items and re-assembled into the said desk top items. The wire out from the said desk, floor, extension-cord may select one of arrangement which is at least one (a) directly out from inner circuit, (b) connect with inner circuit output end by at least one quick connector set, adaptor set, assembly set, or fixing set. Said, the each of the USB-unit(s) or USB-module(s) having its own at least one (aaa) Space to storage USB wire between main housing inner circuit output end and unit, (bbb) unit can fit within the main housing and roll, coil, wrap USB wire from outside the main housing by rolling the said unit housing to extend or receiving wire which is much simple than coil, wrap, or other skill inside the main housing, (ccc) each unit has its own LEDs to show illumination, charging status light, night light, accent light with or without color changing, color selection, color mixing function(s), (ddd) each unit has its own attach kits which is at least one (A) double side tape, form tape, (B) loop and hook piece, (C) 3M tape, (D) magnetics, (E) suction cup, (F) hook, (G) screw holes and screw, (H) slid kits for slide installation, and (I) other traditional installation or fix or attachment items.

The USB-unit(s) includes USB charging-port which has a USB-female receiving end to receive a USB male plug from the USB-wire which has at least 2 male plugs on 2 ends to deliver electric power from the USB-female receiving means (USB Charging-ports) to the other device's/USB-wire's USB-male plug. The preferred USB charging-ports (USB-female receiving means) gets power from a power source and uses its circuit to change the electric current to a desired voltage, and current sufficient to charge Energy-Storage unit or assembly inside of the other electric or digital device(s) through the USB male plug insert into desktop items USB-female receiving port.

The items of these embodiments may be in the form of lighting, an desk lamp, table lighting, lava light, projection light, cosmetic lighted mirror, power station (Parent case #CCC), time piece, electric fan, air freshener, indicator coffee machine, indicator sound device, and visual device has LED(s).

FIG. 23 is an isometric top view of one of preferred liquid or fluid LED or LAVA light (2300) having at least one miniature, air bubble, reflective, floating items, decorative items, leaves, shells, wax, chemical liquid, and other items; those incorporate with at least one LED light to illuminated; fit within the desktop or floor or wall mounted LED light, or it is an individual items put on desk, floor, mounted on wall for at least one desk, floor, wall mounted LED light or other electric device light applications.

FIG. 24 is an isometric top view of one of preferred image or pin-hole image projection LED light (2400) which is powered by battery or by input DC current from input USB port(s). Wherein, the project image LED light has 1st LED incorporate with refractive-lens to project at least on enlarge image or light patters. Furthermore, the LED project light has at least one 2nd LEDs to supply at least one (a1) time display, (a2) glow light, (a3) back light for front slide, heat-transfer film, water transfer film, printing or painting piece, (a4) night light, and (a5) accent light illuminations effects. where in the said battery operated project and built-in LED glow light, night light, or accent light in geometric shape is at least one the (aa) candle light, (bb) night light, (cc) accent light configure for the desktop or floor or wall mounted applications in an eighth embodiment. Wherein, the project light has top (a) Fixed or (b) rotatable housing has built-in he, tube assembly to fit slide, film, printing or painting piece carried mini size image or patterns forming display to let lower position LED light beam emit through and emit out enlarge size image or light patterns after go through the said top position refractive lens or enlarge lens. Wherein, the base (1416) has built-in USB (2408) and outlet (2410) and have at least one $2^{nd}$ LEDs for accent light or night light functions. Wherein, the project light in any geometric shape such as candlelight for 3, 4, 5, 6 inch tall has built-in project image or patterns system and at least other LEDs for glow the colorful film, heater transform film to glow with preferred switch to select functions between, projection light, night light or glow light, both light effect, or OFF all light effects.

FIG. 25 is an isometric top view of one of preferred liquid supplier device (2500) which has built-in USB (2508) (2518) and-or Wireless (Qi) charging-system inside base (2516). Wherein, the device (2500) has outlet (2504), time, date setting or displayer (2512), top coffee or other powder (1506) and lower (2502) water container with heater (not shown) inside base (1516).

Figures 1, 26:
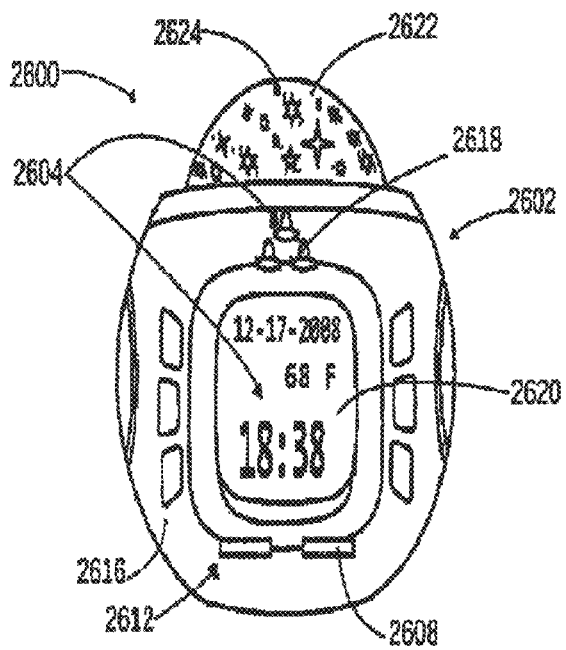
FIG. 26 is an isometric top view of one of preferred sprayer, diffusor for smell, essential oil, air fragrancy, air freshener LED light in a tenth embodiment.
Figures 2, 26:
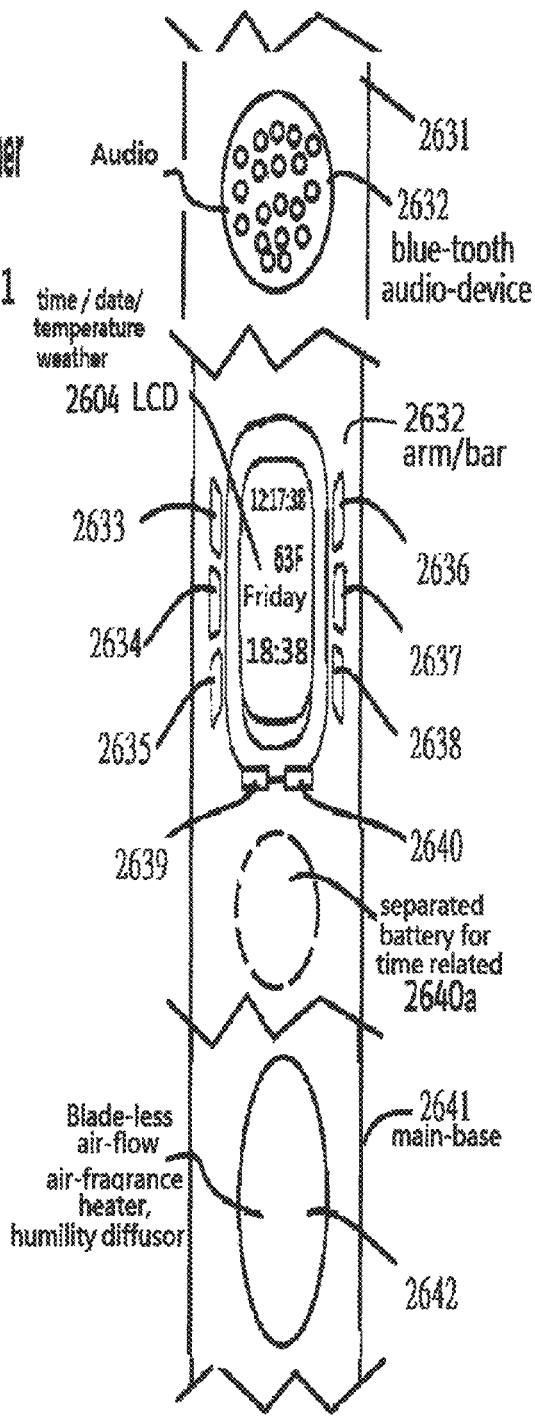

FIG. 26 is an isometric top view of one of preferred sprayer, diffusor (2600) product of current invention for smell, essential oil, air fragrancy, air freshener, the desktop or floor or wall-mounted LED light has its own existing function is one of sprayer, diffusor (2612) air flow device (2606) and LED light source (2602) fit within housing for act glow light, back light for heat or water transfer films, painting or printing piece with liquid or water or essential oil container (2614). As other existing function products of current invention or above discussed preferred products of current invention FIG. 23, 24, 25 has built-in USB and-or wireless (Qi) charging-unit(s) fit within the housing.

FIGS. 26-1, 26-2 is one of (A) time, alarm clock with built-in (a1) LED '8' segments (2620), or (a2) 7 LED segments display (2620), or (a3) LCD display having LED back light display (2604); for desktop items or fit into at least one desk, floor, wall-mounted LED light, or preferred it is individual desktop item or desktop applications; having built-in charging system. Said LED light (2600) has built-in at least one (aa) Pin-hole image projection without through refractive-lens or magnify lens. the light beam just passing through at least one (i) shaped openings or windows, (ii) painting or printing windows or shape areas, (iii) colorful film, piece, or blister printing dome piece or sphere cover; to show enlarge image or lighted patterns on surrounding wall, ceiling, areas without any other optics-lens or optics-piece except the pin-hole image dome, cover, sheet, piece. The said LED light further had built-in time related functions with plurality of adjust, setting, select switch (2633) (2634) (2635) (2636) (2637) (2638) and USB Charging-port (2639) (2640) with built-in backup battery (2640a) and optional for air flow device (2642); all install or fit within the arm, bar, pole of said desk, floor, wall-mounted LED item, light, extension cord.

Figure 27:
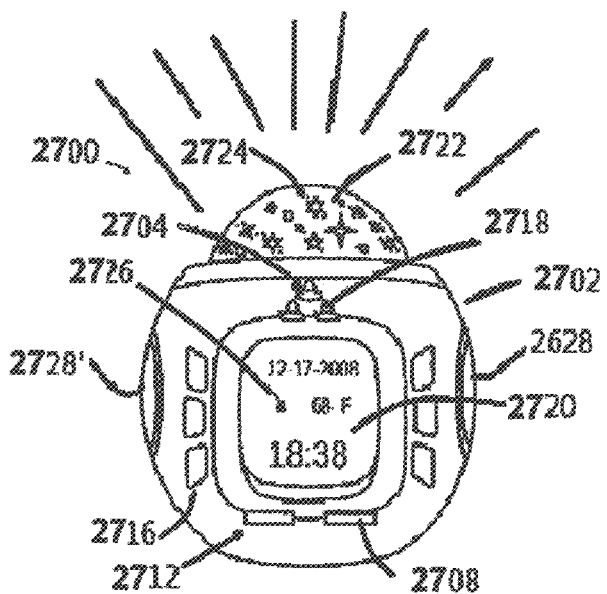
FIG. 27 is an isometric top view of one of preferred the alarm clock, time piece, pin-holes image projection, color image projection device.

FIG. 27 is similar with FIG. 26-1 for an isometric top view of one of preferred the alarm clock, time piece, pin-holes image projection, color image projection device or desktop items fit within at least one the desktop or floor or wall mounted LED light, or preferred it is individual desktop item or applications having built-in charging system in an eleventh embodiment.

Figure 28:
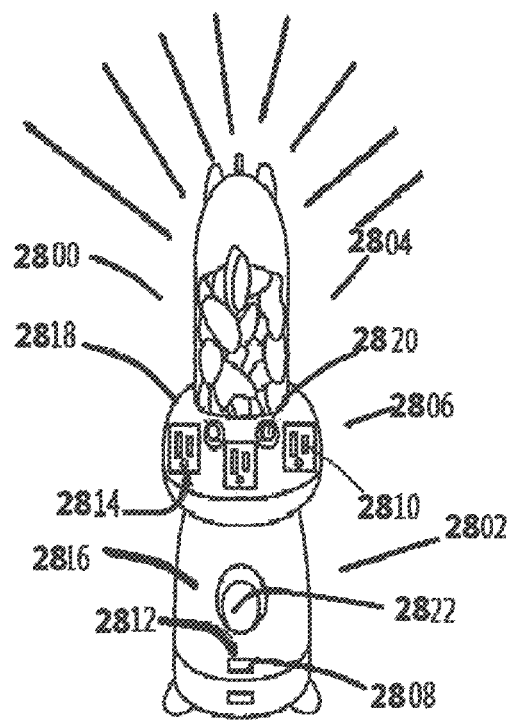
FIG. 28 is an isometric side view of one of preferred the food supply device or desktop items fit within LED light.

FIG. 28 is an isometric side view of one of preferred the food supply device or desktop items fit within at least one desktop or floor and wall mounted LED light, or preferred it is individual desktop item or desktop applications; having built-in charging system.

Figure 29:
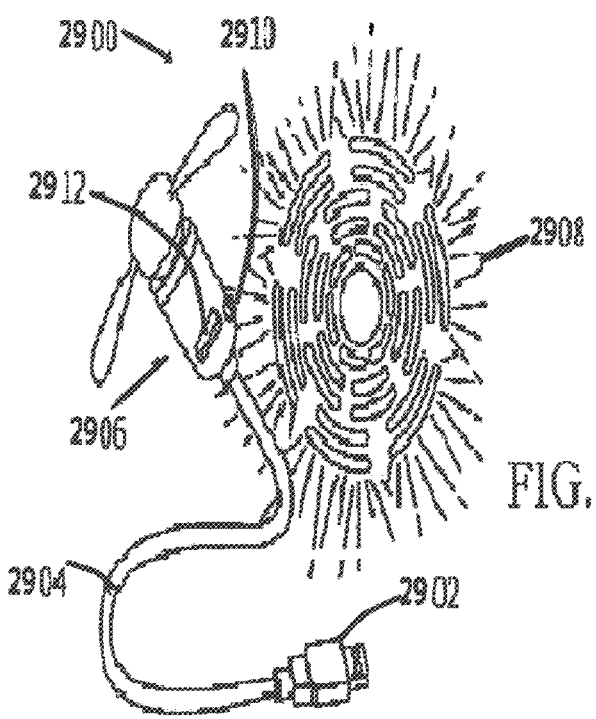
FIG. 29 is an isometric side view of LED light having built-in charging system in a twelfth embodiment.

FIG. 29 is an isometric side view of one of preferred the air flow device or desktop items fit within at least one desktop or floor and wall mounted LED light, or preferred it is individual desktop item or desktop applications having built-in charging system in a twelfth embodiment.

FIGS. 30A1, 30A2, 30B1, 30B2, 30B3, 30B4, 30C1, 30C2, 30C3, 30C4, 30C5, 30C6, 30C7, 30D1, 30D2, 30D3, 30D4 is detail description for USB-unit, USB-Module, Outlet-unit, Outlet-module, sealed-unit, Universal unit and all related parts for reference.

1. FIG. 30A1 show (1) USB-unit: The Unit means it is an individual charger has only charger purpose to have one input-current and passing though inner own circuit to make input current change to one output current to charger other device from its own USB port(s). This unit can be housed or without any hosing and install within the said desk-top housing and all live-wired or electric-carried parts & accessories not touchable by people except the USB-port(s).

The Charger only take 1 and only 1 of the input power or current and passing through inner circuit to come out the DC current on desired voltage and amperage. It does not have more than one different input current such as AC or DC current as input current or it will be totally destroy the output current because inner circuit is fixed for one and only one current specification.

FIG. 30A2 show (2) USB-Module: This module is not a single USB-Unit Charger. It will be any combination for any number of the USB-Unit(s) or/and Outlet-unit(s) has its own number of the USB-port(s) or/and Outlet-port(s) to connect with other electric or digital data device's mail prong(s) or Plug(s) to charging or supplying the DC or/and AC current to other devices(s). This unit can be housed or without any hosing and install within the said desk-top housing and all live-wired or electric-carried parts & accessories not touchable by people except the USB-port(s).

FIGS. 30B1, 30B2, 30b3, 30B4 show (3) Outlet-unit and Outlet Module: The unit it is an individual POWER SUPPLIER device has outlet-receptacle which can receive the other device's prongs to deliver or supply the AC current from the outlet-unit's power source though the outlet-unit's port(s) to other device's prong to get into other device's circuit to power other device. This unit can be housed or without any hosing and install within the said desk-top housing and all live-wired or electric-carried parts & accessories not touchable by people except the USB-port(s).

FIGS. 30C1, 30C2, 30C3, 30C4, 30C5, 30C6, 30C7 show (4) Sealed-unit: This is a unit which has desired combination for any number of USB-unit(s) or/and outlet-unit(s) arrangement or combination and sealed into one piece of the housing and passed all USA required related safety standard(s) and get test labs' certification for this sealed unit only which not including the other housing parts or accessories non-related to the USB or Outlet charger. This sealed unit any live-wire or electric-carried parts & accessories have to sealed so called sealed unit so can pass the US Safety standard requirement(s).

FIGS. 30D1, 30D2, 30D3, 30D4 show (5) Universal Charger: This is charger which has finished housing and electric-contactor such as prong means, or wired, or quickly-connector(s) which not only can incorporate with the said desk-top items but it also can use for other applications. One of preferred embodiment is market available USB-2.1 Amp Charger has 3 USB-ports with prongs. This can install within the current invention desk-items housing by wired or outlets and it also can take apart from the desk-top item's housing and carry with people to plug-into Wall outlets to charger the computer, communication, consumer electric items or any electric or digital data devices while prong means plug-into outlet on wall or power strip's outlets. This is definition for universal charger for current desk-top items.

FIGS. 30E1, 30E2 is an isometric view of parent filed case preferred arrangement of at least one wired movable, detachable, dis-assemble, re-assemble USB or Wireless (Qi) charging-unit(s) and outlet-unit(s). Wherein, Each unit has at least one (a) geometric shape and (b) preferred construction including at least one (A) reading light has color changing, selection, mixing of cool white, warm white light beam ([L] of FIG. 30E1),
(B) accent tube light or tube LED candle light having at least one (a) project image, (b) glow light, (c) LED candlelight has moving or waving or shaking or flicking flame, (c) LED back light for front heat/water transfer film, color film, printing or paint piece ([M] of FIG. 30E1),
(C) LED night light has built-in at least one (a) surge protection circuit, (b) outlet(s), (c) at least one motion, moving, radar, and photo sensor, (d) USB and-or wireless (Qi) charger, and (e) seat, saddle, slot, ditch, and other design to put be-charged products on during charging time. ([N] of FIG. 30E1),
(D) plug-in outlet night light having color changing light (169a) and-or indicator light (169c) and-or outlet(s) (169d) ([Q] of FIG. 30E1),
(E) plug-in night light having outlet(s) with surge protection (R of FIG. 30E1).

(F) Each separate able charging unit(s) (161) is movable or detachable, dis-assemble, re-assemble unit from main housing by at least one main wire (165a'), branch wire (165b) (165b'). Wherein, the said wire coil, wrap, extend, retract to fit into wire-arrangement space of each charging-unit(s) having length up to 30 feet. Each separate able USB and-or wireless (Qi) charging-unit (161) up to 30 feet to connect with main housing of a desktop, floor, wall mounted item, or light, or extension-cord in order to buy one current invention products can have 2 distance away location have USB and-or wireless (Qi) charging function (Ⅰ of FIG. 30E1). For one preferred example, Extension cord has 2 detachable USB and-or Wireless (Qi) Charging-unit(s). People can pull one charging-unit(s) on desktop and pull another one to bed rack or wall adjacent bed, so can easily charge device on hand-reachable 2 locations. One other alternative example, Power strip or desktop lantern base has built-on 2 or more detachable charging-unit under couch or under living room table. People can pull one of units on living room table and pull 2nd one of units on other ends 2nd living room table and pull others of unit(s) on 3rd living room table. It is appreciated, the more than one detachable charging-unit(s) can fit with desk, floor, wall-mounted item, lighting, extension cord to offer people has more than one location(s) (up to 30 feet) to charge device(s). Wherein, the said power strip or other desk, floor, wall-mounted item, light, extension cord powered by external DC power source by at least one (1) USB male plug (160) or USB female receiving port (M of FIG. 30E1), (2) external transformer (165AC-DC) which is direct plug-in or has AC-plug wire (163 of B FIG. 30E1); to supply DC power into said USB and-or Wireless (Qi) Charging-unit(s). It is appreciated some alternative application for these features also shown on FIGS. 53 to 60.

(G) Other USB charging unit(s), LED unit, Outlet with different male plugs connect to AC or DC power source as other FIGS. including FIGS. 3E1 inside A, B, C, D, E, F, G, H, J, K, S, T, U).

Figure 57:
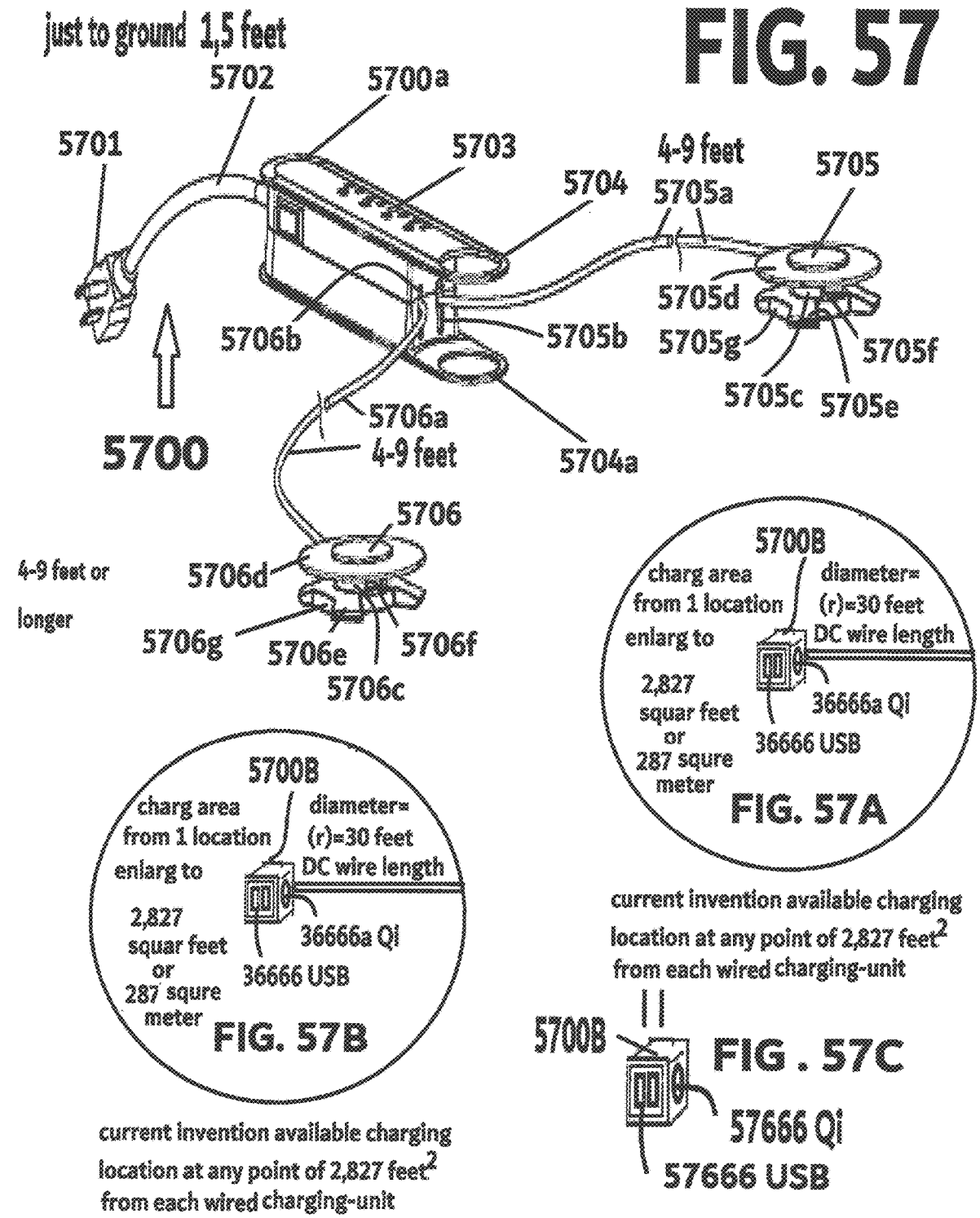

FIG. 30F1 show alternative construction desk, floor, wall mounted item, LED light, extension cord similar with FIG. 1. Wherein the difference for this preferred embodiment is built-in (A) USB (1e) or (B) Wireless (Qi) (not shown) charging-unit(s) is one of (aa) fixed (1d) (FIGS. 1 to 8), (bb) wired (1e) movable, detachable, dis-assemble, or re-assemble unit(s) (1e) or (FIG. 57). Wherein, said unit(s) has built-in wire-arrangement (FIGS. 53A to 53D) to coil, roll, pull, or receiving (FIG. 57) preferred length of charging-wire easily at outside (FIG. 53A show rotating direction arrow head) of the main housing not make wire arrangement construction inside the main housing as US prior art US 2011-021-5759 FIGS. 1A, 1B, 2 wire arrangement inside the main housing which is difficult because people finger is no way can get into main housing. Furthermore '759 FIG. 3 external wire arrangement is arranged on middle of wire length which apply elastic kits which always had tangle wired or fail of elastic spring issues. Furthermore, '759 FIG. 4 other application is just put long length wire just outside of main housing which is also not acceptable by market required.

From FIG. 30F1 show one preferred embodiment of current invention, the said item, light, extension cord powered by at least one (a) USB-male plug get external DC power (1c) or by jump USB-wire (1b') has at least 2 USB male plug (1b'1) (1b'2), (b) item built-in female receiving port(s) (1b) to receive external male plug (1b''') input DC power, (c) item has AC-plug wire to get input power and go through built-in AC-to-DC circuit, (d) items has external direct plug-in or AC-plug wired transformer (1c'), and (e) other market available for USB and-or Wireless charging system, LED(s) light source, and additional DC operated functions. Furthermore, the said items, light, extension cord has built-in surge protection circuit to protect input AC power so can protect all internal electric parts & accessories not damaged by super high voltage power and also protect the other AC operated products while other AC product connect with built-in AC outlet receiving port(s) (1f).

FIG. 30F1 also show the main housing has female receiving end(s)(1d) (1e) to connect with external plug-in or wired transformer (1c') to get 1st DC current by low cost AC-to-DC inside transformer, and go through main housing built-in at least one DC-to-DC or conductive piece or electric parts to supply or distribute the said at least one $2^{nd}$ or more different voltage or different amperage DC power for other electric parts which is at least one (i) IC, (ii) charging-unit(s), (iii) primary LEDs for illumination, (iv) 2nd or more secondary LEDs; for night light, accent light, status indicator light, wireless (Qi) charging-unit(s) or other preferred function(s).

FIGS. 30G, 30H, 30I, 30J show all different outlet(s) arrangement on different base of said items, light, extension cords with or without 2nd or more wire to connect with the input AC power. Wherein, these outlets unit(s) shown on FIGS. 30G, 30H, 30I, 30J has at least one (a) internal conductive wires or (b) built numbers of outlet-unit(s) on one circuit board, and (c) number of outlets, USB and-or Wireless (Qi) charging-unit(s) form one module; to arrange on at least one locations, base, bar, and pole of said (i) desk, (ii) floor, or (iii) wall mounted item, light, or extension cord. Wherein, some preferred input power is same as above discuss for FIGS. 3, 4, 9. Wherein, top of the application can be any kind of items, light, extension cord such as FIGS. 53 to 60 shown some preferred applications.

FIGS. 31, 31A, 31B, 31C disclosure the 1st embodiment for floor light (3100) or ground lighting has (a) plurality of LED or (b) LED or CFL bulb; arranged on main bar (31806), side branch arm (31804) (31805) for illumination. And, at least one secondary LED light source (not shown) for night light or accent light as above discussed all kind of light effects such as color changing, selection, mixing, adjust brightness. Said LED light (3100) has plurality of AC outlets-unit (31214) (31214a) (31214b) (31214c) (31214d) or outlet module (31210) on base (31800) or wired to other location(s) such as arm (31803), added table (31802) to has nice and net wire connection better than market existing power strip with mess wires. And, the said item, light, extension cord has preferred USB (31212) (31212a) (31212b) (31212c) (31212d) (31212e) and-or wireless (Qi) charging-unit(s) (31222) install anywhere and not limited for one of fixed on embodiment (3100). The said USB unit(s) (31212) (31212a) (31212b) (31212c) (31212d) (31212e) and wireless (Qi) charging-unit(s) (31222) is one movable, detachable, dis-assemble, re-assemble has its own built-in space, slot, gaps, grove, ditch space for wire-arrangement (FIGS. 53 to 60) and coil, pull, receive wire on outside of main housing by simple rotating. Incorporate enough conductive wire or USB-wire (not shown) can easily arranged USB or wireless (Qi) charging-unit(s) (31222) install on the stem, bar, pole, pedestal, added-surface, and move said unit(s) to more than one location(s) to charge phone or other device(s) because each unit having enough charging-wire length which can be up to 30 feet. Wherein, base (31800) or table (31802), base bar (31801), top bar (31803) of said embodiment (3100) has enough space to fit the said unit(s) during shipment to save packing cost, trouble. Said each unit (31208) (31212) (31214) enough charging-wire is connected or came from main housing built-in at least one AC-to-DC circuit(s), and control function(s) or distribute power by at least one IC, distribute system, switch, sensor (31809a), wireless signal receiving system (31809) which including at least one IR, RF, Blue tooth, Z-way, ZigBee, Wi-Fi, download APP software to make set, adjust, change, selection, power on/off, and other wireless remote control system (31809). Wherein, said USB charging-unit deliver the USB Charging-port DC 5Volt (+/−10%) to charge other items and the embodiment is powered by 120Volt AC. Wherein, the embodiment (3100) is powered by external AC power.

FIGS. 32, 32A, 32B, 32C disclosure the 2nd floor lamp, garden light or ground lighting device (3200) has the base (B32A) with desire USB port(s) (32212) (32212a) (32212b) or outlet(s) (32214) (32214a) including 6 kind of circuits as FIGS. 32C (32C1, 32C2, 32C3, 32C4, 32C5, 32C6, 3C7). It is appreciated, the outlet(s) alternative arrangement is one of above discuss as FIGS. 30G, 30H, 30I, 30J. Wherein, the said embodiment (3200) all illumination, charging, control system fit within or install on embodiment (3200) is any combination selected from (a) AC-to-DC circuit, (b) DC-to-DC circuit, (c) IC circuitry, (d) AC or-and DC light source, (e) USB charger has USB charging-port, (f) AC outlets, (g) wireless charger, (h) inductor charger sets, (i) wireless communication set, (j) remote controller, (k) Bluetooth communication kits, (l) wi-fi communication kits; to make preferred functions as above all Figure details discussion. The said table (32802) has base support rack or arm (32801A) where has built-in wireless charging-unit (32808) such as inductor charging or magnetic coil set. The wireless charging-unit(s) (32808) has preferred kits or parts or for desire combinations. The wireless charging-unit(s) electric-coils fit into embodiment table or vertical, horizon, tilt surface to interact with the be-charged product electric-coils to change magnetic force to DC current to charge other DC operated product(s). The embodiment (3200) built-in USB charging-unit(s) (32312) (32212a) (32212b) install on bar (32806) (32803) (32801) is one of (a) fixed, or (b) wired for movable, detachable, dis-assembly, re-assembly unit(s) having USB-wire from 2 to 30 feet to allow people charge product(s) on more than one locations away from said embodiment (3200). Wherein, the said USB charging-unit(s) has more powerful or more quickly wired USB charging-un current invention for desk, floor, wall-mounted LED light is one of important features and improved market all LED lighting only has fixed and none movable, detachable, dis-assemble, re-assemble USB charging-unit(s). So, current invention has more remote away charging-units and more powerful charger up to 3.1 Amp or higher or more USB charging-ports for USB 3.0 specification for quickly charging capacity. As for the extra additional functions including (a) wireless control system by at least one IR, RF, Blue tooth, Z-way, Zigbee, Wi-Fi, download APP control software, (b) IC for color changing, selection, mixing, (c) brightness control or adjust, (d) add surge or other protection circuit to prevent electric shortage or attack by high voltage, (e) primary LED light source including plurality LEDs or replaceable LED or CFL bulb, (f) secondary LEDs for accent light, or night light, (g) wire arrangement built inside unit(s) of movable, detachable USB or wireless charging-unit(s) and coil, pull, receive wire on outside of main housing, (h) module has preferred number of USB and-or wireless charging-unit(s), outlet(s); for preferred desk, floor, wall-mounted item, light, extension cord as above FIGS. 1 to 31 and all alternative, replaceable, equal function discussion should all fall within the current invention concept, idea, and claims.

FIGS. 33, 33A, 33B, 33C disclosure the $3^{nd}$ embodiment for floor light or ground lighting (3300) has outside transformer has AC-to-DC and AC current so base has 2 different current into the said floor light or garden light for at least one (a) USB charger, (b) DC power LED primary and secondary light source, (c) AC power source or AC outlets; as all above FIGS. 1 to 32 and all co-pending parent filed case(s) discussion; to supply at least one (aa) charging, (bb) illumination, (cc) supply power purpose, (dd) wireless control, (ee) wire-arrangement (33434A) inside base (33800) and-or said USB-wires fit within said detachable, movable charging-unit(s) housing. The more than one of the said fixed or wired movable, detachable, dis-assemble, re-assemble USB or wireless charging-unit(s) and-or outlets has more useful function(s). Said embodiment (3300) preferred has at least one or any combination function(s) including but not limited for (a) surge protection, (b) overheat protection, (c) shortage circuit protection, (d) overload protection, (e) master controller, (f) remote controller, (g) download APP control software, (h) Z-way, (i) wireless, and (j) wi-fi, infrared controller or communication. The said plurality number or at least one (1) fixed or (2) wired movable, detachable, dis-assemble, re-assemble; USB or wireless charging-unit(s) and-or outlets within or install anywhere of said lighting device to supply the DC 5.0Volt at the USB port output-end or wireless output 5 Watt to 100 watt DC to wireless receiver of other electric device(s). The base (33800) also has pre-arrangement not only has the weight means but also has wire arrangement (33424A) to install the power source wires (33424). Said USB-wire for detachable charging-port(s) is fit into unit(s) own space for wire-arrangement. The wire-arrangement is same concept as co-inventor's parent filing (#TTT) (#RRR) or issued patents.

Wherein, the embodiment (3300) has the built-in wireless (Qi) charging system which has electric coils fit within horizon, vertical, tilt surface of embodiment body to connect with input power and current through the electric-coil to create the magnetic fields to interact with be-charged built-in or add-on or plug-into electric coils to change receiving magnetic field through the be-charged electric coils to charge other products. Furthermore, for USB charging-unit(s), the embodiment (3300) has built-in at least one AC-to-DC circuit, DC-to-DC circuit with related electric parts & accessories to get desired current to charge the device's energy storage kits including but not limited for rechargeable batteries. The said built-in or add-on surface, table preferred is one of see though material such as plastic resin to allow the people can see though the inner inductor electric coils to easily know this is wireless charger. The add-on surface is one of assembly piece so can install the said wireless charging assembly within and assembled to form a table or piece has built-in wireless charging-unit(s).

FIGS. 33, 33A, 33B, 33C disclosure the base of the light device including the desktop, ground light, floor light, garden light in all kind of different construction has charging features from USB or wireless charging-units within or install on these lighting having wire to connect at least one fixed, movable, detachable, dis-assemble, and re-assembly charging-unit(s) or assembly as FIG. 32 one of preferred arrangement but not limited for wired charging-unit(s) from the said ground, floor, wall mounted lighting. Said base may have different outlet power source as FIGS. 30G, 30H, 30I, 30J though different electric circuit as FIGS. 30A1 to 30D4 selected combination of arrangement including the—FIGS. 3A, 3B and FIG. 3C, FIG. 3D for USB or wireless or USB and wireless charger-unit(s).

FIGS. 34, 34A, 34B, 34C disclosure the 4*th* embodiment (3400) which has the plurality of (1) fixed or (2) wired movable, detachable, dis-assemble, re-assemble; USB (34212) (34212*a*) (34212*b*) (34212*c*) (34212*d*) install on bar, table, pole or wireless charging-unit(s) (34222) (34222*a*) and-or outlets (34512) (434512*a*) which install anywhere of said embodiment (3400) housing. Wherein, said embodiment (3400) has rotating orientation outlet-unit(s) and has desired spacing or extendable, bendable, retractable functions as (35212B, 35212A of FIG. 35C) or co-inventor's (#BBB) features. Wherein, one of preferred construction as FIG. 35C shown alternative for built-in outlet-unit(s) is one of extension cord or power strip. The concepts for FIG. 35C show one alternative outlet-module is one of transforming shape power strip (3512B) or extendable (3512C) or outlet-module is one of tilt able, rotatable, changeable shape, position, or orientation features (3512A) (3512C). The said plurality of (1) fixed or (2) wired movable, detachable, dis-assemble, re-assemble USB or wireless charging-unit(s) install on anywhere of the body, poles, bar, tube, add-on parts, add-on surface, frame, steam, arms and all the electricity go through the inner of the frame, housing, tube, bar, pole, steam, arms by enough length wire(s) to connect with circuit board and the AC, DC light source, switch, wireless receivers, outlets. Wherein, said USB charging-ports to supply the illuminations by AC or DC light source, charging DC power, supply AC power to other electric or digital device(s). The said outlets-unit or outlet-module has outlet-ports for any combination arrangement or for a module has plurality of outlets, or movable or detachable separated housing outlets module fit within market available power strips, power cord, power station has wire-plug (3528I) to connect with the inner circuit receiving outlet-ports (2141). The said each outlet is round shape and can rotation orientation to any directions with optional cover to prevent from kids touch the inner conductive parts or from dust or water or from electric shocked FIG. 34B disclosure the built-in or added-on surface, table, plate which has preferred organizer, compartment, drawer (34810) to allow people to put the stationary, tools, phone, i-pad, key, hair clipper, ear ring, bracelet, TV remote controller, other personal items. Wherein, the embodiment (3400) as above FIGS. 1 to 33 discussion has built-in plurality of (1) fixed or (2) wired movable, detachable, dis-assemble, re-assemble USB charging-port or outlets and connect with light device circuitry by quickly connector, plugs, direct soldering, joint kits or the other device. And, each of charging-unit has its own built-in wire-arrangement to arrange USB-wire(s) fit within at least one groove, hooks, clipper, openings, cutout. Wherein, the said charging-unit(s) is one assembly unit and assembled by at least one screw, press-tight, catch and hook, sonic sealing, solvent, glue or other construction to assembled into one piece from many parts after install said USB-port(s), coil-sets within. Said, the outlet-unit or outlet-module or power strip or extension cord fit within embodiment 93400) also can design a slide door as FIG. 33C or FIG. 34C (800B), movable cover FIG. 34C (800A), snap tight door FIG. 34C (800A) to cover the compartment while people do not use the extension cord's outlets as FIG. 36.

FIGS. 35, 35A, 35B, 35C disclosure the No. 5 embodiment (3500) which has base (35ABB) has 120Volt AC power from AC-Plug wire (35528AC) get into the base by AC-plug (35526) and wire (35522) to connect with inside circuit(s) to supply (A) the DC current to the (a) USB (35802) (35212) (35212*a*) (35212*b*) or wireless (Qi) (3555) (3555*a*) charging-unit(s), (b) DC or LED light source, and-or (B) the AC to the AC light source such as LED bulb, or CFL bulb, (bb) outlet-port(s).

The said outlet-unit(s) (35512) which may for outlet-module (35512A) (35512B), outlet extension cord (35512*a*), outlet power strips (35512*c*), bendable extension cord/power strips (3512B), twist or rotatable or change orientation outlet set (3512A). Said, bendable or transforming extension cord or power strip (25512B) can fit into all kind shape base (35ABB) while power strip in a straight-line or curve-shape configure to the contour or edge of base. This is one of big improvement to use transforming, bendable power strip with or without fixed or detachable USB and-or wireless Qi charging-unit(s) fit into all kind of desk, floor, wall-mounted item, light, extension cord, or other LED related embodiment(s). Furthermore, the said all outlet-port(s) of outlet-unit, outlet-module, extension-cord may has optional cover, slide door, snap cover to make cosmetic or safety arrangement. To apply the existing power strip with AC plug and wire is not perfect than current invention to incorporate with existing power strip with or without fixed or detachable USB and-or wireless charging-unit for (aaa) universal and (bbb) existing power strip already have safety certification and also already mass production for decades so cost is the lowest.

Apply exiting power strip with or without USB and-or Wireless charging-unit (35512B) (35512*a*) (35512*c*) (35512A) (35512) to fit into current invention all kind applications base can save a lot of safety testaments or development cost and also save a lot of time, labor, resource to design. Wherein, a built-in extension cord which can select from straight one (35512) or transforming power strip (35512B), curved shape power strip (35512B), extendable power strips (35512C) which each outlets can change position or orientation models from existing market place. The said existing power-strip, extension cord can use wired (not shown) or prong-wire (3528I) to insert into inner outlet-unit (32141) or quickly connector (not shown) to connect with the input AC. The embodiment (3500) has all features, function as above FIGS. 1 to 34, co-pending filed case, inventor issued parent filed case. It is appreciated all above discussed Drawing, text, detail description should all fall within the current invention claims for any alternative, replaceable, equal function for parts and accessories.

FIGS. 36, 36A, 36B, 36C disclosure the floor light for indoor applications (3600) at marketplace do not have waterproof door, cover or outdoor function. The current invention has waterproof door or cover to prevent moisture or water leakage into inner of base.

The current invention base (B36ABB) further including a compartment which can fit the market existing power strips (36512*a*) has the outlet-port(s) (36214) to receiving the all kind of power strip FIG. 35 (35512*a*) (35512A) (35512B) (35512C) (35512*b*) having extension-cord's plug (365281) to power the existing power strip. The current embodiment (3600) arrangement to sell the floor light or desk lighting do not including expensive #14 AC-plug wire. To sell the floor light or desk light without the #14 gauge AC-plug wire will big cost saving for consumer. For some application, the existing power strip can movable, removed, dis-assemble, detach form said embodiment (3600) and assemble back again.

The power strip (36512*a*) inside outlet-port(s) (36214) has desired number and (a) fixed or (b) wired movable, detachable, dis-assembly able, re-assembly able; USB and-or wireless (Qi) charger products. Wherein, said "and-or" means the one charging-unit has both USB and wireless charging-unit(s) built inside in one individual unit. Wherein, the one of preferred USB charging-unit has built-in not only USB-ports but also has its own wire-arrangement space, slot, ditch, grove, gaps to fit each USB-unit own USB-wire.

Wherein, the DC power deliver or supply to each USB charging-unit(s) incorporated with external or jump USB-wires having at least 2 male USB-plug charge the other device(s). The added-on or built-in table of desk, floor, wall-mounted light device has at least one plurality of (1) fixed or (2) wired movable, detachable, dis-assemble, re-assemble USB and-or wireless charging unit, module, seal unit, universal piece; has plurality of USB charging-ports which is at least one standard, rotatable, tilt-able, twistable, square shape outlet unit(s), round shape outlet-units, plurality of outlets-ports, or outlets-module which has any combination for outlet-units, USB-unit or sealed-unit, and universal-units; as above and co-pending or co-pending cases disclosure skill or application.

The power source used a simple 120Volt AC prong-wire to get power into the said floor light, garden light, wall mounted light housing or base. The one of preferred embodiment (3600) extension cord has special design length from 1 feet to 10 feet or longer of #14 gauge electric wire to meet safety standard for 1850 Watt load.

The current preferred embodiment (3600) AC power #14 gauge wire fit into the base wire arrangement space to pull out, receiving back into the base space. The current invention has wired detachable USB and-or wireless charging-units and each charging-unit has its own 3 to 30 feet length of #16 to #22 gauge USB-wire depend on different country safety requirement. Wherein, Each USB wire has Minimum 4 to 30 feet length to let people charge products within 30 feet diameter areas which equal (3.1416 times 30 feet×30 feet=2,827 square feet=or equal 287 square meter area). The current invention enlarge people charging location from one location to 2,827 square feet (ft$^{2)}$ or 287 square meter (meter$^{2)}$. This is the big improvement than any other market USB and-or Wireless (Qi) charging applications to enlarge charge-location from 1 location to 2,827 feet or 287 meter$^2$ as FIG. 36B and FIG. 57 shown.

From FIG. 36D show current invention charging-unit can put any location within 2,817 ft$^2$ or meter area from each detachable, movable, separate able individual USB or wireless charging-unit while the wire length is 30 feet. So, if people purchase one of current invention desk, floor, wall-mounted item, light, or power strips; people can put power strip under furniture such as sofa, couch, take, desk to charge other products on any location within the said 2,817 feet2. The current invention wired unit(s) has built-in wire-arrangement so no more see mess wires for power #14 gauge wire and DC delivery wire #16 to #22 gauge DC wire. The input power for current invention having outlet-unit(s), the power wire specification depends on the application. The AC power wire can be 1,650 Watt or 1,850 watt or any wattage for different electric appliance. One of example is lighted cosmetic mirror set show on FIGS. 22, 25-1, 25-2 or lighted dressing mirror set FIGS. 21-1, 25-3, 25-4, 37-4; has multiple features or functions. Said, multiple functions LED light has built-in mirror(s) supply house ladies to have light, magnetic lens, charge phone, and use hair dryer at same time have to use 1,850 Watt for safety consideration. If not use the hair dryer can use 1,650 Watt with less thin electric wires.

FIGS. 37-1 to 37-9 disclosure 9 preferred embodiment of current invention, but not limited for 9 design of the said floor lamp or floor electric device such as lighted dressing mirror FIG. 37-4 as above discussed that has different shape and construction. These applications are same as co-inventor's (#HHH-11) prior art U.S. Pat. No. 8,950,899 FIG. 11. One of alternative embodiment change from these 9 examples into LED light has built-in mirror(s) by keeping outlets, keeping USB input-power or output-charging unit, adding mirror, increasing brightness, arranging LEDs on contour or edge of LED light; so LED light supply preferred function is at least one (1) see partial face, partial body, whole body image from mirror, (2) capture front people, object(s), space image while people handle selfie work, (3) see details of face, partial body, object detail by at least one magnify lens for cosmetic or selfie or other works, (4) see dressing fitting, (5) offer illumination, (6) charger phone, (7) operate selfie to take photo into camera or video or phone device, (8) use hair dryer or use steam iron.

The said desk, floor, wall-mounted item, light, or extension cord which has preferred different shape or plurality of LED(s) to supply enough brightness for front people or object(s) or environment with face, half body, whole body mirror and light illumination; which show on some preferred LED light has built-in mirror set with or without rack or suction cup to hold image capture device(s) show on FIGS. 22, 25-1, 25-2 for rotatable LED light, or lighted dressing mirror set FIGS. 21-1, 25-3, 25-4, 37-4 for tilt angle LED light; incorporate with all kind of material without any limitation and all preferred LED light source. Wherein, the LED light source including U.S. Pat. No. 8,950,899 claimed but not limited.

FIG. 38 disclosure preferred but not limited for 11 design of the said wall light or lamp for the residence, office, building wall installation which has different shade and construction co-inventor's (#HHH-11) prior art U.S. Pat. No. 8,950,899 FIG. 12 and this also is same concept of the co-pending filing case (#HH-1) Filed Ser. No. 13/295,562, (#HH-2) Ser. No. 14/829,114 (#HH-3) Ser. No. 14/829,213 (#JJ-2) Ser. No. 14/602,206 and issued parent patents (#HH-09) U.S. Pat. No. 8,434,927 (JJ-10) U.S. Pat. No. 8,303,158 (JJ-1) U.S. Pat. No. 8,960,988, has the lighted image surrounding the said light device with special geometric art, message, words, sign, character on the wall or surface or ceiling and each has desired USB charging-port to charge or AC outlet-port(s) to supply the AC power to laptop or other electric device for bed, room, office to use while adapt this kind of wall mounted AC or DC light source.

Figure 39:
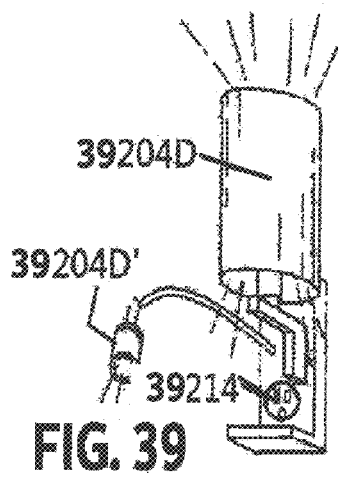
FIGS. 39 to 39H disclosure preferred but not limited for 9 design of the said wall light or wall mounted lamp.
Figure 39A:
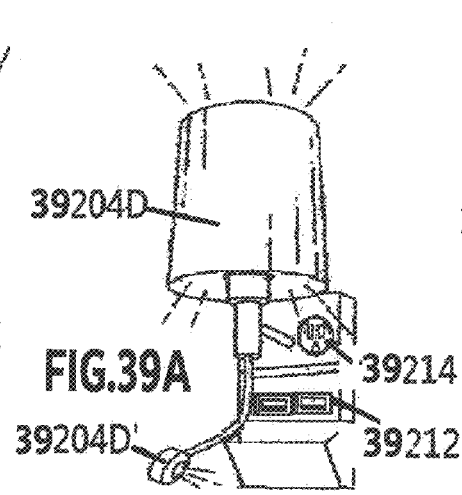
Figure 39B:
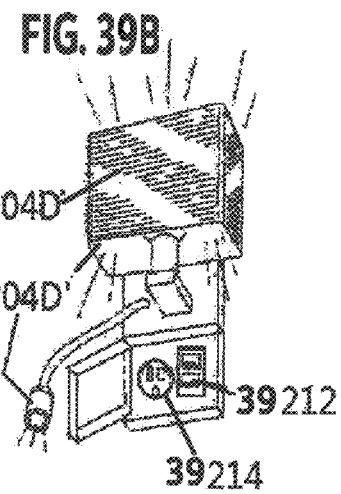
Figure 39C:
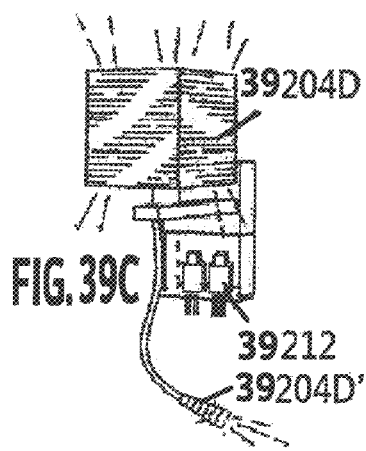
Figure 39D:
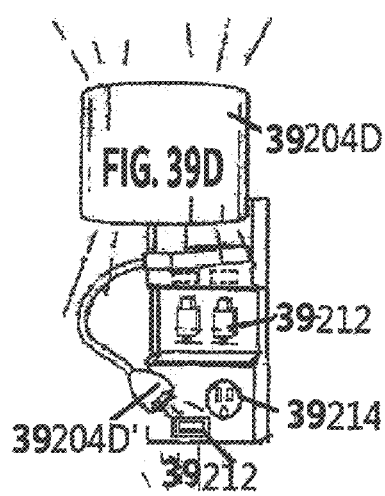
Figure 39E:
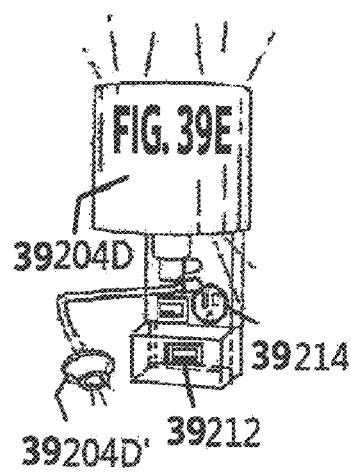
Figure 39F:
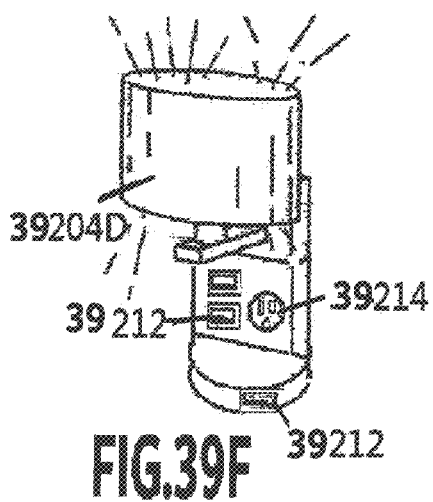
Figure 39G:
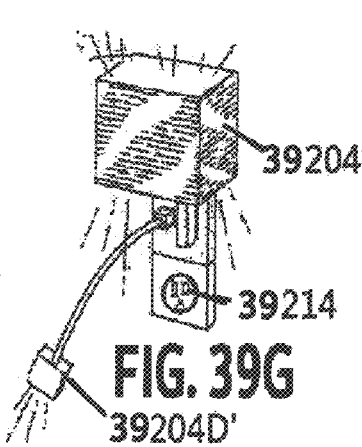
Figure 39H:
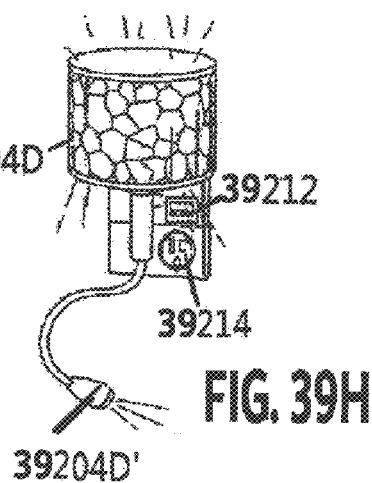

FIGS. 39 to 39H disclosure preferred but not limited for 9 design of the said wall light or wall mounted lamp which preferred for the bed or sofa or reading areas to use while people want such kind of wall mounted lighting which has different shades 39204D and lamp constructions 39204D' as co-inventor's (#HHH-11) prior art U.S. Pat. No. 8,950,899 FIG. 6 and each of them are powered by 120V AC by wired or plug-in with preferred sensor, switch, remote controller, wireless communication controllers and USB charger-ports 39212 or-and Outlet-ports 39214 has at least one of the AC or DC light source go through the FIG. 3A, FIG. 3B, or FIG. 3C, or FIG. 3D system to make illumination or-and charger or-and supply AC power depend on market requirement.

This kind of device preferred has the AC power source, it also can have backup DC power source for DC light source while power fail an use.

FIGS. 40 to 40Z7 disclosure preferred but not limited for 32 design of the said wall light or wall mounted lamp has different shade and construction co-inventor's (#HHH-11) prior art U.S. Pat. No. 8,950,899 FIG. 9 and each of them are powered by 120V AC by wired or plug-in with preferred sensor, switch, remote controller, wireless communication controllers and USB charger-ports or-and Outlet-ports, all specification depend on market requirement.

Figure 41:
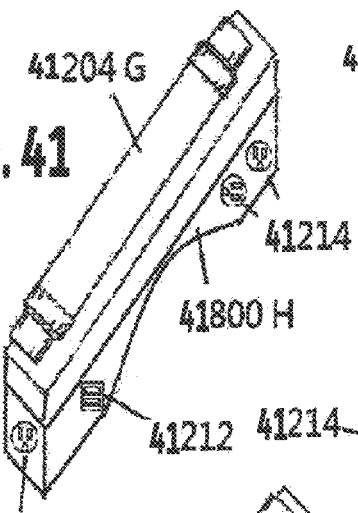
FIGS. 41 to 41f disclosure preferred but not limited for 7 design of the said wall light or wall mounted lamp.
Figure 41A:
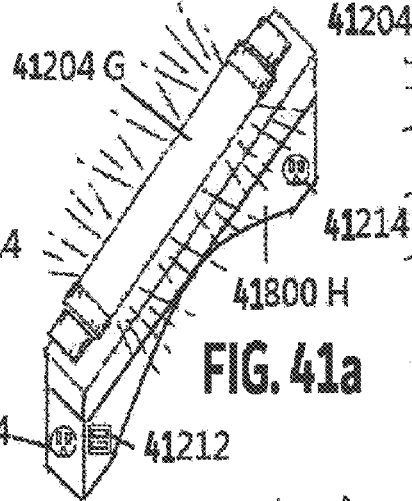
Figure 41B:
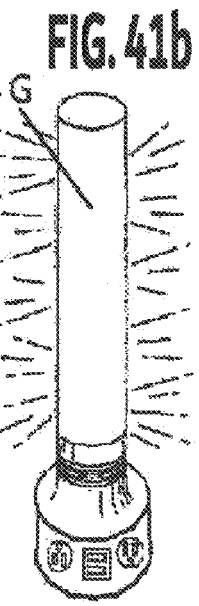
Figure 41C:
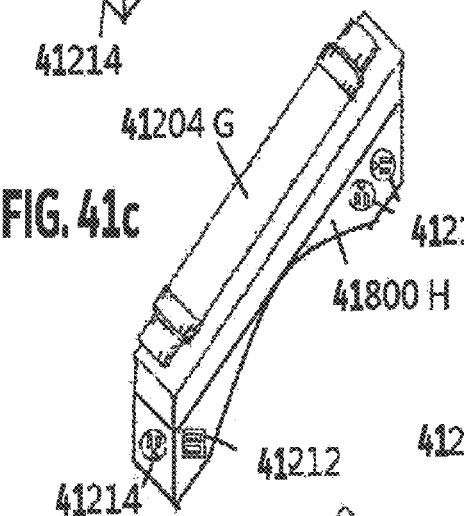
Figure 41D:
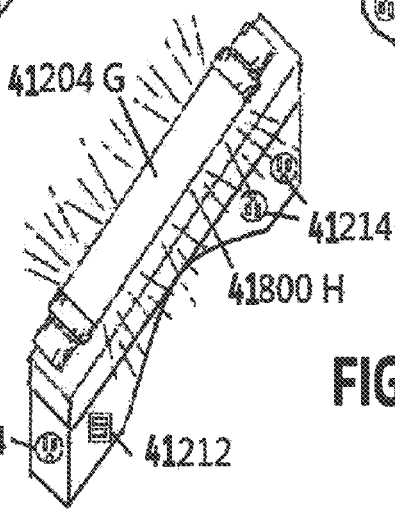
Figure 41E:
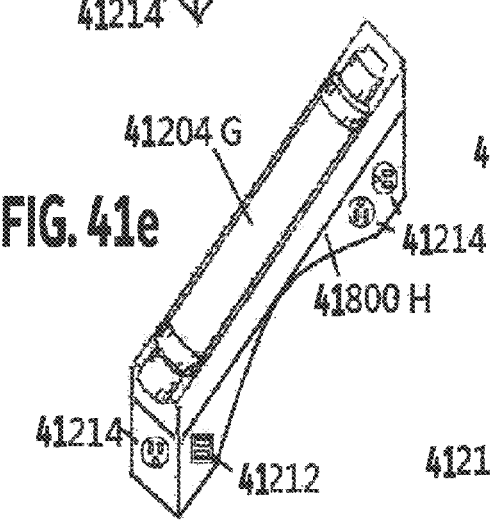
Figure 41F:
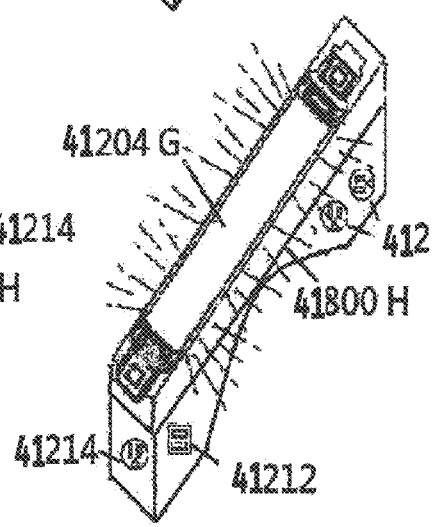

FIGS. 41 to 41*f* disclosure preferred but not limited for 7 design of the said wall light or wall mounted lamp which good for old/age people or kids care products or patient use at bathroom, toilet set, hospital, shower area, stair locations which has elongate or plurality light source or light source has the tube for (1)cosmetic such as filled liquid or small reflective material or miniature staff within or multiple LED light source with color changing . . . etc has different shade such hexagon, triangle, round, square elongate and construction co-inventor's (#HHH-11) prior art U.S. Pat. No. 8,950,899 FIG. 10 and each of them are powered by 120V AC by wired or plug-in with preferred sensor, switch, remote controller, wireless communication controllers and USB charger-ports or-and Outlet-ports, and (2) optional center had hand-grab smooth curvature so can allow people to use for bathroom, restroom, patio, swimming pool, outdoor, garden, beside bed, toilet seat, hospital, office, public building, parking lot stair, stairs, evacuation stair with motion sensor, PIR sensor, Moving sensor, remote controller, wireless controller, APP communication, Bluetooth communication controller for more convenience especially for the old/aged people or kids care products use.

FIGS. 42 to 42*e* disclosure preferred but not limited for 6 design of the said wall light or wall mounted lamp for lower profile or lower position wall mounted light or driving way or garage wall applications which has different shade and construction co-inventor's (#HHH-11) prior art U.S. Pat. No. 8,950,899 FIG. 5 and each of them are powered by 120V AC by wired or plug-in with preferred sensor, switch, remote controller, wireless communication controllers and USB charger-ports or-and Outlet-ports.

Figure 43:
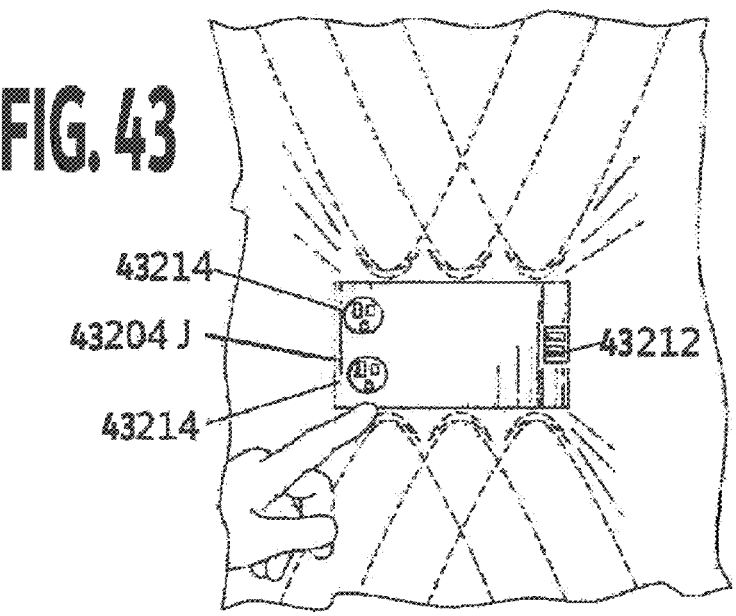
FIGS. 43, 43a disclosure preferred but not limited for 2 design of the said wall light or wall mounted lamp.
Figure 43A:
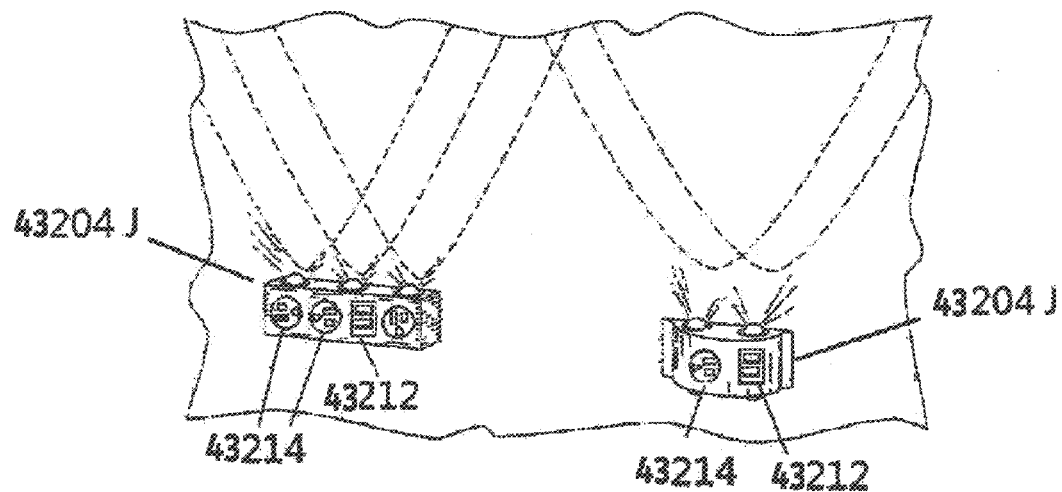
Figure 44:
FIGS. 44, 45, 46, 47, 48, 49, 50 disclosure to apply the existing power strip, extension cords or outlet-tap incorporate with floor light or wall mounted light.
Figure 45:
Figure 46:
Figure 47:
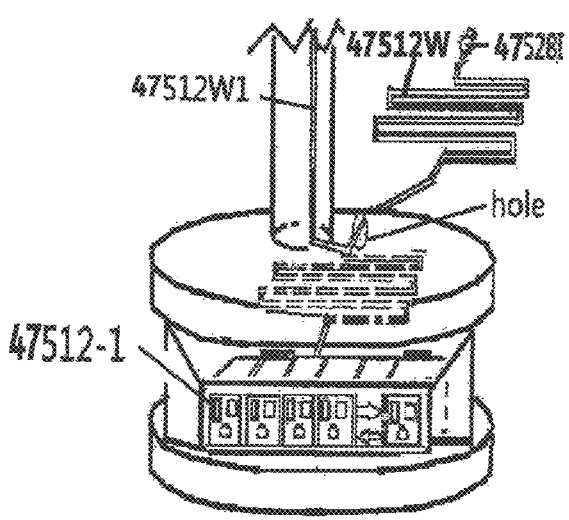
Figure 48:
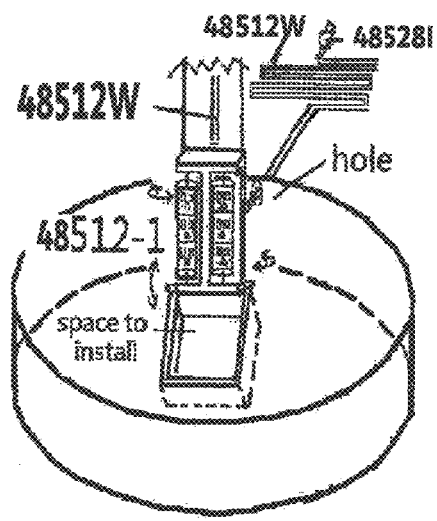
Figure 49:
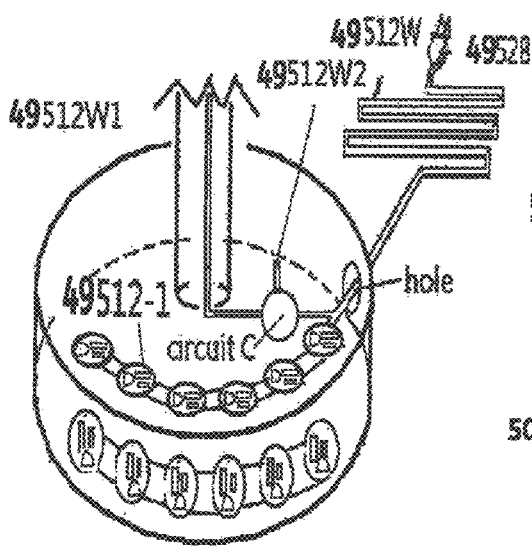

FIGS. 43, 43*a* disclosure preferred but not limited for 2 design of the said wall light or wall mounted lamp has different shade and construction co-inventor's (#HHH-11) prior art U.S. Pat. No. 8,950,899 FIG. 7 and each of them are powered by 120V AC by wired or plug-in with preferred sensor, switch, remote controller, wireless communication controllers and USB charger-ports or-and Outlet-ports. and this also is same concept of the co-pending filing case (#HH-1) Filed Ser. No. 13/295,562, (#HH-2) Ser. No. 14/829,114 (#HH-3) Ser. No. 14/829,213 (#JJ-2) Ser. No. 14/602,206 and issued parent patents (#HH-09) U.S. Pat. No. 8,434,927 (JJ-10) U.S. Pat. No. 8,303,158 (JJ-1) U.S. Pat. No. 8,960,988 has the lighted image with special geometric art or logo or words or slogan or any message shown on the wall or surface or ceiling.

FIGS. 44, 45, 46, 47, 48, 49, 50 show some preferred embodiment has existing power strip, extension cords or outlet-tap incorporate with floor light or wall mounted light which use existing market power strip or extension cord its own wires as wall outlet power source while the power strip or extension cord has 3 prongs or while the power rating is higher than 1,650 higher wattage so the extension cord need use 16 or 14 gauge of electric-wires which is so expensive so the floor light's wire use the wire which already for existing power strip or extension cord so do not need inner has 14-16 gauge wires+Floor lamp also use the 14-16 gauge wires (Because wattage is too high). The preferred embodiment to use the existing wires of extension cord or power strip for both power source for outlets or for floor light all functions. The floor light or other any power need get from the wire from the power strip. The floor light also can have very short wire for 16-22 gauge prong-wires (much cheaper and shortest wire length) to insert prong into one of outlets of the existing power strip or extension cord. So can save many cost including (1) outlet-unit or outlet-module no need to do any expensive lab testament to meet US safety standard (2) Save double wire cost for high wattage outlets while use existing power strip wires to connect with wall outlets and has shortest low wattage 16-22 gauge cheaper wire to connect the power from power strip or its wires (3) Easily to make different models because there have hundreds of different of power strip, extension cords at market place (4) Further incorporate with all outlet-tap which can connect with floor light built-in outlet-ports so can direct plug the all market available outlet-tap products to become one outlet-port to supply N outlet-tap's outlet-ports. The outlet-tap is built-in floor light or wall light which has flip-over, spring pop-out, rotating functions so can have good cosmetic appearance while not use the outlet-ports and it can simply to rotate, pop-out, flip-over while need to use the outlet-ports or outlet-unit or outlet-module or sealed unit or universal unit . . .

All details discussion can review inventor parent filed on 2010 which is much earlier than Prior art '759 LEE and inventor other US pending or issued patent including; (#CCC-10) U.S. Pat. No. 8,998,462 and its child (#CCC-1) Ser. No. 14/642,169 and (#CCC-2) Ser. No. 14/793,262 filing cases (#FFF=Ser. No. 13/863,073) (#RRR=Ser. No. 13/858,604) (#TTT=Ser. No. 13/870,253) (#A-05 U.S. Pat. No. 7,810,985) (#B-05 U.S. Pat. No. 7,318,653) (#F-05 U.S. Pat. No. 7,651,365).

FIGS. 51, 52 show the 2010 announced update USB ports definition and Specification as above background details Wikipedia data which can offer at least 5.0Volt DC current up to 2.1 Amp that is no any worldwide standard and specification for this quick charging USB port. Furthermore, Apple company start to use the quick charger on i-phone 4 date on 2012 which has 1 Amp output DC current and that is higher output current from Apple USB plug-in wall USB Charger. The said Apple 5 Watt output is basing 2010 announced new USB charger specification and beyond all items before 2010 which is out-of-date USB charger from computer output port only has 500 ma (0.5 A).

From FIG. 33 to FIG. 50 cover at least one (1) LED Desktop, (2) LED Floor light, (3) LED Wall mounted light, (4) Extension cord, (5) Built-in power strips which supply predetermined DC or AC current to; at least one of (a) USB unit have at least one USB charging ports, (b) Wireless charger system, (c) Outlet(s) or outlet module on remote away, distancing, separated locations for detachable, movable, separated, separated able, re-assemble able USB-unit(s) or-and outlet-unit(s); from output end of circuit(s). The power from circuit(s) built-in base, built-in LED or CFL Bulb, or from AC power source directly to separated remote away Outlet-unit, outlet module by conductive wire.

FIGS. 53A, 53B show one of preferred power strip or extension cord (5300) has following features including:
(A) The power strip (5300) has built-in at least one wired (not shown) and movable, detachable, dis-assemble, and re-assemble; USB or wireless (Qi) charging-unit(s).
(B) Wherein, The power strip (5300) powered by AC-Plug (5301) and short length AC input wire (5302) which just allow the power strip (5300) can lie down on ground from wall outlet location around 1.5 feet (45 cm) to save expensive #14 gauge AC wire cost.

(C) Said, power strip (5300) has built-in at least one surge, over-heat, over-load, and short-circuit protection device (5307a) to prevent high voltage electricity input damage the all connected electric products. Said, protection device has at least one indicator light, reset switch (5307b) to show and restart operation.

(D) The AC input power went through protection device supply AC power to said numbers of AC outlet-unit(s) to supply AC power to external AC operated products.

(E) The said AC input power also supply power to power strip (5300) built-in AC-to-DC circuit (5300A) to change input AC power to $1^{st}$ DC power which is different voltage or amperage with charging DC current.

(F) It is appreciated for some preferred application, the $1^{st}$ DC power is same voltage with USB charging current because the input AC power already went through surge protection device so different with other prior arts which lack of surge protection application and power strip is not good for home use. In this case, said $1^{st}$ DC is same voltage or amperage with charging system DC current.

(G) Wherein, said $1^{st}$ DC power go through at least one DC-to-DC circuit, IC, control circuit, wireless receiving system, sensor, and switch to change $1^{st}$ DC to $2^{nd}$ or more DC current which has different voltage or amperage with $1^{st}$ DC current.

(H) Said at least one $1^{st}$ DC current, $2^{nd}$ DC current, or more different voltage, and amperage DC current supply to at least one
  (a) LED(s) light source (5307) built-in power strip (5300) or detachable charging-unit(s) (5305) (5306) for area, indicator, charging status, night light, location indicator light; illumination,
  (b) The detachable, movable, dis-assemble, re-assemble at least one USB, and Wireless (Qi) charging-unit(s) (5305) (5306) which has minimum 1 feet or up to 30 feet DC power delivery wire connect with said power strip (5300).
  (c) at least one IC for light effect, sensor, wireless receiving system, IC for charging status, remote control receiving system; to make set, select, change, adjust at least one color, brightness, on/off, and other systems.

(I) said wired and detachable, movable, dis-assemble, re-assemble charging-unit(s) (5305) (5306) has at least one (a) USB charging port(s) (5305), (b) Wireless charging coil system (5306), and (c) both USB charging-port(s) and wireless charging coil system (5306A); with or without built-in LED light source(s) (5307) to show at least one area, indicator, charging status, night light, location indicator light; illumination (J) said each wired and detachable, movable, dis-assemble, re-assemble charging-unit(s) (5305) (5306) has its own space for wire-arrangement to coil, pull, extend, receive DC power delivery wire which having minimum 1 feet and can up to 30 feet or more longer length.

(K) Said each wired and detachable, movable, dis-assemble, re-assemble charging-unit(s) (5305) (5306) assemble with power strip (5300) by at least one catch-and-hook, snap tight, hole-and-raise dome, and push tight fitting so can easily detach from and re-assemble with power strip (5300).

(L) said each wired and detachable, movable, dis-assemble, re-assemble charging-unit(s) (5305) (5306) to coil, wrap, pull, receive wire operation all at outside power strip main housing as FIG. 53A show arrow-head show because each charging-unit has minimum 1 feet long DC wire, some up to 30 feet wire length which is not able to fit into main housing of power strips.

(M) said each wired and detachable, movable, dis-assemble, re-assemble charging-unit(s) (5305) (5306) to coil, wrap, pull, receive wire operation by hand or manual operation do not incorporate with any elastic kits, spring piece to extend DC wire and push bottom to receive back automatically because such applications always create a lot of defect functions.

(N) Said one of preferred way to coil, wrap, pull, receive wire as FIG. 53A show the each wired and detachable, movable, dis-assemble, re-assemble charging-unit(s) (5305) (5306) has raise-body, dome, axis or pole to fit within the opening, hole, cutout (5304) of power strip extend-body so can roll, rotating, spin the charging unit(s) along the axis, opening, hole, circle edge of cut-out (5304) to make coil, wrap, pull, receive DC wire at outside power strip body.

(O) said each wired and detachable, movable, dis-assemble, re-assemble charging-unit(s) (5305) (5306) has to design on outside power strip (5300) main housing because the length of DC delivery wire length from 1 to 30 feet or more long length which need 4 inch diameter round unit (5305) (5306) to store the DC wire. From FIG. 53A shown one of example which is 4 inch diameter, and from FIGS. 53C, 53D, 53E, 53F, 54, 55 shown all details for said USB, Wireless charging-unit(s) detail construction which is impossible to put wire arrangement inside power strip internal space because DC wire need big space outside center round area to install USB-port(s) or Wireless coil-sets with input DC wire terminals, other electric components.

(P) said power strips (5300) has manual operated power on-off switch (5308).

From FIG. 53A show one of current invention for power strip (5300) application has (A to P) unique features which are not same as any above list prior arts. Furthermore, FIG. 57,58,59,60 show some other applications has same concept, idea as FIGS. 53A to 53F, 54, 55. It is appreciated all these examples and above discuss FIG. 1 to FIG. 52 and co-pending filed case, issued parent cases text, drawing, function, features should be fall into current invention claims. And, the current invention is child filed case of (#CC-2010) filed on 2010.

FIG. 53B show back side of power strip (5300) which has lower extension body had opening (5315) to clip the charging-unit(s) which has center cylinder or area to install number of USB charging-port(s) (5314) fit within the two wall (5315) (5316) and DC wire is coil from the outside of center cylinder to wall edge. Wherein, said minimum size of charging-unit(s) need to storage 8.2 feet (2.5 meter) DC wire which coil or wrap surrounded center cylinder for charging-components need 4 inch diameter. Said, each charging-unit(s) has dome, axis, raise-body to clip into opening (5313) on one side and charging-unit(s) other side has built-in at least one hook-and-loop, magnetic-piece, pole-and-hole, and other join-kits to join more than one charging-units together so can fit within the top and bottom openings to make all DC wires well storage within the space within walls (5315) (5316). Furthermore, the power strip may has bottom with plurality positioned-poles, bar, raised piece to install the AC power wire while people want more than 1.5 feet AC power wire which is not preferred application of current invention because too costly for AC power wire longer than 1.5 fee.

FIGS. 53C, 53D show USB (5320) and-or wireless (5321) charging-unit. Wherein, each has built-in space for wire-arrangement to arrange DC delivery wire between main housing and charging-unit for people to coil or roll outside the main housing because power strip housing do not enough to coil minimum wires length such as 8.2 feet (2.5 meter) for each unit. From FIG. 53C show USB charging-unit (5320) which has dome, axis, raise-body on top to allow fit within power strip opening as FIG. 53B shown. The said unit has top and base wall to allow the DC delivery wire (5323) coil, wrap, pull, storage within the 2 walls surrounding the center cylinder area where install the said USB-port(s), electric parts and accessories. the top and bottom wall has at least one space (5327) (5328) (5329) and (5330) to arrange (a) at least one magnetic-piece, hook-and-loop piece to join with other unit(s) on one or (b) at least one magnetic-piece, hook-and-loop piece, 3M tape, double side tape, and other fix-kits to install the unit (5320) on surface of any furniture, wall, bed rack, side-table, living room couch, living room table, or any other location(s) where people stay, work, rest, selfie, cosmetic for time period. Said, Each of charging-unit (5320) has space (5326) to arrange preferred electric components is at least one LED(s) (5325), IC, circuitry, sensor, switch, and other electric parts to set, select, adjust, change some function(s) or effect(s).

From FIG. 53D show one of preferred wireless charging-unit(s) (53210 which has same center cylinder to install at least one circuit, input DC wire terminals, slot or cutout or seat or area (5332) to put be-charged products to interact with built-in wall electric-coil (5331). Wherein, Each of charging-unit (5321) has space (5333) to arrange preferred electric components is at least one LED(s), IC, circuitry, sensor, switch, and other electric parts to set, select, adjust, change some function(s) or effect(s). The said unit has top and base wall to allow the DC delivery wire (5332) coil, wrap, pull, storage within the 2 walls surrounding the center cylinder area. Said, the top and bottom wall has at least one space (5327') (5328') (5329') and (5330') to arrange (a) at least one magnetic-piece, hook-and-loop piece to join with other unit(s) on one or (b) at least one magnetic-piece, hook-and-loop piece, 3M tape, double side tape, and other fix-kits to install the unit (5320) on surface of any furniture, wall, bed rack, side-table, living room couch, living room table, or any other location(s) where people stay, work, rest, selfie, cosmetic for time period.

Said, charging-unit (5320) as above discussed has both USB charging-system (53666) and Wireless charging-system (53666a) fit within so can offer both charging-system from one unit.

Said FIGS. 53C, 53D also show the top view and bottom view to show the top wall (5335) has dome, geometric shape axis, raise-body (5319) on top wall (5335). Also, show bottom wall (5334) has many cut-out areas (5334cut) which is allow people finger to easy access plug-in or move out external USB-wire (5339) male plug (5338) from at least one built-in cylinder (5336) USB charging-port(s) (5337). Also, the areas do not have cut-out (5334cut) keep coiled wire in position after coiled. Wired.

FIGS. 53E, 53F show one of preferred construction of an USB and-or wireless (Qi) charging-units (5340A) brief construction on top, side, bottom. From FIG. 53E show wired and detachable, movable, separate able, dis-assemble, re-assemble charging-unit(s) (5340A) has geometric shape axis (5341), raise-body, or pole to fit into power strip openings, hole (not shown). The charging-unit (5340A) has top wall (5343) and bottom wall (5344) and within the 2 walls has center cylinder (5345) which has slot (5346) to arrange DC delivery wire and wire-terminal into cylinder to supply DC power to said charging-unit(s). The charging-unit(s) may has built-in LED(s) (5348) within cylinder (5345) or one of wall (5343) (5344) to offer preferred light signal, light illumination as above discussed.

From FIG. 53F show the other viewing angle for one of preferred charging-unit (5349A) has top wall (5349) and bottom wall (5352) both are separated piece so can install the inner USB or wireless charging components and parts. After install all electric parts and accessories and connect DC delivery wire from power strip main housing assembled top and bottom wall by at least one screw through screw holes (5356), sonic sealing, chemical compound, glue, hook and catcher, and press-tight kit.

FIGS. 54, 55 show one of preferred construction of an USB or wireless charging-unit with wire from main housing to charging unit(s), and one preferred construction. From FIG. 54 show details for one of charging-unit construction. The charging-unit has top wall (5357) has geometric shape axis or raised-body (5338) to fit with hole of main housing opening and has number of pole (5359) to assembly 5361) with cylinder (5367). The top wall (53570 incorporate with magnetic piece (5360) and coil-set (5361) powered by circuit (5364) which is powered by input terminals (5362) (5363) of DC power delivery wire (5365) and all parts install within the cylinder (5367) which built-in on bottom wall (5366) having plurality of cutout area(s) (5368). One side of bottom wall (5366) may incorporate with $2^{nd}$ magnetic piece (5369) so can interact with other charging-unit(s) magnetic piece to assembly together.

Said, more than one charging-unit(s) join-together in order to install within two opening(s) or hole(s) of extend part of main housing as FIGS. 53A, 53B shown. The said other side of bottom wall (5366) also had one cover (5370) having two cylinder-hole(s) to fit with top cover 2 cylinder-poles (5359) and assembly together by screw (5372). Where the cover (5370) also offer an area, surface (5371S) to arrange fix-kits including double side tape, Velcro tape, hook-and-loop piece, hook and clipper set to install wired movable charging-unit(s) on surface of any furniture or wall.

FIG. 56 show one of preferred power strip (5600) has two charging-units ($1^{st}$) and ($2^{nd}$) and both ($1^{st}$) ($2^{nd}$) assembly together to fit within the main housing extension-parts hole (5382) (5392) to coil or roll the DC power delivery wire (not shown) outside of main housing (5380) because (1) each charging-unit DC power delivery wire too long to install within the main housing, (2) main housing dimension too small to allow people finger to make coil, roll, receive DC power delivery wire, (3) market required DC power delivery wire need minimum 4 to 9 feet for each charging-unit which need min. 3 inch to 4 inch diameter round charging-unit having center cylinder axis to roll.

From FIG. 56, said at least one charging unit(s) ($1^{st}$)($2^{nd}$) has much bigger dimension than power strip (5600) main housing (5380) to storage the DC power delivery wire (not shown). Furthermore, the current invention power strip (5600) preferred has more than one charging-unit(s) ($1^{st}$ and $2^{nd}$) assembly-together by at least one magnetic-piece (5383d) (5389d), loop-and-hook so can form one finished-assembly (5600A) having 2 outside surface (5383) (5389) has dome, geometric shape axis, pole to install whole assembly into as FIGS. 53A, 53B. Wherein, said power strip (5600) has parts including (a) AC-plug (5384), (b) AC power wire (5385), (C) surge or other protection circuit (5386) to prevent high voltage input damage all connect electric product(s), (d) AC receiving-outlet inner metal-set (5387) (5388) to connect with input AC power wire terminal(s)

(5385+) (5385−), (e) wire from metal assembly (not shown) to built-in AC-to-DC (5383b) (5389b) change input AC power to DC power, (f) USB and-or wireless (Qi) coil (not shown), (g) magnetic piece (5383-1) (to assembly with other unit's magnetic piece (5389-1), (h) bottom cover has flat surface (not shown) to arrange fix-kits to install on surface of any furniture(s).

FIGS. 57, 58, 59, 60 show some preferred desk, floor, wall mounted item, light, and power strip has movable, detachable, dis-assembly, re-assemble USB or wireless (Qi) charging-unit(s) fit within item, light, and power strip's extension-parts or base. Wherein, each charging-unit has built-in space for wire-arrangement manual to make simple pull out or receive wire within the space of each charging-unit(s).

From FIG. 57 show two charging-unit(s) (5705) (5706) each has minimum 4-9 feet or much long length coil, wrap into gaps, ditch, grove, space between top wall (5705d) and bottom wall (5705e) and the each charging-unit(s) has preferred 3 to 4 inch diameter so can store such long DC power delivery wire (5705a) (5706a). The each charging-unit (5705) (5706) top wall has dome or geometric axis or pole to allow two outward top wall can fit into power strip (5700) extend-body hole (5704) (5704a) and manual to coil, wrap wire just rotating the each charging unit(s) at outside power strip (5700) main housing because manual coil, wrap DC power delivery wire at outside is much simple just need rotating the Big diameter charging-unit(s) body.

From FIG. 57 is similar with earlier FIGS. 53A, 53B, 53C, 53D, 53E, 53F, 54, 55, 56 details discussion and more detail can refer to these details description. From FIG. 57 show From FIGS. 57A and 57B show the current invention make a big improvement to change all market power strips (5700) to charge other products at one position to any locations of super broad 2,728 square feet or 272 square meter while the current invention power strips (5700) has only one of 2 (5705) or (5706) wired and detachable, movable, dis-assembly, re-assembly at least one USB, Wireless, both USB and Wireless; charging-unit(s). Wherein, said power strip (5700) has both charging-unit(s) (5705) (5706) of FIG. 57A and FIG. 57B, the people can have double broad (2,728×2=5,456 square fee) or double (272×2=544 square meter) areas to charge be-charged products. From FIGS. 57A, 57B, 57C also show one charging unit (5700B) has built-in both USB (57666 USB) and Wireless (Qi) (5666 Qi) charging functions. This is other important improvement and features of current invention.

Figure 58:
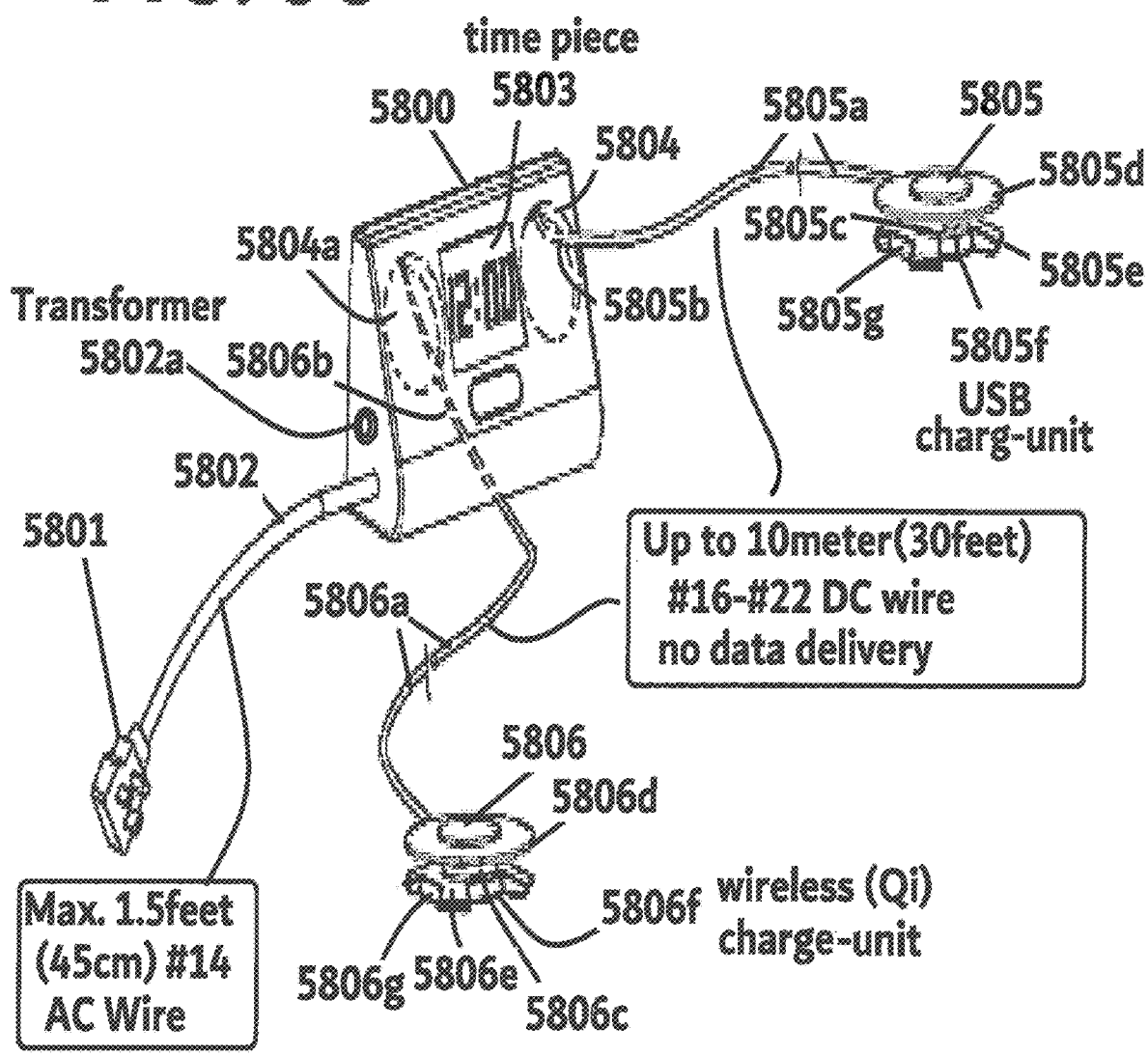

From FIG. 58 show one preferred desk, floor, wall-mounted item, light, and power strip is one of alarm clock (5800). The said alarm clock (5800) has time display function as above discuss FIGS. 14, 21, 26-1, 26-2, 27 for all detail for alarm clock related function(s), effect(s), part(s). Hereof, Said alarm clock main housing has 2 hidden space (5804) (5804a) to install preferred round or other geometric shape charging-unit(s) (5805) (5806) and each charging-unit has minimum 4-9 feet DC power delivery wire (5805b) (5806b) to deliver DC power to each unit for at least one (a) USB, (b) Wireless (Qi), and (c) Both USB and Wireless (Qi) charging-function(s). Wherein, the said each charging-unit has its own wire arrangement space and use manual to coil, pull, extend, receive DC power delivery wire. Same as FIG. 57 disclosure the current alarm clock has 2 wired charging unit(s) can let people charge products up to 5,456 square feet or 545 square meter at any locations. Other features or function as above FIG. 1 to FIG. 57 discussed.

Figure 59:
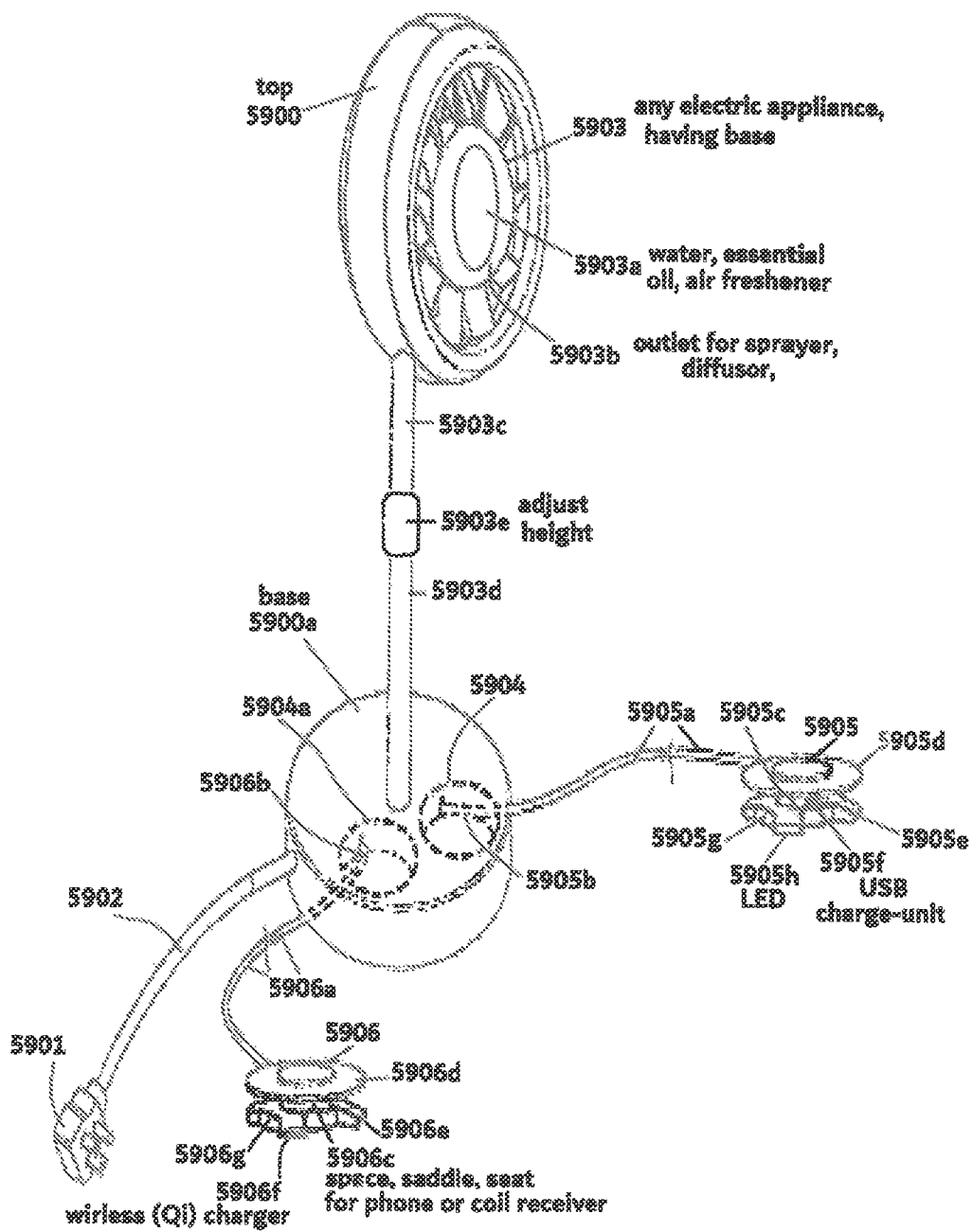

From FIG. 59 show one preferred embodiment is one of desk, floor, wall-mounted items, light, and power strip has height adjustable (5903e) stand, pole (5903) (5903d) to offer preferred functions which is at least one (1) fan or air flow device, (2) LED light for selfie, (3) lighting, (4) heater, (5) diffusor, sprayer, (6) other electric application, appliance, equipment. Wherein, The base (5900a) has built-in 2 compartments to install said wired and movable, detachable, separate able, dis-assembly, re-assembly charging-unit(s) (5905) (5906). Rest of all function(s) or light effect(s) are similar with above list FIGS. 1 to 57 discussion.

Figure 60:
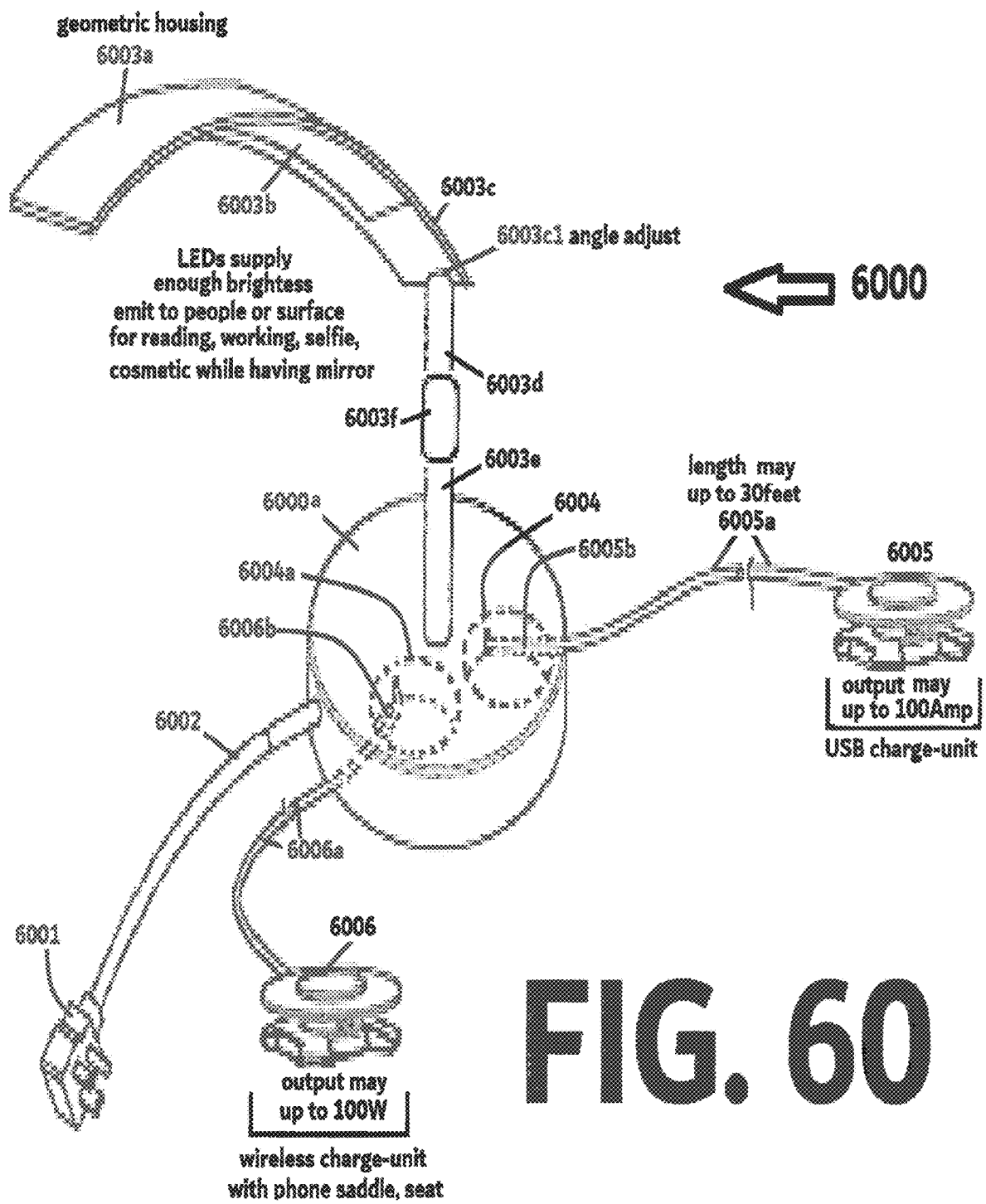

From FIG. 60 show one preferred embodiment (6003) is one of desk, floor, wall-mounted items, light, and power strip has built-in 2 compartments (6004) (6004a) to install said wired and movable, detachable, separate able, dis-assembly, re-assembly charging-unit(s) (6005) (6006). Rest of all function(s) or light effect(s) are similar with above list FIGS. 1 to 57 discussion.

Wherein, said wired and movable, detachable, dis-assembly, re-assembly charging unit for all kind of electric product has preferred function(s) is at least one (A) top and bottom view of one new power strip or extension cord has wired and movable, detachable, dis-assemble, and re-assemble; USB or wireless charging-unit(s). Wherein the said charging-unit(s) is at least one USB-unit, USB-module, sealed-unit, and universal-unit has plurality of USB charging-ports and at least one (1) fixed or (2) wired movable, detachable, dis-assemble, re-assemble standard or rotatable, tilt-able, twistable, square or round outlet-units with outlets-ports, or outlets-module which has any combination for outlet-units, USB-unit or sealed-unit or universal-units as above and co-pending or co-pending cases disclosure skill or application.

(B) power strip or extension cord has following features;
  (b-1) Said power strip or extension cord has very short 14 gauge AC-wire around 1.5 feet which just let 14 gauge AC-Plug plug-into wall outlet and just let power strip or extension cord to lay down on floor needed length to save expensive cost for 14 gauge wire cost.
  (b-2) Said power strip or extension cord has at least one extend-parts to hold at least one or plurality of wired and movable, detachable, dis-assemble, and re-assemble; USB or wireless charging-unit(s).
  (b-3) said extension part can install at least one or more than one charging-unit(s) and each of charging-unit can joint-together by built-in magnetic-sets, Velcro sets, catch-and-hook sets, pin and receiving holes set, or other join-together kits to fit into extension-parts space.
  (b-4) Said wire between the extension cord and USB/wireless charging-unit(s) for each detachable USB or wireless charging-unit(s) can fit within extension-parts and roll to desired length from outside the power strip main housing. I.E. each built-in wire arrangement is not built inside power strip main housing because (a) main housing too narrow space to storage up to 8 feet DC wire, (b) coil or roll or arrange DC wire from inside of main housing is not possible and too difficult.
  (b-5) Said each wired and movable, detachable, dis-assemble, and re-assemble; USB or wireless charging-unit(s) has built-in its own wire arrangement to arrange up to 10 meters (30 feet) for 16-22 gauge DC wire.
  (b-6) Said each wired and movable, detachable, dis-assemble, and re-assemble; USB or wireless charging-unit(s) has its own installation kits is at least one of (i) 3M tape or foam tape, (ii) Velcro-tape, (iii) magnetic sets, (iv) catch and receiving sets, (v) press tight and release sets, (vi) other dis-assemble and re-assemble kits or sets. So, can join any number of charging-unit(s) together to install within (A) extension part(s), (B)

surface of at least one desk, table, wall, bed frame, side table, couch, chain, and indoor, outdoor preferred furniture any surface(s).

(b-7) Said each wired and movable, detachable, disassemble, and re-assemble; USB or wireless charging-unit(s) with or without its own LED(s) for area or status indictor illuminations.

(b-8) Said each wired and movable, detachable, disassemble, and re-assemble; USB or wireless charging-unit(s) housing has cut-out, glove, ditch, opening to allow people can easily to arrange wire within each charging-unit housing.

(b-9) Said each wired and movable, detachable, disassemble, and re-assemble; USB or wireless charging-unit(s); said USB charging-unit(s) port is install within (1) the walls of each wire-arrangement space or (2) the walls, ditch, groove of each unit side housing.

(b-10) said power strip with or without at least one surge, over-heat, over-charge, electric-shortage, and GFCI protection circuit.

(b-11) said power strips built-in outlet(s) is at least one rectangular, round, rotatable with or without ground-pin.

(b-12) said power strip bottom has space or arrangement to receive the length of DC wire which is too long after installation of each charging-unit.

(b-13) Said power strip has built-in AC-to-DC circuit to change the input AC power to the First DC power to supply to built-in parts need the highest DC voltage. And said the first DC voltage power through at least one DC-to-DC circuitry, IC, conductive piece to supply or distribute the at least one second or more different DC voltage or DC Amp DC power to other electric parts for preferred function(s). This is different with market all power strip the AC input power without go through at least one (A) surge or other protection circuitry, (B) IC or conductive piece or other electric parts to supply at least one second voltage or Amp DC current to said USB ports or LEDs for illumination or LEDs to show at least one charging, power, surge, and other protection or other status indicator light, and (C) other market extension cord all DC charging-unit(s) is fixed forever on the said main housing of extension cord or all wire arrangement is not built-in said each of detachable charging-unit(s).

From above discussion for the USB Charging-port which has minimum 1.0 Amp to 5.0 Amp or higher amperage to allow people to get short time charger without any digital or electric data delivery is different with out of date 500 ma slow charger and has digital data delivery which will cause the overheat and fire risk. The current invention also has one and only one power source which is not like has AC input at 1$^{st}$ and change to DC Battery power pack to become power source and has more than one power source into desktop product and go to the USB port which is not practical and increase a lot of trouble for construction and expensive. The current invention as co-inventor parent filed including:

The current invention are continuously filing of co-pending filing U.S. Ser. No. 12/950,017 (#CCC) Multiple surface LED light filed on Nov. 29, 2010 with rotating device has LED light device(s) and USB device and Outlets device built-in on the rotating substrate with more than one surface to offer multiple function.

The current invention also continuously filing for (Inventor's #FFF) U.S. Ser. No. 13/117,227 filed on May 27, 2011 for Universal Module has USB-Unit(s) or/and Outlet-unit(s) for variety of electric or digital-data device. these parent filing case cover all desktop items and lighting device and desk top items. The current invention and related filing case have features at least cover as below feature and function including:

1. A Quick USB charging-ports assembly for lighting device, consist of; At least one of USB charging ports has minimum 1.0 A up to 5.0 Amp charging capacity and specification released on 2007 and update on 2010.

The USB charging ports only has charging function without any electric or digital data transmit or delivery.

At least one of circuit incorporate with the said USB charging port(s) and only has one input power-source and the said circuit supply DC current to charge the energy storage unit or assembly including battery, batteries, rechargeable battery inside the said other electric or digital data product(s) though outside housing's USB-wire has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device(s).

A lighting device and its parts has base for desk, surface, floor, wall installation and has housing space with opening to install the USB charging port(s).

2. The Quick USB charging ports assembly for lighting device, the said power source is from outside the light device housing's AC to DC transformer, adaptor, converter, invertor which has circuit-kits inside to change the AC current to DC current.

3. The Quick USB charging ports assembly for lighting device, the said power source is from AC wall or extension cord or other's outlet and get power by the AC plug and wire to the light device inner-circuit which has transformer, invertor, adaptor, converter assembly inside and change the input AC current to DC current.

4. The Quick USB charging ports assembly for lighting device, the said light device has LED or LEDs to offer at least one function select from illumination, area illumination, indicator light, lighted image, project image, time display, charging status, date or/and calendar display, temperature display, message display.

5. The Quick USB charging ports assembly for lighting device, the said light device has non-LED light source to offer illumination.

6. The Quick USB charging ports assembly for lighting device, the said light device housing space including light device's base, pole, bar, stationary organizer, compartment, construction, stand, clip base, or other housing space.

7. The Quick USB charging ports assembly for lighting device, the said circuit has more than one circuit-kits or circuit-inner which for transformer, invertor, adaptor, converter inside the outside or light device's housing, and the said more than one circuit is circuit-inside that make device not only supply the DC current to the USB charging-ports but also arrange the power or electric functions to the other functions including light source, LED(s), time display, message display, wireless communication, image display, timer, date/calendar/weather display, other added functions, temperature/humility display, remote controller, wi-fi controller, image controller, IP cam, infra-red controller, wireless communication controller.

8. The Quick USB charging ports assembly for lighting device, the said lighting device is one of desk lamp, floor lamp, wall lamp, outdoor lighting, night light.
9. The Quick USB charging ports assembly for lighting device, the said other electric or digital products is a communication equipment, computer equipment, consumer electric products which has the DC energy storage unit or assembly inside the products and can be rechargeable.
10. The Quick USB charging ports assembly for lighting device, the said USB charging-port is a type A construction which same as majority of laptop computer USB port but has minimum 1.0 A up to 5 Amp or higher charging capacity.
11. The Quick USB charging ports assembly for lighting device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.
12. The Quick USB charging ports assembly for lighting device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.
13. The Quick USB charging ports assembly for lighting device, the said USB charging-port(s) has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.
14. The Quick USB charging ports assembly for lighting device, the said only one input power source, the said USB charging-port(s) only take output-end's DC current from (1) the circuit-inner while without the outside device's housing transformer; or (2) circuit-kits while has the outside device's housing transformer.
15. The Quick USB charging ports assembly for lighting device, the said light device further incorporate with Outlet-unit or Outlet-Module to SUPPLY the AC current directly though only conductive-kits or assembly from the outlet receiving port(s) to the other electric or digital device's has conductive prongs and the said Outlet-unit or outlet-module install within or on anywhere the light device.
16. The Quick USB charging ports assembly for lighting device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.
17. The Quick USB charging ports assembly for lighting device, the said light device has added outlet-unit which has number 1 to N (any number) and has surge-protection for number over the 3 or more to offer the more safety.
18. The Quick USB charging ports assembly for lighting device, the said USB charging-ports or/and Outlet-units can arrange on any parts of the said lighting device including base, pole, bar, stand, stationer-organizer, added housing construction, clips.
19. The Quick USB charging ports assembly for lighting device, the said lighting device light source is a built-in LED(s), CFL, Power saving bulb, separated LED bulb, Florescent tube, LED tube, EL, OEL or other market available light source.
20. The Quick USB charging ports assembly for lighting device, the said lighting device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects.
21. The Quick USB charging ports assembly for lighting device, the said lighting device is a floor lamp has the USB charging-port on the anywhere of housing, base, added desk, bar, stand, pole and has number of outlets on the base or stand number from 1 to N (any number) so work as power strip has outlets up to N with optional surge protection and has only one wire with AC-Plug to plug-into Wall
22. A Quick USB charging-ports assembly for digital alarm clock or time related device, consist of;
   At least one of USB charging-ports has minimum 1.0 A up to 5.0 Amp charging capacity and specification released on 2007 and update on 2010.
   The said USB charging-ports only has charging function without any electric or digital data transmit or delivery.
   A circuit incorporate with the said USB charging-port(s) and only has one input power source and the said circuit supply DC current to charge the energy storage unit or assembly including battery, batteries, rechargeable battery inside the said other electric or digital data product(s) though an outside housing's USB-wire has at least 2 male plugs to connect with USB charging-ports and be-charged product's USB receiving-ports to deliver the DC current.
   The said USB charging-port(s) is universal type can fit for all different USB-Wire at least one of plug(s) so can charge all different be-charged device(s).
   A digital alarm clock or time related device has housing with opening to install the USB charging port(s).
23. The Quick USB charging ports assembly for digital alarm clock or time related device, the said power source is from outside the digital alarm clock or time related device housing's AC to DC transformer, adaptor, converter, invertor which has circuit-kits inside to change the AC current to DC current.
24. The Quick USB charging ports assembly for digital alarm clock or time related device, the said power source is from outside digital alarm clock or time related device housing's AC wall outlet and get power by the AC plug and wire to the light device inner-circuit which has transformer, invertor, adaptor, converter assembly inside and change the input AC current to DC current.
25. The Quick USB charging ports assembly for digital alarm clock or time related device, the said device has LED or LEDs to offer at least one function select from illumination, indicator light, lighted image, project image, time display, charging status, date or/and calendar display, temperature display, message display.
26. The Quick USB charging ports assembly for digital alarm clock or time related device, the said device has non-LED light source to offer illumination indicator light, lighted image, project image, time display, charging status, date or/and calendar display, temperature display, message display.

27. The Quick USB charging ports assembly for digital alarm clock or time related device, the said light device housing including light device's base, stationary construction, compartment, organizer, holder for phone or ipad or power-bank, be-charged products, or other housing arrangement has space.
28. The Quick USB charging ports assembly for digital alarm clock or time related device, the said circuit has more than one circuit-inside for transformer, invertor, adaptor, converter inside the light device's housing that not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, wifi controller, image controller, IP cam, infrared controller, wireless communication controller.
29. The Quick USB charging ports assembly for digital alarm clock or time related device, the said digital alarm clock or time piece device is one of clock, LED time piece, LED segments has 8 construction, time piece has audio parts & accessories, wall clock, night light time piece, desktop item has time display products, desktop time piece, digital alarm time piece, alarm clock, digital or analog time piece.
30. The Quick USB charging ports assembly for digital alarm clock or related piece, the said other electric or digital products is a communication equipment, computer equipment, consumer electric products which has the DC energy storage unit or assembly inside the products and can be rechargeable.
31. The Quick USB charging ports assembly for digital alarm clock or time related device, the said USB charging-port is a type A construction which same as majority of laptop computer USB port but has minimum 1.0 A up to 5 Amp or higher charging capacity.
32. The Quick USB charging ports assembly for digital alarm clock or time related device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.
33. The Quick USB charging ports assembly for digital alarm clock or time related device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.
34. The Quick USB charging ports assembly for digital alarm clock or time related device, the said USB charging-port(s) has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.
35. The Quick USB charging ports assembly for digital alarm clock or time related device, the said only one input power source, the said USB charging-port(s) only take output-end's DC current from (3) the circuit-inner while without the outside device's housing transformer; or
(4) circuit-kits while has the outside device's housing transformer.
36. The Quick USB charging ports assembly for digital alarm clock or time related device, the said device further incorporate with Outlet-unit or Outlet-Module to SUPPLY the AC current directly though only conductive-kits or assembly from the outlet to the other electric or digital device has conductive prongs equipment and the said Outlet-unit or outlet-module install within or on anywhere the device.
37. The Quick USB charging ports assembly for digital alarm clock or time related device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.
38. The Quick USB charging ports assembly for digital alarm clock or time related device, the said device has added outlet-unit which has number 1 to N (any number) and has surge-protection for number over the 3 or more to offer the more safety.
39. The Quick USB charging ports assembly for digital alarm clock or time related device, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.
40. The Quick USB charging ports assembly for digital alarm clock or time related device, the said device light source is a built-in LED(s), liquid crystal display, CFL, Power saving bulb, separated LED bulb, Florescent tube, LED tube, EL, OEL or other market available light source.
41. The Quick USB charging ports assembly for digital alarm clock or time related device, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.
42. The Quick USB charging ports assembly for digital alarm clock or time related device, the said device is a time related product has the USB charging-port on the anywhere of housing, base and has number of outlets on the base or housing with number from 1 to N (any number) so work as power strip has outlets up to N with optional surge protection and has only one wire with AC-Plug to plug-into Wall.
43. Quick USB charging ports assembly for lighting device, consist of;
A USB charging ports has minimum 1.0 A up to 5.0 Amp charging capacity and specification released on 2007 and update on 2010.
The USB charging ports only has charging function without any electric or digital data transmit or delivery.

A circuit incorporate with USB charging port(s) and only has one input power source and supply DC current to charge the energy storage unit or assembly including battery, batteries, rechargeable battery inside the said other electric or digital data product(s). The circuit incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.

A lighting device has housing and bar, stand, base, pole, clipper, holder with opening to install the USB charging port(s) for quickly charging.

44. Quick USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.

45. Quick USB charging ports assembly for lighting device, the said USB-unit, USB-module, Outlet-unit, Outlet-module, USB Universal kits, USB sealed-unit can have number from 1 to N (any number).

46. Quick USB charging ports assembly for lighting device, the said clipper has spring device so can clip the variety desk, table, bed, tube, bar, post, edge so can install the desktop lighting device on many place where has the thickness equal or less than clipper's two arms opening width.

47. Quick USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.

48. Quick USB charging ports assembly for lighting device, the said lighting device for desk, floor, wall, ceiling, landscape, ground, table, bed, moving table, bed cushion table, or any flat surface can put lighting device without vibration to make the lighting device to fall down.

49. Quick USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.

50. Quick USB charging ports assembly for lighting device, the said USB wire has at least two male plugs one prefer TYPE A and the other prefer is mini-USB or micro-USB or Type C USB has smaller, compact, thin, narrow USB construction but quickly charging and bigger charging capacity.

51. Quick USB charging ports assembly for lighting device, the said light device has optic film added to prevent reflection from the LED, LEDs, LED Bulb or other light source.

52. Quick USB charging ports assembly for lighting device, the said outlet-unit or outlet-module has add surge protection, or master controller or wireless communication by Wife, APP, remote controller, infra-red, RF remote, timer, time delay, dimmer, color changing, brightness controller functions or features.

53. Quick USB charging ports assembly for lighting device, the said lighting device incorporate with switch, sensor, motion sensor, timer, to turn on and turn off the lighting device.

54. A Quick USB charging-ports assembly for lighted cosmetic mirror device, consist of; At least one of USB charging-ports has minimum 1.0 A up to 5.0 Amp charging capacity and specification released on 2007 and update on 2010.

The said USB charging-ports only has charging function without any electric or digital data transmit or delivery.

A circuit incorporate with the said USB charging-port(s) and only has one input power source and the said circuit supply DC current to charge the energy storage unit or assembly including battery, batteries, rechargeable battery inside the said other electric or digital data product(s) though outside housing and individual USB-wire has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device(s).

A lighted cosmetic mirror device has image related function including magnify, reflective face, reflective body, reflect objects with light source to see under dark environment has housing with opening to install the USB charging port(s).

55. The Quick USB charging ports assembly for lighted cosmetic mirror device has image related function, the said power source is from outside the device housing's AC to DC transformer, adaptor, converter, invertor which has circuit-kits inside to change the AC current to DC current.

56. The Quick USB charging ports assembly for lighted cosmetic mirror device has Image related function, the said power source is from outside Image related device housing's AC wall outlet and get power by the AC plug and wire to the device inner-circuit which has transformer, invertor, adaptor, converter assembly inside and change the input AC current to DC current.

57. The Quick USB charging ports assembly for lighted cosmetic mirror device has Image related function, the said device has LED or LEDs to offer at least one function select from illumination, indicator light, lighted image, project image, time display, charging status, date or/and calendar display, temperature display, message display, color changing, brightness changing, dimmer the light brightness.

58. The Quick USB charging ports assembly for lighted cosmetic mirror device has Image related function, the said device has non-LED light source to offer illumination, indicator light, lighted image, project image, time display, charging status, date or/and calendar display, temperature display, message display, different color of light, different brightness, dimmer the light brightness.

59. The Quick USB charging ports assembly for lighted cosmetic mirror device has Image related function, the said light device housing has at least one parts or desire combination select from light device's mirror, reflective surface, reflective and magnify kits or assembly, magnify lens, optics lens, optics assembly, base, bar, stand, pole, hook, stationary construction, compartment, compartment for the install all electric parts & accessories, organizer, holder for phone or i-pad or power-bank, be-charged products, or other housing arrangement has space.

60. The Quick USB charging ports assembly for lighted cosmetic mirror device has Image related function, the said circuit has more than one of circuit-kits, or circuit-inner, there has other circuit-inside which beside the said transformer, invertor, adaptor, converter fit inside of the the light device's housing or outside-housing so that the device is not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, wi-fi controller, image controller, IP cam, infra-red controller, wireless communication controller.

61. The Quick USB charging ports assembly for lighted cosmetic mirror device has Image related function, the said lighted cosmetic mirror device has image related function is one device has desire combination select from desktop mirror, wall mounted mirror, time piece, LED segments has 8 construction, time piece has audio parts & accessories, clock, night light, desktop item has reflective mirror-like surface and functions, desktop time piece, digital alarm time piece, alarm clock, digital or analog time piece, weather station, radio.

62. The Quick USB charging ports assembly for lighted cosmetic mirror device has Image related function, the said other electric or digital products is a communication equipment, computer equipment, consumer electric products which has the DC energy storage unit or assembly inside the products and can be rechargeable.

63. The Quick USB charging ports assembly for lighted cosmetic mirror device has Image related function, the said USB charging-port is a type A construction which same as majority of laptop computer USB port(s) but has minimum 1.0 A up to 5 Amp or higher charging capacity and do not allow has data delivery.

64. The Quick USB charging ports assembly for lighted cosmetic mirror device has image related function, the said USB receiving-port of the said be-charged products which can be any kind of construction and size has its custom-pin which need as compact as possible including compact USB, Mini USB, Micro USB for compact size so can make be-charged device thinner, smaller, slim as much as possible.

65. The Quick USB charging ports assembly for lighted cosmetic mirror device has Image related function, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.

66. The Quick USB charging ports assembly for lighted cosmetic mirror device has Image related function, the said device has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.

67. The Quick USB charging ports assembly for lighted cosmetic mirror device has Image related function, the said only one input power source, the said USB charging-port(s) only take output-end's DC current from (5) the circuit-inner while without the outside device's housing transformer; or
(6) circuit-kits while has the outside device's housing transformer.

68. The Quick USB charging ports assembly for lighted cosmetic mirror device has Image related function, the said device further incorporate with Outlet-unit or Outlet-Module to SUPPLY the AC current directly though only conductive-kits or assembly from the outlet to the other electric or digital product(s) has conductive prongs equipment(s) and the said Outlet-unit or outlet-module install within or on anywhere the device.

69. The Quick USB charging ports assembly for lighted cosmetic mirror device has Image related function, the other electric or digital product(s) for AC outlet-unit or AC Outlet-module is one of the cosmetic related kits including but not limited from listed items including a hair-dryer, hair-related tools with electricity to drive, curing hair heater, electric fan, skin repair of polisher equipment, moisture machine, humility machine, or any machine, tools, kits, equipment for people to make cosmetic purpose for face, hair, body, skin, hand, foot, leg, arms which need to use AC power source all belong to cosmetic related kits.

70. The Quick USB charging ports assembly for lighted cosmetic mirror device has Image related function, the said outlet-unit or outlet-module or universal unit or sealed units has Outlet receiving ports which may drive different cosmetic related kits and supply the AC current up to 1,850 Watt for hair dryer, 1,650 Wall for normal electric device or any other bigger or lower Watt needed for people while people use the Lighted cosmetic mirror device.

71. The Quick USB charging ports assembly for lighted cosmetic mirror device has Image related function, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.

72. The Quick USB charging ports assembly for lighted cosmetic mirror device has Image related function, the said device has added outlet-unit which has number 1 to N (any number) and has surge-protection for number over the 3 or more to offer added surge protection circuit or the over-heat breaker circuit or the said over-load circuit, current leakage circuit for the more safety.

73. The Quick USB charging ports assembly for lighted cosmetic mirror device has Image related function, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.

74. The Quick USB charging ports assembly for lighted cosmetic mirror device has Image related function, the said device light source is a built-in LED(s), CFL, Power saving bulb, separated LED bulb, Florescent tube, cold cathord tube, LED tube, EL, OEL or other market available light source.

75. The Quick USB charging ports assembly for lighted cosmetic mirror device has Image related function, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.

76. The Quick USB charging ports assembly for lighted cosmetic mirror device has Image related function, the said device is a lighted cosmetic mirror product has the USB charging-port on the anywhere of housing, base and has number of outlets on the base or housing with number from 1 to N (any number) so work as power strip has outlets up to N with optional surge protection and has only one wire with AC-Plug to plug-into Wall.

77. Quick USB charging ports assembly for lighting device, consist of; A USB charging ports has minimum 1.0 A up to 5.0 Amp charging capacity and specification released on 2007 and update on 2010.

The USB charging ports only has charging function without any electric or digital data transmit or delivery.

A circuit incorporate with USB charging port(s) and only has one input power source and supply DC current to charge the energy storage unit or assembly including battery, batteries, rechargeable battery inside the said other electric or digital data product(s).

The said circuit incorporate with an outside housing's and separated USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.

A lighting device has housing and bar, stand, base, pole, clipper, holder with opening to install the USB charging port(s) for quickly charging.

78. Quick USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.

79. Quick USB charging ports assembly for lighting device, the said USB-unit, USB-module, Outlet-unit, Outlet-module, USB Universal kits, USB sealed-unit can have number from 1 to N (any number).

80. Quick USB charging ports assembly for lighting device, the said clipper has spring device so can clip the variety desk, table, bed, tube, bar, post, edge so can install the desktop lighting device on many place where has the thickness equal or less than clipper's two arms opening width.

81. Quick USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.

82. Quick USB charging ports assembly for lighting device, the said lighting device for desk, floor, wall, ceiling, landscape, ground, table, bed, moving table, bed cushion table, or any flat surface can put lighting device without vibration to make the lighting device to fall down.

83. Quick USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.

84. Quick USB charging ports assembly for lighting device, the said USB wire has at least two male plugs one prefer TYPE A and the other prefer is mini-USB or micro-USB or Type C USB has smaller, compact, thin, narrow USB construction but quickly charging and bigger charging capacity.

85. Quick USB charging ports assembly for lighting device, the said light device has optic film added to prevent reflection from the LED, LEDs, LED Bulb or other light source.

86. Quick USB charging ports assembly for lighting device, the said outlet-unit or outlet-module has add surge protection, or master controller or wireless communication by Wife, APP, remote controller, infra-red, RF remote, timer, time delay, dimmer, color changing, brightness controller functions or features.

87. Quick USB charging ports assembly for lighting device, the said lighting device incorporate with switch, sensor, motion sensor, timer, to turn on and turn off the lighting device.

88. A Quick USB charging-ports assembly for desktop power station device, consist of;

At least one of USB charging-ports has minimum 1.0 A up to 5.0 Amp charging capacity and specification released on 2007 and update on 2010.

The said USB charging-ports only has charging function without any electric or digital data transmit or delivery.

A circuit incorporate with the said USB charging-port(s) and only has one input power source and the said circuit supply DC current to charge the energy storage unit or assembly including battery, batteries, rechargeable battery inside the said other electric or digital data product(s) though outside housing and separated USB-wire which has at least 2 male plugs to connect with USB charging-ports and be-charged product's USB receiving-ports to deliver the DC current.

The said USB charging-port(s) is universal type can fit for all different USB-Wire at least one of plug(s) so can charge all different be-charged device(s).

A desktop power station device has more than one power charging or-and supplying function including more than one receiving-port(s) to connect different other products' plug or inser-end or prongs or add extra function(s) select from lighting, LED(s), illumination, controller, wireless communication, motion detection, surge protection, leakage current function, overheat function and device, charging status indicator and device has housing with opening to install the USB charging port(s) and other receiving-ports for other functions.

89. The Quick USB charging ports assembly for desktop power station device, the said power source is from outside the device housing's AC to DC transformer, adaptor, converter, invertor which has circuit-kits inside to change the AC current to DC current.

90. The Quick USB charging ports assembly for desktop power station device, the said power source is from outside device housing's AC wall outlet and get power by the AC plug and wire to the device inner-circuit which has transformer, invertor, adaptor, converter assembly inside and change the input AC current to DC current.

91. The Quick USB charging ports assembly for desktop power station device, the said device has LED or LEDs to offer at least one function select from illumination, indicator light, lighted image, project image, time display, charging status, date or/and calendar display, temperature display, message display, color changing, brightness changing, dimmer the light brightness.
92. The Quick USB charging ports assembly for desktop power station device, the said device has extra lighting which is a non-LED light source to offer illumination, indicator light, lighted image, project image, time display, charging status, date or/and calendar display, temperature display, message display, different color of light, different brightness, dimmer the light brightness.
93. The Quick USB charging ports assembly for desktop power station device, the said device housing has at least one parts or desire combination select from device's plurality of AC outlets, female receiving-ports for mail plug, insert-end, prong, connector, adaptor to build the electric signal delivery, audio connector, video connector, wireless communication receiver or transmitter, Bluetooth sets, wife set, base, bar, stand, stationary construction or organizer, compartment, compartment for the install all electric parts & accessories, organizer, holder for phone or ipad or power-bank, be-charged products, or other housing arrangement has space.
94. The Quick USB charging ports assembly for desktop power station device, the said circuit has more than one of circuit-kits, or circuit-inner, there has other circuit-inside which beside the said transformer, invertor, adaptor, converter fit inside of the device's housing or outside-housing so that the device is not only supply the DC current to the USB charging-ports but also arrange the power to the other functions including light source, LED, time display, message display, wireless communication, image display, timer, date/calendar/weather display, temperature/humility display, radio, music, audio device, alarm device, speaker device, remote controller, wifi controller, image controller, IP cam, infra-red controller, wireless communication controller.
95. The Quick USB charging ports assembly for desktop power station device, the said desktop power station device has power charging or-and supplying function is one device has desire combination select from USB charger, AC Power supplier, time piece, LED segments has 8 construction, time piece has audio parts & accessories, clock, night light, working light, digital alarm time piece, alarm clock, digital or analog time piece, weather station, radio, temperature, fan, video device, wireless communication equipment such as wife, APP, screen, TV.
96. The Quick USB charging ports assembly for desktop power station device, the said other electric or digital products is a communication equipment, computer equipment, consumer electric products which has the DC energy storage unit or assembly inside the products and can be rechargeable.
97. The Quick USB charging ports assembly for desktop power station device, the said USB charging-port is a type A construction which same as majority of laptop computer USB port(s) but has minimum 1.0 A up to 5 Amp or higher charging capacity and do not allow has data delivery.
98. The Quick USB charging ports assembly for desktop power station device, the said USB receiving-port of the said be-charged products which can be any kind of construction and size has its custom-pin which need as compact as possible including compact USB, Mini USB, Micro USB for compact size so can make be-charged device thinner, smaller, slim as much as possible.
99. The Quick USB charging ports assembly for desktop power station device, the said USB charging-port(s) number from 1 to N (any number) and has relative number of the AC to DC circuit-kits of outside device's housing or AC to DC circuit-inner to match the desire charging capacity to have 1.0 A, 2.1 A, 3.1 A, 4.2 A, 1.5 A, 2.4 A, 3.4 A, 4.8 A, 6.2 A, 6.8 A or higher combination and charging capacity.
100. The Quick USB charging ports assembly for desktop power station device, the said device has different circuit including (1) outside device's housing transformer, adaptor, invertor, converter's is circuit-kit (2) inside the device's housing to change AC to DC current is circuit-inner (3) inside the device's housing for other added functions is circuit-inside and all these different circuits has number 1 to N (any number) depend on functions, performance, effects needed.
101. The Quick USB charging ports assembly for desktop power station device, the said only one input power source, the said USB charging-port(s) only take output-end's DC current from
    (7) the circuit-inner while without the outside device's housing transformer; or
    (8) circuit-kits while has the outside device's housing transformer.
102. The Quick USB charging ports assembly for desktop power station device, the said device further incorporate with Outlet-unit or Outlet-Module to SUPPLY the AC current directly though only conductive-kits or assembly from the outlet to the other electric or digital product(s) has conductive prongs equipment(s) and the said Outlet-unit or outlet-module install within or on anywhere the device.
103. The Quick USB charging ports assembly for desktop power station device, the other electric or digital product(s) for AC outlet-unit or AC Outlet-module is one of the cosmetic related kits including but not limited from listed items including a hair-dryer, hair-related tools with electricity to drive, curing hair heater, electric fan, skin repair of polisher equipment, machine, electric tools, or any machine, tools, kits, equipment for people to work which need to use AC power source.
104. The Quick USB charging-ports assembly for desktop power station device, the said outlet-unit or outlet-module or universal unit or sealed units has Outlet receiving ports which may drive different machine, tools, kits and supply the AC current up to 1,850 Watt, 1,650 Wall for normal electric device or any other bigger or lower Watt needed for people while people use the equipment, machine, electric products.
105. The Quick USB charging ports assembly for desktop power station device, the said USB charging-port(s) and outlet-unit has desire combinations to assembly together to form the said USB-Module or Outlet-Module or Universal Unit or Sealed-Unit which has desire number or USB Charging-ports and Outlet-unit has ground pin or without ground pin.
106. The Quick USB charging ports assembly for desktop power station device, the said device has added outlet-unit which has number 1 to N (any number) and has surge-protection for number over the 3 or more to offer added surge protection circuit or the over-heat breaker circuit or the said over-load circuit, current leakage circuit for the more safety.
107. The Quick USB charging ports assembly for desktop power station device, the said USB charging-ports or/and Outlet-units can arrange on any parts of the said device including housing, body, stationer-organizer, added housing construction, holder for communication or computer or consumer products, holder for power-bank which offer the DC power from its output end to be charged products and power-bank can be-charged by said USB charging-ports at input end.

108. The Quick USB charging ports assembly for desktop power station device, the said device light source is a built-in LED(s), CFL, Power saving bulb, separated LED bulb, Florescent tube, cold-cathode tube, LED tube, EL, OEL or other market available light source.

109. The Quick USB charging ports assembly for desktop power station device, the said device optional add more other electric parts & accessories to make more useful items including timer, remote controller, dimmer, color changing, remote controller, wireless controller, APP controller, Wife communication, Wife controller, motion sensor, switch, remote controller, master power controller, Anti-Glare filter prevent from reflective effects, audit device, speaker, equalizer, temperature display, weather display, music, alarm, or other functions which available from market place for all kind of time piece.

110. The Quick USB charging ports assembly for desktop power station device, the said device has the USB charging-port on the anywhere of housing, base and has number of outlets on the base or housing with number from 1 to N (any number) so work as power strip has outlets up to N with optional surge protection and has only one wire with AC-Plug to plug-into Wall.

111. Quick USB charging ports assembly for lighting device, consist of;
A USB charging ports has minimum 1.0 A up to 5.0 Amp charging capacity and specification released on 2007 and update on 2010.
The USB charging ports only has charging function without any electric or digital data transmit or delivery.
A circuit incorporate with USB charging port(s) and only has one input power source and supply DC current to charge the energy storage unit or assembly including battery, batteries, rechargeable battery inside the said other electric or digital data product(s). The said USB charging-ports incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.
A lighting device has housing and bar, stand, base, pole, clipper, holder with opening to install the USB charging port(s) for quickly charging.

112. Quick USB charging ports assembly for lighting device, the said device housing, bar, stand, base, pole, base, clipper, holder has opening to install the Outlet-unit(s) or Outlet-Module(s) or USB-unit(s) or USB-Module(s) or USB universal kits or USB sealed-unit.

113. Quick USB charging ports assembly for lighting device, the said USB-unit, USB-module, Outlet-unit, Outlet-module, USB Universal kits, USB sealed-unit can have number from 1 to N (any number).

114. Quick USB charging ports assembly for lighting device, the said clipper has spring device so can clip the variety desk, table, bed, tube, bar, post, edge so can install the desktop lighting device on many place where has the thickness equal or less than clipper's two arms opening width.

115. Quick USB charging ports assembly for lighting device, the said lighting device which has at least one of light source select from built-in LED(s), Screw in or snap-in or fit tight LED bulb, CFL, Energy Saving Bulb, Florescent tube, LED tube, EL, OEL, Organic EL elements or light panel or light piece.

116. Quick USB charging ports assembly for lighting device, the said lighting device for desk, floor, wall, ceiling, landscape, ground, table, bed, moving table, bed cushion table, or any flat surface can put lighting device without vibration to make the lighting device to fall down.

117. Quick USB charging ports assembly for lighting device, the said USB charging-port(s) of USB-unit or USB-Module or Outlet-Module or Universal unit or Sealed-unit is type A or the type to incorporate with USB-wire which has at least one male plug out of at least two male plug is Type A.

118. Quick USB charging ports assembly for lighting device, the said USB wire has at least two male plugs one prefer TYPE A and the other prefer is mini-USB or micro-USB or Type C USB has smaller, compact, thin, narrow USB construction but quickly charging and bigger charging capacity.

119. Quick USB charging ports assembly for lighting device, the said light device has optic film added to prevent reflection from the LED, LEDs, LED Bulb or other light source.

120. Quick USB charging ports assembly for lighting device, the said outlet-unit or outlet-module has add surge protection, or master controller or wireless communication by Wife, APP, remote controller, infra-red, RF remote, timer, time delay, dimmer, color changing, brightness controller functions or features.

121. Quickly USB charging ports assembly for lighting device, the said lighting device incorporate with switch, sensor, motion sensor, timer, to turn on and turn off the lighting device.

122. Quick USB charging ports assembly for lighting device, consist of;
At least one of USB charging-ports has minimum 1.0 A up to 5.0 Amp around DC 5Volt or has desire combination for 1.0 A, 2.1 A, 1.2 A, 2.4 A, 3.1 A, 3.6 A, 4.2 A, 4.8 A or other combination for Big Amperage output-current to get quickly charger function and not overheat caused high voltage from transformer output-end to charge the battery. The USB charging ports only has charging function without any electric or digital data transmit or delivery.
At least one of circuit-kits inside the outside housing or circuit-inner inside the lighting device housing and both incorporate with the said USB charging port(s) and only has one input power-source and the said circuit supply DC current to charge the energy storage unit or assembly including battery, batteries, rechargeable battery inside the said other electric or digital data product(s) though outside housing's USB-wire has at least 2 male plugs to connect with USB charging-ports and be-charged product's USB receiving-ports to deliver the DC current.
The $2^{nd}$ or more circuit-inside which inside the Light device's housing to supply the power to the said added functions beside the USB Charging-ports and the said $2^{nd}$ or more circuit-inside has electric parts & accessories or $2^{nd}$ transformer to get enough electric current which current needed is bigger than USB Charger needed to said plurality LEDs or plurality different color LEDs or other light source, dinner, switch, motion sensor, remote controller, PIR sensor, or Time display, alarm, controller, wireless communication device, wireless controller, IR photo diode, IP cam, or other market available electric functions to prevent from overheat by one of the transformer to supply the Big Amperage of current to Quickly USB Charging-port and the Plurality of different colors LEDs.

The said USB charging-port(s) is universal type can fit for all different USB-Wire at least one of plug(s) so can charge all different be-charged device(s).

The circuit incorporate with an outside housing's USB wire has at least 2 male plugs to connect with USB charging-ports and be-charged product's USB receiving-ports to deliver the DC current and one of two male plug is compact, thin, narrow, cute, small size to connect with be-charged products USB receiving-ports prefer select from mini-USB, micro-USB, Type C USB or market place for smaller, thinner, compact size so to match thinner be-charged products.

A lighting device has housing and bar, stand, base, pole, clipper, holder with opening to install the USB charging port(s) for quickly charging.

\

123. A light device has USB charger including;

At least one outlet power source through AC-to-DC device inside or outside the light device housing to change from outlet's $1^{st}$ Alternative current (AC) to $1^{st}$ voltage Direct Current (DC).

At least one of DC-to-DC device or IC or other circuit-inside(s) within or inside of the said light device to change the said $1^{st}$ voltage DC current to $2^{nd}$ voltage or more different Voltage DC current(s) and at least one DC Voltage current for USB charger output-end and at least one DC voltage current for DC light source.

The said light device has light source to offer illumination, and USB Charger's USB Charging-port(s) only to charge the other electric or digital products without electric data delivery.

The said light source is one of DC or AC light source that DC light source is powered by one of more than one of different voltage DC current (s) or AC light source is powered by the said $1^{st}$ AC current.

The said DC light source's working voltage DC current and USB charging-port output-end's 5Volt DC Current powered by the said $1^{st}$ or more different voltage DC current(s) to operate the illumination and charging functions.

The AC light source powered by the said $1^{st}$ AC current through the inside housing's conductive parts or the said more than one circuit-inside for arrangement.

124. A light device has USB charger including;

At least one AC outlet power source through inside light device housing at least one of AC-to-DC device to change from outlet's Alternative current (AC) to $1^{st}$ voltage or more different voltage of Direct Current (DC).

(A) The said $1^{st}$ voltage or $1^{st}$ voltage DC current though DC-to-DC circuit(s) to get more than one different voltage of Direct current either one is 5Volt DC current directly or through conductive or electric parts inside light housing to USB charging-port(s) output-end to charge the other electric or digital products, and more than one different voltage of Direct current at least one meet working voltage of the DC light source including LED(s) to get illumination. The said light device has both USB charger and illumination both functions.

Or (B) The said $1^{st}$ voltage Direct current is higher voltage DC current than USB-port output-end's 5 Volt DC current need through DC-to-DC circuit(s) or IC or other circuit-inside(s) within or inside of the said light device to change the said $1^{st}$ voltage DC current to $2^{nd}$ voltage DC current or through more DC-to-DC circuit(s) to make more different voltage DC current(s) to arrange USB charging-ports output-end has 5Volt Direct current to charge other electric or digital device(s) and has $1^{st}$ AC through the conductive parts or circuit-inside to the said AC light source for illumination.

Or (C) The said $1^{st}$ voltage Direct current is 5Volt and directly or through conductive or DC-to-DC circuit, or electric parts inside light housing to all USB charging-port(s) output-end to charge the other electric or digital products, and has the $1^{st}$ AC current though the circuit-inside or IC or other electric parts to supply or arrange AC power to the said AC light source for illumination.

125. The light device has USB Charger, the said light device has outlet-unit or outlet-module get $1^{st}$ AC current though the inner housing conductive parts directly to at least one of the out-unit or outlet-module's outlet port(s) to supply AC power to other electric or digital products.

126. The light device has USB Charger, the said DC light source including built-in LED or LED(s). EL light element, Organic Electro-luminescent element(s).

127. The light device has USB charger, the said AC light source including CFL light, LED bulb, Fluorescent Tube, Energy Saving bulb, Cold Cathode tube, Halogen bulb, Incandescent bulb.

128. The light device has USB Charger, the said Light device has USB module or USB power station has plurality of USB-ports and Outlet-ports to supply variety of DC current for different amperage and voltage and the said 120Volt AC current 129. The light device has USB Charger, the said light device has at least one of added function(s) selected from (a) time display has separated batteries power source (b) alarm and time has batteries power source (c) Lighted mirror for reflect image (d) magnify lens to magnify the objects (e) wireless transmitter & receiver (f) APP controller (g) power station (h) surge protection (i) overheat protection (j) shortage cut-off protection (k) blue-tooth operation (l) remote controller (m) motion sensor (n) time delay (o) infra-red controller.

130. The light device has USB Charger, the said light device has LED indicator light to show charging status or added functions status.

131. The light device has USB charger, the said 5Volt DC current has its tolerance (+/−15%).

The above 131 features for different MAIN DEVICE is fall within the PARENT Filing for desktop items definition which has functions as description as below:

desk top item function means in said desk top item housing for providing at least one of the following functions: a display of light beams from the LED, projection, an image, projection of a time image, clock functions, illumination of an area, playing of music, serving as a source of power or electric signals, display of photos, transmission of digital signals, providing air flow at a desired temperature, generating moisture, steam, or smells, dispensing liquid, brewing coffee/tea, preparing food, and displaying charging status;

To enable people to easily reach, touch, operate, or manage the desk top items, the USB-unit(s) or USB-module(s) are installed on or within the item or a substrate(s). The items may be positioned at a location where people will stay for a period time, such as a desk, table, bed, chair, land, grass, or wherever else people work, rest, or take a nap. For example, people use a computer, laptop computer, iPhone™, iPad™, or iCloud™ on a substrate(s), location, or place such as a table, desk, bed, laptop stand, laptop supporter, laptop cushion or any similar surface(s) which allows people to work, sleep, or lay down for a period of time while charging other electric or digital data device(s).

In all such places where people will stay for period of time, the nearby desk top items with LED means and built-in USB-units easily offer electric power to all other electric or digital data device(s), so people do not need to bend the body to find a power source under the table, which normally is farther away than the desk top items having LED means. Hence, this arrangement offers good convenience for people while they work, rest, or even take a nap, so that they can easily use the USB-unit(s) or USB-module of the desk top items with LED means to charge their small phone, computer, iPad™, or any other electric or digital data device(s) while they work, rest, sleep or take a nap.

It is appreciated all the above discussion, background, brief, details description or alternative, replaceable, equal function, similar concept for quickly USB Charing-port which has initial public specification to overcome the overheating, overcome problem cause while had electric or digital data delivery, overcome only can charge one certain be-charged device because the USB port has male plug with custom-pin arrangement which not fit for variety of the be-charged device(s) so cause big return for not universal, or the more than 2 power source input to the same USB port which will make cost increased and consumer confused with expensive circuit board, so the current inventions same as the parent filing cases as above listed and has the minimum 1.0 Amp to 5 Amp or higher with safety USB charging-ports which can allow Big current passing though without heat problems to prevent overheating and cause the unit risk to fire and quickly charging capacity to save people waiting time is the most important than the charger from out-of-date 500 ma slow charger. The desktop items, lighting items, image items, lighted cosmetic mirror items, digital alarm clock, power station on desktop or any other more application as the parent filing case covered should be still fall within the current invention. And has other features as below 15 features;

1. A wired and detachable, re-assembly charging-unit, comprising;
   A charging-unit has at least one DC power delivery wire
   (1) connect with electric product built-in circuitry output-end(s),
   (2) storage within unit's built-in wire-arrangement,
   (3) assembly with electric device opening or base recessed compartment,
   (4) is coiled at outside said device by manual without elastic or spring piece.
   Said charging-unit has at least one (1) USB, (2) wireless (Qi), (3) USB and wireless; charging-system to charge external electric product(s).
2. A wired detachable, re-assembly charging-unit, wherein said electric device is power strip.
3. A wired detachable, re-assembly charging-unit, wherein said electric device is desk, floor, wall-mounted LED light.
4. A wired detachable, re-assembly charging-unit, wherein said electric device is LED light emit enough brightness to front person, object(s) to capture at least (a) partial face or whole face image, (b) partial body or whole body image, and (c) object details image; by at least one mirror, image capture device, phone having camera or video function, camera, and video camera.
5. A wired detachable, re-assembly charging-unit 1, wherein said wired and detachable charging-unit has at least two unit(s) and each unit has minimum 4 feet to 30 feet DC power delivery wire to cover broad area where people can charge product(s) at any location within broad area.
6. A wired detachable, re-assembly charging-unit, wherein said charging-unit has built-in slot, seat, saddle, cutout, gap to install be-charged product coil-set align to coil-set of charging-unit to operate wireless charging function.
7. A wired detachable, re-assembly charging-unit, wherein said charging-unit has built-in at least one USB charging-port(s) to receive external male-plug of USB-wire to deliver DC power to be-charged product(s).
8. A wired detachable, re-assembly charging-unit, wherein said charging-unit has center cylinder to install at least one USB charging-port and electric parts.
9. An LED light has DC power ports, comprising;
   At least one (1) power input-port to receiving external DC power into LED light, and (2) USB charging-port to supply DC power to charge external product; built-in LED light.
   A plurality LEDs arrange in geometric shape install on contour, edge of LED light to supply enough brightness to front at least one person, object, space to capture image is at least one
   (a) Partial or whole face image, (b) partial or whole body image, (c) details of object(s) image, (d) front environment image;
   by at least one camera, video camera, phone having image capture functions, cam device, or any image capture device(s);
   for people handle at least one selfie, cosmetic, object introducing, show details of objects, sell product(s).
10. An LED light has DC power ports, wherein said LED(s) light beam color is at least one (a) cool white color, (b) warm white color, and (c) mixing different white color.
11. An LED light has DC power ports, wherein said LED light illumination, function, color, brightness, angle, focus control by at least one (a) wired, (b) wireless; control system.
12. An LED light has DC power ports, wherein said wireless control is at least one (a) IR, (b) RF, (c) blue tooth, (d) Z-way, (e) Zig-Bee, (f) Wi-Fi, (g) Wi-Fi extender, (h) download APP software.
13. An LED light has DC power ports, wherein said LED light has built-in or added-on holder, suction-cup, hinge-holder to arrange the said image capture device on preferred position, height, orientation, direction to capture at least one image, and audio.
14. An LED light has DC power ports, wherein said LED light has recessed compartments on base to install at least one USB, Wireless, USB and wireless; wired and detachable, movable, dis-assembly, re-assembly charging-unit(s), and each unit has minimum feet length.
15. An LED light has DC power ports, wherein said LED light has at least one built-in, and added-on mirror with or without magnify function(s).

The invention claimed is:
1. A wired and detachable, re-assembleable, or movable charging-unit for an electric device, comprising:

a charging unit configured to deliver direct current by a conductive wire that connects with an output end of circuitry built-in the electric device, wherein the conductive wire
(1) is stored within a wire arrangement space or compartment built-in the charging unit; and/or
(2) is coiled within the electric device by a manual spring-less mechanism without a spring or elastic member,
wherein the charging unit is or has one or more charging system selected from:
a USB charging system, and
a wireless charging system.

2. A wired and detachable, re-assembleable, or movable charging-unit for an electric device as claimed in claim 1, wherein the electric device is a power strip.

3. A wired and detachable, re-assembleable, or movable charging-unit for an electric device as claimed in claim 1, wherein the electric device is one of a desk, floor, or wall-mounted LED light.

4. A wired and detachable, re-assembleable, or movable charging-unit for an electric device as claimed in claim 1, wherein the electric device is an LED light that emits sufficient brightness to capture, by at least one mirror, image capture device, phone having a camera, or video camera, at least (a) a partial or whole face image, (b) a partial or whole body image, and (c) an image of an object.

5. A wired and detachable, re-assembleable, or movable charging-unit for an electric device as claimed in claim 1, wherein the charging unit has at least two units and each unit has one said conductive wire having a length of 1 to 30 feet for delivering power to a large area so that persons can charge the external electric products at any location with the large area.

6. A wired and detachable, re-assembleable, or movable charging-unit for an electric device as claimed in claim 1, wherein the charging unit has a built-in slot, seat, saddle, cutout, or gap to install the conductive wire and/or a product-to-be-charged.

7. A wired and detachable, re-assembleable, or movable charging-unit for an electric device as claimed in claim 1, wherein the charging unit has at least one built-in charging port to receive a male plug of an external USB wire to deliver DC power to a product-to-be-charged.

8. A wired and detachable, re-assembleable, or movable charging-unit for an electric device as claimed in claim 1, wherein the charging unit has a central cylindrical space or compartment to install at least one charging port or wireless charging set.

9. An LED light having a charging function, comprising:
at least one DC power input end built-in the LED light housing to receive external DC power;
one or more than one of:
(1) a fixed charging unit built-in the LED light; or
(2) a detachable, re-assembleable, or movable wired charging unit,
wherein each charging unit has one or more than one of:
(a) a wireless charger function, or
(b) a USB charging function,
to supply DC power to charge an external product; and
a plurality of LEDs arranged in a geometric shape on the LED light and controlled by an integrated circuit and switch for one or more than one illumination effect selected from a light function, light color, brightness, color-mixing, sequential on-off, fade-in and fade-out, motion, non-motion, a dimmer function, and a power fail function.

10. An LED light having a charging function as claimed in claim 9, wherein an LED light beam color is selected from (a) a cool white color, (b) a warm white color, or (c) a mixture of colors.

11. An LED light having a charging function as claimed in claim 9, further including a wired or wireless control system for controlling LED light illumination, function, color, brightness, angle, and/or focus.

12. An LED light having a charging function as claimed in claim 9, further including a wireless control system selected from: (a) infrared, (b) radio frequency, (c) Bluetooth, (d) Z-way, (e) Zigbee, (f) Wi-Fi, (g) a Wi-Fi extender, or (h) downloaded APP software.

13. An LED light having a charging function as claimed in claim 9, further including one of a built-in or added-on holder, suction cup, or hinge-holder to position an image capture device at a preferred position, height, orientation, or direction to capture at least one image and/or audio.

14. An LED light having a charging function as claimed in claim 9, wherein a base of the LED light includes compartments to install one or more than one USB, wireless, or USB and wireless charging unit that is detachable, re-assembleable, or movable, each charging unit having a connecting wire of at least one foot in length.

15. An LED light having a charging function as claimed in claim 9, wherein the LED light has at least one built-in or added-on mirror with or without a magnifying function.

16. An LED light having a charging function as claimed in claim 9, wherein the plurality of LEDs emit light of sufficient brightness to capture an image of a person or object in a space in front of the LED light.

17. An LED light having a charging function as claimed in claim 9, wherein the LED light captures, by at least one mirror, image capture device, phone having a camera, or video camera, at least (a) a partial or whole face image, (b) a partial or whole body image, and (c) an image of an object.

18. An LED light having a charging function as claimed in claim 9, wherein the LED light is one of (a) a cosmetic mirror, (b) selfie light device, (c) wall mounted LED light, (d) desktop LED light, and (e) floor LED light.

* * * * *